(12) United States Patent
Kominac et al.

(10) Patent No.: US 9,244,912 B1
(45) Date of Patent: Jan. 26, 2016

(54) METHODS AND SYSTEMS FOR FACILITATING A REMOTE DESKTOP REDRAWING SESSION UTILIZING HTML

(75) Inventors: Stevan Kominac, Palo Alto, CA (US); Jeremy Michael Stanley, San Mateo, CA (US); Curtis Schwebke, Menlo Park, CA (US)

(73) Assignee: WYSE TECHNOLOGY L.L.C., San Jose, CA (US)

( * ) Notice: Subject to any disclaimer, the term of this patent is extended or adjusted under 35 U.S.C. 154(b) by 599 days.

(21) Appl. No.: 13/557,160

(22) Filed: Jul. 24, 2012
(Under 37 CFR 1.47)

Related U.S. Application Data

(63) Continuation-in-part of application No. 12/965,820, filed on Dec. 10, 2010, now Pat. No. 8,949,726.

(60) Provisional application No. 61/669,639, filed on Jul. 9, 2012.

(51) Int. Cl.
*G06F 3/00* (2006.01)
*G06F 17/28* (2006.01)
*H04L 29/08* (2006.01)

(52) U.S. Cl.
CPC .............. *G06F 17/28* (2013.01); *H04L 67/2823* (2013.01)

(58) Field of Classification Search
CPC .................................................. H04L 67/2823
USPC ......................................... 715/740, 744, 760
See application file for complete search history.

(56) References Cited

U.S. PATENT DOCUMENTS

| | | | |
|---|---|---|---|
| 5,949,412 A | 9/1999 | Huntsman | |
| 6,700,589 B1 | 3/2004 | Canelones et al. | |
| 6,831,665 B2 | 12/2004 | Tsuda et al. | |
| 6,854,122 B1 | 2/2005 | Sheriff et al. | |
| 7,167,181 B2 | 1/2007 | Duluk et al. | 345/506 |
| 7,191,211 B2 | 3/2007 | Tuli | 709/203 |
| 7,441,196 B2 * | 10/2008 | Gottfurcht et al. | 715/740 |
| 7,864,186 B2 | 1/2011 | Robotham et al. | |
| 8,176,428 B2 * | 5/2012 | Tuli | 715/738 |
| 8,239,749 B2 | 8/2012 | Williamson et al. | 715/211 |
| 8,314,804 B2 | 11/2012 | Feth et al. | 345/522 |
| 8,402,013 B2 | 3/2013 | Dutta et al. | 707/709 |
| 8,458,331 B2 | 6/2013 | Chauhan et al. | 709/225 |
| 8,504,654 B1 * | 8/2013 | Kominac | H04L 67/08 709/217 |

(Continued)

OTHER PUBLICATIONS

International Preliminary Report on Patentability; PCT/US2011/064279; pp. 12.

(Continued)

*Primary Examiner* — William Titcomb
(74) *Attorney, Agent, or Firm* — Baker Botts L.L.P.

(57) ABSTRACT

Examples of methods, systems, apparatus, and machine-readable storage media are provided to facilitate access and control of a remote desktop of a remote machine by a windows web browser of a client device through a web server without installing proprietary plug-ins or protocols on the client device. A web server may translate user input requests from a web browser into input calls compatible with a remote desktop display protocol. The web server may receive remote desktop drawing commands from the remote machine and translate the remote desktop drawing commands into web browser drawing updates compatible with the windows web browser. A web server may communicate with the windows web browser via HTTP and communicate with the remote machine via a remote desktop display protocol.

33 Claims, 50 Drawing Sheets

(56) References Cited

U.S. PATENT DOCUMENTS

| | | | |
|---|---|---|---|
| 8,527,563 B2 | 9/2013 | Brugiolo | 707/899 |
| 8,589,800 B2* | 11/2013 | Kominac | H04L 67/02 715/719 |
| 8,694,603 B2 | 4/2014 | Brobst et al. | 709/217 |
| 8,789,040 B1 | 7/2014 | Callary | 717/178 |
| 8,803,898 B2 | 8/2014 | Shreiner et al. | 345/537 |
| 8,949,463 B2* | 2/2015 | Kominac | G06F 17/30905 709/203 |
| 8,949,726 B2* | 2/2015 | Kominac | G06F 17/30905 715/740 |
| 8,966,376 B2* | 2/2015 | Kominac | G06F 17/30905 709/217 |
| 2002/0032751 A1 | 3/2002 | Bharadwaj | 709/218 |
| 2002/0120683 A1 | 8/2002 | Gomes et al. | 709/203 |
| 2004/0190771 A1 | 9/2004 | Eid et al. | |
| 2004/0260821 A1 | 12/2004 | Yamamoto et al. | 709/229 |
| 2006/0005114 A1 | 1/2006 | Williamson et al. | 715/502 |
| 2006/0256130 A1 | 11/2006 | Gonzalez | |
| 2007/0079244 A1 | 4/2007 | Brugiolo | 715/740 |
| 2007/0165035 A1 | 7/2007 | Duluk et al. | 345/506 |
| 2007/0198698 A1 | 8/2007 | Boyd et al. | 709/224 |
| 2007/0260702 A1 | 11/2007 | Richardson et al. | |
| 2007/0263007 A1 | 11/2007 | Robotham et al. | |
| 2007/0282951 A1 | 12/2007 | Selimis et al. | |
| 2007/0288855 A1 | 12/2007 | Rohrabaugh et al. | |
| 2008/0098101 A1 | 4/2008 | Black et al. | 709/223 |
| 2008/0198409 A1 | 8/2008 | Bodin et al. | |
| 2008/0263010 A1 | 10/2008 | Roychoudhuri et al. | 707/3 |
| 2008/0313545 A1 | 12/2008 | Patel et al. | 715/738 |
| 2009/0195537 A1 | 8/2009 | Qui et al. | |
| 2009/0296657 A1 | 12/2009 | Omar et al. | |
| 2009/0307428 A1 | 12/2009 | Schmieder et al. | 711/118 |
| 2010/0070887 A1* | 3/2010 | Murrett et al. | 715/760 |
| 2010/0115145 A1 | 5/2010 | Banerjee et al. | 710/10 |
| 2010/0194753 A1* | 8/2010 | Robotham et al. | 345/428 |
| 2010/0235476 A1 | 9/2010 | Lin et al. | 709/219 |
| 2010/0262650 A1 | 10/2010 | Chauhan et al. | 709/203 |
| 2010/0268762 A1 | 10/2010 | Pahlavan et al. | |
| 2010/0268828 A1* | 10/2010 | Pahlavan et al. | 709/227 |
| 2010/0268939 A1 | 10/2010 | Pahlavan et al. | 713/155 |
| 2010/0268940 A1 | 10/2010 | Pahlavan et al. | 713/155 |
| 2010/0268941 A1* | 10/2010 | Pahlavan | G06F 9/4445 713/155 |
| 2010/0269046 A1* | 10/2010 | Pahlavan | G06F 3/1462 715/740 |
| 2010/0269047 A1 | 10/2010 | Pahlavan et al. | 715/740 |
| 2010/0269048 A1* | 10/2010 | Pahlavan et al. | 715/740 |
| 2010/0269152 A1* | 10/2010 | Pahlavan et al. | 726/3 |
| 2010/0274922 A1 | 10/2010 | Reavely | |
| 2010/0281107 A1 | 11/2010 | Fallows et al. | |
| 2010/0293598 A1 | 11/2010 | Collart et al. | |
| 2011/0119602 A1* | 5/2011 | Isozu | 715/760 |
| 2011/0154212 A1* | 6/2011 | Gharpure et al. | 715/738 |
| 2011/0185286 A1* | 7/2011 | Moyers et al. | 715/752 |
| 2012/0017142 A1 | 1/2012 | Nagao | 715/211 |
| 2012/0066601 A1 | 3/2012 | Zazula et al. | 715/733 |
| 2012/0078691 A1* | 3/2012 | Tsai et al. | 705/14.4 |
| 2012/0079374 A1* | 3/2012 | Gaddis | 715/269 |
| 2012/0079380 A1* | 3/2012 | Tsai et al. | 715/716 |
| 2012/0151369 A1* | 6/2012 | Kominac | H04L 67/02 715/740 |
| 2012/0151370 A1* | 6/2012 | Kominac | G06F 17/30905 715/740 |
| 2012/0151371 A1* | 6/2012 | Kominac | G06F 17/30905 715/740 |
| 2012/0151372 A1 | 6/2012 | Kominac et al. | 715/740 |
| 2012/0151373 A1* | 6/2012 | Kominac | G06F 17/30905 715/740 |
| 2012/0266061 A1 | 10/2012 | Williamson et al. | 715/234 |
| 2012/0331038 A1 | 12/2012 | Yang | 709/203 |
| 2014/0258390 A1 | 9/2014 | Annamalaisami et al. | 709/203 |

OTHER PUBLICATIONS

International Preliminary Report on Patentability; PCT/US2011/064277; pp. 10.

International Preliminary Report on Patentability; PCT/US2011/064284; pp. 9, Aug. 15, 2013.

International Preliminary Report on Patentability; PCT/US2011/064282; pp. 8, Sep. 19, 2013.

"Windows Forms", Wikipedia, the free encyclopedia, retrieved from http://en.wikipedia.org/wiki/Windows_Forms, 3 pages, May 25, 2012.

"Comparison of the Java and NET platforms", Wikipedia, the free encyclopedia, retrieved from http://en.wikipedia.org/wiki/Comparison_of_the_Java_and_NET_platforms, 10 pages, Dec. 11, 2014.

* cited by examiner

1500-A receiving, at the transcoding server, a user input request from the web browser at the client device for access and control of the remote machine, wherein the web browser supports a 2D canvas and dynamic drawing
(1502-A)

↓ translating, at the transcoding server, the user input request into an input command compatible with a remote desktop display protocol to be utilized by the transcoding server for facilitating communication with the remote machine
(1504-A)

↓ receiving, at the transcoding server, a remote desktop drawing command from the remote machine in response to the input command
(1506-A)

↓ translating, at the transcoding server, the remote desktop drawing command into a drawing update compatible with the hypertext markup language
(1508-A)

↓ facilitating providing the drawing update from the transcoding server to the web browser
(1510-A)

FIG. 15A

1700-A receiving, at the transcoding server, a plurality of drawing requests from the web browser at the client device, using HTTP, wherein HTTP is a pull protocol
(1702-A)

handling, at the transcoding server, the plurality of drawing requests as long polling requests
(1704-A)

receiving, at the transcoding server, a remote desktop drawing command from the remote machine
(1706-A)

translating, at the transcoding server, the remote desktop drawing command into a web browser drawing update, wherein the remote desktop drawing command is compatible with a push protocol, wherein the web browser drawing update is compatible with HTTP, wherein HTTP is a pull protocol
(1708-A)

facilitating providing the web browser drawing update from the transcoding server to the web browser of the client device, utilizing HTTP, as a response to at least one of the plurality of drawing requests from the web browser
(1710-A)

```
receiving, at the adapter, an input request from the web browser utilizing
a request-response protocol, wherein the request-response protocol is a
pull protocol
(1802-A)
```

↓

```
translating, at the adapter, the input request into an input command
compatible with a remote desktop display protocol to be utilized by a
remote desktop client at the transcoding server for facilitating
communication with the remote desktop server at the remote machine,
wherein the remote desktop display protocol is a push protocol
(1804-A)
```

↓

```
providing the input command to a remote desktop client at the
transcoding server, to facilitate providing the input command to the
remote desktop server utilizing the remote desktop display protocol
(1806-A)
```

↓

```
receiving, at the adapter, a remote desktop drawing command from the
remote desktop server in response to the input command, wherein the
remote desktop drawing command is based on an image of a remote
desktop of the remote machine
(1808-A)
```

↓

```
translating, at the adapter, the remote desktop drawing command into a
graphics drawing command compatible with the transcoding server to
allow the transcoding server to facilitate providing a web browser
drawing update to the web browser, wherein the web browser drawing
update is compatible with the web browser
(1810-A)
```

FIG. 18A

2000-A receiving, at the web server, a remote desktop drawing command based on an image of the remote desktop of the remote machine, wherein the remote desktop drawing command is compatible with a remote desktop display protocol utilized by the remote machine
(2002-A)

translating, at the web server, the remote desktop drawing command into a web browser drawing update that is compatible with the web browser
(2004-A)

facilitating providing the web browser drawing update from the web server to the web browser of the client device utilizing HTTP during a remote desktop session between the client device and the remote machine
(2006-A)

```
receiving, at the web server, drawing requests from the web browser at the
client device
(2202-A)
```

```
receiving, at the web server, a remote desktop drawing command from the
remote machine using a remote desktop display protocol, wherein the
remote desktop drawing command is based on an image of a remote desktop
of the remote machine
(2204-A)
```

```
translating, at the web server, the remote desktop drawing command into a
display image and drawing coordinates for the display image
(2206-A)
```

```
placing, at the web server, the drawing coordinates into an HTTP response
header
(2208-A)
```

```
in response to at least one of the drawing requests, facilitating providing the
display image and the drawing coordinates together to the web browser in a
single HTTP response, for drawing the display image of the remote desktop
at the web browser, wherein the single HTTP response comprises the HTTP
response header
(2210-A)
```

```
receiving, at the wrapper, an input request from the web browser utilizing a
request-response protocol, wherein the request-response protocol is a pull
protocol
(2302-A)
```

↓

```
translating, at the wrapper, the input request into an input command
compatible with a remote desktop display protocol to be utilized by a remote
desktop client at the web server for facilitating communication with the
remote desktop server at the remote machine, wherein the remote desktop
display protocol is a push protocol
(2304-A)
```

↓

```
providing the input command to a remote desktop client at the web server, to
facilitate providing the input command to the remote desktop server utilizing
the remote desktop display protocol
(2306-A)
```

↓

```
receiving, at the wrapper, a remote desktop drawing command from the
remote desktop server in response to the input command, wherein the remote
desktop drawing command is based on an image of a remote desktop of the
remote machine
(2308-A)
```

↓

```
translating, at the wrapper, the remote desktop drawing command into a
graphics drawing command compatible with the web server to allow the web
server to facilitate providing a web browser drawing update to the web
browser, wherein the web browser comprises a windows web browser and
the web browser drawing update is compatible with the windows web
browser
(2310-A)
```

FIG. 23A

METHODS AND SYSTEMS FOR FACILITATING A REMOTE DESKTOP REDRAWING SESSION UTILIZING HTML

CROSS-REFERENCES TO RELATED APPLICATIONS

The present application claims the benefit of priority from U.S. Provisional Patent Application Ser. No. 61/669,639, entitled, "WEB SERVER FOR REMOTE DESKTOP DISPLAY PROTOCOL," filed on Jul. 9, 2012. The present application is also a continuation-in-part of U.S. patent application Ser. No. 12/965,820 entitled "METHODS AND SYSTEMS FOR CONDUCTING A REMOTE DESKTOP SESSION VIA HTML THAT SUPPORTS A 2D CANVAS AND DYNAMIC DRAWING," filed on Dec. 10, 2010. All of the foregoing applications are hereby incorporated by reference in their entirety for all purposes.

FIELD

The subject technology relates in general to communications and processing, and for example to, methods and systems for facilitating accessing and/or controlling a remote desktop of a remote machine in real time by a web browser of a client device via HTTP.

BACKGROUND

Traditional implementations of remote desktop protocols enable a remote user to access his or her desktop or applications from a client device over a LAN or WAN network topology to a server.

The traditional approach is for a software infrastructure vendor to support a specific public or proprietary remote desktop display protocol, which is native or installed on a server. To access the server using a remote desktop protocol, a client typically needs to have a protocol-specific software application that executes on the user's specific operating system and platform or plug-in for a specific browser.

Conventional approaches are thus cumbersome to users. Accordingly, there is a need for systems and methods that facilitate user interaction with an application running on a server from a client device and provide an improved experience for users at the client device.

SUMMARY

Aspects of the present disclosure may provide utilizing a server that may provide one or more web browsers' access to one or more remote machines through a remote desktop client. A server may include a module or functionality, e.g., machine-readable instructions, to receive requests from a web browser. A sever may include a module or functionality, e.g., machine-readable instructions, to translate user input requests received (as HTTP requests) from a web browser into corresponding input calls in a protocol/language compatible with one or more remote desktop clients for accessing one or more remote machines. In one aspect, a server can receive information/data from, e.g., drawing commands, from one or more remote machines via the one or more remote desktop clients and translate the information/data into a protocol/language compatible with the associated web browser(s). A server can include storage/memory functionality for holding an image, e.g., a Java or memory bitmap, which can be modified in response to drawing commands received from the remote desktop server. A server may receive from the remote desktop server and store coordinates corresponding to the respective drawing commands. In certain aspects, a server may comprise a web server, e.g., a windows web server.

In some applications, a server may facilitate/accelerate rendering an image of the related remote desktop(s) at the related web browser by creating and modifying an image of the portion of the remote desktop that is affected by the user's input at the user device.

Aspects of the present disclosure may provide a web server with asynchronous request handling functionality to handle requests from a web browser.

Aspects of the present disclosure may provide a server with long polling functionality to handle requests from a web browser.

Aspects of the present disclosure may include or provide a web browser having a canvas or 2D rendering functionality.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

FIG. 15A is a block diagram representing an example of a method of facilitating accessing and controlling a remote desktop of a remote machine in real time by a web browser of a client device via a hypertext transfer protocol (HTTP) utilizing a transcoding server.

FIG. 17A is a block diagram representing an example of a method of facilitating a remote desktop session between a web browser of a client device and a remote machine through a transcoding server, utilizing hypertext transfer protocol (HTTP) headers of HTTP for remote desktop session drawing.

FIG. 18A is a block diagram representing an example of a method of facilitating a remote desktop session between a web browser of a client device and a remote desktop server at a remote machine through a transcoding server, utilizing an adapter at the transcoding server.

FIG. 19C is a continuation of FIG. 19B.

FIG. 19E is a continuation of FIG. 19D.

FIG. 20A is a block diagram of an example of a method of facilitating accessing and controlling a remote desktop of a remote machine in real time by a web browser of a client device via a hypertext transfer protocol (HTTP).

FIG. 22A is a block diagram of an example of a method of facilitating a remote desktop session, utilizing hypertext transfer protocol (HTTP) headers for remote desktop session drawing.

FIG. 23A is a block diagram of an example of a method of facilitating a remote desktop session between a web browser and a remote desktop server.

Figure 1:
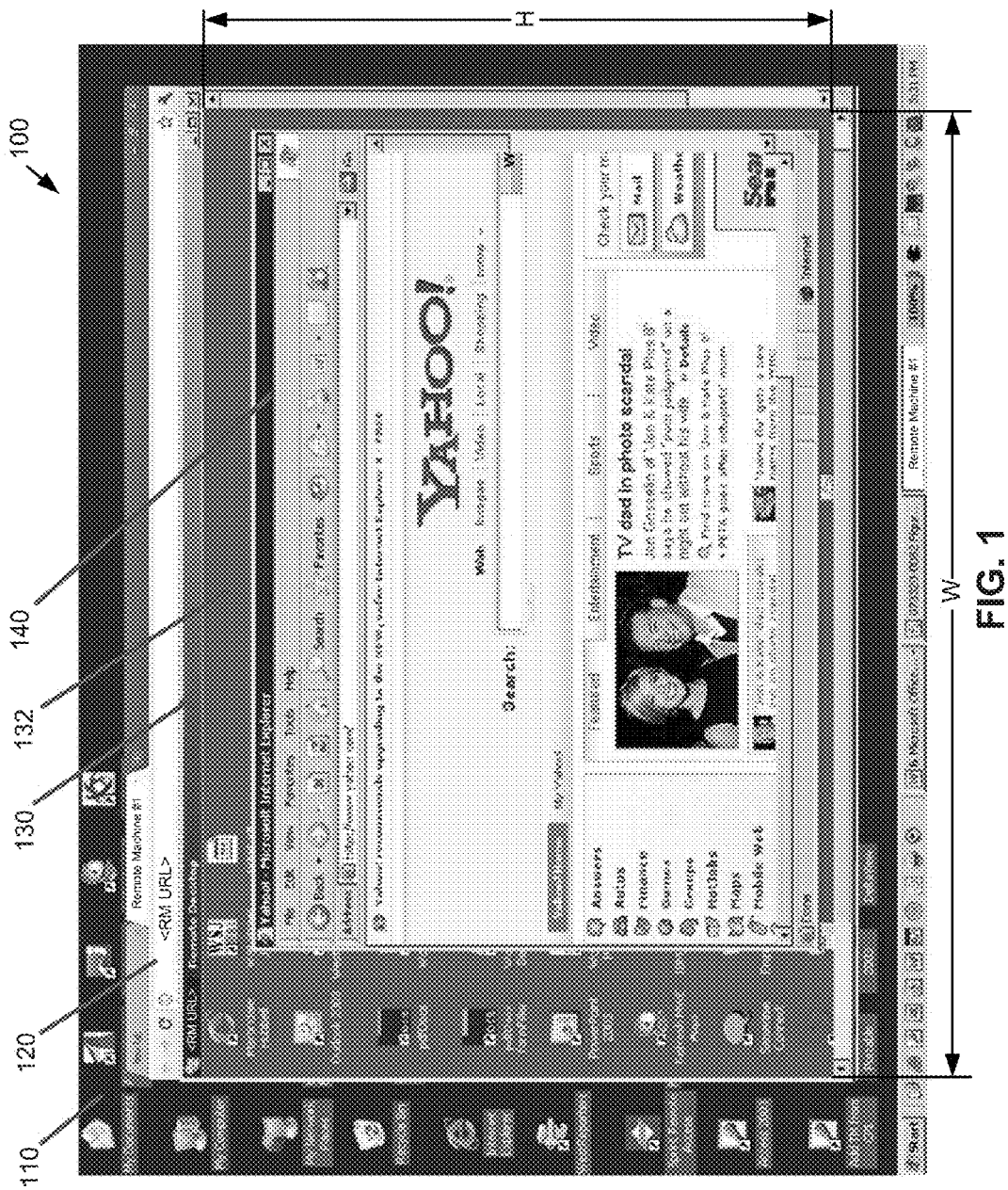
FIG. 1 illustrates an example of a display on a client device during a remote access session with a remote machine via a server.

While certain embodiments are depicted in the drawings, one skilled in the art will appreciate that the embodiments depicted are illustrative and that variations of those shown, as well as other embodiments described herein, may be envisioned and practiced within the scope of the present disclosure.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology. Like components are labeled with identical element numbers for ease of understanding.

Prior approaches using hypertext markup language (HTML) have required the use of browser specific plug-ins as a method to create a better user experience by accelerating video and audio for example. Browser plug-ins do not achieve HTML browser independence across the competing infrastructure vendors.

Infrastructure vendors are competing heavily in the "proprietary" remote desktop protocols and are focused on modest improvements over time to improve the user experience. The user experience while using a remote desktop protocol is a primary differentiator between the infrastructure vendors. There are, however, no known efforts to enable the user and customer to have a single unified method to have remote access to their home, work or mobile Windows, Mac or Linux environments.

In some aspects, embodiments of the subject technology can eliminate or reduce the need for the installation of "proprietary" protocols on a user's device (or a client device) for accessing a remote machine during a remote desktop session. A remote machine, or remotely accessed machine, may include a remote desktop server. By enabling the user to use a single method to access their remote desktops with an "open standard" technology like HTML5, the requirements placed on a user's device, e.g., a smart phone, can be greatly reduced.

In some aspects, embodiments of the subject technology can reduce or eliminate the need for installation of client software and/or a browser plug-in on the user's client device.

In some aspects, embodiments of the subject technology can achieve a robust user experience that one would expect from a local executing application on a personal computing desktop.

In some aspects, embodiments of the subject technology can advantageously utilize 2D rendering capability of suitable web browsers and replace proprietary rendering protocols with the 2D drawing capabilities of a browser running on the user's client device.

In some aspects, embodiments of the subject technology can allow a user to easily access one or multiple open remote desktops across multiple servers and maintain their exact state from information stored in real-time on an associated web server having protocol translation functionality that can function as a common interface between push-type protocol employed by most remote desktop protocols and the pull-type protocol employed by HTTP, also referred to herein as a "transcoding server," which the user may access via a web browser having 2D rendering capability. Doing so can allow the user to render a remote display of a currently open session in a few seconds. Thus, as the user switches from client device to client device, the exact state of a particular remote desktop is preserved and is re-rendered based on the capabilities of each display device. Effectively the user's multiple desktops can be configured to be always on and ready to be displayed on demand. The user's remote desktops can be configured to be accessed at any time and from any location.

Prior to the subject technology as described herein, because HTTP (a pull-type protocol) and most remote desktop display protocols (push-type protocols) are incompatible, it has generally been recognized by those skilled in the art that proprietary software and/or downloadable plug-ins were necessary for a web browser in order to have a remote desktop session using an HTTP on one end and a remote desktop display protocol on the other end.

In some aspects, embodiments of the subject technology can enable a user of any endpoint device with a web browser having 2D rendering capabilities, e.g., an HTML5 browser, to display one or more remote desktop sessions in a single or multiple browser windows. Embodiments of the present disclosure can accordingly eliminate the need for installation on a client device of proprietary or open source client applications for remote desktop access. Embodiments of the present disclosure can establish and maintain simultaneous remote desktop connections to a single or multiple Windows, Mac OS, or Linux servers and enable all remote sessions to be displayed and interacted independently within the user's browser application. Embodiments of the present disclosure can be rendered in real-time and be displayed as a web page on the remote client, e.g., a user device such as a smart phone. All user mouse, touch and keyboard input may be captured within the browser window and converted into the input format needed by the remote desktop machine, which may utilize common desktop protocols, e.g., independent computing architecture (ICA) by Citrix Systems, remote desktop protocol (RDP) by Microsoft, and PC-over-IP (PCoIP) by Taradici, etc. Embodiments of the present disclosure can maintain open connections to the host servers at all times allowing single or multiple endpoint devices to be interactively connected and disconnected to the remote sessions instantly. Remote sessions never need to be disconnected from the servers as embodiments of the present disclosure can maintain active connections to the desktop. Active sessions can be resized and adjusted for best display and user experience to utilize the full capability of the user's access device.

In some aspects, embodiments of the subject technology can reduce or eliminate the requirement for a local client application, e.g., a web browser, to support a vendor specific remote desktop protocol. Embodiments of the present disclosure can allow a browser with 2D rendering capability to run on any hardware, any operating system and any form-factor for the user to access her or his remote desktop or applications. A user can simply point the browser, e.g., an HTML5 compatible browser such as Google Chrome, to a respective predetermined uniform resource locator (URL) for one or more remote machines configured as remote desktop application servers. The browser can access a transcoding server that can translate or transcode between the protocol used for the browser and the protocol used for the remote machine(s). The transcoding server can be public/private cloud-based, and the access to the transcoding server can utilize HTTPS protocol. The transcoding server can authenticate the connection between the remote machine and a remote desktop client, render the desktop of the remote machine(s) in real-time, and transmit that rendering to the browser via HTTP so that the browser can display the rendering in HTML5 canvas. Accordingly, embodiments of the present disclosure can function as, or provide, a virtual desktop and application server that connects to one or multiple remote desktop servers, e.g., Citrix XenDesktop with ICA, Microsoft Windows Client and Server with RDP, and VMware View with PCoIP, etc.

Prior to HTML5 supporting canvas 2D real-time drawing primitives, HTML alone was not seen as a practical rendering technology due to the static nature of the rendered objects. As used according to the present disclosure, HTML5, and similar browser languages, can enable a new user robust experience due to the ability of rendering in 2D, 3D and multimedia video/audio objects on the client platform; HTML5 can also, in some cases, utilize hardware acceleration for such rendering. Aspects of the subject technology can facilitate enhanced user experience for remote desktop sessions by providing platform-independent techniques that allow real time access to remote machines and do not require the client device to have proprietary software or plug-ins. Moreover, the remote machines are not required to have HTTP or HTML compatibility for the remote desktop sessions.

As described herein, aspects of the subject technology can reduce or minimize traffic between a browser and a transcoding server according the present disclosure. The reduction in traffic can be facilitated by various aspects of the subject technology including, but not limited to, implementation of long polling for drawing requests received from a web browser, providing to a web browser only image portions from a remote desktop that have changed and need to be updated (rather than the image of the entire remote desktop), and placing coordinates for updated image portion(s) into a header of a single HTTP transmission response. The reduction of traffic to and from a browser can facilitate a remote desktop session that provides a real time user experience, e.g., a user experience with few if any perceivable delays in the round trip time (delay) for user inputs to travel from a client device, to the remote machine, and a corresponding update of the remote desktop showing up on the client device. In exemplary embodiments, such delay may be below, e.g., 100 milliseconds, so that most users will not perceive any delay at all.

FIG. 1 shows an example of a display at a client device with a large screen during a remote desktop session with a remote machine via a server. The display 100 includes the local desktop 110 of the client device, a web browser window 120 that in turn includes a remote view window 130 showing an image 132 of a remote desktop of the remote machine, which image includes, in this example, folder and shortcut icons in addition to a remote web browser application 140 running on the remote machine. The remote view window 130 may have a height H and a width W, and remote view window 130 may be resized (e.g., to be made larger to cover the entire local desktop 110 or be made smaller). The image 132 of the remote desktop 130 and remote application 140 are based on display output data of the remote desktop 130 and remote application 140 from the remote machine transmitted to the client device via the server.

Figure 5:
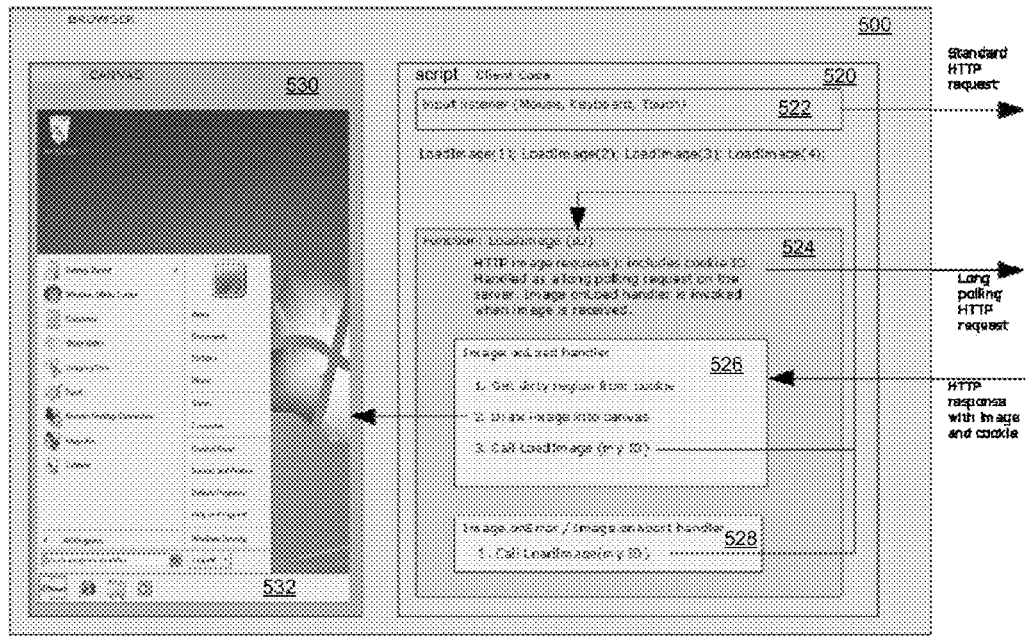
FIG. 5 is a conceptual block diagram of an example of a web browser as used in conjunction with a transcoding server and a remote machine.

As was noted previously, aspects of the present disclosure can include or utilize a HTML5 compatible web browser having a 2D canvas, e.g., 530 in FIG. 5. The HTML5 specification provides for a 2D canvas, which allows for dynamic, real-time, scriptable rendering of 2D shapes and bitmap images. In one aspect, being scriptable can mean or include reference to utilizing JavaScript for rendering a 2D image. The canvas consists of a drawable region defined in HTML code with height and width attributes. JavaScript code may access the area through a full set of drawing functions similar to other common 2D APIs, thus allowing for dynamically generated graphics.

Figure 2A:
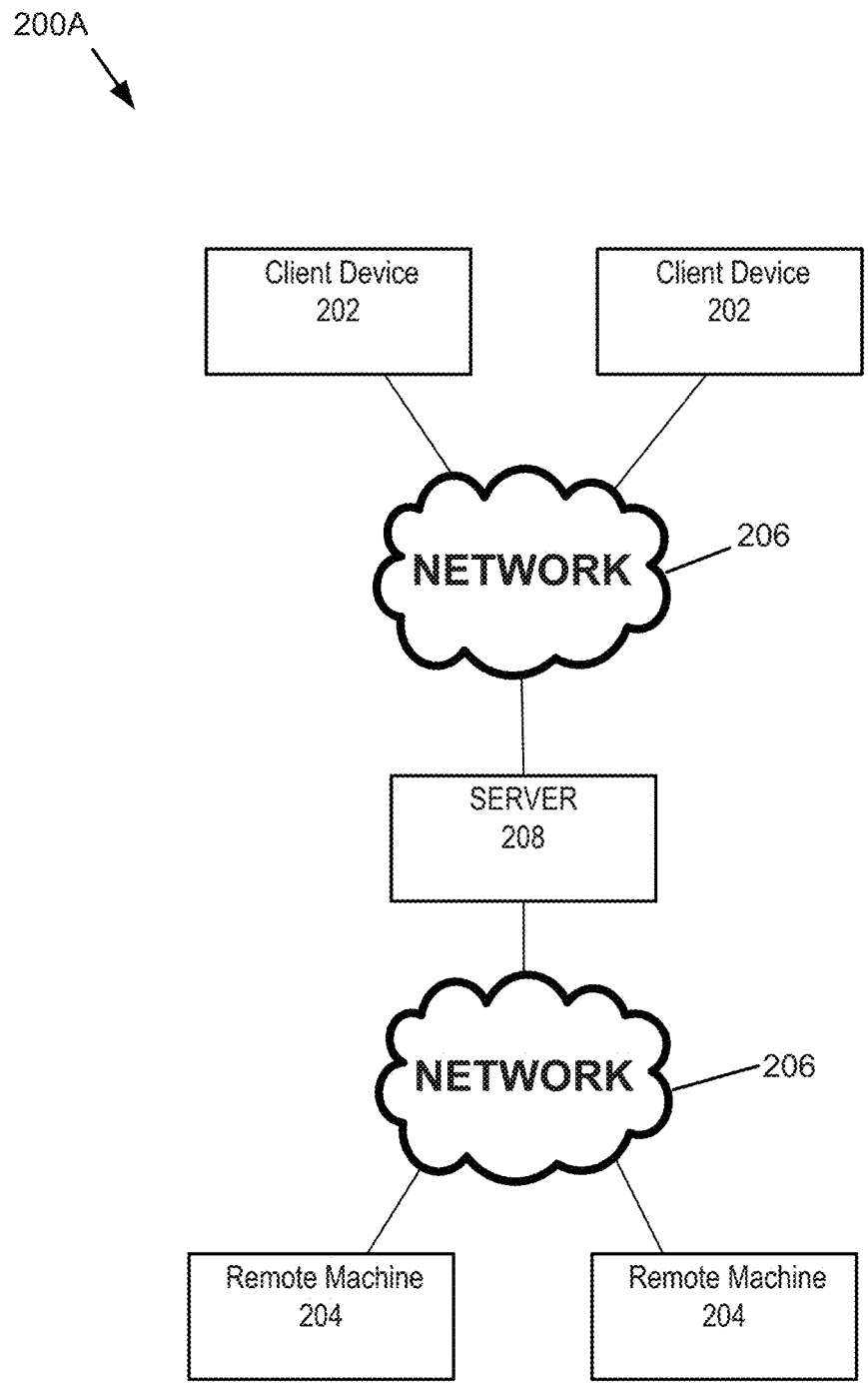
FIG. 2A is a diagram of an example of one or more client devices each with a web browser connected to one or more remote machines via multiple networks and a server.
Figure 2B:
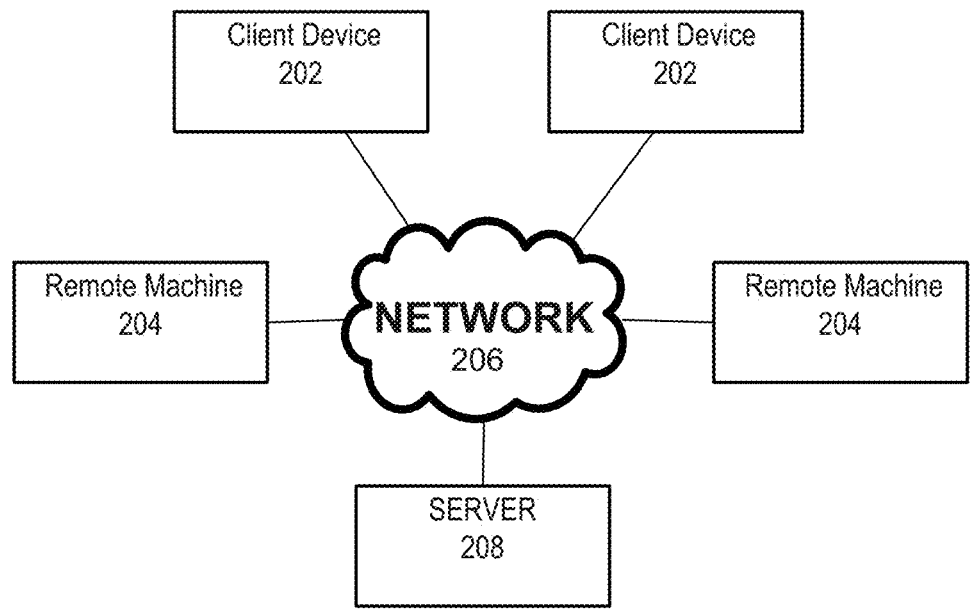
FIG. 2B is a diagram of an example of one or more client devices each with a web browser connected to one or more remote machines through a network and a server.

As shown in FIGS. 2A-2B, an overall architecture of exemplary embodiments of the present disclosure may contain three parts: a client device (or a user's device) containing a browser, e.g., an HTML5 compatible browser; a server, e.g., a Java web sever, that is configured to function as a transcoding server, translating between different protocols; and a remote machine to which the client device is connecting. As shown and described for FIGS. 3A-3B, a transcoding server may include three main sections: a remote desktop client wrapper or adapter, a drawing commands queue, and a web application container. The web application container can include various elements or components, e.g., a hypertext transfer protocol (HTTP) handler, a long polling handler, and a drawing requests queue, as shown and described with reference to FIGS. 2A-11. In an alternate embodiment, a drawing commands queue may be a part of a web application container.

FIG. 2A is a diagram of an example of client devices such as those having a web browser connected to multiple remote machines through multiple networks and a server. The system 200 may include one or more remote client devices 202 in communication with one or more remote machines 204 via a server computing device 208 (server) via one or more networks 206. In one aspect, the server 208 is configured to allow remote sessions (e.g., remote desktop sessions) wherein users at client devices 202 can access applications and files on one or more remote machines 204 by logging onto the server 208 from a client device 202 over one or more networks 206.

FIG. 2B is a diagram of an alternate example of one or more client devices connected to one or more remote machines through a network and a server. As shown in the drawing, the server 208 associated with the remote machines 204 can be connected to network 206, for example, in a hub and spoke configuration.

By way of illustration and not limitation, in one aspect of the disclosure, stated from a perspective of a remote machine side (treating a remote machine 204 as a local device and treating a client device 202 as a remote device), an application is executed (or runs) at a local device 204. While a client device 202 may receive and display a view of the application on a display local to the client device 202, the client device 202 does not execute (or run) the application at the client device 202. Stated in another way from a perspective of the client side (treating a remote machine 204 as a remote device and treating a client device 202 as a local device), a remote application is executed (or runs) at a remote machine 204, and while a client device 202 may receive and display a view of the remote application, the client device 202 does not execute (or run) the remote application locally at the client device.

By way of illustration and not limitation, a client device 202 can represent a computer, a mobile phone, a laptop computer, a thin client device, a personal digital assistant (PDA), a portable computing device, or a suitable device with a processor. In one example, a client device 202 may be a smartphone (e.g., iPhone, Android phone, Blackberry, etc.). In certain configurations, a client device 202 can represent an audio player, a game console, a camera, a camcorder, an audio device, a video device, a multimedia device, or a device capable of supporting a connection to a remote server. In a preferred example, a client device 202 is mobile. In another example, a client device 202 can be stationary. According to one aspect of the disclosure, a client device 202 may be a device having at least a processor and memory, where the total amount of memory of the client device 202 could be less than the total amount of memory in a remote machine 204 or a server 208. In one example, a client device 202 does not have a hard disk. In one aspect, a client device 202 has a display smaller than a display supported by a remote machine 204 or a server 208. In one aspect, a client device may include one or more client devices.

In one preferred aspect, a server 208 or a remote machine 204 may represent a computer. In another aspect, a server 208 or a remote machine 204 may represent a laptop computer, a computing device, a virtual machine (e.g., VMware® Virtual Machine), a desktop session (e.g., Microsoft Terminal Server), a published application (e.g., Microsoft Terminal Server) or a suitable device with a processor. In one preferred example, a server 208 or a remote machine 204 is stationary. In another aspect, a server 208 or a remote machine 204 can be mobile. In certain configurations, a server 208 or a remote machine 204 may be any device that can represent a client device. In one aspect, a server 208 may include one or more servers.

In one example, a first device is remote to a second device when the first device is not directly connected to the second device. In one example, a first remote device may be connected to a second device over a communication network such as a Local Area Network (LAN), a Wide Area Network (WAN), and/or other network.

When a client device 202, a server 208 and a remote machine 204 are remote with respect to one another, a client device 202 may connect to a server 208 over a network 206, and a remote machine may connect to a server 208 over a network 206 via a network connection, for example, a modem connection, a LAN connection including the Ethernet or a broadband WAN connection including DSL, Cable, T1, T3, Fiber Optics, Wi-Fi, or a mobile network connection including GSM, GPRS, 3G, WiMax or other network connection. A network 206 can be a LAN network, a WAN network, a wireless network, the Internet, an intranet or other network. A network 206 may include one or more routers for routing data between client devices and/or servers. A remote device (e.g., client device, server) on a network may be addressed by a corresponding network address, such as, but not limited to, an Internet protocol (IP) address, an Internet name, a Windows Internet name service (WINS) name, a domain name or other system name. These illustrate some examples as to how one device may be remote to another device. However, the subject technology is not limited to these examples.

According to certain aspects of the present disclosure, the terms "server" and "remote server" are generally used synonymously in relation to a client device, and the word "remote" may indicate that a server is in communication with other device(s), for example, over a network connection(s).

According to certain aspects of the present disclosure, the terms "client device" and "remote client device" are generally used synonymously in relation to a server and/or a remote machine, and the word "remote" may indicate that a client device is in communication with a server(s) and/or a remote machine(s), for example, over a network connection(s).

In one aspect of the disclosure, a "client device" may be sometimes referred to as a client, a user device, a user's device or vice versa. Similarly, a "server" may be sometimes referred to as a server device or vice versa. A server is sometimes referred to as a web server. Exemplary embodiments of the present disclosure include use of web servers with transcoding functionality, e.g., transcoding servers.

In one aspect, the terms "local" and "remote" are relative terms, and a client device may be referred to as a local client device or a remote client device, depending on whether a client device is described from a client side or from a server side or a remote machine's side, respectively. A remote machine may be referred to as a local machine or a remote machine, depending on whether a remote machine is described from the remote machine's side or from a client or server side. Similarly, a server may be referred to as a local server or a remote server, depending on whether a server is described from a server side or from a client side or a remote machine's side, respectively. Furthermore, an application running on a remote machine may be referred to as a local application, if described from a remote machine's side, and may be referred to as a remote application, if described from a client side or a server side.

In one aspect, devices placed on a client side (e.g., devices connected directly to a client device(s) or to one another using wires or a short range wireless connection (e.g., Bluetooth)) may be referred to as local devices with respect to a client device and remote devices with respect to a server. Similarly, devices placed on a server side (e.g., devices connected directly to a server(s) or to one another using wires or a short range wireless connection (e.g., Bluetooth)) may be referred to as local devices with respect to a server and remote devices with respect to a client device.

Figure 3A:
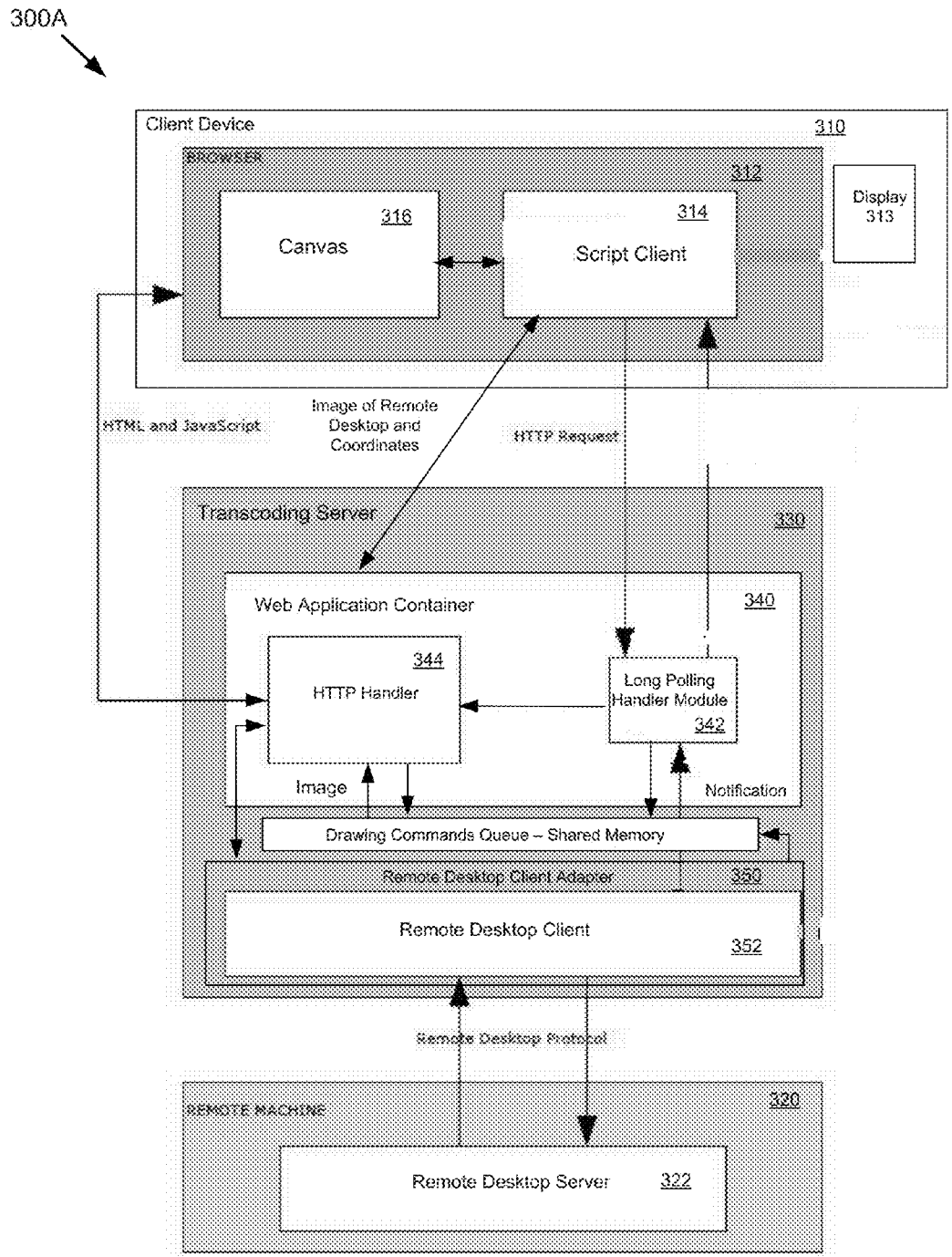
FIG. 3A is a conceptual block diagram of an example of a transcoding server according to certain aspects of the present disclosure as used in conjunction with a web browser and a remote machine.

FIG. 3A is an example of a conceptual block diagram of a system 300A including a transcoding server 330 according to certain aspects of the present disclosure as used in conjunction with a web browser 312 and a remote machine 320. A client device 310, such as a smart phone or laptop computer, is depicted along with a web browser having (i) a canvas 316, e.g., the web browser 312 supports a 2D rendering canvas, and (ii) a script client 314, e.g., a JavaScript client in a preferred embodiment.

Transcoding server 330 can include three main functional blocks or modules: a web application container 340, a remote desktop client adapter 350, and a drawing commands queue 360 that includes a shared memory. The web application container can include an HTTP handler 344 for handling HTTP requests from the web browser and HTTP responses to the web browser. In some embodiments, the web application container 340 may also include a long polling handler module 342, as shown. The remote desktop client adapter 350 can be configured to interface with a remote desktop client 352, e.g., from a third-party vendor, for communication with remote machine 320, which may include a remote desktop server 322, as shown. Embodiments of a transcoding server 330 can be configured to provide an application framework for hosting one or more web applications and/or function as a Java web application container that can run Servlets. In some aspects, a remote desktop client adapter 350 may be referred to as a remote desktop client common interface.

The remote desktop client 352 may function to communicate with the remote desktop server 322 of the remote machine 320 using a remote desktop display protocol. The remote desktop client sends a user's input to the remote machine, and receives drawing data from the remote machine via its specific remote desktop display protocol.

In one aspect, a remote desktop server 322 may refer to a software installed on a remote machine 320, and a remote desktop server 322 may allow applications, particularly those including graphical applications, which run on the remote machine 320, to be displayed at a machine that is separate and distinct from the remote machine 320 (e.g., client devices 310). Remote desktop server 322 may allow drawing commands representing an image of a desktop of the remote machine to be transmitted to the separate machine (e.g., transcoding server 330). In one aspect, remote desktop client 352 may refer to software installed on the machine that is separate and distinct from the remote machine 320 (e.g., transcoding server 330). Remote desktop client 352 may send requests to remote desktop server 322 via a remote desktop display protocol and in response receive the drawing commands representing the image of the desktop of the remote machine via the remote desktop display protocol.

In operation, the web application container 340 can function to receive and respond to the JavaScript client's HTTP requests. In one implementation, a Servlet container can be used but the same result can be achieved using any similar web application framework, such as Restlet, for example. The remote desktop client adapter 350 may provide a common interface between any remote desktop client and the drawing commands queue/the web application container.

The remote desktop client adapter 350 may receive a user's input information, data, or commands (e.g., mouse, keyboard, and touch events) from HTTP handler 344 and translate the input information/commands into respective remote desktop input calls, which are sometimes referred to as remote desktop input commands. The remote desktop client adapter 350 may also translate the drawing commands of the remote desktop, e.g., GDI drawing commands, received from remote desktop server 322 (via a remote desktop display protocol and remote desktop client 352) into Java graphics application programming interface (API) commands. Java graphics API commands in themselves are not suitable for the web browser; but they are an intermediary step towards achieving browser compatibility. The remote desktop client adapter may then execute those Java graphics API commands, i.e., drawing into an off-screen Java bitmap, which can be stored in the drawing commands queue 360. In an alternative embodiment, the drawing commands queue (e.g., 360 of FIG. 3A or 440 of FIG. 4A or 4B) may receive the Java graphics API commands from the remote desktop client adapter and execute the Java graphics API commands to draw into an off-screen Java bitmap. The HTTP handler (e.g., 344 of FIG. 3A or 422 of FIG. 4A) or image conversion module (e.g., 346 of FIG. 3B or 428 of FIG. 4B) can create an image, such as a joint photographic experts group (JPEG) image, or a portable network graphics (PNG) image, or a bit image file (BMP) image or any other image file in an image format suitable for web browsers, from the Java off-screen bitmap; and the resulting image is suitable for the browser 312. In one aspect, a JPEG image may be referred to as a JPEG image file, and a PNG image may be referred to as a PNG image file, and BMP image may be referred to as a BMP image file. In one aspect, as the image (e.g., a JPEG or PNG image) is created in real time, when it is created, it is simply sent to the web browser without being stored at the transcoding server.

In one aspect, the drawing commands queue 360 can serve two purposes: holding or storing the off-screen Java bitmap onto which drawing commands are executed; and, holding or serving as a drawing coordinates pool, e.g., a queue of coordinates for drawing commands. The drawing commands queue 360 can, for example, store GDI drawing command coordinates received from the remote desktop client adapter. In the event there are new drawing coordinates in the queue, the drawing commands queue 360 may send a notification to long polling handler module 342 (e.g., can be sent so that any pending request in the drawing requests queue can be served). The drawing requests queue (e.g., 426 in FIG. 4A or 4B) can function to store incoming long polling drawing requests from the client and respond to them when there are pending drawing commands from the drawing commands queue.

Figure 3B:
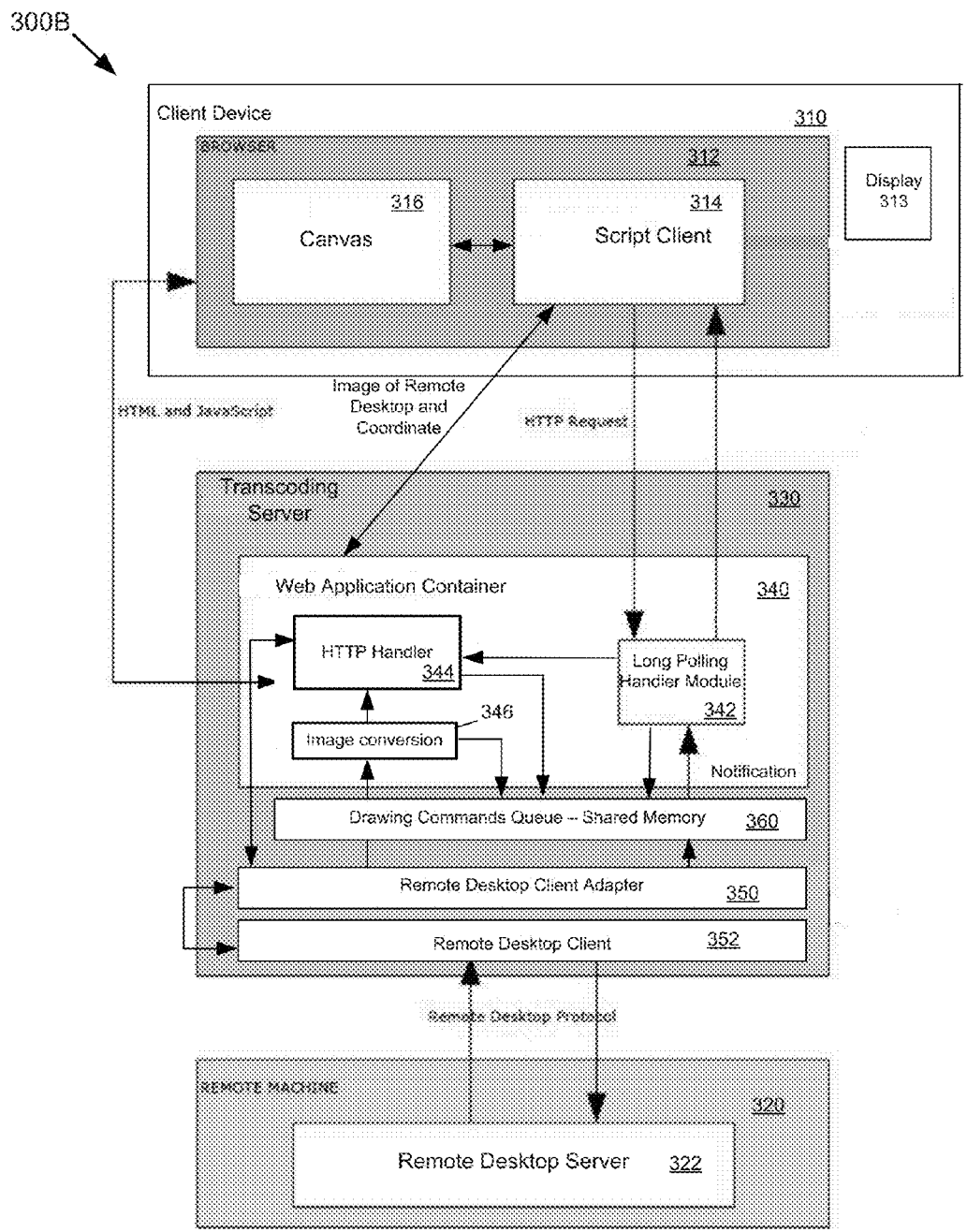
FIG. 3B is a conceptual block diagram of an example of a transcoding server according to certain alternate aspects of the present disclosure as used in conjunction with a web browser and a remote machine.

FIG. 3B is a conceptual block diagram of a system 300B including a transcoding server 330 according to certain alternate aspects of the present disclosure as used in conjunction with a web browser and a remote machine. System 300B is similar to system 300A of FIG. 3A with similar reference numbers, except that the remote desktop client 352 is shown as a separate module/functional block relative to the remote desktop client 350 adapter, and an image conversion module 346 is shown as a separate module/functional block relative to HTTP handler 344.

Figure 4C:
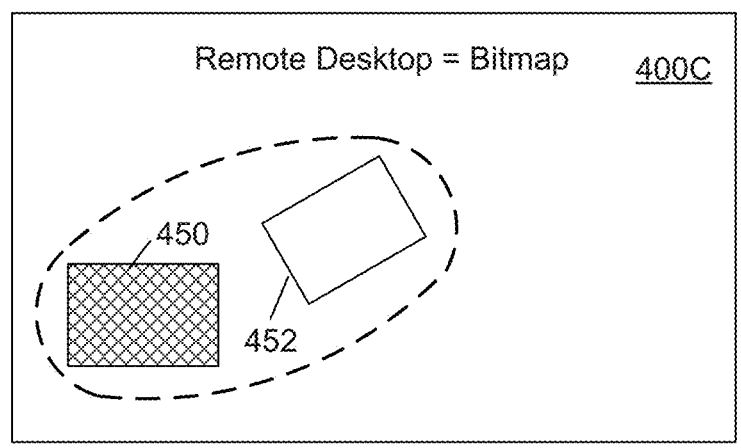
FIG. 4C is a conceptual block diagram of a remote desktop of a remote machine.
Figure 4A:
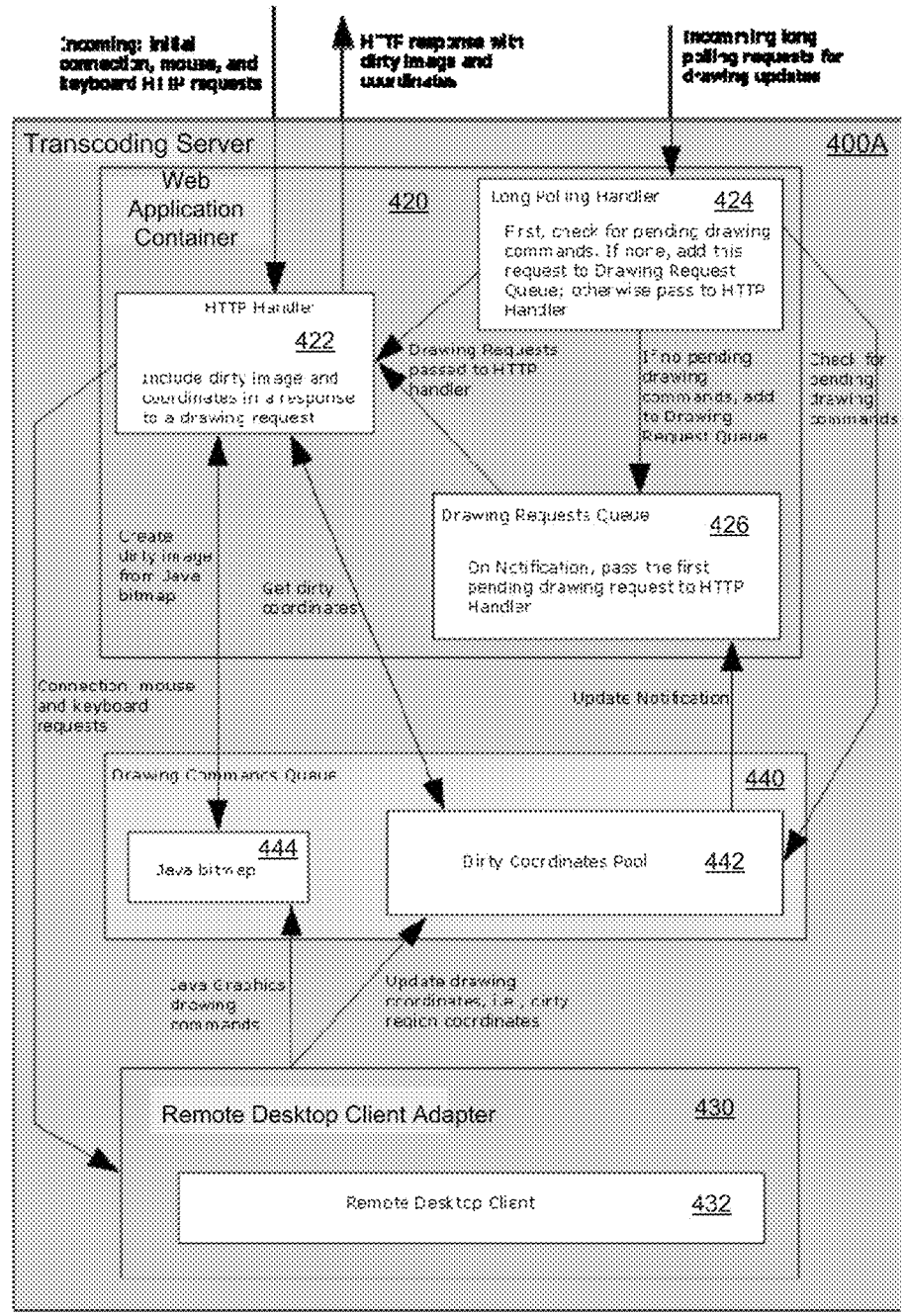
FIG. 4A is a conceptual block diagram of an example of a transcoding server.
Figure 4B:
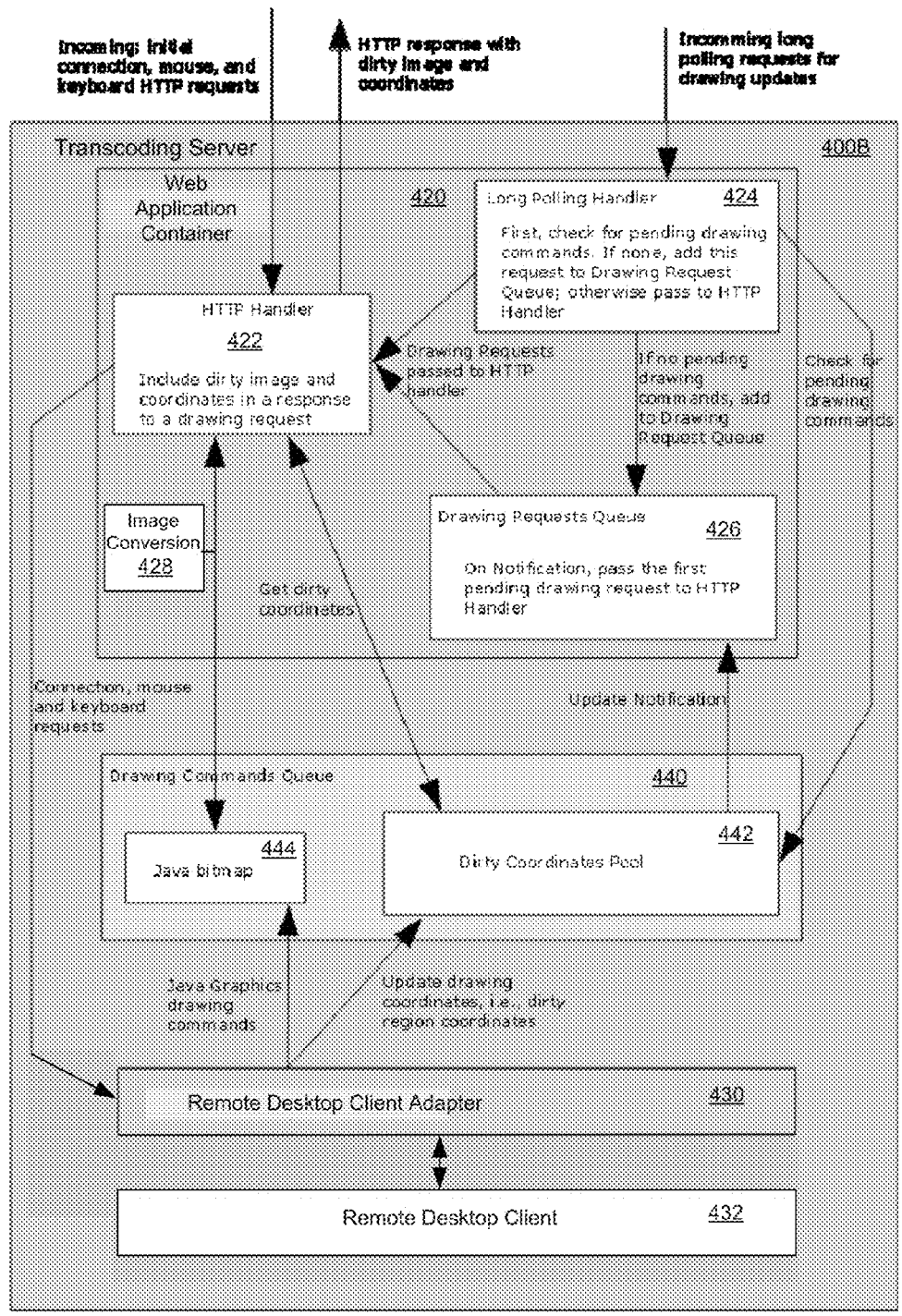
FIG. 4B is a conceptual block diagram of an example of an alternate transcoding server.

FIG. 4A is a detailed conceptual block diagram of a transcoding server 400A according to certain aspects of the present disclosure. In one aspect, transcoding server 400A may preferably be a Java transcoding server. Transcoding server 400A may include a web application container 420 (e.g., a web application container such as a Servlet container), a remote desktop client adapter 430, and a drawing commands queue 440. The remote desktop client adapter 430 can be configured to interface with any suitable remote desktop client 432 for communication with a remote machine (e.g., 320 in FIG. 3A or 3B), which may be configured to include a remote desktop server (e.g., 322 in FIG. 3A or 3B). 432. The drawings commands queue 440 can function as memory or storage that is accessible by both the web application container 420 and the remote desktop client adapter 430. The web application container 420 may include an HTTP handler 422 for handling HTTP requests from a web browser and sending HTTP responses back to the client/web browser (e.g., 312 in FIG. 3A or 3B). In one aspect, the HTTP handler 422 is a standard HTTP handler. The drawing commands queue 440 can serve two purposes: holding or storing an off-screen image, e.g., Java bitmap 444, onto which drawing commands are executed; and, serving as a drawing coordinates pool 442, e.g., a queue of coordinates for drawing commands. The coordinates can be those of regions or areas of an image of the remote desktop that need to be redrawn at the client device to reflect changes on the remote desktop. The areas or regions are sometimes referred to as "dirty" regions, as indicated in FIGS. 4A-4B.

In some embodiments, the web application container may include a long polling handler module, which includes a long polling handler 424 and a drawing requests queue 426. The long polling handler 424 can operate with drawing requests queue 426. The drawing requests queue 426 can function to store incoming long polling drawing requests received from the client (e.g., HTML5 compatible web browser such as web browser 312 in FIG. 3A or 3B) via the long polling handler 424 and respond to them when there are pending drawing commands from the drawing commands queue 440. In one aspect, pending drawing commands may include coordinates for the image in dirty coordinates pool 442 and/or an image (e.g., Java bitmap 444) in the drawing commands queue 440.

In operation, the web application container 420 may receive and respond to HTTP requests from a web browser on a user device (e.g., 202 in FIG. 2A or 310 in FIG. 3A or 3B). The web application container 420 may provide user input requests to the remote desktop client adapter 430, which provides a common interface between the web application container 420 and the remote desktop client 432. The remote desktop client adapter 430 may translate user input information (e.g., mouse, keyboard, and touch events) into respective remote desktop input calls for the remote desktop client 432. The remote desktop client adapter 430 may translate the drawing commands (e.g., GDI drawing commands) of an image of a remote desktop received from a remote machine (e.g., 204 in FIG. 2A or 2B or 320 in FIG. 3A or 3B) via a remote desktop display protocol and the remote desktop client 432, into Java graphics drawing commands.

After receiving and translating the drawing commands from the remote desktop client 432, the remote desktop client adapter 430 may draw into an off-screen Java bitmap stored in the drawings commands queue 440 as shown. More specifically, the remote desktop client adapter 430 may provide as an image the portion, also referred to as the "dirty region(s)" of the remote desktop affected by the user's input from the user device. Along with the drawing commands, the remote desktop client adapter 430 may extract, from the drawing command(s), coordinates of the dirty region(s) from the remote desktop client and provide the drawing coordinates to the drawing commands queue 440 (e.g., dirty coordinates pool 442), as indicated. As explained later, the coordinates can be placed into an HTTP header section (e.g., by HTTP handler 422) to send dirty region coordinates (e.g., as cookie), along with an image, to a browser (e.g., 312 in FIG. 3A or 3B) for display.

In the event there are new drawing coordinates in the drawing commands queue 440 (e.g., in the dirty coordinates pool 442), drawing commands queue 440 may send a notification to the drawing requests queue 426 so that any pending request in the drawing requests queue 426 can be forwarded to the HTTP handler 422 for serving. The HTTP handler 422 may then reach to the drawing commands queue 440 (e.g., dirty coordinates pool 442), and obtain the dirty coordinates from the dirty coordinates pool 442. The HTTP handler 422 may then place the dirty coordinates into an HTTP header section (known as a cookie). In addition, according to those coordinates, the HTTP handler 422 may obtain an image portion from the Java off-screen bitmap 444. The HTTP handler 422 may then send the image (e.g., as a JPEG image or a PNG image) as well as the coordinates, which are stored in an HTTP response header section, to the web browser (e.g., 312 in FIG. 3A or 3B) for display at the user device's display (e.g., 313 in FIG. 3A or 3B). As a result, the transcoding server 400A can facilitate a remote desktop session between a user device (e.g., 202 in FIG. 2A or 2B or 310 in FIG. 3A or 3B) and a remote machine (e.g., 204 in FIG. 2A or 2B or 320 in FIG. 3A or 3B) without the need for the user device to utilize proprietary plug-ins or protocols.

In one aspect, an image (or an image file) and drawing coordinates sent by a transcoding server to a web browser may be considered as an example of web browser drawing updates. In a preferred aspect, web browser drawing updates are compatible with the web browser so that the web browser can recognize the web browser drawing updates and process them to display an image at the appropriate location on a display. Web browser drawing updates may be implemented with other types of drawing data and commands.

In one aspect, an HTTP protocol (the requests of which may be handled with an HTTP handler and a long polling handler) between a client device and a transcoding server is a pull protocol, and a remote desktop display protocol utilized between a transcoding server and a remote machine is a push protocol.

Long polling is a modification of the traditional polling technique and can allow emulation of an information push from a server to a client. With long polling, the client requests information from the server in a similar way to a normal poll. In the event the server does not have any information available for the client, instead of sending an empty response, the server holds the request and waits for some information to be available. Once the information becomes available (or after a suitable timeout), a complete response is sent to the client. The client can then immediately re-request information from the server, allowing the server to almost always have an available waiting request that it can use to deliver data in response to an event.

FIG. 4B is a conceptual block diagram of an alternate transcoding server 400B according to certain aspects of the present disclosure. Transcoding server 400B is similar to transcoding server 400A of FIG. 4A with similar drawing numbers, except a separate image conversion or generation block 428 is shown. Block 428 may function to take the Java bitmap 444 from the drawing commands queue 440 and convert it to an image file, e.g., JPEG, BMP, PNG, or the like, and provide the image file to the HTTP handler 422 so that the HTTP handler 422 can send the image file along with the associated coordinates to the web browser (e.g., 312 in FIG. 3A or 3B). An additional difference is that the remote desktop client 432 is shown as a separate module/functional block relative to the remote desktop client adapter 430.

FIG. 4C is a conceptual block diagram of an image 400C of a remote desktop of a remote machine. The image 400C can include the entire desktop of the remote machine. The image may be provided by a remote desktop client, e.g., 432 in FIG. 4A or 4B, as part of a remote desktop drawing command for a remote desktop session with a remote machine. A suitable remote desktop display protocol may be used for the remote desktop session. Examples can include, but are not limited to, the Microsoft® Remote Desktop Protocol (RDP), personal computer over internet protocol (PCoIP), remote FX (RFX) protocol, remote framebuffer (RFB) protocol, Citrix independent computing architecture (ICA), NX protocol, and/or other suitable remote desktop display protocols. In one example, it may be advantageous to use the RDP (which is a push-type protocol) as it is widely used. As shown, image 400C can include regions that have changed, e.g., image portion 450 and image portion 452, relative to a prior instance of the image of the desktop. Both image portions 450 and 452 can be provided, along with their coordinates, in a drawing command from an associated remote desktop server to an associated remote desktop client (to be processed and translated and then to be sent to a web browser by a transcoding server) for a remote desktop session. Alternatively, image portion 450 may be provided in a drawing command with its coordinates, and then image portion 452 may be provided in another drawing command with its coordinates separately (e.g., sequentially). Thus, when only a portion of the remote desktop has changed, then only the changed portion can be provided from a remote desktop server to its remote desktop client, instead of providing the entire image of the remote desktop to reduce traffic and improve efficiency.

FIG. 5 is a conceptual block diagram and image of a web browser 500 according to certain aspects of the present disclosure as used in conjunction with a transcoding server (e.g., 208 in FIG. 2A or 2B, 330 in FIG. 3A or 3B, 400A in FIG. 4A, or 400B in FIG. 4B) and a remote machine (e.g., 204 in FIG. 2A or 2B, or 320 in FIG. 3A or 3B). In a preferred aspect, web browser 500 may be an HTML5 compatible web browser. In one aspect, web browser 500 may be web browser 312. Web browser 500 can include a script client code 520, for example, a JavaScript client code, and a canvas 530 (e.g., an object or element in memory supporting 2D drawing or rendering). The script client code 520 may refer to a script client 314 in FIG. 3A or 3B. The canvas 530 can include or represent the entire viewable window (e.g., 130 of FIG. 1) of the browser (e.g., 312, 500). In a preferred aspect, the canvas 530 is an HTML5 compatible canvas, e.g., a canvas element according to the HTML5 specification. Examples of suitable web browsers can include, but are not limited to, Mozilla Firefox, Google Chrome, Safari, and Opera. Web browser 500 may be resident on a suitable user device such as a PC or smartphone or the like.

The script client code 520 can include an input listener 522 responsive to user inputs such as mouse, keyboard, and touch events. The input listener 522 can send HTTP requests with the user inputs to a transcoding server, e.g., server 208 in FIG. 2A or 2B or 330 of FIG. 3A or 3B. The script client code 520 may also include a load image function or module 524 that includes an image onload handler 526, which may extract drawing coordinates from the HTTP header (e.g., from the portion known as a cookie), draw the received image onto canvas 530, and call the load image function 524 again, passing it its unique identification (ID). An image on error handler and/or image on abort handler 528 may also be included in the load image function 524 to handle loading errors. The handler 528 may call the load image function 524. For remote desktop sessions, the canvas 530 can hold an image of the remote desktop of the remote machine, e.g., 132 of FIG. 1, and the user device may display the image onto a display (e.g., 313 in FIG. 3A or 3B) in the viewable window 130 of the browser (e.g., 312, 500).

As mentioned previously, an HTML5 compatible browser can be used for exemplary embodiments of the present disclosure. HTML5 includes (or supports) a canvas, which allows for dynamic, real-time, scriptable rendering of 2D shapes and bitmap images. In one aspect, being scriptable can mean or include reference to utilizing JavaScript for rendering a 2D image. The canvas 530 consists of a drawable region defined in HTML code with height and width attributes. JavaScript code may access the canvas region or area through a full set of drawing functions similar to other common 2D APIs, thus allowing for dynamically generated graphics.

In operation, such as accessing a remote machine (e.g., 204 in FIG. 2A or 2B or 320 in FIG. 3A or 3B)) during a remote desktop session, the input listener 522 may relay user inputs to the related transcoding server (e.g., 208 in FIG. 2A or 2B or 330 in FIG. 3A or 3B), which interfaces with the remote machine by way of a remote desktop client and remote desktop client adapter (e.g., 350 in FIG. 3A or 3B or 430 in FIG. 4A or 4B). The script client code 520 can also send a number of drawing requests, as indicated by LoadImage(1)-LoadImage(4). As described previously, the drawing requests can be handled by the related transcoding server as long polling requests.

When drawing commands are received from the remote desktop server via the remote desktop client, the transcoding server may create/modify an off-screen image of the remote desktop and provide the actual image and related coordinates to the browser 500, where the JavaScript client's image onload handler (e.g., 528) can then draw the image 532 to the canvas 530 in accordance with the coordinates extracted from the HTTP header (e.g., cookie). In one aspect, the image 532 represents a portion of the entire image of the remote desktop that has been changed, and thus the onload handler can receive and update a portion of the canvas based on the coordinates received (instead of updating the entire canvas).

In one aspect, a bitmap in a transcoding server (e.g., Java off-screen bitmap 444) may include or represent a bitmap of an entire image of a remote desktop (e.g., 132 of FIG. 1). When a portion(s) of the image of the remote desktop is changed (e.g., image portion 450, 452) in response to, for example, a user's input command or other changes by the remote machine, the changed image portion(s) and its remote desktop coordinates may be provided as a remote desktop drawing command(s) to a remote desktop client adapter (e.g., 430) from a remote desktop server (e.g., 322) via a remote desktop client (e.g., 432).

In one aspect, the remote desktop client adapter may translate the remote desktop drawing command(s) into a graphics drawing command(s), generate coordinates (corresponding to the remote desktop coordinates) based on the graphics drawing commands, and provide the coordinates into a pool (e.g., 442). The remote desktop client adapter may execute the graphics drawing command(s) to draw into the bitmap, or stated in another way to generate a bitmap portion(s) to update a portion(s) of the bitmap (e.g., a portion(s) of 444) according to the coordinates generated by the remote desktop client adapter. The updated portion(s) of the bitmap represents the changed image portion(s) of the remote desktop. In a preferred aspect, the updated portion(s) of the bitmap is a portion of a Java off-screen bitmap 444.

In one aspect, an HTTP handler (e.g., 422) may form an image file corresponding to the updated portion(s) of the bitmap, obtain the coordinates (e.g., from 442) for the image file, and place the coordinates into a section of an HTTP header. The HTTP handler may then provide the image file and the coordinates to a web browser (e.g., 312, 500) or more specifically to a script client code (e.g., 520) in a single HTTP response.

A canvas (e.g., 530) may store the entire image of a remote desktop (e.g., 132 of FIG. 1) to be displayed on a display (e.g., 100, 313) and then a portion(s) of the canvas 530 may be updated when a portion(s) of the image of the remote desktop is changed during a remote desktop session. In this example, when the script client code receives an image file and the coordinates corresponding to the changed portion(s) of the image of the remote desktop, the script client code can update a portion of the canvas at canvas coordinates corresponding to the coordinates received from the HTTP handler so that the updated portion of the canvas represents the image contained in the image file.

Because drawing commands provided by a remote desktop client may include only those image portion(s) or region(s) of the remote desktop (with corresponding coordinates) that have been changed or updated relative to previous drawing commands, the image provided to the canvas (e.g., 530) can accordingly be limited or minimized to include just the updated portion(s) of the remote desktop, in exemplary embodiments. The updates on the remote desktop can be due to a user's input (e.g., via a remote desktop session) or caused by the remote machine itself, e.g., a new indicated time from the system clock. Because the size of the image(s) provided to the canvas (e.g., 530) in response to drawing requests can be minimized, the traffic for the remote session can be reduced or minimized, facilitating a real time user experience for a remote desktop session.

In one example, a remote desktop drawing command may comprise a drawing call such as gdi_bitmap (*data, top, left, width, height, 16, 32) in which "*data" may be a pointer to a memory location where the bitmap data is located. The parameters "top, left, width, height" may represent the coordinates for the bitmap data. The parameter "16" may be the number of bits in red-green-blue (RGB), and the parameter "32" may be the number of bits in alpha-red-green-blue (ARGB). Thus, this exemplary call indicates where the bitmap data for a portion of the image of the remote desktop (e.g., the portion that has been changed) is located, the coordinates for the bitmap data, and the number of bits used to convert from an RGB format to an ARGB format.

In another example, a graphics drawing command may comprise a drawing call such as draw-rect (color, top, left, width, height). This drawing call can draw a rectangle at the coordinates specified by "top, left, width, height" using the specified "color."

In one aspect, when long polling is utilized between a client device and a transcoding server that uses HTTP (a pull protocol), traffic to the client device can be reduced to a level experienced by a push-type protocol.

Figure 6:
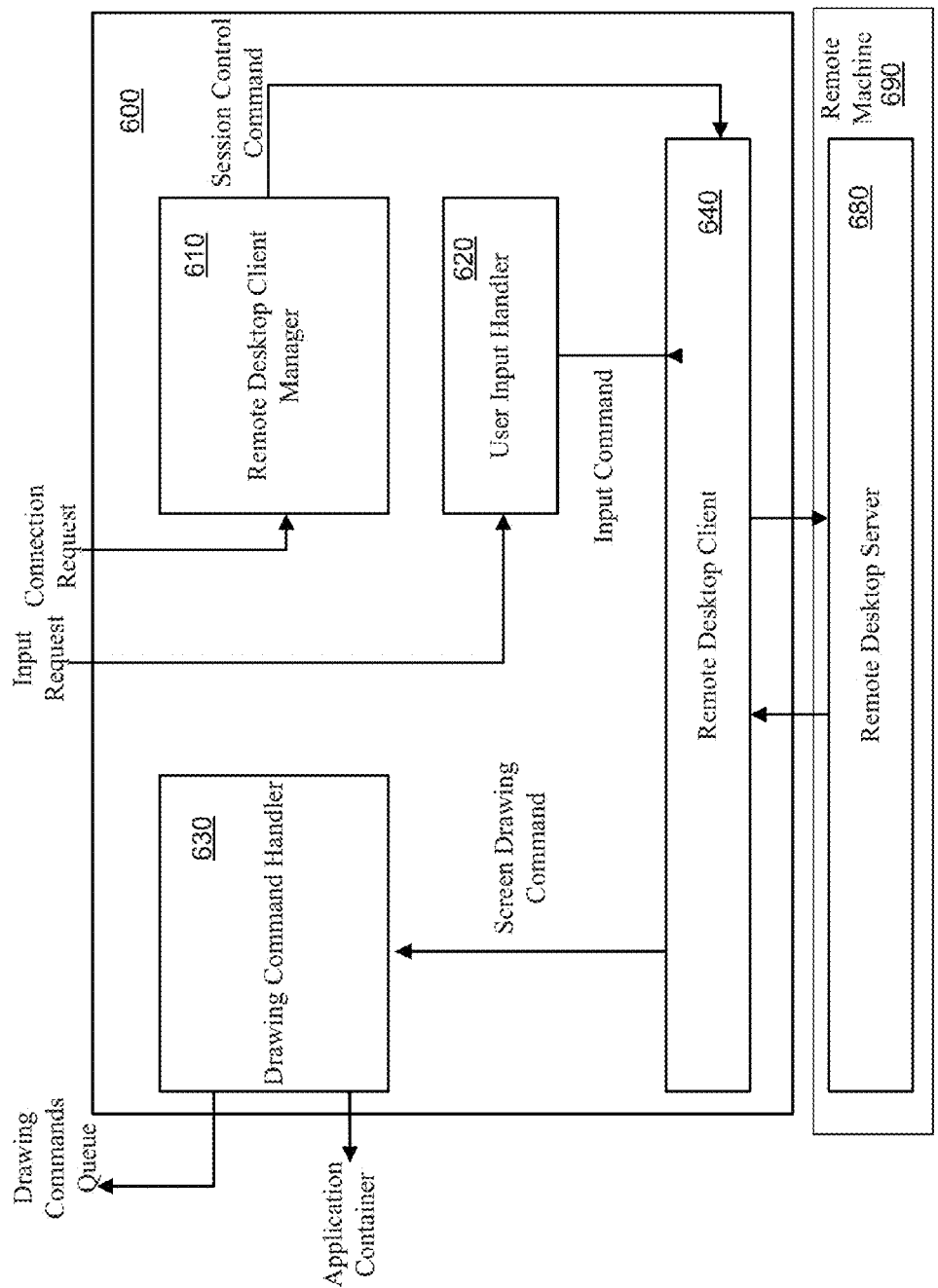
FIG. 6 is a conceptual block diagram of an example of a transcoding server according to certain aspects of the present disclosure.

FIG. 6 illustrates an example of remote desktop client adapter 600, in accordance with various aspects of the subject technology. The remote desktop client adapter 600 facilitates communication between the remote machine 690, which may include a remote desktop server 680, and the rest of the transcoding server components, e.g., the web application container (e.g., 420 in FIG. 4A or 4B) and drawing commands queue (e.g., 440 in FIG. 4A or 4B). In some aspects, a remote desktop client adapter 600 may provide a common interface between remote desktop client (e.g., 352 in FIG. 3A or 3B, 432 in FIG. 4A or 4B, or 640 in FIG. 6) and web application container (e.g., 420 in FIG. 4A or 4B). In some aspects, a remote desktop client adapter 600 may include a drawing command handler 630, a remote desktop client manager 610, a user input handler 620, and remote desktop client 640. In some aspects, a remote desktop client adapter does not necessarily include a remote desktop client 640. Rather, a remote desktop client may be a module separate from remote desktop client adapter (e.g., as shown in FIG. 3B).

According to various aspects of the subject technology, an adapter 600 may include a remote desktop client manager 610, which may be configured to receive a connection request (e.g., an HTTP request specifying a particular remote machine) indirectly from a web browser (e.g., 312 in FIG. 3A or 3B) via a web application container (e.g., 340 in FIG. 3A or 3B or 420 in FIG. 4A or 4B). In some aspects, a connection request may be received from a web browser via a web application container that communicates with the web browser. For example, the connection request can be received from a web browser via an HTTP handler (e.g., 344 or 422) of a web application container. In some aspects, a remote desktop client manager 620 may manage (or facilitate) establishing a remote desktop session between a remote desktop client 640 and a remote desktop server 680 in response to the connection request. For example, a remote desktop client manager 610 may manage (or facilitate) starting the remote desktop session, passing credentials, settings, preferences, etc., to a remote desktop server (e.g., via a remote desktop client), and stopping the remote desktop session.

In one aspect, a remote desktop client manager 610 may receive a connection request, e.g., a request originated from a web browser to establish a connection with remote desktop server (e.g., 322 or 680). In response to the connection request, the remote desktop client manager 610 may generate session control commands that are compatible with the remote desktop client, remote desktop server and the remote desktop display protocol, e.g., session control commands that can be understood and processed by remote desktop client and remote desktop server and that can be transmitted and received by remote desktop client and remote desktop server utilizing the remote desktop display protocol. These session control commands may include a command for starting a remote desktop session, a command for stopping the remote desktop session. The session control commands may include one or more of credentials, settings, preferences, etc. and command(s) for passing credentials, settings, preferences, etc. to remote desktop server (e.g., 322 or 680). In response to the connection HTTP request, the remote desktop client manager 610 may provide the appropriate session control command(s), generated by the remote desktop client manager, to the remote desktop client (e.g., 352 or 640). The remote desktop client may then use the session control commands received from the remote desktop client manager 610 to start a remote desktop session with the remote desktop server, pass credentials, settings, preferences, etc., to remote desktop server, and stop the remote desktop session.

In one aspect, a remote desktop client manager 610 can translate a connection request that is not compatible with a remote desktop client, a remote desktop server, or a remote desktop display protocol (e.g., that cannot be understood or processed by a remote desktop client, a remote desktop server or a remote desktop display protocol) into session control commands that are compatible with the remote desktop client, the remote desktop server and the remote desktop display protocol (i.e., that can be understood and processed by remote desktop client and remote desktop server and that can be communicated between remote desktop client and remote desktop server utilizing the remote desktop display protocol).

In some aspects, facilitating an establishment of a remote desktop session, between a remote desktop client and a remote desktop server, comprises generating a session control command based on the initial HTTP request. In some aspects, facilitating an establishment of the remote desktop session comprises transmitting the session control command from a remote desktop client manager 610 to a remote desktop client 640 and then from the remote desktop client to a remote desktop server 680. For example, the session control command may be transmitted to the remote desktop server 680 via the remote desktop client 640 that communicates with remote desktop server 680 using a remote desktop display protocol. In some aspects, the remote desktop display protocol comprises at least one of the Microsoft® Remote Desktop Protocol (RDP), personal computer over internet protocol (PCoIP), remote FX (RFX) protocol, remote framebuffer (RFB) protocol, independent computing architecture (ICA), NX protocol, and other suitable remote desktop display protocols. In some aspects, the RFB protocol comprises virtual network computing (VNC).

According to certain aspects of the subject technology, a server such as server 208, 330, 400A, 400B (e.g., via a remote desktop client manager 610) can maintain open connections between its remote desktop client and one or more remote desktop servers at all times, allowing single or multiple client devices to be interactively connected and disconnected to remote desktop sessions instantly. In some aspects, remote desktop sessions may never need to be disconnected from the one or more remote desktop servers, as a server can maintain active connections to the one or more remote desktop servers. Of course, a remote machine (e.g., 690) may go down for reasons that are outside of a related transcoding server's control; however, the connection can be maintained as long as the remote machine is available for remote access. For example, a remote desktop client manager 610 may continuously maintain the remote desktop session until the remote desktop server disconnects from the remote desktop session depending on the remote desktop server's idle remote connection settings. In some aspects, remote desktop sessions established utilizing a remote desktop client manager 610 may be resized and adjusted for best display and user experience to utilize the full capability of the client devices.

According to various aspects of the subject technology, a user input handler 620 may receive an input request indirectly from a web browser such as a server 208, 330, 400A, 400B (e.g., via an HTTP handler 344 or 422), and convert the input request into a format recognized by and/or compatible with remote desktop client 640 and remote desktop server 680. For example, user input handler 620 receives an input request that was transmitted utilizing a request-response protocol from web browser. In preferred aspects, the request-response protocol may comprise hypertext transfer protocol (HTTP). In another aspect, the request-response protocol may comprise other suitable request-response protocols. In some aspects, the input request is received from a web browser (e.g., 312 in FIG. 3A or 3B) via a web application container (e.g., 340 420) that communicates with the web browser. For example, the input request is received via an HTTP handler (e.g., 344 or 422) of a web application container. In some aspects, the input request comprises at least one of a mouse event, a keyboard event, and a touch event. User input handler 620 may translate the input request that is in a format suitable for or compatible with the request-response protocol into an input command (e.g., a remote desktop display protocol input command) that is suitable for or compatible the remote desktop display protocol. The user input handler 620 may transmit the input command to a remote desktop client 640, which may transmit the input command to a remote desktop server 680. For example, user input handler 620 may facilitate transmitting the input command to remote desktop server 680 via remote desktop client 640 that communicates with remote desktop server 680 using the remote desktop display protocol. In one aspect, an input request is sometimes referred to as a user input command and vice versa. Please note, however, if an input request is referred to as an input command when it is received via HTTP, it is a HTTP request rather than a command. In one aspect, an input command is sometimes referred to as an input call or a remote desktop input command and vice versa.

A remote machine 690 (e.g., its remote desktop server 680) may execute one or more actions based on the input command and send drawing data, as a result of the executed one or more actions, to a server such as a transcoding server 208, 330, 400A or 400B (e.g., a remote desktop client 620 of the server). According to various aspects, a remote desktop client 640 can receive a screen drawing command transmitted from a remote machine 690 (e.g., its remote desktop server 680) utilizing the remote desktop display protocol, in response to the input command transmitted to remote machine 690 (e.g., its remote desktop server 680). In one aspect, a screen drawing command received from a remote machine may be sometimes referred to as a drawing command, a remote machine drawing command, or a remote desktop drawing command received from a remote machine and vice versa. The drawing command handler 630 may then receive the screen drawing command from the remote desktop client 640 connected to the remote machine 690. For example, a drawing command handler 630 can receive the screen drawing command from a remote machine 690 (e.g., its remote desktop server 680) via a remote desktop client 640 that communicates with the remote machine 690 (e.g., its remote desktop server 680) using the remote desktop display protocol.

According to certain aspects, a drawing command handler 630 may convert a screen drawing command into a format recognized by and/or compatible with a web browser (e.g., 312 in FIG. 3A or 3B). For example, a drawing command handler 630 may translate a screen drawing command that is suitable for or compatible with a remote desktop client, a remote desktop server and a remote desktop display protocol, into a graphics drawing command that is compatible with the server 208, 330, 400A or 400B, such as a Java graphics (abstract window toolkit) API command when the server is a Java transcoding server. In some aspects, translating the screen drawing command can include calculating new, and/or adjusting received drawing command parameters, and/or making adjustments to the received bitmap data, such as, but not limited to, converting the 16-bit red-green-blue (RGB) 5-6-5 color format into a 32-bit alpha-red-green-blue (ARGB) 8-8-8-8 format. In some aspects, drawing command handler 630 may execute the graphics drawing command (e.g., Java graphics API command) to draw into an already created image bitmap, (e.g., the off-screen Java bitmap 444) of the drawing commands queue (e.g., 360 in FIG. 3A or 3B, or 440 in FIG. 4A or 4B) at the transcoding server (e.g., 330 in FIG. 3A or 3B, 400A in FIG. 4A, or 400B in FIG. 4B). In one aspect, Java graphics API command is sometimes referred to as Java graphics command or Java graphics drawing command. In one aspect, the off-screen bitmap may be a storage or memory location that is a part of a drawing commands queue (e.g., 360 or 440) accessible by an application container (e.g., 340 or 420). In one aspect, the size of an off-screen bitmap may represent the size of a remote session. Stated in another way, the size of an off-screen bitmap may represent the size of the remote desktop, or an off-screen bitmap may be a bitmap representation of an entire image of a remote desktop.

Preferred embodiments of the present disclosure may, in essence, translate a request in HTTP to a command in a remote desktop display protocol and vice versa (e.g., translate requests/responses transmitted/received via HTTP to commands transmitted/received via a remote desktop display protocol, and vice versa) for a remote session between a client device and a remote machine. For example, the input request from the web browser such as a server 208, 330, 400A, 400B may be translated into the input command (e.g., a remote desktop input command) that is suitable for or compatible with the remote desktop display protocol and is received by remote desktop server 680 via remote desktop client 640. The screen drawing command transmitted from the remote machine 690 (e.g., in response to the input command) utilizing the remote desktop display protocol may be translated into the graphics drawing command that is compatible with the server 208, 330, 400A or 400B, such as a Java graphics (abstract window toolkit) API command. In some aspects, HTTP is a pull protocol while a remote desktop display protocol may be a push protocol. In some aspects, a drawing command in push protocol may be translated into a drawing update (or a drawing response) in pull protocol during a remote session between a client device and a remote machine.

With continued reference to FIG. 6, a drawing command handler 630, when drawing into the off-screen bitmap, may transmit pixel data to the off-screen bitmap. In some aspects, the pixel data is used to update a portion of the off-screen bitmap (e.g., an off-screen Java bitmap). In some aspects, a drawing command handler 630 may transmit the pixel data to the off-screen bitmap so that the updated portion of the off-screen bitmap may be stored and/or converted to an image file.

According to certain aspects, a drawing command handler 630 can generate one or more coordinates corresponding to the updated portion of the off-screen bitmap (e.g., an image drawn into the off-screen bitmap when the graphics drawing command is executed). For example, the one or more coordinates may identify the locations where the corresponding image bitmap is to be executed on the canvas of a web browser. In one example, the one or more coordinates may be extracted or copied from the graphics drawing command. A drawing command handler 630 may also transmit the one or more coordinates to a dirty coordinates pool 442 in FIG. 4A or 4B that is a part of a drawing commands queue (e.g., 360 or 440). In some aspects, a drawing command handler 630 may transmit the one or more coordinates to the dirty coordinates pool so that the one or more coordinates may be stored in the dirty coordinates pool. Thus, a drawing command handler 630 may update "dirty" region coordinates in the drawing commands queue. In some aspects, a drawing command handler 630 may transmit a notification signal to a drawing requests queue (e.g., 426 in FIG. 4A or 4B) of a web application container (e.g., 420). In some aspects, the notification signal/message may indicate that the image bitmap (e.g., the off-screen Java bitmap) has been updated.

Figure 7:
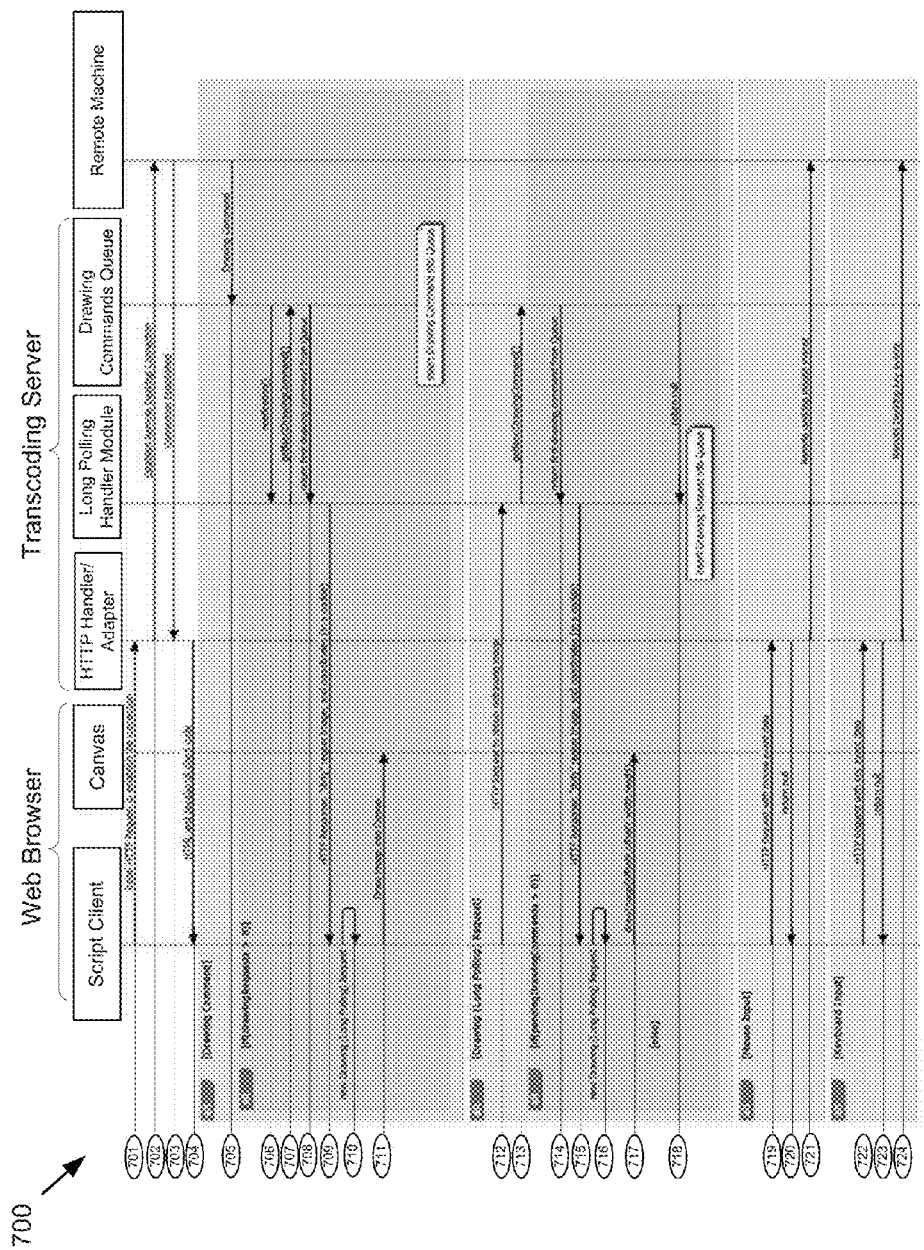
FIG. 7 is an example of a sequence diagram of the interactions between a transcoding server as used in conjunction with a web browser and a remote machine.

FIG. 7 is a sequence diagram 700 of the interactions between a transcoding server (e.g., 208, 330, 400A or 400B) as used in conjunction with a web browser (e.g., 312) and a remote machine (e.g., 204, 320 or 690), according to certain aspects of the present disclosure. The sequences are shown as 701-724. As shown at 701, a web browser can send an initial HTTP request to a transcoding server (e.g., transcoding server 400A of FIG. 4), for example, to its HTTP handler (e.g., 422). The initial HTTP request can include a URL that specifies a desired remote machine. At 702 and 703, the transcoding server can facilitate establishing a remote desktop connection with the remote machine (e.g., its remote desktop server). At 704, the transcoding server also can provide a client code, e.g., JavaScript client code, to the web browser. The JavaScript client code in the web browser can generate a number of drawing requests, which can be handled by the transcoding server as long polling requests. In exemplary embodiments, four drawing requests may be pending at any one time although the number can be selected as desired and optimized for different implementations.

As shown at the bottom of the diagram, e.g., at 719 and 722, the web browser can provide user input requests (as HTTP requests) to the transcoding server, which in turn, e.g., at 721 and 724, can provide the user input commands to the remote machine, e.g., for control of the remote desktop of the remote machine. At 705, the remote machine can provide drawing commands (one command is shown) to the drawing commands queue (e.g., 360 or 440) in the transcoding server by way of the remote desktop client adapter (e.g., 350, 430 or 600), which draws a corresponding image of the remote desktop into the off-screen bitmap in the drawing commands queue. In response to the drawing command, the drawing commands queue can provide, at 706, notification to the drawing requests queue (e.g., 426) in the long polling handler module (e.g., 342) of the transcoding server. In response, the first pending drawing request can be taken from the drawing requests queue and provided to the HTTP handler. In response, at 707 and 708, the HTTP handler may obtain the image from the drawing commands queue. At 709, the HTTP handler may provide the image and corresponding coordinates in a response sent to the script client (e.g., 314 or 520, or more specifically 526) of the web browser. The script client may then, at 711, draw the image (e.g., 532) to the canvas (e.g., 316 or 530) using the appropriate coordinates, extracted from the cookie, for displaying the remote desktop in the web browser.

In one aspect, an HTTP handler (e.g., 422) is a standard HTTP handler in that when it receives a request from a web browser, it responds without waiting or storing the request. For example, when an HTTP handler receives a user input request as a HTTP request at 719 or 722 from a web browser, the HTTP handler responds immediately with a null response at 720 and 723, respectively (while the request is sent to the remote machine via a remote desktop client adapter). In one aspect, a long polling handler (e.g., 424) may be used to receive a request and respond to it based on an event, and a long polling request may be stored. For example, under one condition (e.g., a drawing command is pending), then the request is responded immediately (e.g., the polling handler sends the drawing request to the HTTP handler so that the HTTP handler can send a response to the drawing request immediately. Under another condition (e.g., a drawing command is not pending), then the request may be stored away (e.g., into a drawing requests queue) until a condition is satisfied (e.g., a new drawing command has arrived at a drawing commands queue).

In one aspect, a remote desktop is a desktop of a remote machine. In one aspect, during a remote desktop session with a remote machine, a web browser of a client device may access, control and/or view any or all applications and files resident on the remote machine. In another aspect, during a remote desktop session with a remote machine, depending on the user's credentials and settings, a web browser may be allowed to access, control and/or view some of the applications and files resident on the remote machine.

In one preferred aspect, each of a client device, a transcoding server, and a remote machine is a separate and distinct machine that is remote from one another. In one aspect, a transcoding server may be a machine that can communicate with one or more client devices and one or more remote machines, and a transcoding server may be a machine that can communicate over a web. In one aspect, a web browser may be an application that allows a user to retrieve, present or communicate information over a web.

Figure 8A:
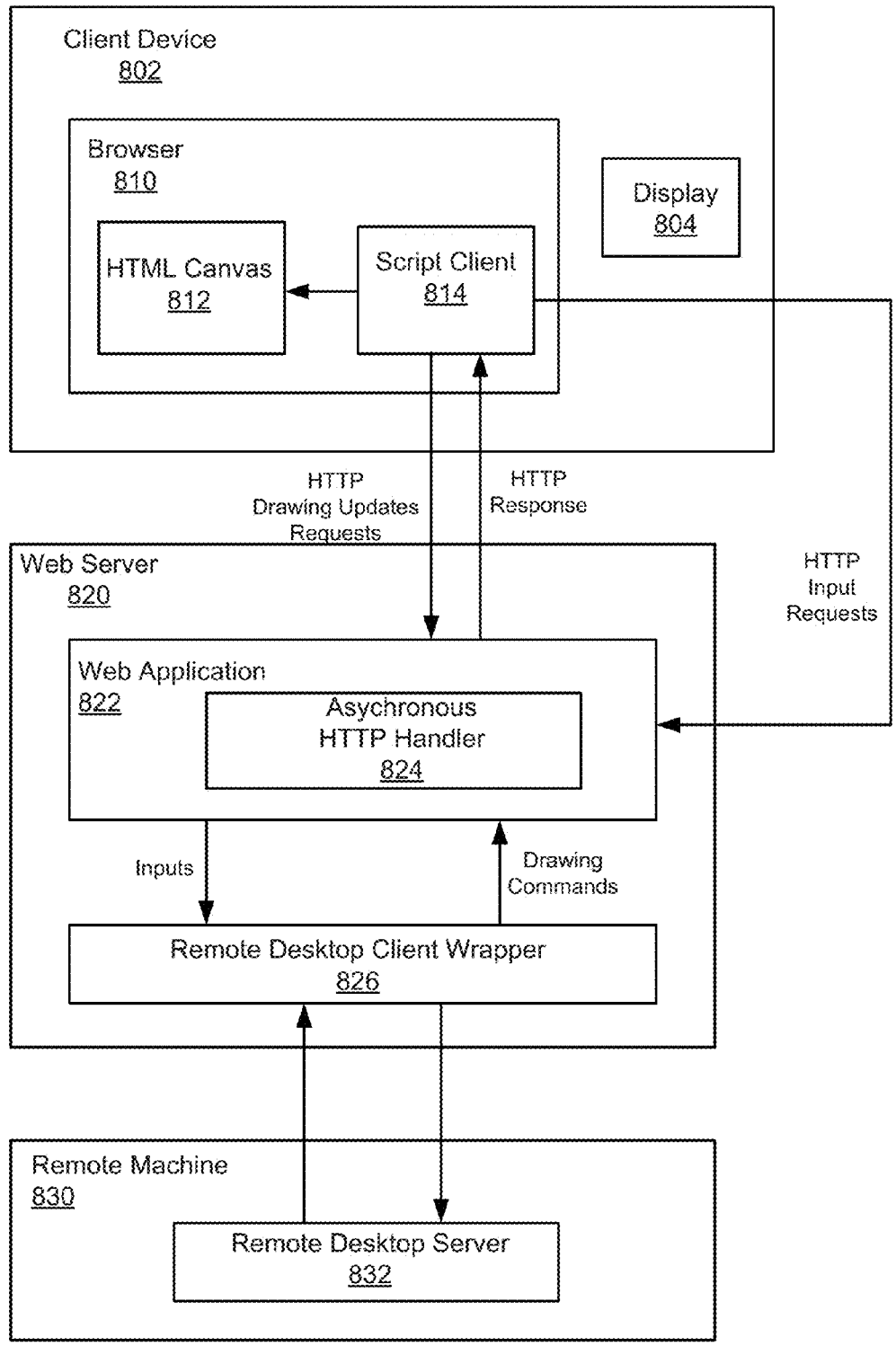
FIG. 8A is a conceptual block diagram of an example of a web server according to certain aspects of the present disclosure as used in conjunction with a client device and a remote machine.

FIG. 8A is a conceptual block diagram of an example of a web server 820 according to certain aspects of the present disclosure as used in conjunction with a web browser 810 (e.g., a HTML5-compatible browser or windows web browser) and a remote machine 830. Web browser 810 may belong to a client device 802, such as a smart phone or laptop computer, and includes (i) a canvas 812 (e.g., a HTML canvas supporting 2D rendering, such HTML5 canvas) and (ii) a script client 814, e.g., a JavaScript client, in an advantageous aspect. The script client 814 may receive an image and corresponding coordinates from the web server 820 and draw the image to the canvas 812, using the appropriate coordinates for displaying the remote desktop in the web browser.

In high-level description, a web server 820 can include two main functional blocks or modules: a web application 822, such as a model-view-controller (MVC) application of the ASP.NET framework, and a remote desktop client wrapper 826. The web application 822 can include an HTTP handler 824 (e.g., an asynchronous HTTP handler, such as an HTTP controller of the ASP.NET MVC) for handling HTTP requests (e.g., HTTP initial connection requests, HTTP input requests and HTTP drawing updates requests) from the web browser 810 and HTTP responses to the web browser 810. The HTTP handler 824 may handle HTTP requests synchronously or asynchronously. A synchronous handling involves an immediate response that is provided in the order of receiving a request that needs immediate attention, whereas the asynchronous handling may involve an immediate response or a delayed response depending on the nature of the request. For example, the response to a synchronous request including an initial connection request or an input request (e.g., user input events, such as mouse, keyboard, or touch events) is a synchronous response and a response to an asynchronous request including a drawing update request is an asynchronous response, which may be immediate, if there are changes in the remote desktop that needs immediate attention or delayed, if there are no changes in the remote desktop. In the asynchronous case, the browser, after making the request may engage in other activities while waiting for the asynchronous response from the web server.

The remote desktop client wrapper 826 can be configured to interface with a remote desktop client (not shown in FIG. 8A for simplicity), e.g., from a third-party vendor, for communication with the remote machine 830, which may include a remote desktop server 832, as shown. Embodiments of the web server 820 can be configured to provide an application framework for hosting one or more web applications and/or function as a windows web application container that can run windows API. In some aspects, a remote desktop client wrapper 826 may be referred to as a remote desktop client common interface. The desktop client wrapper 826 may function to communicate with the remote desktop server 832 of the remote machine 830 using a remote desktop display protocol. The remote desktop client may communicate remote desktop protocol data, for example, send a user's input to the remote machine, and receive drawing data from the remote machine via its specific remote desktop display protocol.

In one aspect, a remote desktop server 832 may refer to a software installed on the remote machine 830, and a remote desktop server 832 may allow applications, particularly those including graphical applications, which run on the remote machine 830, to be displayed at a machine that is separate and distinct from the remote machine 830 (e.g., on display 804 of the client device 802 using web browser 810). Remote desktop server 832 may allow drawing commands representing an image of a desktop of the remote machine to be transmitted to the separate machine via the web server 820. In one aspect, remote desktop client wrapper 826 may refer to software installed on the machine that is separate and distinct from the remote machine 830 (e.g., web server 820). Remote desktop client wrapper 826 may send requests to remote desktop server 832 via a remote desktop display protocol and in response receive the drawing commands representing the image of the desktop of the remote machine via the remote desktop display protocol.

Figure 8B:
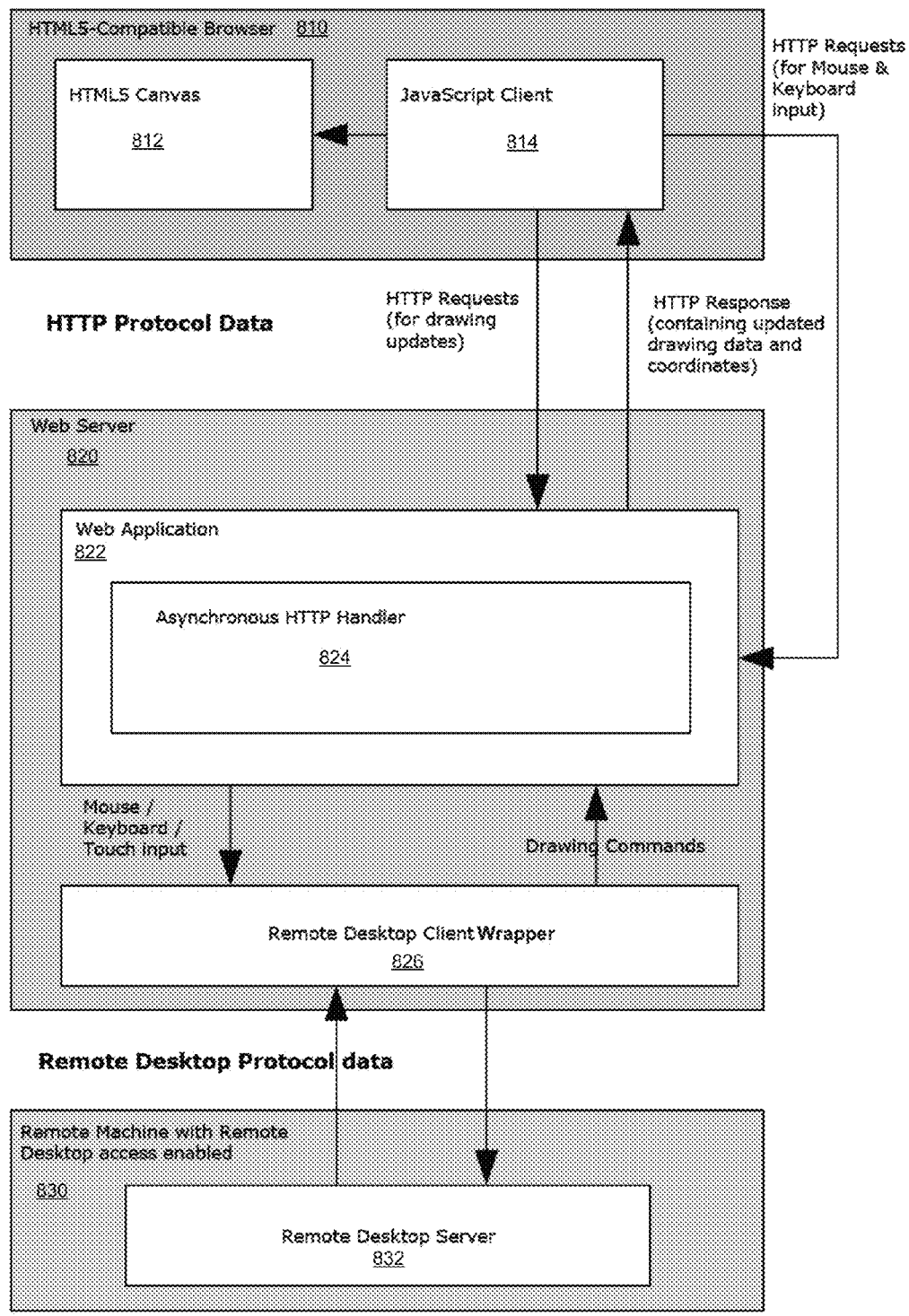
FIG. 8B is a conceptual block diagram of an example of a web server, a browser and a remote machine.

FIG. 8B is a conceptual block diagram of an example of a web server, a browser and a remote machine. One advantageous aspect of the disclosure permits the following: a browser 810 may facilitate communication to and from a web server 820 using HTTP protocol and vice versa, while the web server 820 may facilitate communication to and from a remote machine 830 using a remote desktop display protocol and vice versa. Like components are labeled with identical element numbers for ease of understanding.

Figure 9:
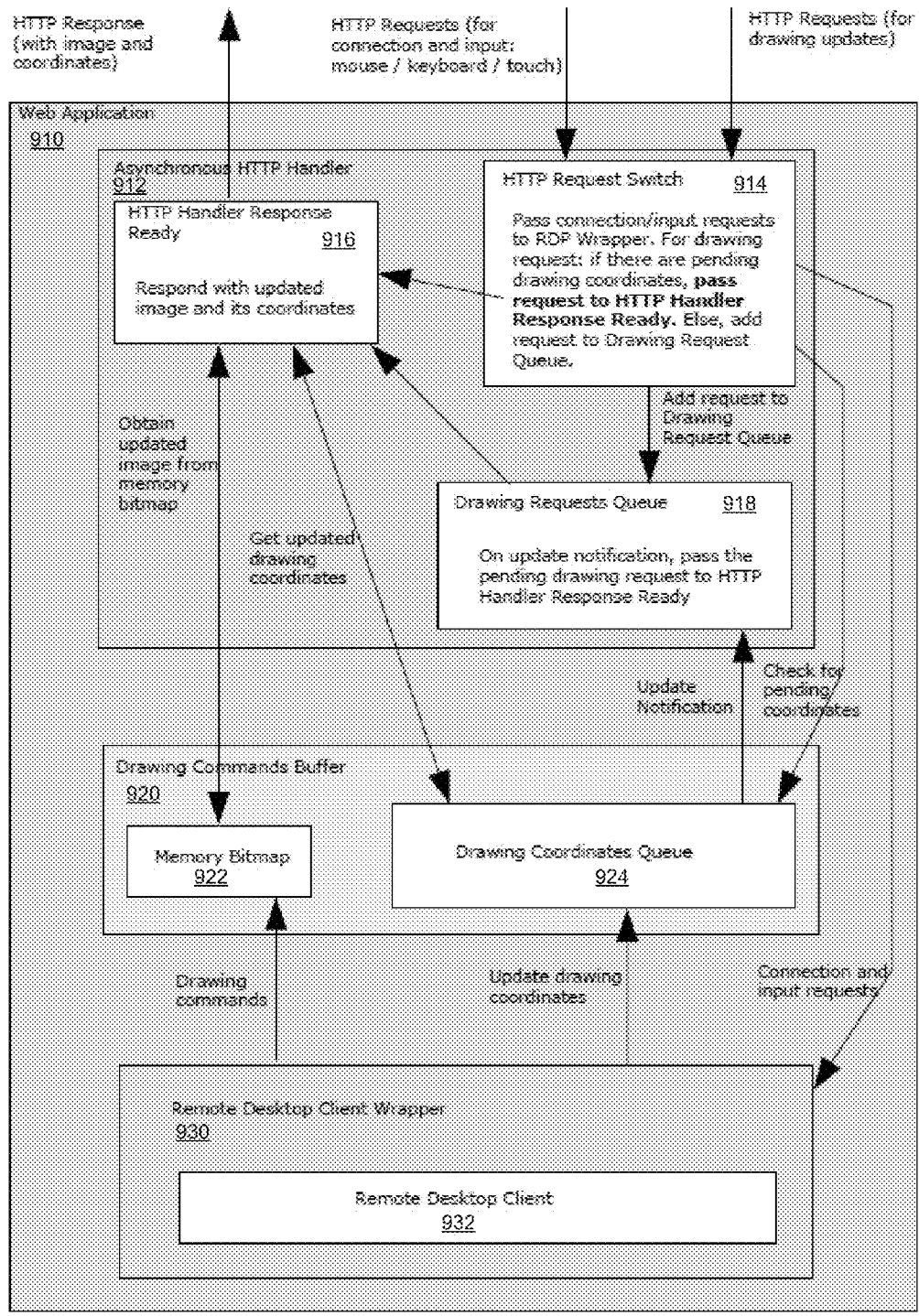
FIG. 9 is a conceptual block diagram of an example of a web server.

FIG. 9 is a conceptual block diagram of an example of a web application 910. In one aspect, a web application 910 may include an asynchronous HTTP handler 912, a drawing commands buffer 920, and a remote desktop client wrapper 930. In operation, the asynchronous HTTP handler 912 may receive and respond to HTTP requests from a web browser (e.g., web browser 810 of FIG. 8) on a user device (e.g., 202 in FIG. 2A or 310 in FIG. 3A or 3B). The asynchronous HTTP handler 912 may provide user input requests to the remote desktop client wrapper 930, which provides a common interface between the asynchronous HTTP handler 912 and the remote desktop client 932. The asynchronous HTTP handler 912 may include, an HTTP request switch 914, an HTTP handler response ready module 916, and a drawing requests queue 918. The HTTP request switch 914 may handle HTTP drawings requests, HTTP requests for connection, and user input events (e.g., mouse, keyboard, or touch events). The HTTP request switch 914 may be configured to pass connection and input requests received from a script client (e.g., script client 814 of FIG. 8) of a browser (e.g., browser 810 of FIG. 8) and pass them to remote desktop client wrapper 930.

With regard to drawing requests, if there are pending drawing commands, the HTTP request switch 914 may handle the request synchronously by passing the drawing request to the HTTP handler response ready module 916 for completing the pending requests. Otherwise, the drawing request may be handled asynchronously by adding the drawing request to the drawing requests queue 918. In one aspect, pending drawing commands may include coordinates for the image in a drawing coordinates queue 924 and/or an image (e.g., memory bitmap 922) in the drawing commands buffer 920. In an aspect, a windows bitmap may refer to a windows Graphics API memory bitmap, which in one aspect, may refer to a memory bitmap or an off-screen bitmap. The HTTP handler response ready module 916 can handle sending HTTP responses back to the client/web browser (e.g., 810 in FIG. 8). In one aspect, the HTTP handler response ready module 916 is a standard HTTP handler. The drawing requests queue 918 can function to store incoming HTTP drawing requests received by the HTTP request switch 914 from the client (e.g., HTML5 compatible web browser such as web browser 810 in FIG. 8) and respond to them when there are pending drawing commands from the drawing commands buffer 920. The drawing commands buffer 920 can serve two purposes: holding or storing an off-screen image, e.g., memory bitmap 922, onto which drawing commands are executed; and, serving as the drawing coordinates queue 924, e.g., a queue of coordinates for drawing commands. The coordinates can be those of regions or areas of an image of the remote desktop that need to be redrawn at the client device to reflect changes on the remote desktop. The areas or regions are sometimes referred to as drawing regions. The drawings commands buffer 920 can function as memory or storage that is accessible by both the asynchronous HTTP handler 912 and the remote desktop client wrapper 930.

The remote desktop client wrapper 930 can be configured to interface with any suitable remote desktop client 932 for communication with a remote machine (e.g., 830 in FIG. 8), which may be configured to include a remote desktop server (e.g., 832 in FIG. 8). The remote desktop client wrapper 930 may translate user input information (e.g., mouse, keyboard, and touch events) into respective remote desktop input calls for the remote desktop client 932. The remote desktop client wrapper 930 may translate the drawing commands (e.g., GDI drawing commands) of an image of a remote desktop received from a remote machine (e.g., 204 in FIG. 2A or 2B or 320 in FIG. 3A or 3B) via a remote desktop display protocol and the remote desktop client 932, into windows graphics drawing commands.

After receiving and translating the drawing commands from the remote desktop client 932, the remote desktop client wrapper 930 may draw into an off-screen memory bitmap 922 stored in the drawings commands buffer 920 as shown. More specifically, the remote desktop client wrapper 930 may provide, as an image, a portion of drawing regions of the remote desktop affected by the user's input from the user device. Along with the drawing commands, the remote desktop client wrapper 930 may extract, from the drawing command(s), coordinates of the drawing region(s) from the remote desktop client and provide the drawing coordinates to the drawing commands buffer 920 (e.g., drawing coordinates queue 924), as indicated. The coordinates can be placed into an HTTP header section (e.g., by HTTP handler response ready module 916) to send drawing region coordinates (e.g., as cookie), along with an image, to a browser (e.g., 312 in FIG. 3A or 3B) for display.

In the event there are new drawing coordinates in the drawing commands buffer 920 (e.g., in the drawing coordinates queue 924), drawing commands buffer 920 may send a notification to the drawing requests queue 918 so that any pending request in the drawing requests queue 918 can be forwarded to the HTTP handler response ready module 916 for serving. The HTTP handler response ready module 916 may then reach to the drawing commands buffer 920 (e.g., drawing coordinates queue 924), and obtain the drawing coordinates from the drawing coordinates queue 924. The HTTP handler response ready module 916 may then place the drawing coordinates into an HTTP header section (known as a cookie). In addition, according to those coordinates, the HTTP handler response ready module 916 may obtain an image portion from the off-screen memory bitmap 922. The HTTP handler response ready module 916 may then send the image (e.g., as a joint photographic experts group (JPEG) image, or a portable network graphics (PNG) image) as well as the coordinates, which are stored in an HTTP response header section, to the web browser (e.g., 810 in FIG. 8) for display at the user device's display. As a result, the web application 910 can facilitate a remote desktop session between a user device (e.g., 202 in FIG. 2A or 2B or 310 in FIG. 3A or 3B) and a remote machine (e.g., 204 in FIG. 2A, 3B, 320 in FIG. 3A or 3B. or 830 in FIG. 8) without the need for the user device to utilize proprietary plug-ins or protocols.

In one aspect, an image (or an image file such as a windows image file) and drawing coordinates sent by a web server (e.g., a windows web server) to a windows web browser may be considered as an example of web browser drawing updates. In a preferred aspect, web browser drawing updates are compatible with the windows web browser so that the windows web browser can recognize the web browser drawing updates and process them to display an image at the appropriate location on a display. Web browser drawing updates may be implemented with other types of drawing data and commands.

In one aspect, an HTTP protocol (the requests of which may be handled with HTTP request switch and HTTP handler response ready module) between a client device and a web server is a pull protocol, and a remote desktop display protocol utilized between a web server and a remote machine is a push protocol.

The remote desktop client wrapper 930 may receive a user's input information, data, or commands (e.g., mouse, keyboard, and touch events) from HTTP request switch 914 and translate the input information/commands into respective remote desktop input calls, which are sometimes referred to as remote desktop input commands. The remote desktop client wrapper 930 may also translate the drawing commands of the remote desktop, e.g., GDI drawing commands, received from a remote desktop server (e.g., remote desktop server 832 of FIG. 8, via a remote desktop display protocol and remote desktop client 932) into windows graphics application programming interface (API) commands. Windows graphics API commands in themselves are not suitable for the web browser; but they are an intermediary step towards achieving browser compatibility. The remote desktop client wrapper may then execute those windows graphics API commands, i.e., drawing into an off-screen memory bitmap, which can be stored in the drawing commands buffer 920. In an alternative embodiment, the drawing commands buffer 920 may receive the windows graphics API commands from the remote desktop client wrapper and execute the windows graphics API commands to draw into an off-screen memory bitmap. The HTTP handler response ready module 916 can create an image, such as a JPEG image, or PNG image, or a bitmap file (BMP) image or any other image file in an image format suitable for a browser (e.g., a windows web browsers), from the memory off-screen bitmap; and the resulting image is suitable for the browser 810 of FIG. 8. In one aspect, as the image (e.g., a JPEG or PNG image) is created in real time, when it is created, it is simply sent to the web browser without being stored at the web server. In one aspect, a web server may comprise a web application. In one aspect, a web application may be a part of a web server. In one aspect, a web application may refer to a web server. In one aspect, an asynchronous HTTP handler may be a part of a web application. In one aspect, an asynchronous HTTP handler may refer to a web application. In an aspect, a web server may be a windows web server. In one aspect, a browser may be a windows web browser.

Figure 10:
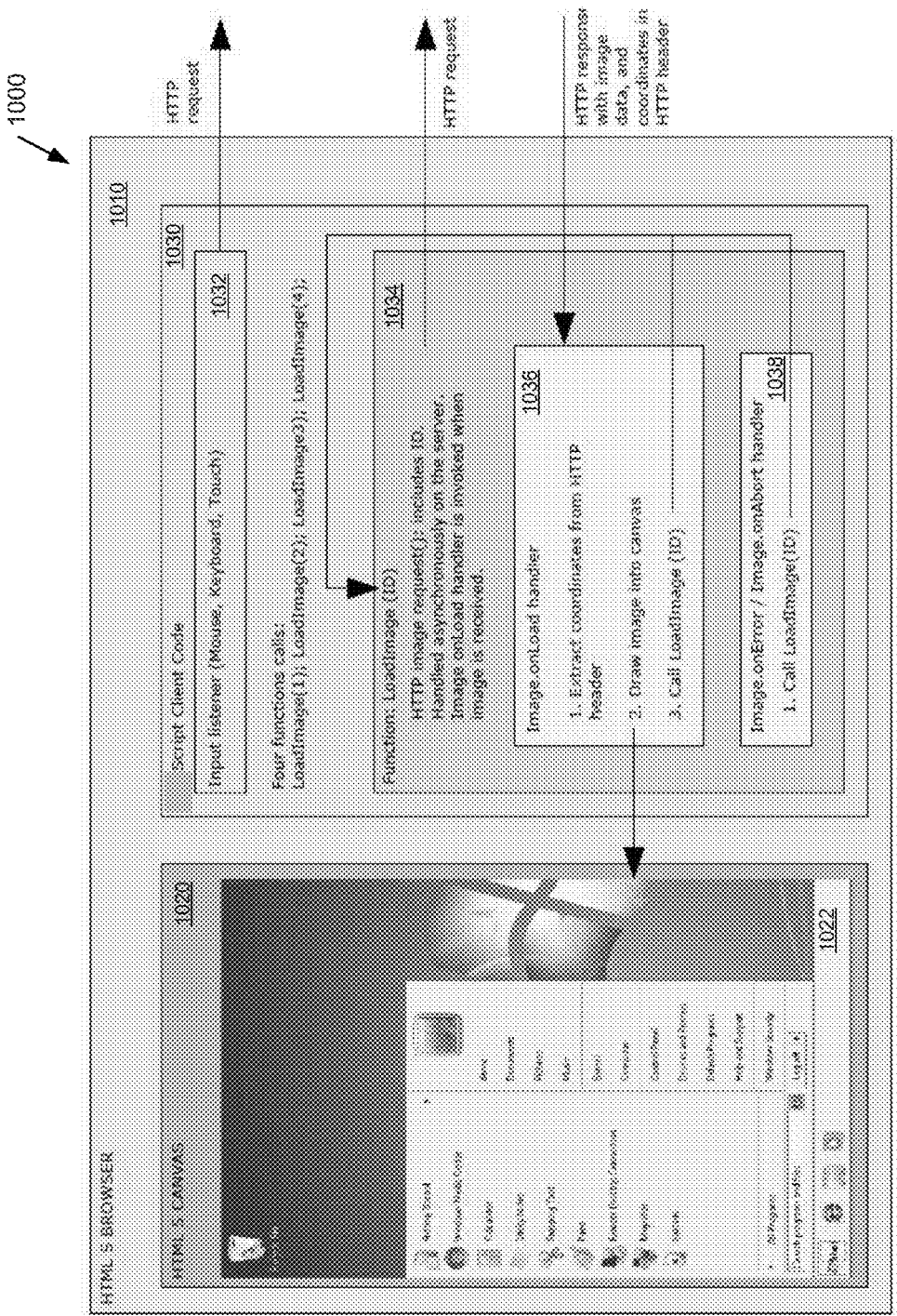
FIG. 10 is a conceptual block diagram of an example of a web browser as used in conjunction with a web server and a remote machine.

FIG. 10 is a conceptual block diagram of an example of a web browser 1010 as used in conjunction with the web server 820 of FIG. 8 and the remote machine 830 of FIG. 8. In a preferred aspect, the web browser 1010 may be a windows web browser compatible with HTML5. Web browser 1010 can include a script client code 1030, for example, a JavaScript client code, and a canvas 1020 (e.g., an object or element in memory supporting 2D drawing or rendering). The script client code 1030 may refer to a script client 814 of FIG. 8. In one aspect, script client code may refer to client script code. The canvas 1020 can include or represent the entire viewable window (e.g., 130 of FIG. 1) of the browser (e.g., 810 of FIG. 8 or 1010). In a preferred aspect, the canvas 1020 is an HTML5 compatible canvas, e.g., a canvas element according to the HTML5 specification. Examples of suitable windows web browsers can include, but are not limited to, Mozilla Firefox, Google Chrome, Windows Safari, and Opera. Web browser 1010 may be resident on a suitable user device such as a PC, a smartphone, or the like.

The script client code 1030 can include an input listener 1032 responsive to user inputs such as mouse, keyboard, and touch events. The input listener 1032 can send HTTP requests with the user inputs to a web server, e.g., a web server of web application 910 in FIG. 9. The script client code 1030 may also include a load image function or module 1034 that can handle HTTP image requests asynchronously on the web server, and includes an image onload handler 1036, which may extract drawing coordinates from the HTTP header (e.g., from the portion known as a cookie), draw the received image onto canvas 1020, and call the load image function 1034 again, passing it its unique identification (ID). An image on error handler and/or image on-abort handler 1038 may also be included in the load image function 1034 to handle loading errors. The on-abort handler 1038 may call the load image function 1034. For remote desktop sessions, the canvas 1020 can hold an image of the remote desktop of the remote machine, e.g., 132 of FIG. 1, and the user device may display the image onto a display (e.g., 313 in FIG. 3A or 3B) in the viewable window 130 of a browser (e.g., 810).

As mentioned previously, an HTML5 compatible browser can be used for exemplary embodiments of the present disclosure. HTML5 includes (or supports) a canvas, which allows for dynamic, real-time, scriptable rendering of 2D shapes and bitmap images. In one aspect, being scriptable can mean or include reference to utilizing a script for rendering a 2D image. The canvas 1020 consists of a drawable region defined in HTML code with height and width attributes. Script codes may access the canvas region or area through a full set of drawing functions similar to other common 2D APIs, thus allowing for dynamically generated graphics.

In operation, such as accessing a remote machine (e.g., 830 of FIG. 8) during a remote desktop session, the input listener 1032 may relay user inputs to the related web server (e.g., 820 or 910), which interfaces with the remote machine by way of a remote desktop client and remote desktop client wrapper (e.g., 826 in FIG. 8). The script client code 1030 can also send a number of drawing requests, as indicated by LoadImage(1)-LoadImage(4).

When drawing commands are received from the remote desktop server via the remote desktop client, the web server may create/modify an off-screen image of the remote desktop and provide the actual image and related coordinates to the browser 1010, where the client's image onload handler (e.g., 1038) can then draw the image 1022 to the canvas 1020 in accordance with the coordinates extracted from the HTTP header (e.g., cookie). In one aspect, the image 1022 represents a portion of the entire image of the remote desktop that has been changed, and thus the onload handler can receive and update a portion of the canvas based on the coordinates received (instead of updating the entire canvas).

In one aspect, a bitmap in a web server (e.g., memory bitmap 922) may include or represent a bitmap of an entire image of a remote desktop (e.g., 132 of FIG. 1). When a portion(s) of the image of the remote desktop is changed (e.g., image portion 450, 452) in response to, for example, a user's input command or other changes by the remote machine, the changed image portion(s) and its remote desktop coordinates may be provided as a remote desktop drawing command(s) to a remote desktop client wrapper (e.g., 930 of FIG. 9) from a remote desktop server (e.g., 832) via a remote desktop client.

In one aspect, the remote desktop client wrapper may translate the remote desktop drawing command(s) into a graphics drawing command(s), generate coordinates (corresponding to the remote desktop coordinates) based on the graphics drawing commands, and provide the coordinates into a queue (e.g., 924 of FIG. 9). The remote desktop client wrapper may execute the graphics drawing command(s) to draw into the bitmap, or stated in another way to generate a bitmap portion(s) to update a portion(s) of the bitmap (e.g., a portion(s) of 922) according to the coordinates generated by the remote desktop client wrapper. The updated portion(s) of the bitmap represents the changed image portion(s) of the remote desktop. In a preferred aspect, the updated portion(s) of the bitmap is a portion of memory bitmap 922.

In one aspect, an HTTP handler response ready module (e.g., 916 of FIG. 9) may form an image file corresponding to the updated portion(s) of the bitmap, obtain the coordinates (e.g., from 924) for the image file, and place the coordinates into a section of an HTTP header. The HTTP handler may then provide the image file and the coordinates to a web browser (e.g., 810, 1010) or more specifically to a script client code (e.g., 1030) in a single HTTP response.

A canvas (e.g., 1020) may store the entire image of a remote desktop (e.g., 132 of FIG. 1) to be displayed on a display (e.g., 100, 313) and then a portion(s) of the canvas 1020 may be updated when a portion(s) of the image of the remote desktop is changed during a remote desktop session. In this example, when the script client code receives an image file and the coordinates corresponding to the changed portion(s) of the image of the remote desktop, the script client code can update a portion of the canvas at canvas coordinates corresponding to the coordinates received from the HTTP handler so that the updated portion of the canvas represents the image contained in the image file.

Because drawing commands provided by a remote desktop client may include only those image portion(s) or region(s) of the remote desktop (with corresponding coordinates) that have been changed or updated relative to previous drawing commands, the image provided to the canvas (e.g., 1020 can accordingly be limited or minimized to include just the updated portion(s) of the remote desktop, in exemplary embodiments. The updates on the remote desktop can be due to a user's input (e.g., via a remote desktop session) or caused by the remote machine itself, e.g., a new indicated time from the system clock. Because the size of the image(s) provided to the canvas (e.g., 1020) in response to drawing requests can be minimized, the traffic for the remote session can be reduced or minimized, facilitating a real time user experience for a remote desktop session.

As discussed above, a remote desktop drawing command may comprise a drawing call such as gdi_bitmap (*data, top, left, width, height, 16, 32) in which "*data" may be a pointer to a memory location where the bitmap data is located. The parameters "top, left, width, height" may represent the coordinates for the bitmap data. The parameter "16" may be the number of bits in red-green-blue (RGB), and the parameter "32" may be the number of bits in alpha-red-green-blue (ARGB). Thus, this exemplary call indicates where the bitmap data for a portion of the image of the remote desktop (e.g., the portion that has been changed) is located, the coordinates for the bitmap data, and the number of bits used to convert from an RGB format to an ARGB format. In another example, a graphics drawing command may comprise a drawing call such as draw-rect (color, top, left, width, height). This drawing call can draw a rectangle at the coordinates specified by "top, left, width, and height "using the specified" color."

Figure 11:
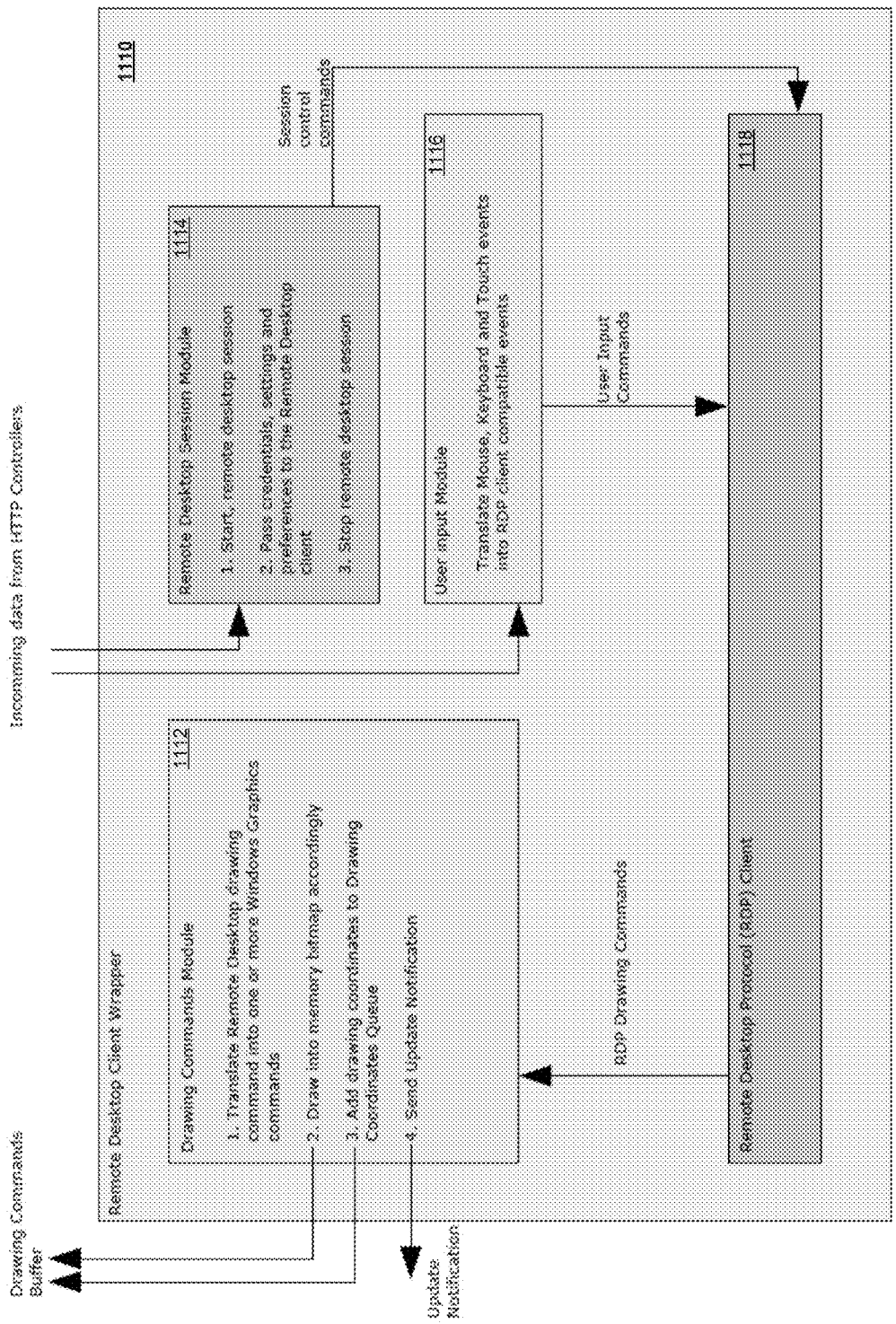
FIG. 11 is a conceptual block diagram of an example of a remote desktop client wrapper.

FIG. 11 is a conceptual block diagram of an example of a remote desktop client wrapper 1100, in accordance with various aspects of the subject technology. The remote desktop client wrapper 1100 facilitates communication between a remote machine (e.g., 830 of FIG. 8), which may include a remote desktop server (e.g., 832 of FIG. 8), and the rest of the web server components, e.g., the asynchronous HTTP handler (e.g., 912 of FIG. 9) and drawing commands buffer (e.g., 920 in FIG. 9). In some aspects, a remote desktop client wrapper 1100 may provide a common interface between remote desktop client (e.g., 932 in FIG. 9) and the asynchronous HTTP handler (e.g., 912 of FIG. 9). In some aspects, a remote desktop client wrapper 1100 may include a drawing command module 1112, a remote desktop session module 1114, a user input module 116, and remote desktop client 1118. In some aspects, a remote desktop client wrapper does not necessarily include a remote desktop client 1118. Rather, a remote desktop client may be a module separate from remote desktop client wrapper (e.g., as shown in FIG. 3B).

According to various aspects of the subject technology, the remote desktop session module 1114 may be configured to receive a connection request (e.g., an HTTP request specifying a particular remote machine) indirectly from a web browser (e.g., 810 of FIG. 8) via the asynchronous HTTP handler (e.g., 912 in FIG. 9). In some aspects, a connection request may be received from a web browser via an HTTP request switch (e.g., 914 of FIG. 9) that communicates with the web browser. In some aspects, a remote desktop session module 114 may manage (or facilitate) establishing a remote desktop session between a remote desktop client 1118 (e.g., a remote desktop protocol client) and a remote desktop server 832 in response to the connection request. For example, a remote desktop session module 1114 may manage (or facilitate) starting the remote desktop session, passing credentials, settings, preferences, etc., to a remote desktop server (e.g., via a remote desktop client), and stopping the remote desktop session.

In one aspect, a remote desktop session module 1114 may receive a connection request, e.g., a request originated from a web browser to establish a connection with remote desktop server (e.g., 322 or 680). In response to the connection request, the remote desktop session module 1114 may generate session control commands that are compatible with the remote desktop client, remote desktop server and the remote desktop display protocol, e.g., session control commands that can be understood and processed by remote desktop client and remote desktop server and that can be transmitted and received by remote desktop client and remote desktop server utilizing the remote desktop display protocol. These session control commands may include a command for starting a remote desktop session, a command for stopping the remote desktop session. The session control commands may include one or more of credentials, settings, preferences, etc. and command(s) for passing credentials, settings, preferences, etc. to remote desktop server (e.g., 832). In response to the connection HTTP request, the remote desktop session module 1114 may provide the appropriate session control command(s), generated by the remote desktop session module, to the remote desktop client (e.g., 1118). The remote desktop client may then use the session control commands received from the remote desktop session module 1114 to start a remote desktop session with the remote desktop server, pass credentials, settings, preferences, etc., to remote desktop server, and stop the remote desktop session.

In one aspect, a remote desktop session module 1114 can translate a connection request that is not compatible with a remote desktop client, a remote desktop server, or a remote desktop display protocol (e.g., that cannot be understood or processed by a remote desktop client, a remote desktop server or a remote desktop display protocol) into session control commands that are compatible with the remote desktop client, the remote desktop server and the remote desktop display protocol (i.e., that can be understood and processed by remote desktop client and remote desktop server and that can be communicated between remote desktop client and remote desktop server utilizing the remote desktop display protocol).

In some aspects, facilitating an establishment of a remote desktop session, between a remote desktop client and a remote desktop server, comprises generating a session control command based on the initial HTTP request. In some aspects, facilitating an establishment of the remote desktop session comprises transmitting the session control command from a remote desktop session module 1114 to a remote desktop client 1118 and then from the remote desktop client to a remote desktop server (e.g., 832). For example, the session control command may be transmitted to the remote desktop server via the remote desktop client 1118 that communicates with remote desktop server using a remote desktop display protocol. In some aspects, the remote desktop display protocol comprises at least one of the Microsoft® Remote Desktop Protocol (RDP), personal computer over internet protocol (PCoIP), remote FX (RFX) protocol, remote framebuffer (RFB) protocol, independent computing architecture (ICA), NX protocol, and other suitable remote desktop display protocols. In some aspects, the RFB protocol comprises virtual network computing (VNC).

According to certain aspects of the subject technology, a server such as server 208, 330, 400A, 400B (e.g., via a remote desktop session module 1114) can maintain open connections between its remote desktop client and one or more remote desktop servers at all times, allowing single or multiple client devices to be interactively connected and disconnected to remote desktop sessions instantly. In some aspects, remote desktop sessions may never need to be disconnected from the one or more remote desktop servers, as a server can maintain active connections to the one or more remote desktop servers. Of course, a remote machine (e.g., 830) may go down for reasons that are outside of a related web server's control; however, the connection can be maintained as long as the remote machine is available for remote access. For example, a remote desktop session module 1114 may continuously maintain the remote desktop session until the remote desktop server disconnects from the remote desktop session depending on the remote desktop server's idle remote connection settings. In some aspects, remote desktop sessions established utilizing a remote desktop session module 1114 may be resized and adjusted for best display and user experience to utilize the full capability of the client devices.

According to various aspects of the subject technology, a user input module 1116 may receive an input request indirectly from a web browser such as a web browser 810 (e.g., via an HTTP request switch 914 of FIG. 9), and convert the input request into a format recognized by and/or compatible with remote desktop client 1118 and remote desktop server 832. For example, user input module 1116 receives an input request that was transmitted utilizing a request-response protocol from a web browser. In preferred aspects, the request-response protocol may comprise hypertext transfer protocol (HTTP). In another aspect, the request-response protocol may comprise other suitable request-response protocols. In some aspects, the input request is received from a web browser (e.g., 810) via an HTTP request switch (e.g., 914) that communicates with the web browser. In some aspects, the input request comprises at least one of a mouse event, a keyboard event, and a touch event. User input module 1116 may translate the input request that is in a format suitable for or compatible with the request-response protocol into an input command (e.g., a remote desktop display protocol input command) that is suitable for or compatible with the remote desktop display protocol. The user input module 1116 may transmit the input command to a remote desktop client 1118, which may transmit the input command to a remote desktop server 832. For example, user input module 1116 may facilitate transmitting the input command to remote desktop server 832 via remote desktop client 1118 that communicates with remote desktop server 832 using the remote desktop display protocol. In one aspect, an input request is sometimes referred to as a user input command and vice versa. Please note, however, if an input request is referred to as an input command when it is received via HTTP, it is a HTTP request rather than a command. In one aspect, an input command is sometimes referred to as an input call or a remote desktop input command and vice versa.

A remote machine 830 (e.g., its remote desktop server 832) may execute one or more actions based on the input command and send drawing data, as a result of the executed one or more actions, to a server such as a web server 820 (e.g., a remote desktop client wrapper 826 of the server). According to various aspects, a remote desktop client 1118 can receive a screen drawing command transmitted from a remote machine 830 (e.g., its remote desktop server 832) utilizing the remote desktop display protocol, in response to the input command transmitted to remote machine 830 (e.g., its remote desktop server 680 of FIG. 6). In one aspect, a screen drawing command received from a remote machine may be sometimes referred to as a drawing command, a remote machine drawing command, or a remote desktop drawing command received from a remote machine and vice versa. The drawing command module 1112 may then receive the screen drawing command from the remote desktop client 1118 connected to the remote machine 830. For example, a drawing command module 1112 can receive the screen drawing command from a remote machine 830 (e.g., its remote desktop server 832) via a remote desktop client 1118 that communicates with the remote machine 830 (e.g., its remote desktop server 832) using the remote desktop display protocol.

According to certain aspects, a drawing command module 1112 may convert a screen drawing command into a format recognized by and/or compatible with a web browser (e.g., 810). For example, a drawing command module 1112 may translate a screen drawing command that is suitable for or compatible with a remote desktop client, a remote desktop server and a remote desktop display protocol, into a graphics drawing command that is compatible with the web server 820, such as a windows graphics (abstract window toolkit) API command. In some aspects, translating the screen drawing command can include calculating new, and/or adjusting received drawing command parameters, and/or making adjustments to the received bitmap data, such as, but not limited to, converting the 16-bit red-green-blue (RGB) 5-6-5 color format into a 32-bit alpha-red-green-blue (ARGB) 8-8-8-8 format. In some aspects, drawing command module 1112 may execute the graphics drawing command (e.g., windows graphics API command) to draw into an already created image bitmap, (e.g., the off-screen memory bitmap 922) of the drawing commands buffer (e.g., 920 in FIG. 9) at the web server (e.g., 820 in FIG. 8). In one aspect, windows graphics API command is sometimes referred to as windows graphics command or windows graphics drawing command. In one aspect, the off-screen bitmap may be a storage or memory location that is a part of a drawing commands buffer (e.g., 920) accessible by an asynchronous HTTP handler (e.g., 912). In one aspect, the size of an off-screen bitmap may represent the size of a remote session. Stated in another way, the size of an off-screen bitmap may represent the size of the remote desktop, or an off-screen bitmap may be a bitmap representation of an entire image of a remote desktop.

Preferred embodiments of the present disclosure may, in essence, translate a request in HTTP to a command in a remote desktop display protocol and vice versa (e.g., translate requests/responses transmitted/received via HTTP to commands transmitted/received via a remote desktop display protocol, and vice versa) for a remote session between a client device and a remote machine. For example, the input request from the web browser such as the windows web browser 810 may be translated into the input command (e.g., a remote desktop input command) that is suitable for or compatible with the remote desktop display protocol and is received by remote desktop server 832 via remote desktop client 1118. The screen drawing command transmitted from the remote machine 830 (e.g., in response to the input command) utilizing the remote desktop display protocol may be translated into the graphics drawing command that is compatible with the web server 820, such as a windows graphics (abstract window toolkit) API command. In some aspects, HTTP is a pull protocol while a remote desktop display protocol may be a push protocol. In some aspects, a drawing command in push protocol may be translated into a drawing update (or a drawing response) in pull protocol during a remote session between a client device and a remote machine.

With continued reference to FIG. 11, a drawing command module 1112, when drawing into the off-screen bitmap, may transmit pixel data to the off-screen bitmap. In some aspects, the pixel data is used to update a portion of the off-screen bitmap (e.g., an off-screen memory bitmap). In some aspects, a drawing command module 1112 may transmit the pixel data to the off-screen bitmap so that the updated portion of the off-screen bitmap may be stored and/or converted to an image file.

According to certain aspects, a drawing command module 1112 can generate one or more coordinates corresponding to the updated portion of the off-screen bitmap (e.g., an image drawn into the off-screen bitmap when the graphics drawing command is executed). For example, the one or more coordinates may identify the locations where the corresponding image bitmap is to be executed on the canvas of a web browser. In one example, the one or more coordinates may be extracted or copied from the graphics drawing command. A drawing command module 1112 may also transmit the one or more coordinates to a drawing coordinates queue 924 in FIG. 9 that is a part of a drawing commands buffer (e.g., 920). In some aspects, a drawing command module 1112 may transmit the one or more coordinates to the drawing coordinates queue so that the one or more coordinates may be stored in the drawing coordinates queue. Thus, a drawing command module 1112 may update "drawing" region coordinates in the drawing commands buffer. In some aspects, a drawing command module 1112 may transmit a notification signal to a drawing requests buffer (e.g., 920) of an asynchronous HTTP handler (e.g., 912). In some aspects, the notification signal/ message may indicate that the image bitmap (e.g., the off-screen memory bitmap) has been updated.

In one advantageous aspect, a windows web server may comprise a Microsoft Windows web server. A Microsoft Windows web server may utilize Microsoft's operating system. In one advantageous aspect, a web browser is a browser that is HTML5 compatible. In one advantageous aspect, a windows web browser is a browser that is HTML5 compatible.

In another advantageous aspect, a windows API may comprise a Microsoft Windows API. A Microsoft Windows web API may be operable in Microsoft's operating system.

In yet another advantageous aspect, a windows web browser may comprise a Microsoft Windows web browser (e.g., Windows Internet Explorer). A Microsoft Windows web browser may be operable in Microsoft's operating system.

In yet another advantageous aspect, an MVC application may comprise an ASP.NET MVC application that may be executable in Microsoft's operating system.

In yet another advantageous aspect, a windows graphics drawing command may comprise a Microsoft Windows graphics drawing command. A Microsoft Windows graphics drawing command may be executable in Microsoft's operating system.

In yet another advantageous aspect, a windows image file may comprise a Microsoft Windows image file. A Microsoft Windows image file may be usable in Microsoft's operating system.

In yet another advantageous aspect, a windows graphics API command may comprise a Microsoft Windows graphics API command. A Microsoft Windows graphics API command may be executable in Microsoft's operating system.

In yet another advantageous aspect, a windows script client's image onload handler (e.g., 1038) may comprise a JavaScript client's image onload handler.

In one aspect, a windows application, file, command, interface, operating system or device (e.g., a windows web server, a windows API, a windows graphics drawing command, a windows image file, a windows script client) is adapted to provide windowing functionality. In one aspect, windowing functionality may be adapted to provide an enclosed, rectangular window area on a display screen. In one aspect, windowing functionality may be adapted to provide a window that is a logical view of a file. This may allow a user to view different portions of a file when the user moves the window. In one aspect, a windows operating system is an operating system adapted to provide windowing functionality. In one example, a windows operating system comprises a Microsoft Windows operating system. In one aspect, a windows application, file, command, interface or device is adapted to utilize, or is operable with, a windows operating system.

In yet another advantageous aspect, a client device (e.g., client device 802 of FIG. 8) is a computing machine that utilizes Microsoft's operating system.

In one aspect, the subject technology may utilize other windows systems and other operating systems.

In one aspect, each of a client device and a remote machine is an end machine for communication, in that each is an end point of communication (as shown in FIGS. 2A and 2B). A server may be also an end machine as shown in FIG. 2B.

In one aspect, a transcoding server may comprise a web server, an HTTP handler may comprise an HTTP handler, a long polling handler may comprise an asynchronous handler and/or an HTTP request switch, a web application container may comprise an ASP.NET MVC Application, a remote desktop client adaptor may comprise a remote desktop client wrapper, a drawing coordinates pool may comprise a drawing coordinated queue, a drawing command handler may comprise a drawing command module a remote desktop client manager may comprise a remote desktop session module, and a user input handler may comprise a user input module.

Figure 12:
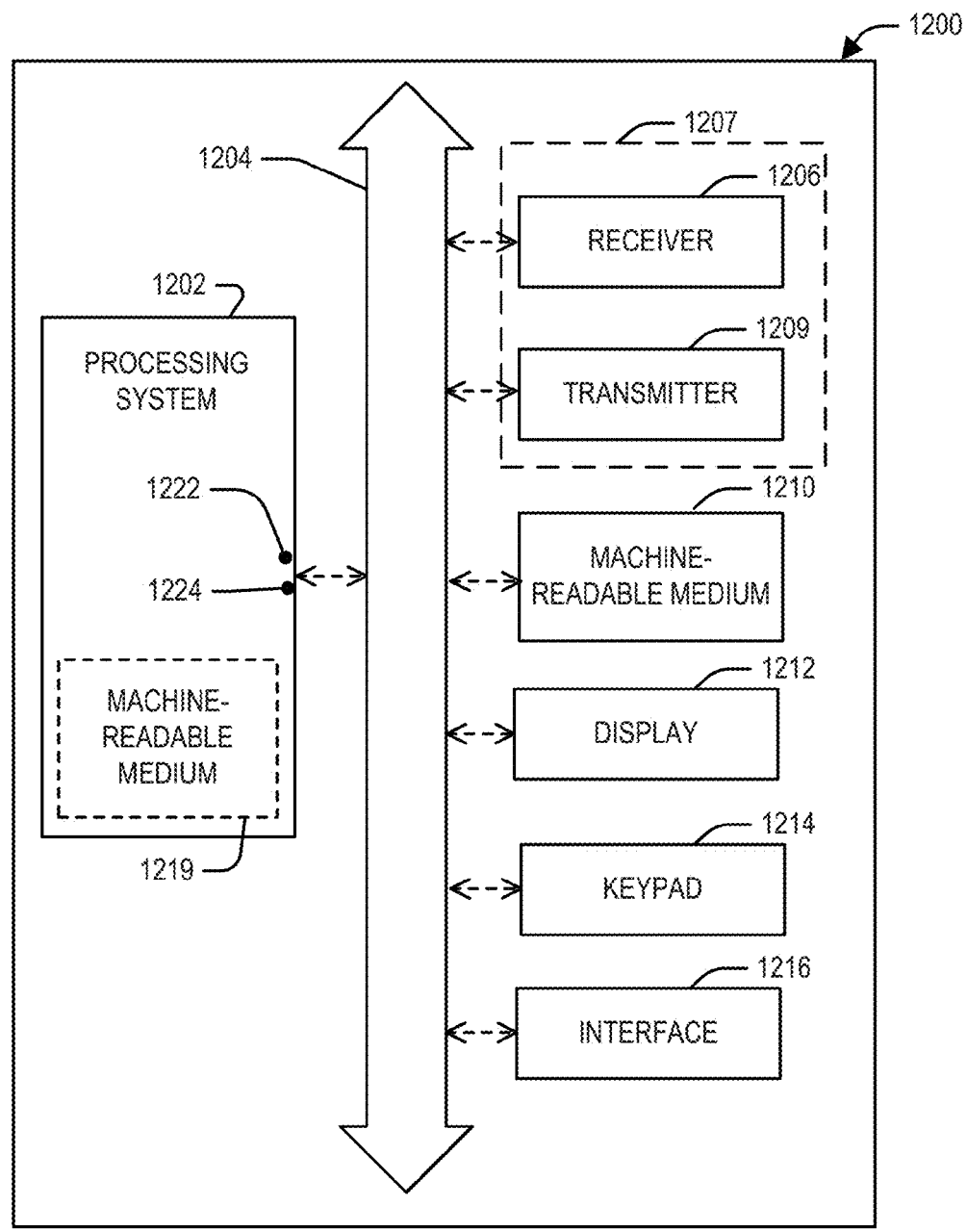
FIG. 12 is a block diagram that illustrates an exemplary computing system.

FIG. 12 is a conceptual block diagram illustrating an example of a computing system 1200 useful for embodiments of the present disclosure. System 1200 may be, for example, a client device (e.g., 202 or 310), a server (e.g., 208, 330, 400A or 400B) or a remote machine (e.g., 204, 320 or 690). The system 1200 may include a processing system 1202. The processing system 1202 is capable of communication with a receiver 1206 and a transmitter 1208 through a bus 1204 or other structures or devices. It should be understood that communication means other than busses can be utilized with the disclosed configurations. The processing system 1202 can generate audio, video, multimedia, and/or other types of data to be provided to the transmitter 1209 for communication. In addition, audio, video, multimedia, and/or other types of data can be received at the receiver 1206, and processed by the processing system 1202.

The processing system 1202 may include a general-purpose processor or a specific-purpose processor for executing instructions and may include a machine-readable medium 1219, such as a volatile or non-volatile memory, for storing data and/or instructions for software programs. The instructions, which may be stored in a machine-readable medium 1210 and/or 1219, may be executed by the processing system 1202 to control and manage access to the various networks, as well as provide other communication and processing functions. The instructions may also include instructions executed by the processing system 1202 for various user interface devices, such as a display 1212 and a keypad 1214. The processing system 1202 may include an input port 1222 and an output port 1224. Each of the input port 1222 and the output port 1224 may include one or more ports. The input port 1222 and the output port 1224 may be the same port (e.g., a bi-directional port) or may be different ports.

The processing system 1202 may be implemented using software, hardware, or a combination of both. By way of example, the processing system 102 may be implemented with one or more processors. A processor may be a general-purpose microprocessor, a microcontroller, a digital signal processor (DSP), an application specific integrated circuit (ASIC), a field programmable gate array (FPGA), a programmable logic device (PLD), a controller, a state machine, gated logic, discrete hardware components, and/or any other suitable device that can perform calculations or other manipulations of information.

A machine-readable medium can be one or more machine-readable media. Software shall be construed broadly to mean instructions, data, or any combination thereof, whether referred to as software, firmware, middleware, microcode, hardware description language, or otherwise. Instructions may include code (e.g., in source code format, binary code format, executable code format, or any other suitable format of code).

Machine-readable media (e.g., 1219) may include storage integrated into a processing system, such as might be the case with an application specific integrated circuit (ASIC). Machine-readable media (e.g., 1210) may also include storage external to a processing system, such as a random access memory (RAM), a flash memory, a read only memory (ROM), a programmable read-only memory (PROM), an erasable PROM (EPROM), registers, a hard disk, a removable disk, a CD-ROM, a DVD, or any other suitable storage device. In addition, machine-readable media may include a transmission line or a carrier wave that encodes a data signal. Those skilled in the art will recognize how best to implement the described functionality for the processing system 1202. According to one aspect of the disclosure, a machine-readable medium is a computer-readable medium encoded or stored with instructions and is a computing element, which defines structural and functional interrelationships between the instructions and the rest of the system, which permit the instructions' functionality to be realized. In one aspect, a machine-readable medium is a non-transitory machine-readable medium, a machine-readable storage medium, or a non-transitory machine-readable storage medium. In one aspect, a computer-readable medium is a non-transitory computer-readable medium, a computer-readable storage medium, or a non-transitory computer-readable storage medium. A non-transitory machine-readable medium (or a non-transitory computer-readable medium) may include, for example, one or more volatile memories and/or one or more non-volatile memories. Instructions may be executable, for example, by a client device, a server, a remote machine, or by a processing system of a client device, a server, or a remote machine. Instructions can be, for example, a computer program including code.

An interface 1216 may be any type of interface and may reside between any of the components shown in FIG. 12. An interface 1216 may also be, for example, an interface to the outside world (e.g., an Internet network interface). A transceiver block 1207 may represent one or more transceivers, and each transceiver may include a receiver 1206 and a transmitter 1209. A functionality implemented in a processing system 1202 may be implemented in a portion of a receiver 1206, a portion of a transmitter 1209, a portion of a machine-readable medium 1210, a portion of a display 1212, a portion of a keypad 1214, or a portion of an interface 1216, and vice versa.

Figure 13A:
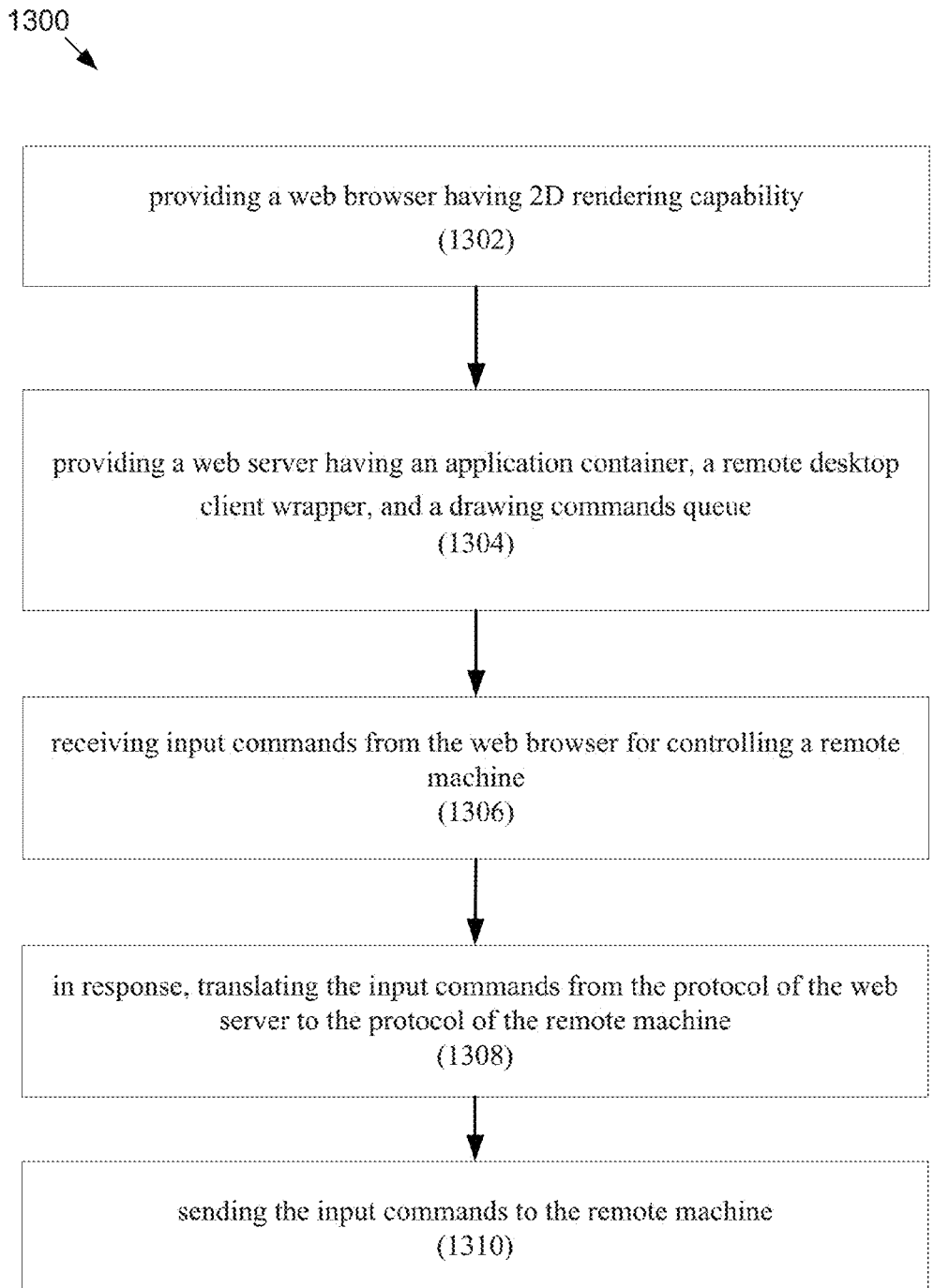
FIG. 13A illustrates a block diagram representing an example of a method of accessing and controlling a remote desktop from a user device.
Figure 13B:
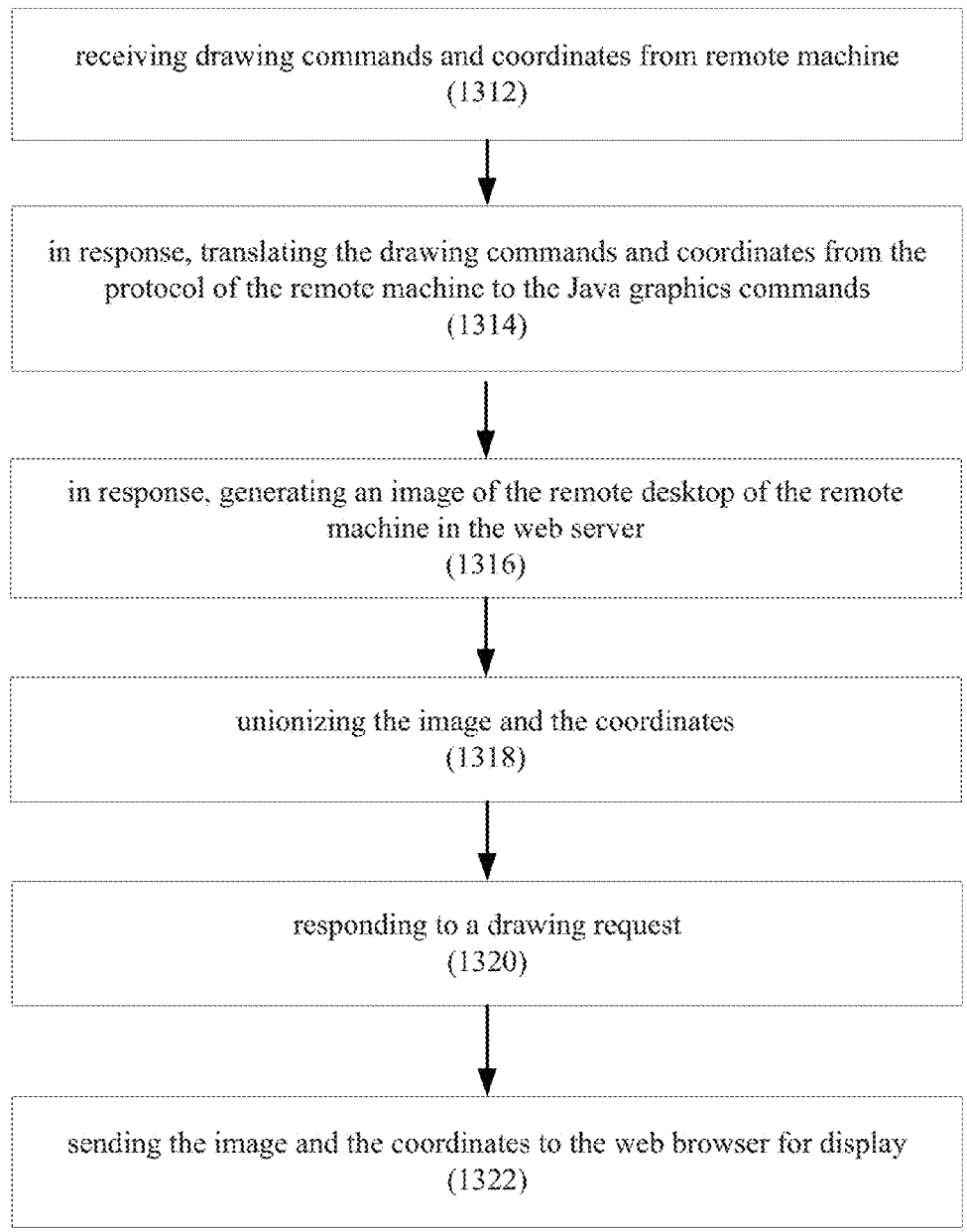
FIG. 13B illustrates a continuation of the FIG. 13A.

FIG. 13A illustrates a block diagram representing a method 1300 of accessing and controlling a remote desktop from a web browser (e.g., 312 or 500) via a transcoding server (e.g., 208, 330, 400A or 400B) according to certain aspects of the present disclosure. FIG. 13B illustrates a continuation of the method 1300. For method 1300, a web browser having 2D rendering capabilities, e.g., an HTML5 compatible web browser, is provided, as described at 1302. Input requests can be received at the transcoding server for controlling the remote desktop, as described at 1306. The input requests can be translated from the protocol of the web browser, e.g., preferably HTTP, into the protocol of the remote desktop server associated with the remote desktop, as described at 1308. The input commands can then be provided to the remote machine (which may include a remote desktop server) as described at 1310.

Referring to FIG. 13B and continuing with the description of method 1300, drawing commands and coordinates, e.g., of dirty regions, can be received by the transcoding server from the remote desktop server, as described at 1312. In response, the drawing commands and coordinates can be translated from the protocol of the remote desktop server to the protocol of the web browser, as described at 1314. The transcoding server can respond by drawing or generating an image of the remote desktop, as described at 1316. The image and the corresponding coordinates can be linked or unionized, as described at 1318. A drawing request from the web browser can be responded to, as described at 1320, by sending the image and coordinates to the web browser for display, as described at 1322. Accordingly, method 1300 may be used for controlling and accessing a remote desktop session via HTTP, and such control can be in real-time.

An exemplary embodiment of a method of accessing and controlling a remote desktop of a remote machine (e.g., 204, 320 or 690) from a web browser (e.g., 312 or 500) via a transcoding server (e.g., 208, 330, 400A or 400B) may include the following three steps: step one can happen once, at the beginning of a session; and steps two and three can continue interchangeably during the remote desktop session.

The first step can include an initial HTTP request by the web browser (e.g., a connection request to connect to a remote machine). For example, an initial HTTP request is sent by the web browser, preferably an HTML5 compatible browser. The web browser receives back a response, which can contain a script client such as 314 or 500, e.g., JavaScript Ajax client code. The transcoding server (e.g., Java transcoding server) can use the connection request to establish a connection to a remote machine via a remote desktop client. A remote desktop client on or used with the Java transcoding server can establish the connection to a remote machine, which utilizes a remote desktop display protocol. The transcoding server can function to interface between the HTTP protocol and the remote desktop display protocol. In one aspect, between the web browser and the transcoding server, there is no connection, as HTTP is a connectionless protocol. Instead, there are only separate requests and responses in HTTP protocol.

The second step is remote session drawing at the web browser: On the browser side, the client JavaScript code can continuously re-send a number of, e.g., four asynchronous (Ajax) HTTP requests to find out if there are any "dirty" regions of the remote desktop of the remote machine to (re) draw. On the Java transcoding server, these drawing requests are handled as long polling requests, meaning that they will be responded to only if there is data to be drawn, otherwise they hang in the drawing requests queue (e.g., 426). In addition, on the Java transcoding server, the remote session is drawn into an off-screen Java bitmap in a drawing commands queue of the transcoding server. In addition, the coordinates of the drawing command are also appended or added to the drawing commands queue. This last part also sends a notification to the drawing requests queue of the transcoding server, so that the first waiting request from the drawing requests queue can be served. In HTTP response to the browser, the "dirty" drawing image is sent, together with the drawing coordinates that are stored in one of the HTTP header sections (known as a cookie). On the browser side, the script client receives the "dirty" image and the coordinates, and the script client draws the image into an HTML canvas (e.g., 530) using coordinates from the cookie. This allows the remote session from a remote machine (e.g., an image of the remote desktop of the remote machine) to be drawn, via a Java transcoding server, to the client's HTML5 browser.

The third step involves a user input, such as a mouse click, keystroke, or touch event. On the browser side, the script client detects, e.g., a mouse event, and sends an HTTP request to the transcoding server, passing along the X and Y coordinates of the event. The Java transcoding server receives the request, sends an empty reply (see, e.g., 720 and 723 in FIG. 7) to close the HTTP request, and then via remote desktop client adapter, it forwards this request to the remote desktop client, which sends it via its protocol to the remote machine. These user input requests can be handled in a standard way, i.e., not as long polling events, to receive and process user input. User input can then be sent to the remote machine.

In a preferred aspect, a script client is not installed on the client device. In other words, a script client does not exist (and is not pre-installed) on the web browser or on the client device prior to the first step described above (e.g., prior to the web browser connecting to, or sending a request to connect to, the transcoding server to initiate a remote session with a remote machine). In a preferred aspect, a client device simply needs a web browser to initiate accessing and controlling a remote desktop of a remote machine or to initiate a remote desktop session with the remote machine. Thus, the client device does not need software or a browser plug-in for a remote desktop display protocol. The transcoding server provides the script client in real time to the web browser via HTTP once the web browser requests a connection to a remote machine for a remote desktop session. The web browser's connection to the remote machine is established through the transcoding server, and the script client is deleted from the client device and the web browser when the remote desktop session is terminated or the browser is closed.

Illustration of Method/Apparatus/Machine Readable Storage Medium for facilitating accessing and controlling a remote desktop of a remote machine in real time by a web browser of a client device via a hypertext transfer protocol (HTTP) utilizing a transcoding server (described as Clauses).

The subject technology is illustrated, for example, according to various aspects described below. Various examples of aspects of the subject technology are described as numbered clauses (1, 2, 3, etc.) for convenience. These are provided as examples, and do not limit the subject technology. Clause 1 below is presented, for example, with reference to the figures of the present disclosure, e.g., FIGS. 14A-14C, etc. It is noted that any of the dependent clauses may be combined in any combination, and placed into a respective independent clause, e.g., clauses 1, 11, and 22. The other clauses can be presented in a similar manner.

Figure 14A:
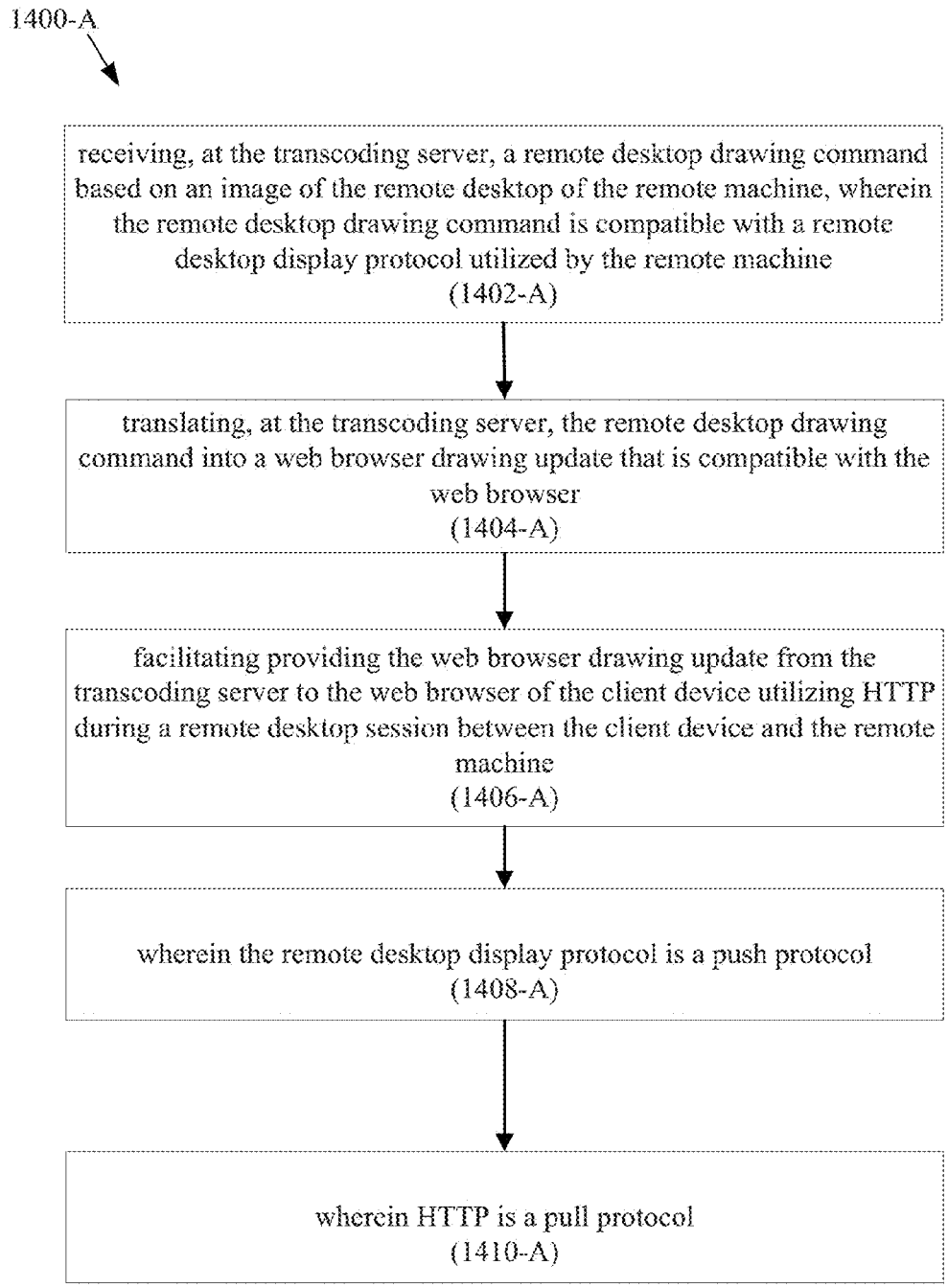
FIG. 14A is a block diagram representing an example of method of facilitating accessing and controlling a remote desktop of a remote machine in real time by a web browser of a client device via a hypertext transfer protocol (HTTP) utilizing a transcoding server.

1. A method (see, e.g., method 1400-A of FIG. 14A) of facilitating accessing and controlling a remote desktop of a remote machine (see, e.g., 320 of FIG. 3A) in real time by a web browser (see, e.g., 500 of FIG. 5) at a client device (see, e.g., 310 in FIG. 3A) via a hypertext transfer protocol (HTTP) utilizing a transcoding server (see, e.g., 330 of FIG. 3A, the method comprising:

receiving, at the transcoding server, a remote desktop drawing command based on an image of the remote desktop of the remote machine, wherein the remote desktop drawing command is compatible with a remote desktop display protocol utilized by the remote machine (see, e.g., item 1402-A in FIG. 14A);

translating, at the transcoding server, the remote desktop drawing command into a web browser drawing update that is compatible with the web browser (see, e.g., item 1404-A in FIG. 14A); and facilitating providing the web browser drawing update from the transcoding server to the web browser of the client device utilizing HTTP during a remote desktop session between the client device and the remote machine (see, e.g., item 1406-A in FIG. 14A), wherein the remote desktop display protocol is a push protocol (see, e.g., item 1408-A in FIG. 14A), wherein HTTP is a pull protocol (see, e.g., item 1410-A in FIG. 14A).

2. The method of clause 1, wherein the web browser drawing update comprises an image file and drawing coordinates for the image file that are recognizable and processable by the web browser.

3. The method of clause 1, wherein the translating comprises:

translating the remote desktop drawing command into a Java graphics drawing command;

updating a portion of a Java bitmap using the Java graphics drawing command, wherein the updated portion of the Java bitmap represents a portion of an entire image of the remote desktop;

creating an image file from the Java bitmap; and generating drawing coordinates for the image file, wherein the web browser drawing update comprises the image file and the drawing coordinates for the image file, wherein the facilitating providing comprises placing the drawing coordinates into an HTTP header, wherein utilizing HTTP comprises using an HTTP handler, wherein the transcoding server is a Java transcoding server that is configured to provide an application framework for hosting one or more web applications.

4. The method of clause 1, wherein the translating comprises:

translating the remote desktop drawing command into a graphics drawing command that is compatible with the transcoding server, wherein the graphics drawing command includes coordinates;

extracting the coordinates from the graphics drawing command;

updating at least a portion of an off-screen bitmap based on the graphics drawing command, wherein the at least a portion of the off-screen bitmap is associated with the coordinates, wherein the off-screen bitmap is based on the image of the remote desktop;

creating an image file based on the at least a portion of the off-screen bitmap; and wherein the web browser drawing update comprises the image file and the coordinates.

5. The method of clause 1, wherein the web browser is an HTML5 compatible web browser.

6. The method of clause 1, comprising:

receiving a user input request from the web browser, using HTTP;

translating the user input request into an input command compatible with the remote desktop display protocol; and providing the input command to the remote desktop client for accessing and controlling the remote desktop of the remote machine during the remote desktop session, wherein the web browser drawing update comprises an image file and drawing coordinates for the image file that are recognizable and processable by the web browser, wherein the image file and the drawing coordinates represent a portion of an entire image of the remote desktop that has been changed in response to the input command.

7. The method of clause 6, wherein the user input request comprises at least one of a mouse event, a keyboard event, and a touch event.

8. The method of clause 1, wherein the remote desktop drawing command comprises remote desktop drawing command parameters and bitmap data received from a remote desktop server of the remote machine, wherein the translating comprises one or more of: calculating new drawing command parameters based on the remote desktop drawing command parameters; adjusting the remote desktop drawing command parameters; and making adjustments to the bitmap data.

9. The method of clause 1, wherein the remote desktop drawing command comprises remote desktop drawing command parameters and bitmap data received from a remote desktop server of the remote machine, wherein the translating comprises making adjustments to the bitmap data, wherein the making adjustments comprises converting a 16-bit red-green-blue (RGB) 5-6-5 color format into a 32-bit alpha-red-green-blue (ARGB) 8-8-8-8 format.

10. The method of clause 1, wherein the transcoding server is an intermediary between the remote machine and the client device, and wherein the transcoding server is physically separate from the remote machine.

Figure 14B:
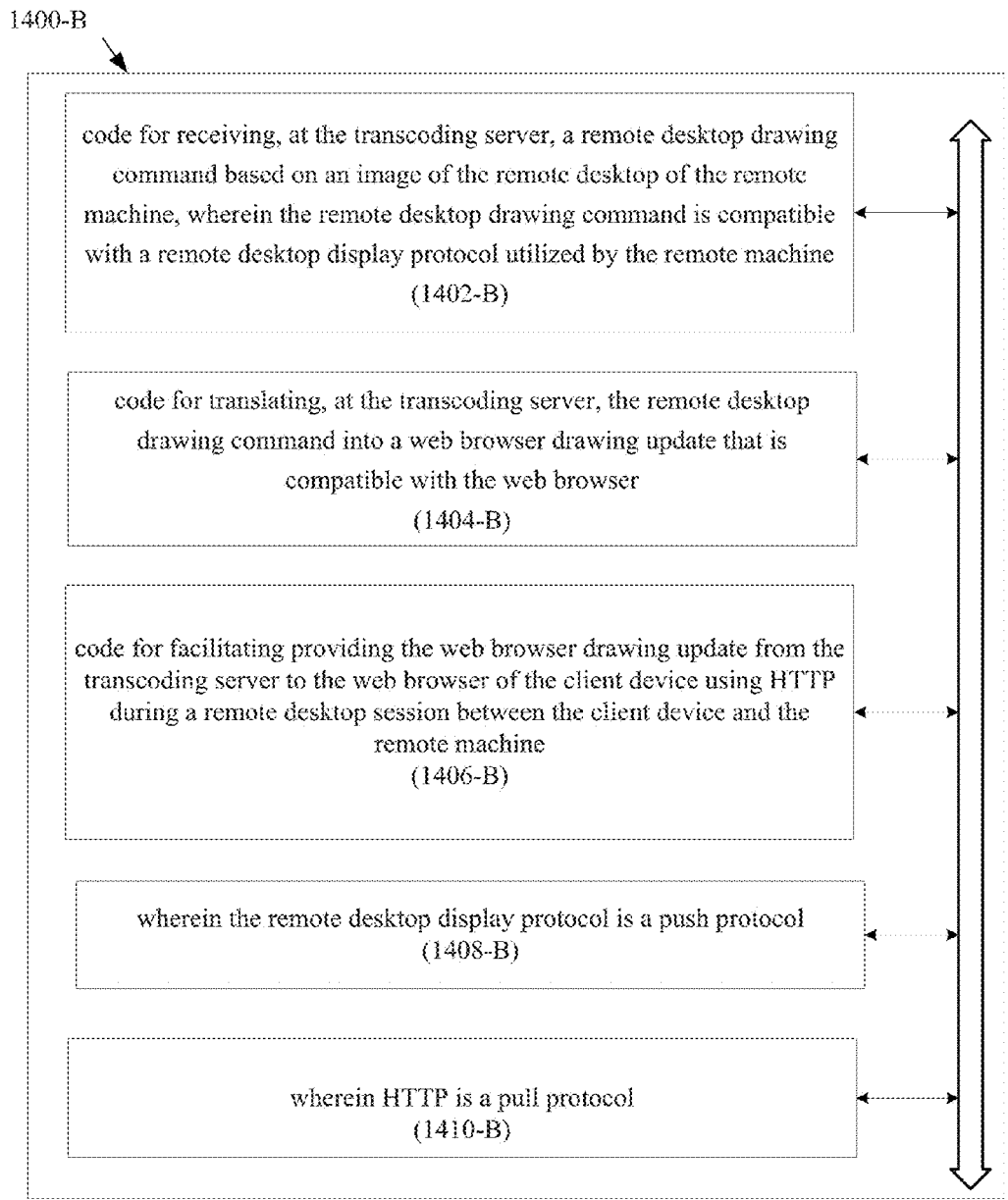
FIG. 14B is a block diagram representing code of an example of a machine-readable storage medium encoded with instructions executable by a processing system to perform a method of facilitating accessing and controlling a remote desktop of a remote machine in real time by a web browser of a client device via a hypertext transfer protocol (HTTP) utilizing a transcoding server.

11. A machine-readable storage medium (see, e.g., machine-readable storage medium 1400-B of FIG. 14B) encoded with instructions executable by a processing system to perform a method of facilitating accessing and controlling a remote desktop of a remote machine (see, e.g., 320 of FIG. 3A) in real time by a web browser (see, e.g., 500 of FIG. 5) at a client device (see, e.g., 310 of FIG. 3A) via a hypertext transfer protocol (HTTP) utilizing a transcoding server (see, e.g., 330 of FIG. 3A), the instructions comprising code for:

receiving, at the transcoding server, a remote desktop drawing command based on an image of the remote desktop of the remote machine, wherein the remote desktop drawing command is compatible with a remote desktop display protocol utilized by the remote machine (see, e.g., item 1402-B in FIG. 14B);

translating, at the transcoding server, the remote desktop drawing command into a web browser drawing update that is compatible with the web browser (see, e.g., item 1404-A in FIG. 14B); and facilitating providing the web browser drawing update from the transcoding server to the web browser of the client device using HTTP during a remote desktop session between the client device and the remote machine (see, e.g., item 1406-A in FIG. 14B), wherein the remote desktop display protocol is a push protocol (see, e.g., item 1408-A in FIG. 14B), and wherein HTTP is a pull protocol (see, e.g., item 1410-A in FIG. 14B).

12. The machine-readable storage medium of clause 11, wherein the web browser drawing update comprises an image file and drawing coordinates for the image file that are recognizable and processable by the web browser.

13. The machine-readable storage medium of clause 11, wherein the translating comprises:

translating the remote desktop drawing command into a Java graphics drawing command;

updating a portion of a Java bitmap using the Java graphics drawing command, wherein the updated portion of the Java bitmap represents a portion of an entire image of the remote desktop;

creating an image file from the Java bitmap; and generating drawing coordinates for the image file, wherein the web browser drawing update comprises the image file and the drawing coordinates for the image file, wherein the facilitating providing comprises placing the drawing coordinates into an HTTP header, wherein utilizing HTTP comprises using an HTTP handler, wherein the transcoding server is a Java transcoding server that is configured to provide an application framework for hosting one or more web applications.

14. The machine-readable storage medium of clause 11, wherein the translating comprises:

translating the remote desktop drawing command into a graphics drawing command that is compatible with the transcoding server, wherein the graphics drawing command includes coordinates;

extracting the coordinates from the graphics drawing command;

updating at least a portion of an off-screen bitmap based on the graphics drawing command, wherein the at least a portion of the off-screen bitmap is associated with the coordinates, wherein the off-screen bitmap is based on the image of the remote desktop;

creating an image file based on the at least a portion of the off-screen bitmap; and wherein the web browser drawing update comprises the image file and the coordinates.

15. The machine-readable storage medium of clause 11, wherein the web browser is an HTML5 compatible web browser.

16. The machine-readable storage medium of clause 11, wherein the instructions comprise code for:

receiving a user input request from the web browser, using HTTP;

translating the user input request into an input command compatible with the remote desktop display protocol; and providing the input command to the remote desktop client for accessing and controlling the remote desktop of the remote machine during the remote desktop session;

wherein the web browser drawing update comprises an image file and drawing coordinates for the image file that are recognizable and processable by the web browser; and wherein the image file and the drawing coordinates represent a portion of an entire image of the remote desktop that has been changed in response to the input command.

17. The machine-readable storage medium of clause 16, wherein the user input request comprises at least one of a mouse event, a keyboard event, and a touch event.

18. The machine-readable storage medium of clause 11, wherein the remote desktop drawing command comprises remote desktop drawing command parameters and bitmap data received from a remote desktop server of the remote machine, wherein the translating comprises one or more of: calculating new drawing command parameters based on the remote desktop drawing command parameters; adjusting the remote desktop drawing command parameters; and making adjustments to the bitmap data.

19. The machine-readable storage medium of clause 11, wherein the remote desktop drawing command comprises remote desktop drawing command parameters and bitmap data received from a remote desktop server of the remote machine, wherein the translating comprises making adjustments to the bitmap data, wherein the making adjustments comprises converting a 16-bit red-green-blue (RGB) 5-6-5 color format into a 32-bit alpha-red-green-blue (ARGB) 8-8-8-8 format.

20. The machine-readable storage medium of clause 11, wherein the transcoding server is an intermediary between the remote machine and the client device, and wherein the transcoding server is physically separate from the remote machine.

21. A computing machine comprising the machine-readable storage medium of clause 11, wherein the computing machine is the transcoding server.

Figure 14C:
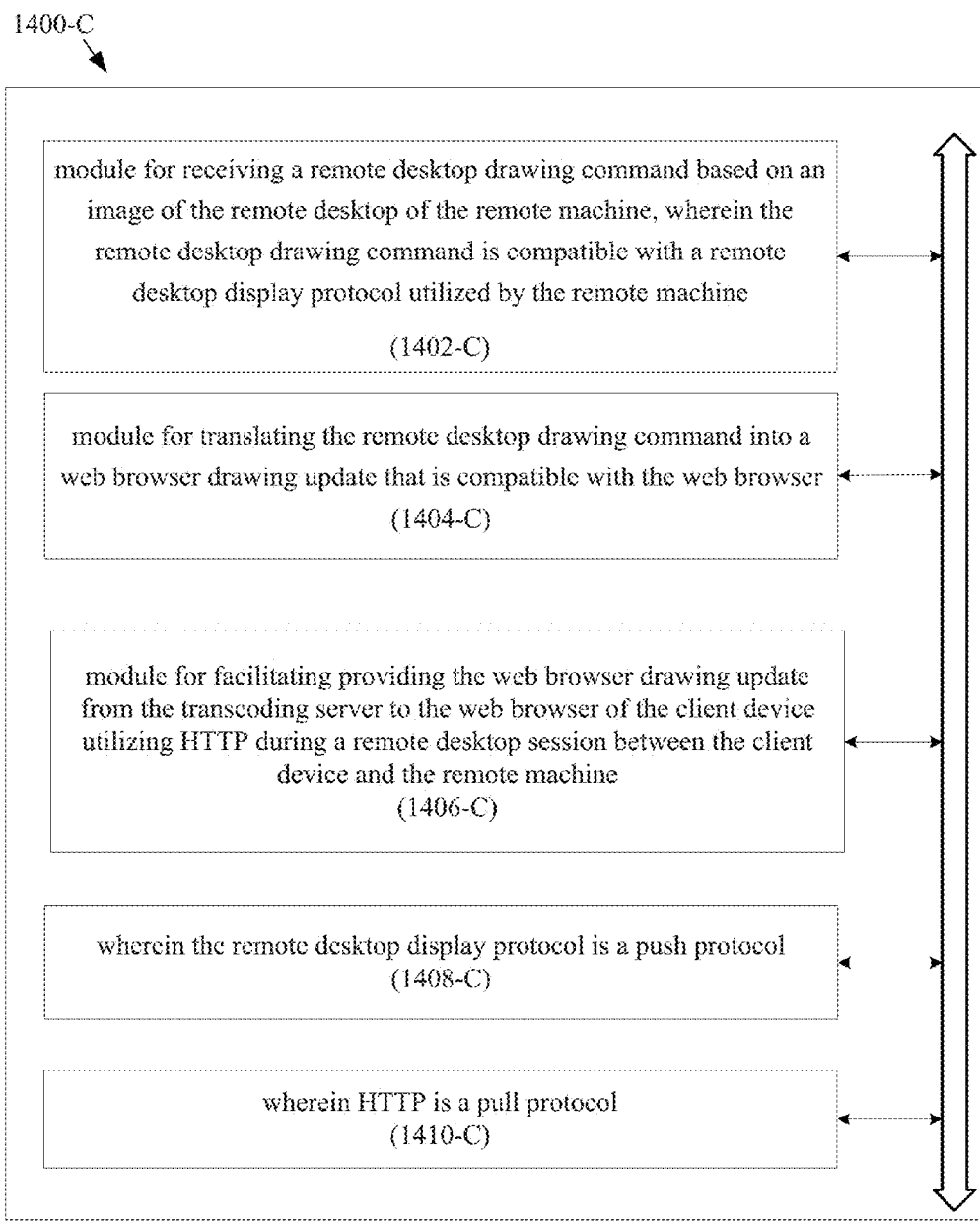
FIG. 14C is a block diagram module of an example of an apparatus for facilitating accessing and controlling a remote desktop of a remote machine in real time by a web browser of a client device via a hypertext transfer protocol (HTTP) utilizing a transcoding server.

22. An apparatus for facilitating accessing and controlling a remote desktop of a remote machine (see, e.g., 320 of FIG. 3A) in real time by a web browser (see, 500 of FIG. 5) at a client device (see, e.g., 310 of FIG. 3A) via a hypertext transfer protocol (HTTP) utilizing a transcoding server (see, e.g., 330 of FIG. 3A), the apparatus comprising:

means for receiving a remote desktop drawing command based on an image of the remote desktop of the remote machine, wherein the remote desktop drawing command is compatible with a remote desktop display protocol utilized by the remote machine (see, e.g., item 1402-C in FIG. 14C);

means for translating the remote desktop drawing command into a web browser drawing update that is compatible with the web browser (see, e.g., item 1404-C in FIG. 14C); and means for facilitating providing the web browser drawing update from the transcoding server to the web browser of the client device utilizing HTTP during a remote desktop session between the client device and the remote machine (see, e.g., item 1406-C in FIG. 14C);

wherein the remote desktop display protocol is a push protocol (see, e.g., item 1408-C in FIG. 14C); and wherein HTTP is a pull protocol (see, e.g., item 1410-C in FIG. 14C).

23. The apparatus of clause 22, wherein the web browser drawing update comprises an image file and drawing coordinates for the image file that are recognizable and processable by the web browser.

24. The apparatus of clause 22, wherein the means for translating comprises:

means for translating the remote desktop drawing command into a Java graphics drawing command;

means for updating a portion of a Java bitmap using the Java graphics drawing command, wherein the updated portion of the Java bitmap represents a portion of an entire image of the remote desktop;

means for creating an image file from the Java bitmap; and means for generating drawing coordinates for the image file, wherein the web browser drawing update comprises the image file and the drawing coordinates for the image file, wherein the means for facilitating providing comprises means for placing the drawing coordinates into an HTTP header, wherein utilizing HTTP comprises utilizing an HTTP handler, and wherein the transcoding server is a Java transcoding server that is configured to provide an application framework for hosting one or more web applications.

25. The apparatus of clause 22, wherein the means for translating comprises:

means for translating the remote desktop drawing command into a graphics drawing command that is compatible with the transcoding server, wherein the graphics drawing command includes coordinates;

means for extracting the coordinates from the graphics drawing command;

means for updating at least a portion of an off-screen bitmap based on the graphics drawing command, wherein the at least a portion of the off-screen bitmap is associated with the coordinates, wherein the off-screen bitmap is based on the image of the remote desktop; and means for creating an image file based on the at least a portion of the off-screen bitmap;

wherein the web browser drawing update comprises the image file and the coordinates.

26. The apparatus of clause 22, wherein the web browser is an HTML5 compatible web browser.

27. The apparatus of clause 22, comprising:

means for receiving a user input request from the web browser, using HTTP;

means for translating the user input request into an input command compatible with the remote desktop display protocol; and means for providing the input command to the remote desktop client for accessing and controlling the remote desktop of the remote machine during the remote desktop session;

wherein the web browser drawing update comprises an image file and drawing coordinates for the image file that are recognizable and processable by the web browser; and wherein the image file and the drawing coordinates represent a portion of an entire image of the remote desktop that has been changed in response to the input command.

28. The apparatus of clause 27, wherein the user input request comprises at least one of a mouse event, a keyboard event, and a touch event.

29. The apparatus of clause 22, wherein the remote desktop drawing command comprises remote desktop drawing command parameters and bitmap data received from a remote desktop server of the remote machine, wherein the means for translating comprises one or more of: means for calculating new drawing command parameters based on the remote desktop drawing command parameters; means for adjusting the remote desktop drawing command parameters; and means for making adjustments to the bitmap data.

30. The apparatus of clause 22, wherein the remote desktop drawing command comprises remote desktop drawing command parameters and bitmap data received from a remote desktop server, wherein the means for translating comprises means for making adjustments to the bitmap data of the remote machine, wherein the means for making adjustments comprises means for converting a 16-bit red-green-blue (RGB) 5-6-5 color format into a 32-bit alpha-red-green-blue (ARGB) 8-8-8-8 format.

31. The apparatus of clause 22, wherein the transcoding server is an intermediary between the remote machine and the client device, and wherein the transcoding server is physically separate from the remote machine.

32. The apparatus of clause 22, wherein the apparatus comprises the transcoding server.

33. The apparatus of clause 22, wherein the apparatus comprises a processing system and a memory.

Illustration of Method/Apparatus/Machine Readable Storage Medium for facilitating conducting a remote desktop session between a web browser of a client device and a remote machine via a transcoding server in real time and utilizing hypertext markup language that supports a two-dimensional (2D) canvas and dynamic drawing (described as Clauses).

Figure 15B:
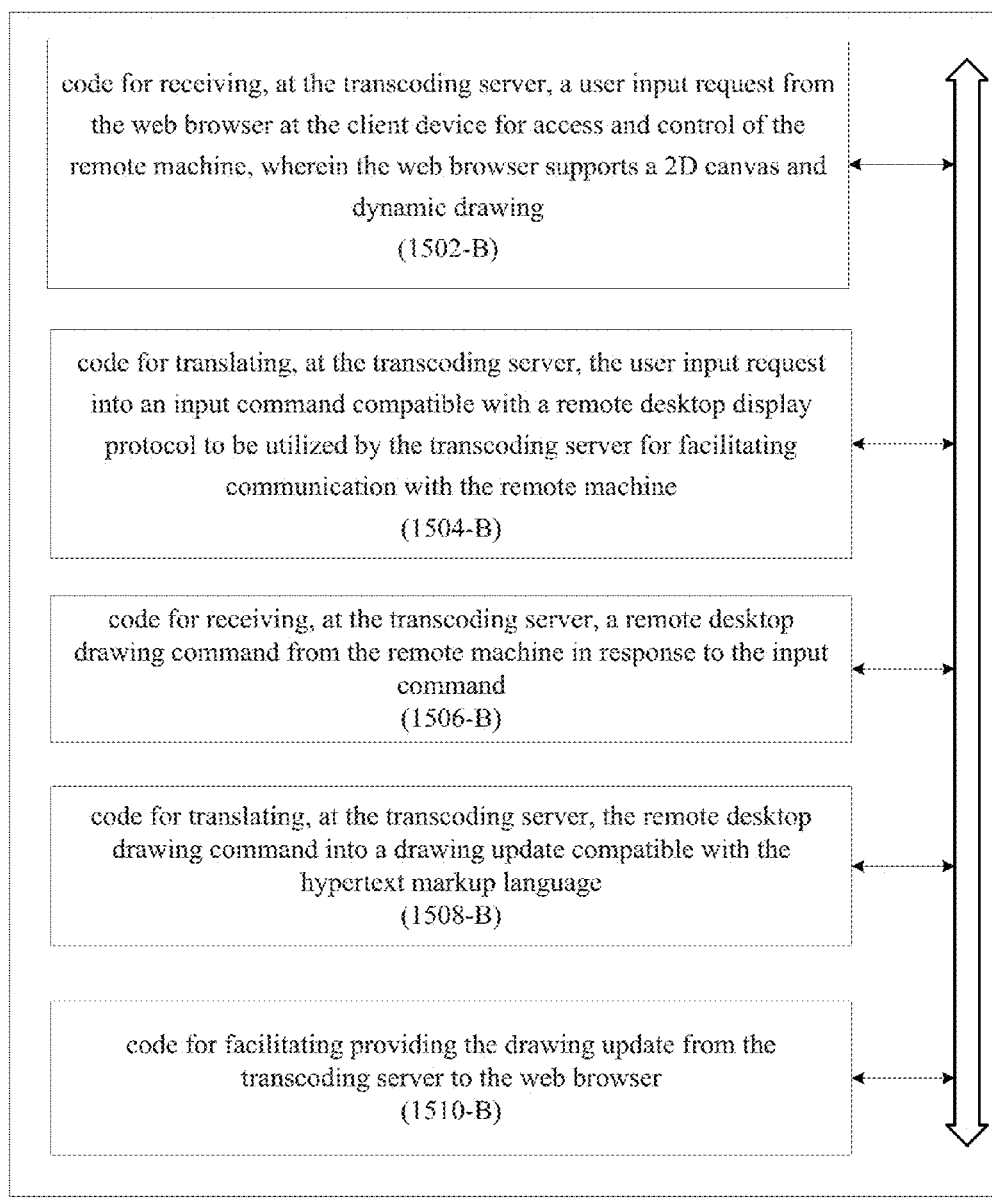
FIG. 15B is a block diagram representing code of an example of a machine-readable storage medium encoded with instructions executable by a processing system to perform a method of facilitating accessing and controlling a remote desktop of a remote machine in real time by a web browser of a client device via a hypertext transfer protocol (HTTP) utilizing a transcoding server.

The subject technology is illustrated, for example, according to various aspects described below. Various examples of aspects of the subject technology are described as numbered clauses (1, 2, 3, etc.) for convenience. These are provided as examples, and do not limit the subject technology. Clause 1 below is presented, for example, with reference to FIGS. 15A-15C. It is noted that any of the dependent clauses may be combined in any combination, and placed into a respective independent clause, e.g., clauses 1, 11, and 22. The other clauses can be presented in a similar manner.

1. A method (see, e.g., item 1500-A in FIG. 15A) of facilitating conducting a remote desktop session between a web browser of a client device (see, e.g., 310 in FIG. 3A) and a remote machine (see, e.g., 320) via a transcoding server (see, e.g., 330) in real time and utilizing hypertext markup language that supports a two-dimensional (2D) canvas and dynamic drawing, the method comprising:

receiving, at the transcoding server, a user input request from the web browser of the client device for access and control of the remote machine, wherein the web browser supports a 2D canvas and dynamic drawing (see, e.g., item 1502-A in FIG. 15A);

translating, at the transcoding server, the user input request into an input command compatible with a remote desktop display protocol to be utilized by the transcoding server for facilitating communication with the remote machine (see, e.g., item 1504-A in FIG. 15A);

receiving, at the transcoding server, a remote desktop drawing command from the remote machine in response to the input command (see, e.g., item 1506-A in FIG. 15A);

translating, at the transcoding server, the remote desktop drawing command into a drawing update compatible with the hypertext markup language (see, e.g., item 1508-A in FIG. 15A); and facilitating providing the drawing update from the transcoding server to the web browser (see, e.g., item 1510-A in FIG. 15A);

wherein the transcoding server is an intermediary between the remote machine and the client device, and wherein the transcoding server is physically separate from the remote machine.

2. The method of clause 1, wherein the translating the remote desktop drawing command comprises:
   translating the remote desktop drawing command into a Java graphics drawing command;
   executing the Java graphics drawing command to update a portion of a Java bitmap, wherein the Java bitmap represents an entire image of a remote desktop of the remote machine;
   generating coordinates for the updated portion of the Java bitmap based on the updated portion of Java graphics drawing command;
   forming an image file based on the updated portion of Java bitmap, wherein the image file is compatible with HTML5, and
   obtaining drawing coordinates for the image file based on the coordinates for the updated portion of the Java bitmap, wherein the drawing coordinates are compatible with HTML5,
   wherein the drawing update comprises the image file and the drawing coordinates for the image file,
   wherein the drawing update represents a portion of the entire image of the remote desktop,
   wherein the web browser temporarily comprises JavaScript client code during the remote desktop session while the remote desktop session persists;
   wherein the method comprises receiving, at the transcoding server, drawing requests from the JavaScript client code of the web browser,
   wherein the facilitating providing the drawing update comprises facilitating providing the drawing update from the transcoding server to the JavaScript client code of the web browser in response to one of the drawing requests from the JavaScript client code of the web browser.

3. The method of clause 1, wherein the translating the remote desktop drawing command comprises:
   translating the remote desktop drawing command into a graphics drawing command compatible with the transcoding server;
   updating a portion of a bitmap based on the graphics drawing command, wherein the updated portion of the bitmap represents a portion of an entire image of a remote desktop of the remote machine that has changed relative to a previous graphics drawing command;
   generating coordinates for the updated portion of the bitmap;
   forming an image file based on the updated portion of the bitmap, wherein the image file is HTML5 compatible; and
   obtaining drawing coordinates for the image file, wherein the drawing coordinates are compatible with HTML5,
   wherein the drawing update comprises the image file and the drawing coordinates for the image file,
   wherein the method comprises receiving, at the transcoding server, drawing requests from the web browser,
   wherein the facilitating providing the drawing update comprises facilitating providing the drawing update from the transcoding server to the web browser in response to one of the drawing requests from the web browser.

4. The method of clause 1, wherein the transcoding server comprises a remote desktop client adapter configured to translate the user input request into the input command compatible with the remote desktop display protocol and to translate the remote desktop drawing command into the graphics drawing command.

5. The method of clause 1, comprising receiving long polling HTTP requests from the web browser, wherein the long polling HTTP requests comprise drawing requests.

6. The method of clause 1, comprising receiving from the web browser an initial HTTP request comprising a uniform resource locator (URL) of the remote machine.

7. The method of clause 6, comprising facilitating providing a script client code to the web browser in response to the initial HTTP request for the URL of the remote machine, wherein the script client code is compatible with HTML5.

8. The method of clause 1, wherein the remote desktop drawing command is compatible with the remote desktop display protocol, wherein the remote desktop display protocol is a push protocol, and wherein the facilitating providing the drawing update comprises facilitating providing the drawing update using HTTP that is a pull protocol.

9. The method of clause 1, wherein dynamic drawing comprises drawing in real time a portion of the 2D canvas, rather than drawing the entire 2D canvas, in response to one or more drawing requests of a script client of the web browser.

10. The method of clause 1, wherein the 2D canvas is updatable by a portion at a time according to a set of coordinates.

11. A machine-readable storage medium (see, e.g., 1210, 1219 in FIG. 12) encoded with instructions executable by a processing system (see, e.g., 1202) to perform a method of facilitating conducting a remote desktop session between a web browser of a client device (see, e.g., 310 in FIG. 3A) and a remote machine (see, e.g., 320) via a transcoding server (see, e.g., 330) in real time and utilizing hypertext markup language that supports a two-dimensional (2D) canvas and dynamic drawing, the instructions comprising code for:
   receiving, at the transcoding server, a user input request from the web browser of the client device for access and control of the remote machine, wherein the web browser supports a 2D canvas and dynamic drawing (see, e.g., item 1502-B in FIG. 15B);
   translating, at the transcoding server, the user input request into an input command compatible with a remote desktop display protocol to be utilized by the transcoding server for facilitating communication with the remote machine (see, e.g., item 1504-B in FIG. 15B);
   receiving, at the transcoding server, a remote desktop drawing command from the remote machine in response to the input command (see, e.g., item 1506-B in FIG. 15B);
   translating, at the transcoding server, the remote desktop drawing command into a drawing update compatible with the hypertext markup language (see, e.g., item 1508-B in FIG. 15B); and
   facilitating providing the drawing update from the transcoding server to the web browser (see, e.g., item 1510-B in FIG. 15B);
   wherein the transcoding server is an intermediary between the remote machine and the client device, and wherein the transcoding server is physically separate from the remote machine.

12. The machine-readable storage medium of clause 11, wherein the translating the remote desktop drawing command comprises:
   translating the remote desktop drawing command into a Java graphics drawing command;
   executing the Java graphics drawing command to update a portion of a Java bitmap, wherein the Java bitmap represents an entire image of a remote desktop of the remote machine;
   generating coordinates for the updated portion of the Java bitmap based on the Java graphics drawing command;
   forming an image file based on the updated portion of the Java bitmap, wherein the image file is compatible with HTML5; and obtaining drawing coordinates for the image file based on the coordinates for the updated portion of the Java bitmap, wherein the drawing coordinates are compatible with HTML5, wherein the drawing update comprises the image file and the drawing coordinates for the image file, wherein the drawing update represents a portion of the entire image of the remote desktop, wherein the web browser temporarily comprises JavaScript client code during the remote desktop session while the remote desktop session persists;

wherein the method comprises receiving, at the transcoding server, drawing requests from the JavaScript client code of the web browser, wherein the facilitating providing the drawing update comprises facilitating providing the drawing update from the transcoding server to the JavaScript client code of the web browser in response to one of the drawing requests from the JavaScript client code of the web browser.

13. The machine-readable storage medium of clause 11, wherein the translating the remote desktop drawing command comprises:

translating the remote desktop drawing command into a graphics drawing command compatible with the transcoding server;

updating a portion of a bitmap based on the graphics drawing command, wherein the updated portion of the bitmap represents a portion of an entire image of a remote desktop of the remote machine that has changed relative to a previous graphics drawing command;

generating coordinates for the updated portion of the bitmap;

forming an image file based on the updated portion of the bitmap, wherein the image file is HTML5 compatible; and obtaining drawing coordinates for the image file, wherein the drawing coordinates are compatible with HTML5, wherein the drawing update comprises the image file and the drawing coordinates for the image file, wherein the method comprises receiving, at the transcoding server, drawing requests from the web browser, and wherein the facilitating providing the drawing update comprises facilitating providing the drawing update from the transcoding server to the web browser in response to one of the drawing requests from the web browser.

14. The machine-readable storage medium of clause 11, wherein the transcoding server comprises a remote desktop client adapter configured to translate the user input request into the input command compatible with the remote desktop display protocol and to translate the remote desktop drawing command into the graphics drawing command.

15. The machine-readable storage medium of clause 11, comprising code for receiving long polling HTTP requests from the web browser, wherein the long polling HTTP requests comprise drawing requests.

16. The machine-readable storage medium of clause 11, comprising code for receiving from the web browser an initial HTTP request comprising a uniform resource locator (URL) of the remote machine.

17. The machine-readable storage medium of clause 16, comprising code for facilitating providing a script client code to the web browser in response to the initial HTTP request for the URL of the remote machine, wherein the script client code is compatible with HTML5.

18. The machine-readable storage medium of clause 11, wherein the remote desktop drawing command is compatible with the remote desktop display protocol, wherein the remote desktop display protocol is a push protocol, and wherein the facilitating providing the drawing update comprises facilitating providing the drawing update using HTTP that is a pull protocol.

19. The machine-readable storage medium of clause 11, wherein dynamic drawing comprises drawing in real time a portion of the 2D canvas, rather than drawing the entire 2D canvas, in response to one or more drawing requests of a script client of the web browser.

20. The machine-readable storage medium of clause 11, wherein the 2D canvas is updatable by a portion at a time according to a set of coordinates.

21. A computing machine comprising the machine-readable storage medium of clause 11, wherein the computing machine is the transcoding server.

Figure 15C:
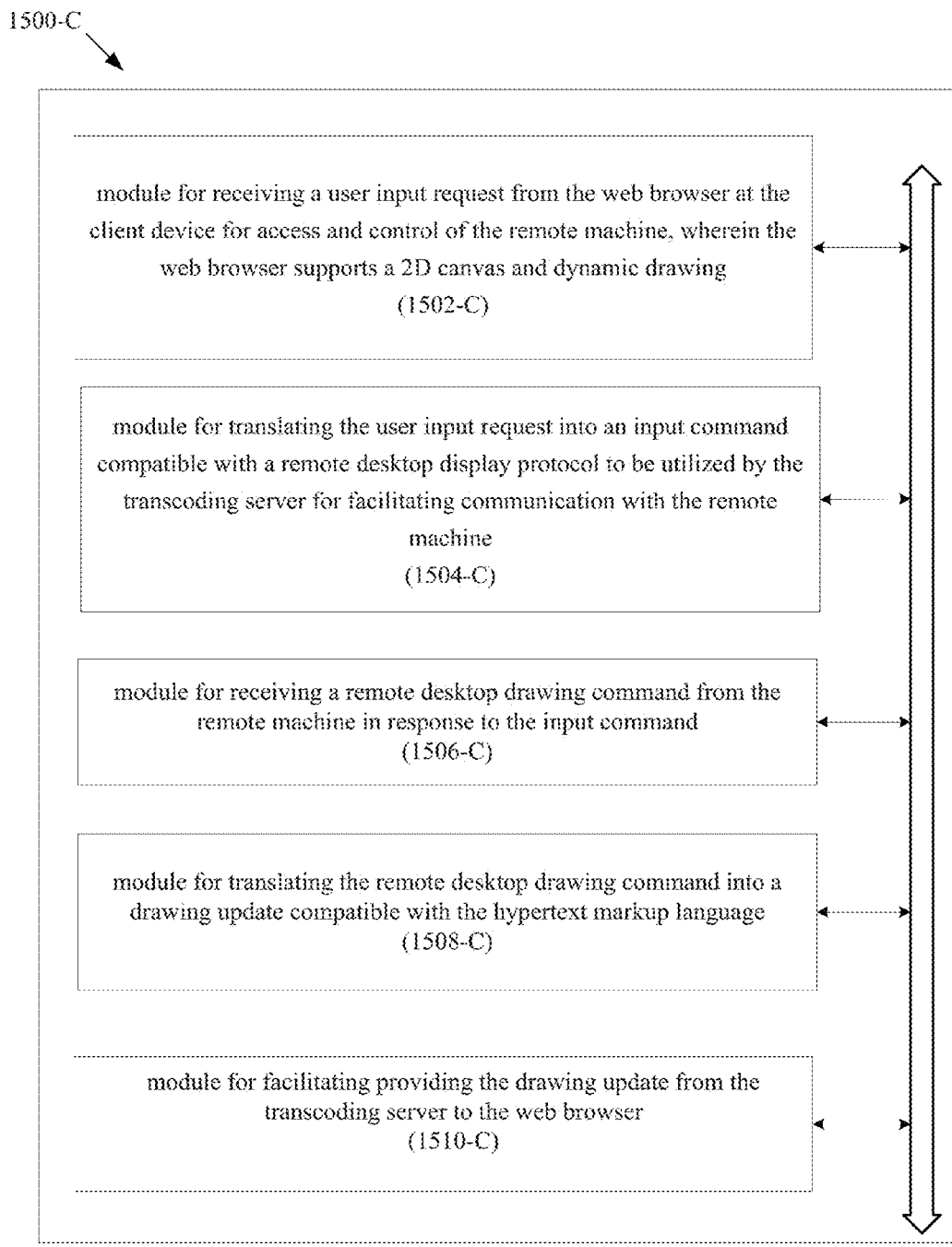
FIG. 15C is a block diagram module of an example of an apparatus for facilitating accessing and controlling a remote desktop of a remote machine in real time by a web browser of a client device via a hypertext transfer protocol (HTTP) utilizing a transcoding server.

22. An apparatus (see, e.g., item 1500-C in FIG. 15C) for facilitating conducting a remote desktop session between a web browser of a client device (see, e.g., 310 in FIG. 3A) and a remote machine (see, e.g., 320) via a transcoding server (see, e.g., 330) in real time and utilizing hypertext markup language that supports a two-dimensional (2D) canvas and dynamic drawing, the apparatus comprising:

means for receiving a user input request from the web browser of the client device for access and control of the remote machine, wherein the web browser supports a 2D canvas and dynamic drawing (see, e.g., item 1502-C in FIG. 15C);

means for translating the user input request into an input command compatible with a remote desktop display protocol to be utilized by the transcoding server for facilitating communication with the remote machine (see, e.g., item 1504-C in FIG. 15C);

means for receiving a remote desktop drawing command from the remote machine in response to the input command (see, e.g., item 1506-C in FIG. 15C);

means for translating the remote desktop drawing command into a drawing update compatible with the hypertext markup language (see, e.g., item 1508-C in FIG. 15C); and means for facilitating providing the drawing update from the transcoding server to the web browser (see, e.g., item 1510-C in FIG. 15C);

wherein the transcoding server is an intermediary between the remote machine and the client device, and wherein the transcoding server is physically separate from the remote machine.

23. The apparatus of clause 22, wherein the means for translating the remote desktop drawing command comprises:

means for translating the remote desktop drawing command into a Java graphics drawing command;

means for executing the Java graphics drawing command to update a portion of a Java bitmap, wherein the Java bitmap represents an entire image of a remote desktop of the remote machine;

means for generating coordinates for the updated portion of the Java bitmap based on the Java graphics drawing command;

means for forming an image file based on the updated portion of the Java bitmap, wherein the image file is compatible with HTML5; and means for obtaining drawing coordinates for the image file based on the coordinates for the updated portion of the Java bitmap, wherein the drawing coordinates are compatible with HTML5, wherein the drawing update comprises the image file and the drawing coordinates for the image file, wherein the drawing update represents a portion of the entire image of the remote desktop, wherein the web browser temporarily comprises JavaScript client code during the remote desktop session while the remote desktop session persists, wherein the apparatus comprises means for receiving drawing requests from the JavaScript client code of the web browser, wherein the means for facilitating providing the drawing update comprises means for facilitating providing the drawing update from the transcoding server to the JavaScript client code of the web browser in response to one of the drawing requests from the JavaScript client code of the web browser.

24. The apparatus of clause 22, wherein the means for translating the remote desktop drawing command comprises:

means for translating the remote desktop drawing command into a graphics drawing command compatible with the transcoding server;

means for updating a portion of a bitmap based on the graphics drawing command, wherein the updated portion of the bitmap represents a portion of an entire image of a remote desktop of the remote machine that has changed relative to a previous graphics drawing command;

means for generating coordinates for the updated portion of the bitmap;

means for forming an image file based on the updated portion of the bitmap, wherein the image file is HTML5 compatible; and means for obtaining drawing coordinates for the image file, wherein the drawing coordinates are compatible with HTML5, wherein the drawing update comprises the image file and the drawing coordinates for the image file, wherein the apparatus comprises means for receiving drawing requests from the web browser, wherein the means for facilitating providing the drawing update comprises means for facilitating providing the drawing update from the transcoding server to the web browser in response to one of the drawing requests from the web browser.

25. The apparatus of clause 22, wherein the transcoding server comprises a remote desktop client adapter configured to translate the user input request into the input command compatible with the remote desktop display protocol and to translate the remote desktop drawing command into the graphics drawing command.

26. The apparatus of clause 22, comprising means for receiving long polling HTTP requests from the web browser, wherein the long polling HTTP requests comprise drawing requests.

27. The apparatus of clause 22, comprising means for receiving from the web browser an initial HTTP request comprising a uniform resource locator (URL) of the remote machine.

28. The apparatus of clause 27, comprising means for facilitating providing a script client code to the web browser in response to the initial HTTP request for the URL of the remote machine, wherein the script client code is compatible with HTML5.

29. The apparatus of clause 22, wherein the remote desktop drawing command is compatible with the remote desktop display protocol, wherein the remote desktop display protocol is a push protocol, and wherein the means for facilitating providing the drawing update comprises means for facilitating providing the drawing update using HTTP that is a pull protocol.

30. The apparatus of clause 22, wherein dynamic drawing comprises drawing in real time a portion of the 2D canvas, rather than drawing the entire 2D canvas, in response to one or more drawing requests of a script client of the web browser.

31. The apparatus of clause 22, wherein the 2D canvas is updatable by a portion at a time according to a set of coordinates.

32. The apparatus of clause 22, wherein the apparatus comprises the transcoding server.

33. The apparatus of clause 22, wherein the apparatus comprises a processing system and a memory.

Illustration of Method/Apparatus/Machine Readable Storage Medium for facilitating a remote desktop session between a web browser of a client device and a remote machine through a transcoding server, utilizing hypertext transfer protocol (HTTP) headers of HTTP for remote desktop session drawing (described as Clauses).

The subject technology is illustrated, for example, according to various aspects described below. Various examples of aspects of the subject technology are described as numbered clauses (1, 2, 3, etc.) for convenience. These are provided as examples, and do not limit the subject technology. It is noted that any of the dependent clauses may be combined in any combination, and placed into a respective independent clause, e.g., clauses 1, 11, and 22. Clause 1 below is presented, for example, with reference to FIGS. 16A-16C. The other clauses can be presented in a similar manner.

Figure 16A:
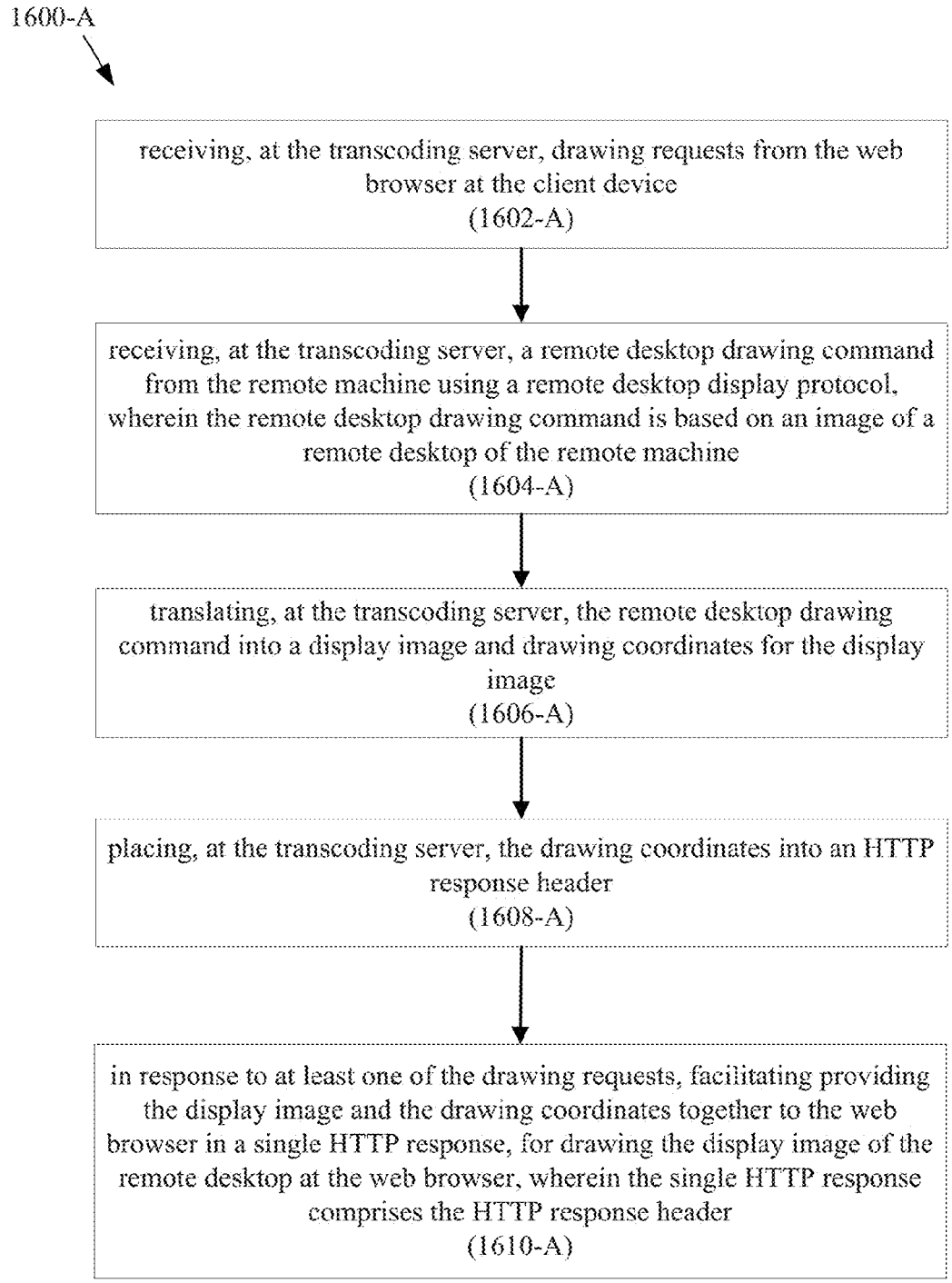
FIG. 16A is a block diagram representing an example of a method of facilitating conducting a remote desktop session between a web browser of a client device and a remote machine via a transcoding server in real time and utilizing hypertext markup language that supports a two-dimensional (2D) canvas and dynamic drawing.

1. A method (see, e.g., item 1600-A in FIG. 16A) of facilitating a remote desktop session between a web browser of a client device (see, e.g., 310 in FIG. 3A) and a remote machine (see, e.g., 320) through a transcoding server (see, e.g., 330), utilizing hypertext transfer protocol (HTTP) headers of HTTP for remote desktop session drawing, the method comprising:

receiving, at the transcoding server, drawing requests from the web browser of the client device (see, e.g., item 1602-A in FIG. 16A);

receiving, at the transcoding server, a remote desktop drawing command from the remote machine using a remote desktop display protocol, wherein the remote desktop drawing command is based on an image of a remote desktop of the remote machine (see, e.g., item 1604-A in FIG. 16A);

translating, at the transcoding server, the remote desktop drawing command into a display image and drawing coordinates for the display image (see, e.g., item 1606-A in FIG. 16A);

placing, at the transcoding server, the drawing coordinates into an HTTP response header (see, e.g., item 1608-A in FIG. 16A); and in response to at least one of the drawing requests, facilitating providing the display image and the drawing coordinates together to the web browser in a single HTTP response, for drawing the display image of the remote desktop at the web browser, wherein the single HTTP response comprises the HTTP response header (see, e.g., item 1610-A in FIG. 16A), wherein the remote desktop display protocol is a push protocol, and wherein HTTP is a pull protocol.

2. The method of clause 1, wherein the translating comprises:

translating the remote desktop drawing command into a Java graphics drawing command, wherein the transcoding server comprises a Java compatible web application container;

updating a portion of a Java graphics bitmap of the remote desktop in response to the Java graphics drawing command;

generating coordinates for the updated portion of the Java bitmap from the Java graphics drawing command;

generating the display image compatible with the web browser based on the updated portion of the Java bitmap; and obtaining the drawing coordinates for the display image based on the coordinates for the updated portion of the Java bitmap, wherein the display image and the drawing coordinates are compatible with HTML, wherein the updated portion of the Java graphics bitmap represents a portion of an entire image of the remote desktop of the remote machine, wherein the display image and the drawing coordinates represent the portion of the entire image of the remote desktop of the remote machine.

3. The method of clause 1, wherein the translating comprises:

translating the remote desktop drawing command into a graphics drawing command compatible with the transcoding server;

updating a portion of a bitmap of the remote desktop based on the graphics drawing command;

generating the coordinates for the updated portion of the bitmap;

generating the display image compatible with the web browser based on the updated portion of the bitmap; and obtaining the drawing coordinates for the display image, wherein the display image and the drawing coordinates are compatible with HTML.

4. The method of clause 1, wherein the display image and the drawing coordinates are compatible with HTML5.

5. The method of clause 1, wherein the transcoding server is an intermediary between the remote machine and the client device, and wherein the transcoding server is physically separate from the remote machine.

6. The method of clause 1, wherein the remote desktop drawing command comprises coordinates of a region of the remote desktop that has changed relative to a previous remote desktop drawing command.

7. The method of clause 6, wherein the coordinates specify a redrawing region.

8. The method of clause 1, wherein the drawing coordinates are compatible with JavaScript client code of the web browser, and wherein the display image is compatible with HTML of the web browser.

9. The method of clause 1, wherein the display image comprises a scaled image of the remote desktop.

10. The method of clause 1, wherein the display image comprises an offset image of the remote desktop.

Figure 16B:
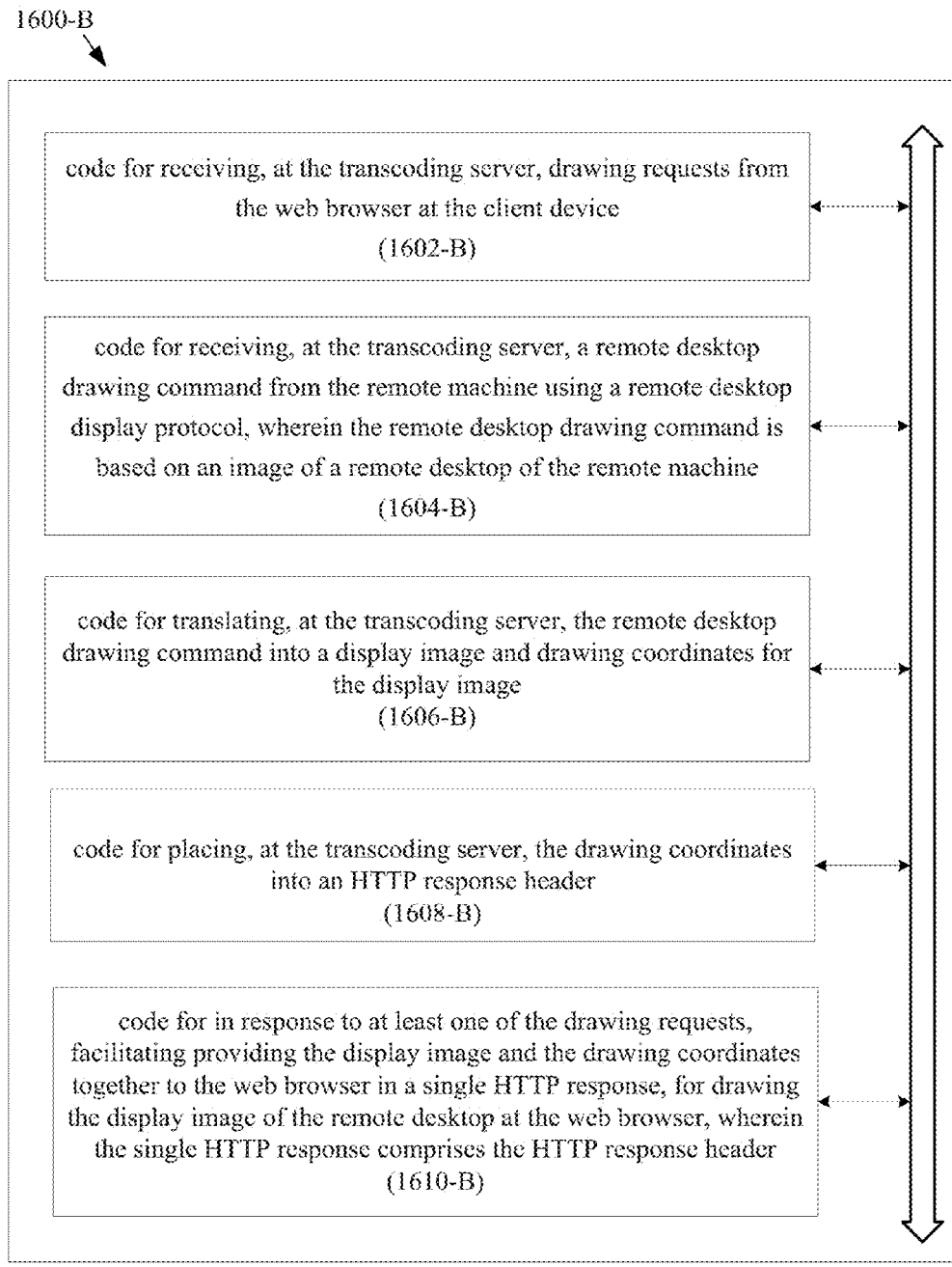
FIG. 16B is a block diagram representing code of an example of a machine-readable storage medium encoded with instructions executable by a processing system to perform a method of facilitating conducting a remote desktop session between a web browser of a client device and a remote machine via a transcoding server in real time and utilizing hypertext markup language that supports a two-dimensional (2D) canvas and dynamic drawing.

11. A machine-readable storage medium (see, e.g., 1210, 1219 in FIG. 12) encoded with instructions executable by a processing system (see, e.g., 1202) to perform a method of facilitating a remote desktop session between a web browser of a client device (see, e.g., 310 in FIG. 3A) and a remote machine (see, e.g., 320) through a transcoding server (see, e.g., 330), utilizing hypertext transfer protocol (HTTP) headers of HTTP for remote desktop session drawing, the instructions comprising code for:

receiving, at the transcoding server, drawing requests from the web browser of the client device (see, e.g., item 1602-B in FIG. 16B);

receiving, at the transcoding server, a remote desktop drawing command from the remote machine using a remote desktop display protocol, wherein the remote desktop drawing command is based on an image of a remote desktop of the remote machine (see, e.g., item 1604-B in FIG. 16B);

translating, at the transcoding server, the remote desktop drawing command into a display image and drawing coordinates for the display image (see, e.g., item 1606-B in FIG. 16B);

placing, at the transcoding server, the drawing coordinates into an HTTP response header (see, e.g., item 1608-B in FIG. 16B); and in response to at least one of the drawing requests, facilitating providing the display image and the drawing coordinates together to the web browser in a single HTTP response, for drawing the display image of the remote desktop at the web browser, wherein the single HTTP response comprises the HTTP response header (see, e.g., item 1610-B in FIG. 16B), wherein the remote desktop display protocol is a push protocol, and wherein HTTP is a pull protocol.

12. The machine-readable storage medium of clause 11, wherein the translating comprises:

translating the remote desktop drawing command into a Java graphics drawing command, wherein the transcoding server comprises a Java compatible web application container;

updating a portion of a Java graphics bitmap of the remote desktop in response to the Java graphics drawing command;

generating coordinates for the updated portion of the Java bitmap from the Java graphics drawing command;

generating the display image compatible with the web browser based on the updated portion of the Java bitmap; and obtaining the drawing coordinates for the display image based on the coordinates for the updated portion of the Java bitmap, wherein the display image and the drawing coordinates are compatible with HTML, wherein the updated portion of the Java graphics bitmap represents a portion of an entire image of the remote desktop of the remote machine, wherein the display image and the drawing coordinates represent the portion of the entire image of the remote desktop of the remote machine.

13. The machine-readable storage medium of clause 11, wherein the translating comprises:

translating the remote desktop drawing command into a graphics drawing command compatible with the transcoding server;

updating a portion of a bitmap of the remote desktop based on the graphics drawing command;

generating the coordinates for the updated portion of the bitmap;

generating the display image compatible with the web browser based on the updated portion of the bitmap; and obtaining the drawing coordinates for the display image, wherein the display image and the drawing coordinates are compatible with HTML.

14. The machine-readable storage medium of clause 11, wherein the display image and the drawing coordinates are compatible with HTML5.

15. The machine-readable storage medium of clause 11, wherein the transcoding server is an intermediary between the remote machine and the client device, and wherein the transcoding server is physically separate from the remote machine.

16. The machine-readable storage medium of clause 11, wherein the remote desktop drawing command comprises coordinates of a region of the remote desktop that has changed relative to a previous remote desktop drawing command.

17. The machine-readable storage medium of clause 16, wherein the coordinates specify a redrawing region.

18. The machine-readable storage medium of clause 11, wherein the drawing coordinates are compatible with JavaScript client code of the web browser, and wherein the display image is compatible with HTML of the web browser.

19. The machine-readable storage medium of clause 11, wherein the display image comprises a scaled image of the remote desktop.

20. The machine-readable storage medium of clause 11, wherein the display image comprises an offset image of the remote desktop.

21. A computing machine comprising the machine-readable storage medium of clause 11, wherein the computing machine is the transcoding server.

Figure 16C:
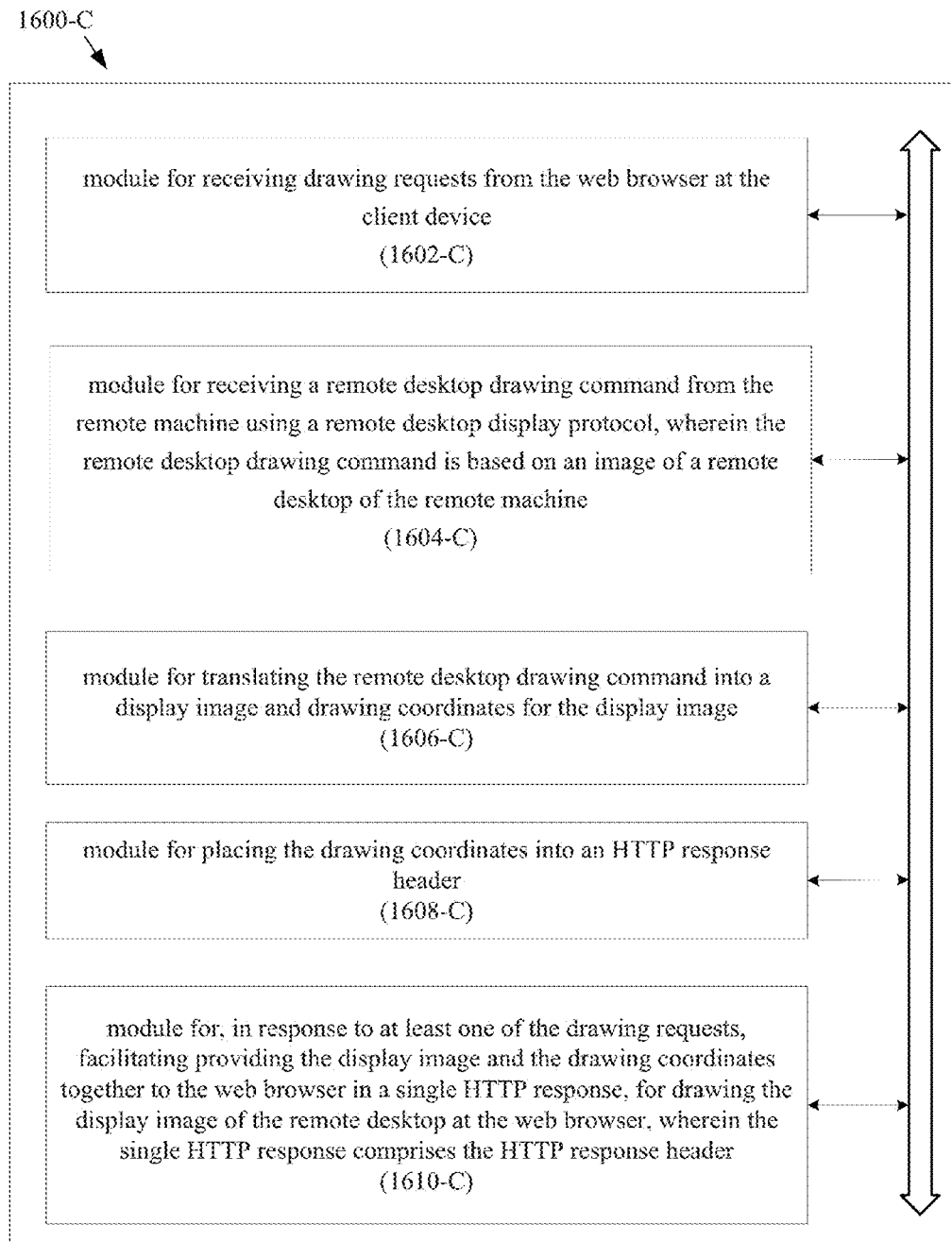
FIG. 16C is a block diagram of module of an example of an apparatus for facilitating conducting a remote desktop session between a web browser of a client device and a remote machine via a transcoding server in real time and utilizing hypertext markup language that supports a two-dimensional (2D) canvas and dynamic drawing.

22. An apparatus (see, e.g., item 1600-C in FIG. 16C) for facilitating a remote desktop session between a web browser of a client device (see, e.g., 310 in FIG. 3A) and a remote machine (see, e.g., 320) through a transcoding server (see, e.g., 330), utilizing hypertext transfer protocol (HTTP) headers of HTTP for remote desktop session drawing, the apparatus comprising:

means for receiving drawing requests from the web browser of the client device (see, e.g., item 1602-C in FIG. 16C);

means for receiving a remote desktop drawing command from the remote machine using a remote desktop display protocol, wherein the remote desktop drawing command is based on an image of a remote desktop of the remote machine (see, e.g., item 1604-C in FIG. 16C);

means for translating the remote desktop drawing command into a display image and drawing coordinates for the display image (see, e.g., item 1606-C in FIG. 16C);

means for placing the drawing coordinates into an HTTP response header (see, e.g., item 1608-C in FIG. 16C); and means for, in response to at least one of the drawing requests, facilitating providing the display image and the drawing coordinates together to the web browser in a single HTTP response, for drawing the display image of the remote desktop at the web browser, wherein the single HTTP response comprises the HTTP response header (see, e.g., item 1610-C in FIG. 16C), wherein the remote desktop display protocol is a push protocol, and wherein HTTP is a pull protocol.

23. The apparatus of clause 22, wherein the means for translating comprises:

means for translating the remote desktop drawing command into a Java graphics drawing command, wherein the transcoding server comprises a Java compatible web application container;

means for updating a portion of a Java graphics bitmap of the remote desktop in response to the Java graphics drawing command;

means for generating coordinates for the updated portion of the Java bitmap from the Java graphics drawing command;

means for generating the display image compatible with the web browser based on the updated portion of the Java bitmap; and means for obtaining the drawing coordinates for the display image based on the coordinates for the updated portion of the Java bitmap, wherein the display image and the drawing coordinates are compatible with HTML, wherein the updated portion of the Java graphics bitmap represents a portion of an entire image of the remote desktop of the remote machine, wherein the display image and the drawing coordinates represent the portion of the entire image of the remote desktop of the remote machine.

24. The apparatus of clause 22, wherein the means for translating comprises:

means for translating the remote desktop drawing command into a graphics drawing command compatible with the transcoding server;

means for updating a portion of a bitmap of the remote desktop based on the graphics drawing command;

means for generating the coordinates for the updated portion of the bitmap;

means for generating the display image compatible with the web browser based on the updated portion of the bitmap; and means for obtaining the drawing coordinates for the display image, wherein the display image and the drawing coordinates are compatible with HTML.

25. The apparatus of clause 22, wherein the display image and the drawing coordinates are compatible with HTML5.

26. The apparatus of clause 22, wherein the transcoding server is an intermediary between the remote machine and the client device, and wherein the transcoding server is physically separate from the remote machine.

27. The apparatus of clause 22, wherein the remote desktop drawing command comprises coordinates of a region of the remote desktop that has changed relative to a previous remote desktop drawing command.

28. The apparatus of clause 27, wherein the coordinates specify a redrawing region.

29. The apparatus of clause 22, wherein the drawing coordinates are compatible with JavaScript client code of the web browser, and wherein the display image is compatible with HTML of the web browser.

30. The apparatus of clause 22, wherein the display image comprises a scaled image of the remote desktop.

31. The apparatus of clause 22, wherein the display image comprises an offset image of the remote desktop.

32. The apparatus of clause 22, wherein the apparatus comprises the transcoding server.

33. The apparatus of clause 22, wherein the apparatus comprises a processing system and a memory.

Illustration of Method/Apparatus/Machine Readable Storage Medium for facilitating a remote desktop session between a web browser of a client device and a remote machine through a transcoding server, utilizing long polling to reduce traffic to the client device (described as Clauses).

The subject technology is illustrated, for example, according to various aspects described below. Various examples of aspects of the subject technology are described as numbered clauses (1, 2, 3, etc.) for convenience. These are provided as examples, and do not limit the subject technology. It is noted that any of the dependent clauses may be combined in any combination, and placed into a respective independent clause, e.g., clauses 1, 11, and 22. Clause 1 below is presented, for example, with reference to FIGS. 17A-17C. The other clauses can be presented in a similar manner.

1. A method (see, e.g., 1700-A of FIG. 17A) of facilitating a remote desktop session between a web browser (see, e.g., 500 of FIG. 5) of a client device (see, e.g., 310 of FIG. 3A) and a remote machine (see, e.g., 320 of FIG. 3A) through a transcoding server (see, e.g., 330 of FIG. 3A), utilizing long polling to reduce traffic to the client device, the method comprising:

receiving, at the transcoding server, a plurality of drawing requests from the web browser of the client device, using HTTP, wherein HTTP is a pull protocol (see, e.g., item 1702-A in FIG. 17A);

handling, at the transcoding server, the plurality of drawing requests as long polling requests (see, e.g., item 1704-A in FIG. 17A);

receiving, at the transcoding server, a remote desktop drawing command from the remote machine (see, e.g., item 1706-A in FIG. 17A);

translating, at the transcoding server, the remote desktop drawing command into a web browser drawing update, wherein the remote desktop drawing command is compatible with a push protocol, wherein the web browser drawing update is compatible with HTTP, wherein HTTP is a pull protocol (see, e.g., item 1708-A in FIG. 17A); and facilitating providing the web browser drawing update from the transcoding server to the web browser of the client device, utilizing HTTP, as a response to at least one of the plurality of drawing requests from the web browser (see, e.g., item 1710-A in FIG. 17A).

2. The method of clause 1, wherein the handling comprises:

determining whether a drawing command is pending at the transcoding server for the web browser;

if there is no pending drawing command, then storing the plurality of drawing requests in a drawing requests queue as long poling requests; and if there is a pending drawing command, then providing at least one of the plurality of drawing requests to an HTTP handler in the transcoding server to allow the HTTP handler to serve the pending drawing command in response to the at least one of the plurality of drawing requests.

3. The method of clause 1, wherein the remote desktop drawing command represents a portion of an entire image of a remote desktop of the remote machine, wherein the translating comprises:
  translating the remote desktop drawing command into a Java graphics drawing command;
  updating a portion of a Java bitmap of the entire image of the remote desktop in response to the Java graphics drawing command;
  generating coordinates of the updated portion of the Java bitmap based on the Java graphics drawing command;
  generating an image file based on the updated portion of the Java bitmap, wherein the image file is compatible with the web browser; and
  obtaining drawing coordinates for the image file based on the coordinates of the updated portion of the Java bitmap,
wherein the web browser drawing update comprises the image file and the drawing coordinates.

4. The method of clause 3, wherein the handling comprises:

determining whether a drawing command is pending at the transcoding server for the web browser;

if there is no pending drawing command, then storing the plurality of drawing requests in a drawing requests queue as long poling requests; and if there is a pending drawing command, then providing at least one of the plurality of drawing requests to an HTTP handler in the transcoding server to allow the HTTP handler to serve the pending drawing command in response to the at least one of the plurality of drawing requests.

5. The method of clause 4, wherein the facilitating providing comprises:

placing, at the HTTP handler, the drawing coordinates into an HTTP header of a single HTTP transmission response to the web browser; and including, at the HTTP handler, the image file into the single HTTP transmission response to the web browser to facilitate providing the image file and the drawing coordinates together to the web browser in the single HTTP transmission response.

6. The method of clause 5, comprising:

when a drawing commands queue has new coordinates, sending a notification to the drawing requests queue to allow at least one of the plurality of drawing requests in the drawing requests queue to be forwarded to the HTTP handler.

7. The method of clause 1, comprising:

receiving a new drawing request from the web browser, in response to facilitating providing the web browser drawing update from the transcoding server to the web browser of the client device as a response to the at least one of the plurality of drawing requests from the web browser.

8. The method of clause 1, comprising:

receiving a request from the web browser to connect to the remote machine; and facilitating providing a JavaScript client code to the web browser in response to the request to connect to the remote machine, wherein the receiving the plurality of drawing requests comprises receiving the plurality of drawing requests from the JavaScript client code, wherein the facilitating providing the web browser drawing update comprises facilitating providing the web browser drawing update to the JavaScript client code.

9. The method of clause 8, comprising: facilitating deleting the JavaScript client code from the web browser when the remote desktop session is terminated.

10. The method of clause 1, comprising:

receiving, at the transcoding server, a user input request from the web browser for accessing or controlling a remote desktop of the remote machine, translating, at the transcoding server, the user input request into an input command compatible with the push protocol;

facilitating providing the input command to the remote machine utilizing the push protocol, wherein the receiving the remote desktop drawing command comprises receiving the remote desktop drawing command in response to the input command.

Figure 17B:
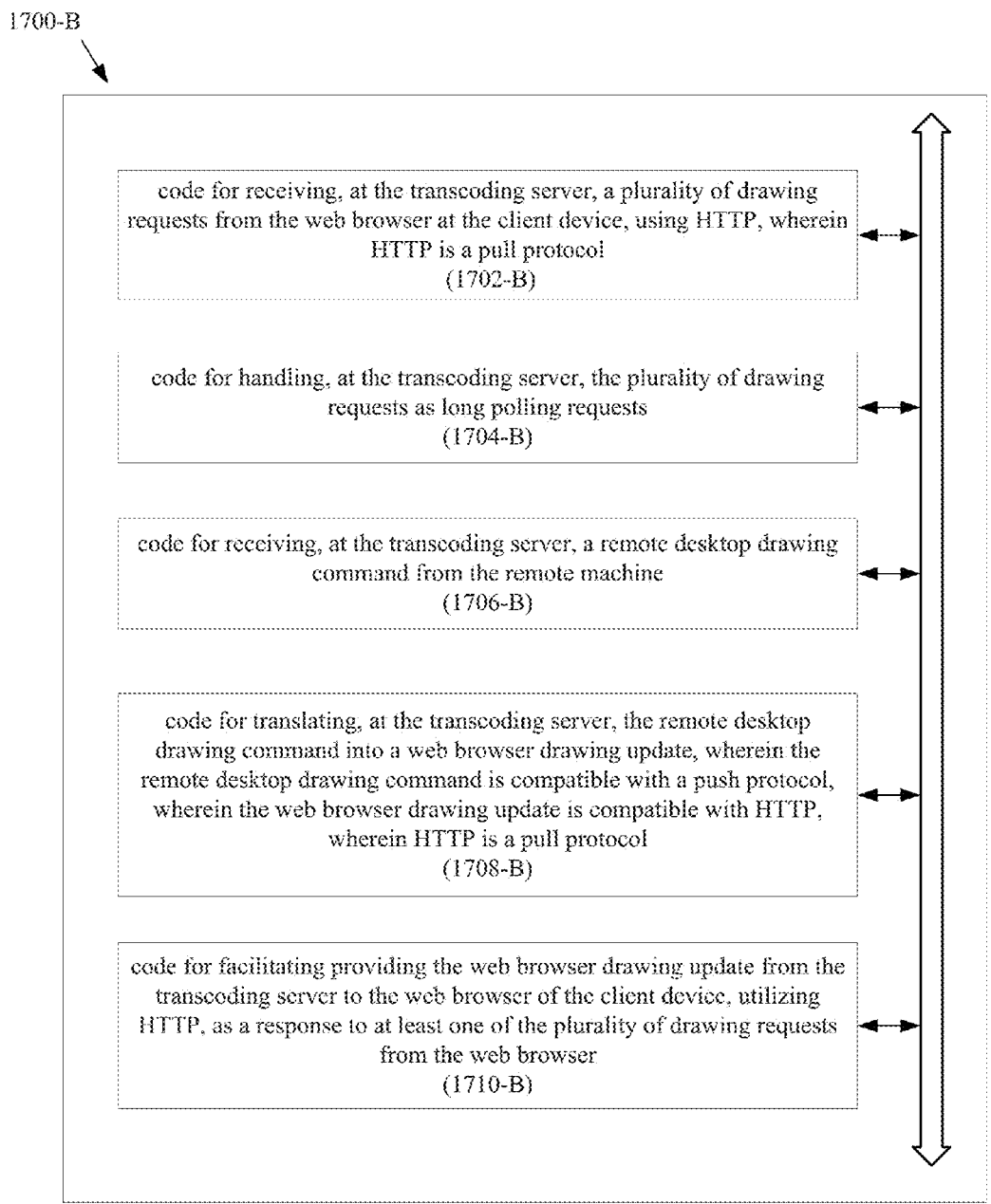
FIG. 17B is a block diagram representing code of an example of a machine-readable storage medium encoded with instructions executable by a processing system to perform a method of facilitating a remote desktop session between a web browser of a client device and a remote machine through a transcoding server, utilizing hypertext transfer protocol (HTTP) headers of HTTP for remote desktop session drawing.
Figure 17C:
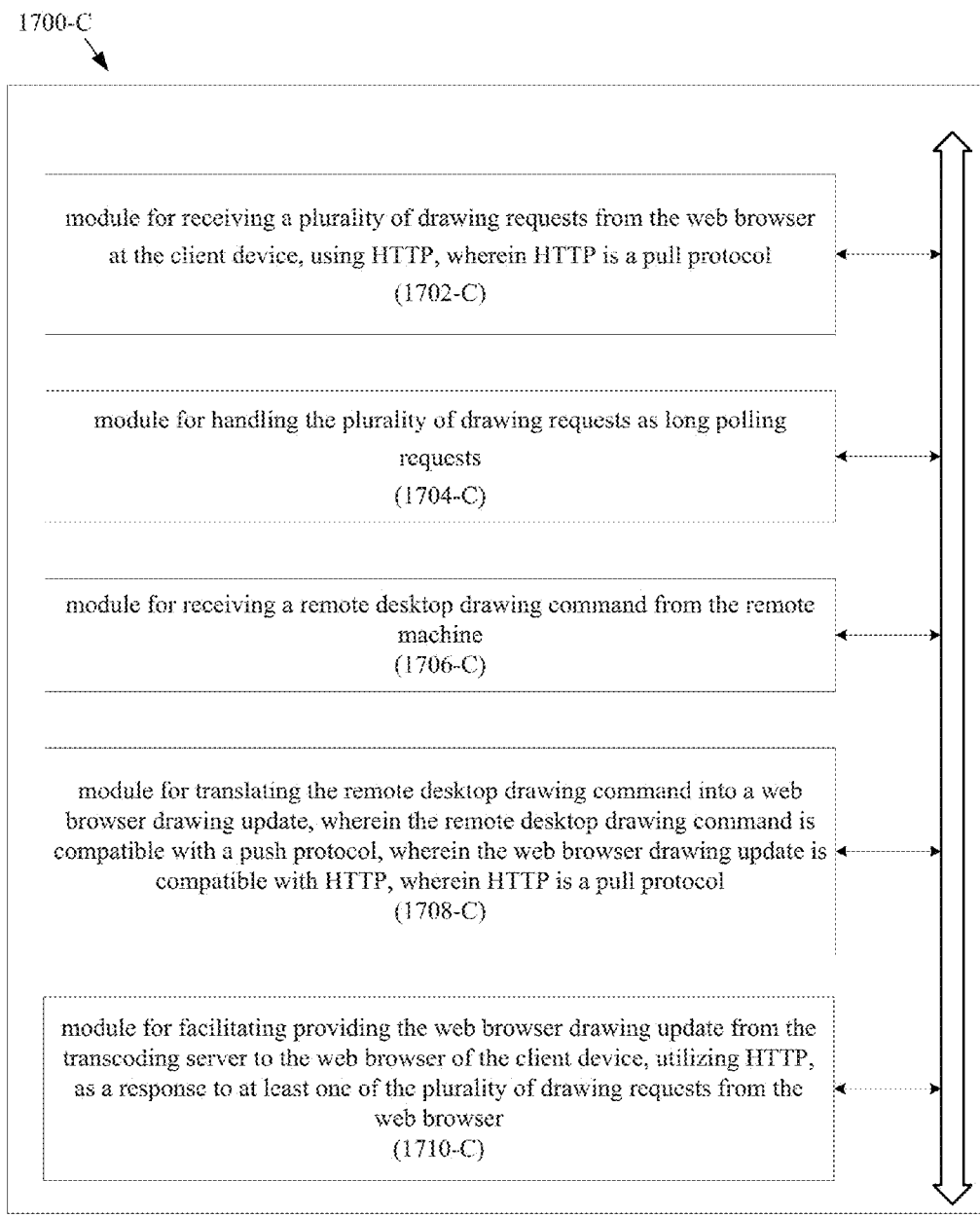
FIG. 17C is a block diagram of module of an example of an apparatus for facilitating a remote desktop session between a web browser of a client device and a remote machine through a transcoding server, utilizing hypertext transfer protocol (HTTP) headers of HTTP for remote desktop session drawing.

11. A machine-readable storage medium (see, e.g., item 1700-B in FIG. 17B) encoded with instructions executable by a processing system to perform a method of facilitating a remote desktop session between a web browser (see, e.g., 500 of FIG. 5) of a client device (see, e.g., 310 of FIG. 3A) and a remote machine (see, e.g., 320 of FIG. 3B) through a transcoding server (see, e.g., 330 of FIG. 3B), utilizing long polling to reduce traffic to the client device, the instructions comprising code for:

receiving, at the transcoding server, a plurality of drawing requests from the web browser of the client device, using HTTP, wherein HTTP is a pull protocol (see, e.g., item 1702-B in FIG. 17B);

handling, at the transcoding server, the plurality of drawing requests as long polling requests (see, e.g., item 1704-B in FIG. 17B);

receiving, at the transcoding server, a remote desktop drawing command from the remote machine (see, e.g., item 1706-B in FIG. 17B);

translating, at the transcoding server, the remote desktop drawing command into a web browser drawing update, wherein the remote desktop drawing command is compatible with a push protocol, wherein the web browser drawing update is compatible with HTTP, wherein HTTP is a pull protocol (see, e.g., item 1708-B in FIG. 17B); and facilitating providing the web browser drawing update from the transcoding server to the web browser of the client device, utilizing HTTP, as a response to at least one of the plurality of drawing requests from the web browser (see, e.g., item 1710-B in FIG. 17B).

12. The machine-readable storage medium of clause 11, wherein the handling comprises:
   determining whether a drawing command is pending at the transcoding server for the web browser;
   if there is no pending drawing command, then storing the plurality of drawing requests in a drawing requests queue as long poling requests; and
   if there is a pending drawing command, then providing at least one of the plurality of drawing requests to an HTTP handler in the transcoding server to allow the HTTP handler to serve the pending drawing command in response to the at least one of the plurality of drawing requests.

13. The machine-readable storage medium of clause 11, wherein the remote desktop drawing command represents a portion of an entire image of a remote desktop of the remote machine,
   wherein the translating comprises:
      translating the remote desktop drawing command into a Java graphics drawing command;
      updating a portion of a Java bitmap of the entire image of the remote desktop in response to the Java graphics drawing command;
      generating coordinates of the updated portion of the Java bitmap based on the Java graphics drawing command;
      generating an image file based on the updated portion of the Java bitmap, wherein the image file is compatible with the web browser; and
      obtaining drawing coordinates for the image file based on the coordinates of the updated portion of the Java bitmap,
   wherein the web browser drawing update comprises the image file and the drawing coordinates.

14. The machine-readable storage medium of clause 13, wherein the handling comprises:
   determining whether a drawing command is pending at the transcoding server for the web browser;
   if there is no pending drawing command, then storing the plurality of drawing requests in a drawing requests queue as long poling requests; and
   if there is a pending drawing command, then providing at least one of the plurality of drawing requests to an HTTP handler in the transcoding server to allow the HTTP handler to serve the pending drawing command in response to the at least one of the plurality of drawing requests.

15. The machine-readable storage medium of clause 14, wherein the facilitating providing comprises:
   placing, at the HTTP handler, the drawing coordinates into an HTTP header of a single HTTP transmission response to the web browser; and
   including, at the HTTP handler, the image file into the single HTTP transmission response to the web browser to facilitate providing the image file and the drawing coordinates together to the web browser in the single HTTP transmission response.

16. The machine-readable storage medium of clause 15, comprising code for:
   when a drawing commands queue has new coordinates, sending a notification to the drawing requests queue to allow at least one of the plurality of drawing requests in the drawing requests queue to be forwarded to the HTTP handler.

17. The machine-readable storage medium of clause 11, comprising code for:
   receiving a new drawing request from the web browser, in response to facilitating providing the web browser drawing update from the transcoding server to the web browser of the client device as a response to the at least one of the plurality of drawing requests from the web browser.

18. The machine-readable storage medium of clause 11, comprising code for:
   receiving a request from the web browser to connect to the remote machine; and
   facilitating providing a JavaScript client code to the web browser in response to the request to connect to the remote machine,
   wherein the receiving the plurality of drawing requests comprises receiving the plurality of drawing requests from the JavaScript client code,
   wherein the facilitating providing the web browser drawing update comprises facilitating providing the web browser drawing update to the JavaScript client code.

19. The machine-readable storage medium of clause 18, comprising code for: facilitating deleting the JavaScript client code from the web browser when the remote desktop session is terminated.

20. The machine-readable storage medium of clause 11, comprising code for:
   receiving, at the transcoding server, a user input request from the web browser for accessing or controlling a remote desktop of the remote machine,
   translating, at the transcoding server, the user input request into an input command compatible with the push protocol;
   facilitating providing the input command to the remote machine utilizing the push protocol,
   wherein the receiving the remote desktop drawing command comprises receiving the remote desktop drawing command in response to the input command.

21. A computing machine comprising the machine-readable storage medium of clause 11, wherein the computing machine is the transcoding server.

22. An apparatus (see, e.g., item 1700-C in FIG. 17C) for facilitating a remote desktop session between a web browser (see, e.g., 500 of FIG. 5) of a client device (see, e.g., 310 in FIG. 3A) and a remote machine (see, e.g., 330 in FIG. 3A) through a transcoding server (see, e.g., 330 in FIG. 3A), utilizing long polling to reduce traffic to the client device, the apparatus comprising:
   means for receiving a plurality of drawing requests from the web browser of the client device, using HTTP, wherein HTTP is a pull protocol (see, e.g., item 1702-C in FIG. 17C);
   means for handling the plurality of drawing requests as long polling requests (see, e.g., item 1704-C in FIG. 17C);
   means for receiving a remote desktop drawing command from the remote machine (see, e.g., item 1706-C in FIG. 17C);
   means for translating the remote desktop drawing command into a web browser drawing update, wherein the remote desktop drawing command is compatible with a push protocol, wherein the web browser drawing update is compatible with HTTP, wherein HTTP is a pull protocol (see, e.g., item 1708-C in FIG. 17C); and
   means for facilitating providing the web browser drawing update from the transcoding server to the web browser of the client device, utilizing HTTP, as a response to at least one of the plurality of drawing requests from the web browser (see, e.g., item 1710-C in FIG. 17C).

23. The apparatus of clause 22, wherein the means for handling comprises:
   means for determining whether a drawing command is pending at the transcoding server for the web browser;

means for storing the plurality of drawing requests in a drawing requests queue as long poling requests if there is no pending drawing command; and means for providing at least one of the plurality of drawing requests to an HTTP handler in the transcoding server, if there is a pending drawing command, to allow the HTTP handler to serve the pending drawing command in response to the at least one of the plurality of drawing requests.

24. The apparatus of clause 22, wherein the remote desktop drawing command represents a portion of an entire image of a remote desktop of the remote machine, wherein the means for translating comprises:

means for translating the remote desktop drawing command into a Java graphics drawing command;

means for updating a portion of a Java bitmap of the entire image of the remote desktop in response to the Java graphics drawing command;

means for generating coordinates of the updated portion of the Java bitmap based on the Java graphics drawing command;

means for generating an image file based on the updated portion of the Java bitmap, wherein the image file is compatible with the web browser; and means for obtaining drawing coordinates for the image file based on the coordinates of the updated portion of the Java bitmap, wherein the web browser drawing update comprises the image file and the drawing coordinates.

25. The apparatus of clause 22, wherein the means for handling comprises:

means for determining whether a drawing command is pending at the transcoding server for the web browser;

means for storing the plurality of drawing requests in a drawing requests queue as long poling requests if there is no pending drawing command; and means for providing at least one of the plurality of drawing requests to an HTTP handler in the transcoding server, if there is a pending drawing command, to allow the HTTP handler to serve the pending drawing command in response to the at least one of the plurality of drawing requests.

26. The apparatus of clause 22, wherein the means for facilitating providing comprises:

means for placing, at the HTTP handler, the drawing coordinates into an HTTP header of a single HTTP transmission response to the web browser; and means for including, at the HTTP handler, the image file into the single HTTP transmission response to the web browser to facilitate providing the image file and the drawing coordinates together to the web browser in the single HTTP transmission response.

27. The apparatus of clause 22, comprising:

means for sending a notification to the drawing requests queue, when a drawing commands queue has new coordinates, to allow at least one of the plurality of drawing requests in the drawing requests queue to be forwarded to the HTTP handler.

28. The apparatus of clause 22, comprising:

means for receiving a new drawing request from the web browser, in response to facilitating providing the web browser drawing update from the transcoding server to the web browser of the client device as a response to the at least one of the plurality of drawing requests from the web browser.

29. The apparatus of clause 22, comprising:

means for receiving a request from the web browser to connect to the remote machine; and means for facilitating providing a JavaScript client code to the web browser in response to the request to connect to the remote machine, wherein the means for receiving the plurality of drawing requests comprises means for receiving the plurality of drawing requests from the JavaScript client code, wherein the means for facilitating providing the web browser drawing update comprises means for facilitating providing the web browser drawing update to the JavaScript client code.

30. The apparatus of clause 29, comprising: means for facilitating deleting the JavaScript client code from the web browser when the remote desktop session is terminated.

31. The apparatus of clause 22, comprising:

means for receiving a user input request from the web browser for accessing or controlling a remote desktop of the remote machine, means for translating the user input request into an input command compatible with the push protocol;

means for facilitating providing the input command to the remote machine utilizing the push protocol, wherein the means for receiving the remote desktop drawing command comprises means for receiving the remote desktop drawing command in response to the input command.

32. The apparatus of clause 22, wherein the apparatus comprises the transcoding server.

33. The apparatus of clause 22, wherein the apparatus comprises a processing system and a memory.

Illustration of Method/Apparatus/Machine Readable Storage Medium for facilitating a remote desktop session between a web browser of a client device and a remote desktop server at a remote machine through a transcoding server, utilizing an adapter at the transcoding server (described as Clauses).

The subject technology is illustrated, for example, according to various aspects described below. Various examples of aspects of the subject technology are described as numbered clauses (1, 2, 3, etc.) for convenience. These are provided as examples, and do not limit the subject technology. It is noted that any of the dependent clauses may be combined in any combination, and placed into a respective independent clause, e.g., clauses 1, 10, and 20. Clause 1 below is presented, for example, with reference to FIGS. 18A-18C. The other clauses can be presented in a similar manner.

1. A method (see, e.g., item 1800-A in FIG. 18A) for facilitating a remote desktop session between a web browser of a client device (see, e.g., 310 in FIG. 3A) and a remote desktop server at a remote machine (see, e.g., 320) through a transcoding server (see, e.g., 330), utilizing an adapter (see, e.g., 600 in FIG. 6) at the transcoding server, the method comprising:

receiving, at the adapter, an input request from the web browser utilizing a request-response protocol, wherein the request-response protocol is a pull protocol (see, e.g., item 1802-A in FIG. 18A);

translating, at the adapter, the input request into an input command compatible with a remote desktop display protocol to be utilized by a remote desktop client at the transcoding server for facilitating communication with the remote desktop server at the remote machine, wherein the remote desktop display protocol is a push protocol (see, e.g., item 1804-A in FIG. 18A);

providing the input command to a remote desktop client at the transcoding server, to facilitate providing the input command to the remote desktop server utilizing the remote desktop display protocol (see, e.g., item 1806-A in FIG. 18A);

receiving, at the adapter, a remote desktop drawing command from the remote desktop server in response to the input command, wherein the remote desktop drawing command is based on an image of a remote desktop of the remote machine (see, e.g., item 1808-A in FIG. 18A); and translating, at the adapter, the remote desktop drawing command into a graphics drawing command compatible with the transcoding server to allow the transcoding server to facilitate providing a web browser drawing update to the web browser, wherein the web browser drawing update is compatible with the web browser (see, e.g., item 1810-A in FIG. 18A).

2. The method of clause 1, wherein the request-response protocol comprises hypertext transfer protocol (HTTP), wherein the graphics drawing command is a Java graphics drawing command, wherein the transcoding server is a Java transcoding server, wherein the web browser is HTML5 compatible.

3. The method of clause 1, wherein the receiving the input request comprises receiving the input request from the web browser via an HTTP handler of a web application container at the transcoding server, wherein the receiving the remote desktop drawing command comprises receiving the remote desktop drawing command via the remote desktop client using the remote desktop display protocol.

4. The method of clause 1, wherein the remote desktop drawing command comprises remote desktop drawing command parameters and bitmap data received from the remote desktop server, wherein the translating the remote desktop drawing command comprises one or more of: calculating new drawing command parameters based on the remote desktop drawing command parameters; adjusting the remote desktop drawing command parameters; and making adjustments to the bitmap data.

5. The method of clause 1, comprising:

generating an image based on the graphics drawing command; and generating coordinates for the image based on the graphics drawing command, wherein the image represents a portion of an entire image of the remote desktop.

6. The method of clause 1, comprising:

executing the graphics drawing command to generate and draw an image into a drawing commands queue at the transcoding server that is accessible by a web application container at the transcoding server for communicating with the web browser;

generating coordinates for the image based on the graphics drawing command;

storing the coordinates in the drawing commands queue; and after generating the coordinates, transmitting a notification to the web application container that a drawing command is ready to be served to the web browser, wherein the graphics drawing command represents a portion of an entire image of the remote desktop.

7. The method of clause 1, comprising:

receiving, via an HTTP handler of the transcoding server, a connection request from the web browser; and facilitating establishing, controlling or terminating the remote desktop session between the remote desktop client and the remote desktop server in response to the connection request, wherein the facilitating of the establishing, controlling or terminating comprises:

generating a session control command based on the connection request, wherein the session control command is compatible with the remote desktop display protocol; and facilitating transmitting the session control command to the remote desktop server via the remote desktop client using the remote desktop display protocol.

8. The method of clause 7, wherein the session control command comprises at least one of: a command for starting the remote desktop session, a command for stopping the remote desktop session, a credential, a setting, a preference, and a command for passing at least one of a credential, a setting, and a preference.

9. The method of clause 1, comprising:

extracting coordinates from the graphics drawing command; and updating at least a portion of an off-screen bitmap based on the graphics drawing command, wherein the at least a portion of the off-screen bitmap is associated with the coordinates, wherein the off-screen bitmap represents an entire image of the remote desktop.

Figure 18B:
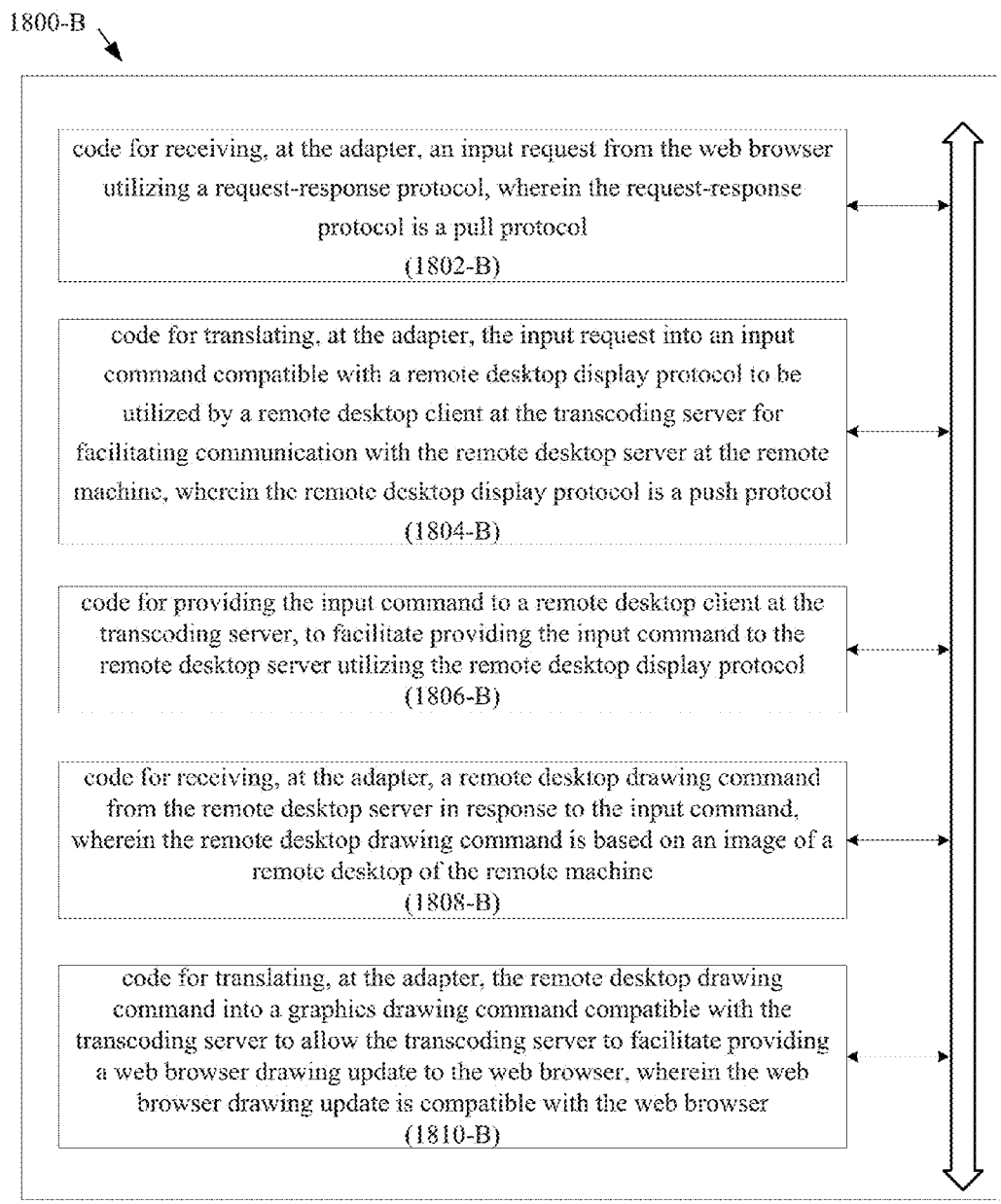
FIG. 18B is a block diagram representing code of an example of a machine-readable storage medium encoded with instructions executable by a processing system to perform a method of facilitating a remote desktop session between a web browser of a client device and a remote desktop server at a remote machine through a transcoding server, utilizing an adapter at the transcoding server.

10. A machine-readable storage medium (see, e.g., 1210, 1219 in FIG. 12) encoded with instructions executable by a processing system (see, e.g., 1202) to perform a method for facilitating a remote desktop session between a web browser of a client device (see, e.g., 310 in FIG. 3A) and a remote desktop server at a remote machine (see, e.g., 320) through a transcoding server (see, e.g., 330), utilizing an adapter (see, e.g., 600 in FIG. 6) at the transcoding server, the instructions comprising code for:

receiving, at the adapter, an input request from the web browser utilizing a request-response protocol, wherein the request-response protocol is a pull protocol (see, e.g., item 1802-B in FIG. 18B);

translating, at the adapter, the input request into an input command compatible with a remote desktop display protocol to be utilized by a remote desktop client at the transcoding server for facilitating communication with the remote desktop server at the remote machine, wherein the remote desktop display protocol is a push protocol (see, e.g., item 1804-B in FIG. 18B);

providing the input command to a remote desktop client at the transcoding server, to facilitate providing the input command to the remote desktop server utilizing the remote desktop display protocol (see, e.g., item 1806-B in FIG. 18B);

receiving, at the adapter, a remote desktop drawing command from the remote desktop server in response to the input command, wherein the remote desktop drawing command is based on an image of a remote desktop of the remote machine (see, e.g., item 1808-B in FIG. 18B); and translating, at the adapter, the remote desktop drawing command into a graphics drawing command compatible with the transcoding server to allow the transcoding server to facilitate providing a web browser drawing update to the web browser, wherein the web browser drawing update is compatible with the web browser (see, e.g., item 1810-B in FIG. 18B).

11. The machine-readable storage medium of clause 10, wherein the request-response protocol comprises hypertext transfer protocol (HTTP), wherein the graphics drawing command is a Java graphics drawing command, wherein the transcoding server is a Java transcoding server, wherein the web browser is HTML5 compatible.

12. The machine-readable storage medium of clause 10, wherein the receiving the input request comprises receiving the input request from the web browser via an HTTP handler of an application container at the transcoding server, wherein the receiving the remote desktop drawing command comprises receiving the remote desktop drawing command via the remote desktop client using the remote desktop display protocol.

13. The machine-readable storage medium of clause 10, wherein the remote desktop drawing command comprises remote desktop drawing command parameters and bitmap data received from the remote desktop server, wherein the translating the remote desktop drawing command comprises one or more of: calculating new drawing command parameters based on the remote desktop drawing command parameters; adjusting the remote desktop drawing command parameters; and making adjustments to the bitmap data.

14. The machine-readable storage medium of clause 10, wherein the instructions comprise code for:

generating an image based on the graphics drawing command; and generating coordinates for the image based on the graphics drawing command, wherein the image represents a portion of an entire image of the remote desktop.

15. The machine-readable storage medium of clause 10, wherein the instructions comprise code for:

executing the graphics drawing command to generate and draw an image into a drawing commands queue at the transcoding server that is accessible by a web application container at the transcoding server for communicating with the web browser;

generating coordinates for image based on the graphics drawing command;

storing the coordinates in the drawing commands queue; and after generating the coordinates, transmitting a notification to the web application container that a drawing command is ready to be served to the web browser, wherein the graphics drawing command represents a portion of an entire image of the remote desktop.

16. The machine-readable storage medium of clause 10, wherein the instructions comprise code for:

receiving, via an HTTP handler of the transcoding server, a connection request from the web browser; and facilitating establishing, controlling or terminating the remote desktop session between the remote desktop client and the remote desktop server in response to the connection request, wherein the facilitating of the establishing, controlling or terminating comprises:

generating a session control command based on the connection request, wherein the session control command is compatible with the remote desktop display protocol; and facilitating transmitting the session control command to the remote desktop server via the remote desktop client using the remote desktop display protocol.

17. The machine-readable storage medium of clause 16, wherein the session control command comprises at least one of: a command for starting the remote desktop session, a command for stopping the remote desktop session, a credential, a setting, a preference, and a command for passing at least one of a credential, a setting, and a preference.

18. The machine-readable storage medium of clause 10, wherein the instructions comprise code for:

extracting coordinates from the graphics drawing command; and updating at least a portion of an off-screen bitmap based on the graphics drawing command, wherein the at least a portion of the off-screen bitmap is associated with the coordinates, wherein the off-screen bitmap represents an entire image of the remote desktop.

19. A computing machine comprising the machine-readable storage medium of clause 10, wherein the computing machine is the transcoding server.

Figure 18C:
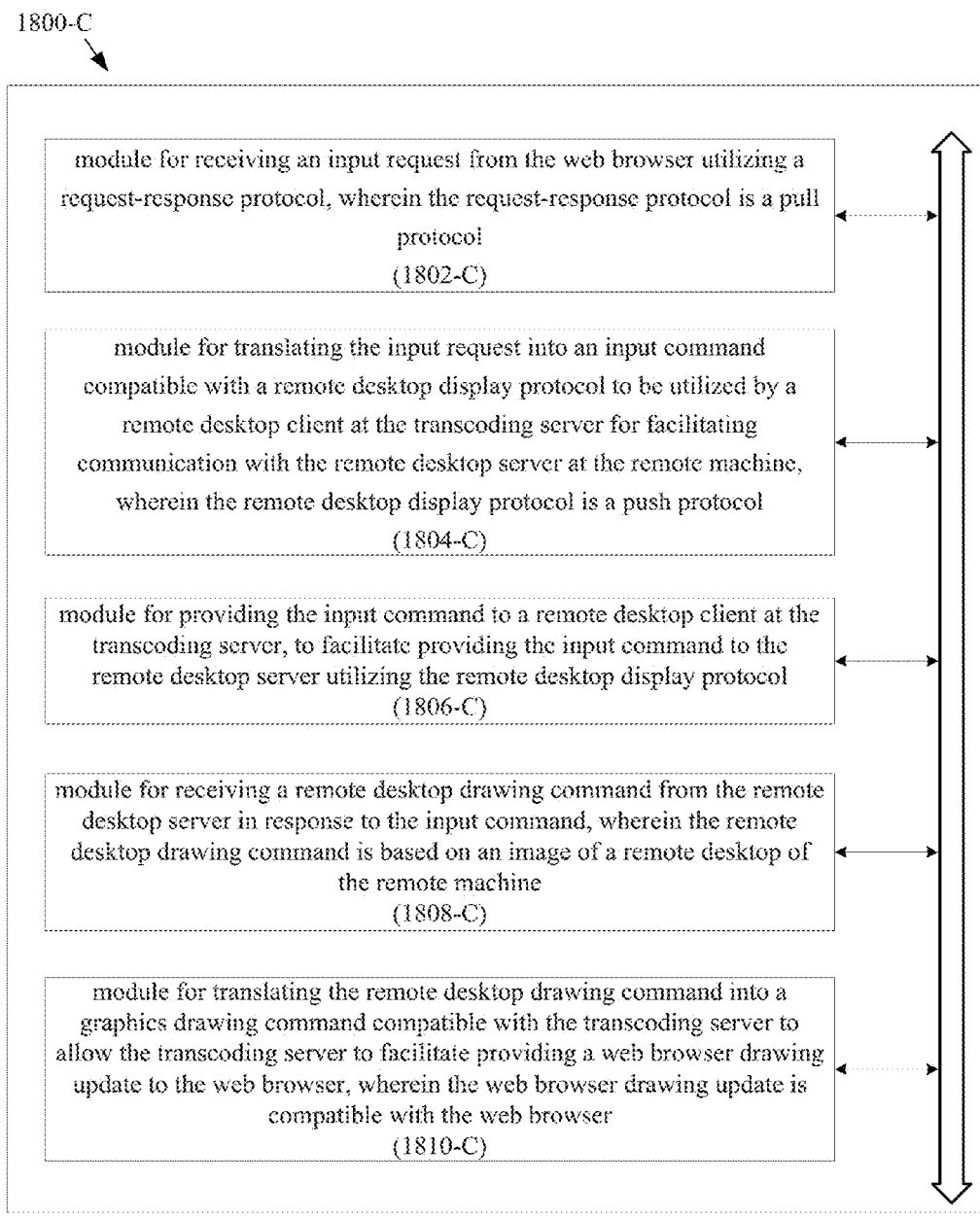
FIG. 18C is a block diagram of module of an example of an apparatus for facilitating a remote desktop session between a web browser of a client device and a remote desktop server at a remote machine through a transcoding server, utilizing an adapter at the transcoding server.

20. An apparatus (see, e.g., item 1800-C in FIG. 18C) for facilitating a remote desktop session between a web browser of a client device (see, e.g., 310 in FIG. 3A) and a remote desktop server at a remote machine (see, e.g., 320) through a transcoding server (see, e.g., 330), utilizing an adapter (see, e.g., 600 in FIG. 6) at the transcoding server, the apparatus comprising:

means for receiving an input request from the web browser utilizing a request-response protocol, wherein the request-response protocol is a pull protocol (see, e.g., item 1802-C in FIG. 18C);

means for translating the input request into an input command compatible with a remote desktop display protocol to be utilized by a remote desktop client at the transcoding server for facilitating communication with the remote desktop server at the remote machine, wherein the remote desktop display protocol is a push protocol (see, e.g., item 1804-C in FIG. 18C);

means for providing the input command to a remote desktop client at the transcoding server, to facilitate providing the input command to the remote desktop server utilizing the remote desktop display protocol (see, e.g., item 1806-C in FIG. 18C);

means for receiving a remote desktop drawing command from the remote desktop server in response to the input command, wherein the remote desktop drawing command is based on an image of a remote desktop of the remote machine (see, e.g., item 1808-C in FIG. 18C); and means for translating the remote desktop drawing command into a graphics drawing command compatible with the transcoding server to allow the transcoding server to facilitate providing a web browser drawing update to the web browser, wherein the web browser drawing update is compatible with the web browser (see, e.g., item 1810-C in FIG. 18C).

21. The apparatus of clause 20, wherein the request-response protocol comprises hypertext transfer protocol (HTTP), wherein the graphics drawing command is a Java graphics drawing command, wherein the transcoding server is a Java transcoding server, wherein the web browser is HTML5 compatible.

22. The apparatus of clause 20, wherein the means for receiving the input request comprises means for receiving the input request from the web browser via an HTTP handler of a web application container at the transcoding server, wherein the means for receiving the remote desktop drawing command comprises means for receiving the remote desktop drawing command via the remote desktop client using the remote desktop display protocol.

23. The apparatus of clause 20, wherein the remote desktop drawing command comprises remote desktop drawing command parameters and bitmap data received from the remote desktop server, wherein the means for translating the remote desktop drawing command comprises one or more of: means for calculating new drawing command parameters based on the remote desktop drawing command parameters; means for adjusting the remote desktop drawing command parameters; and means for making adjustments to the bitmap data.

24. The apparatus of clause 20, comprising:

means for generating an image based on the graphics drawing command; and means for generating coordinates for the image based on the graphics drawing command, wherein the image represents a portion of an entire image of the remote desktop.

25. The apparatus of clause 20, comprising:

means for executing the graphics drawing command to generate and draw an image into a drawing commands queue at the transcoding server that is accessible by a web application container at the transcoding server for communicating with the web browser;

means for generating coordinates for image based on the graphics drawing command;

means for storing the coordinates in the drawing commands queue; and means for transmitting, after generating the coordinates, a notification to the web application container that a drawing command is ready to be served to the web browser, wherein the graphics drawing command represents a portion of an entire image of the remote desktop.

26. The apparatus of clause 20, comprising:

means for receiving, via an HTTP handler of the transcoding server, a connection request from the web browser; and means for facilitating establishing, controlling or terminating the remote desktop session between the remote desktop client and the remote desktop server in response to the connection request, wherein the means for facilitating of the establishing, controlling or terminating comprises:

means for generating a session control command based on the connection request, wherein the session control command is compatible with the remote desktop display protocol; and means for facilitating transmitting the session control command to the remote desktop server via the remote desktop client using the remote desktop display protocol.

27. The apparatus of clause 26, wherein the session control command comprises at least one of: a command for starting the remote desktop session, a command for stopping the remote desktop session, a credential, a setting, a preference, and a command for passing at least one of a credential, a setting, and a preference.

28. The apparatus of clause 20, comprising:

means for extracting coordinates from the graphics drawing command; and means for updating at least a portion of an off-screen bitmap based on the graphics drawing command, wherein the at least a portion of the off-screen bitmap is associated with the coordinates, wherein the off-screen bitmap represents an entire image of the remote desktop.

29. The apparatus of clause 20, wherein the apparatus comprises the transcoding server.

30. The apparatus of clause 20, wherein the apparatus comprises a processing system and a memory.

Illustration of Method/Apparatus/Machine Readable Storage Medium for facilitating accessing and controlling a remote desktop of a remote machine in real time from a web browser of a client device via a hypertext transfer protocol (HTTP) handler and a remote desktop client adapter for a transcoding server (described as Clauses).

The subject technology is illustrated, for example, according to various aspects described below. Various examples of aspects of the subject technology are described as numbered clauses (1, 2, 3, etc.) for convenience. These are provided as examples, and do not limit the subject technology. It is noted that any of the dependent clauses may be combined in any combination, and placed into a respective independent clause, e.g., clauses 1, 10, and 18. Clause 1 below is presented, for example, with reference to FIGS. 19A-19E. The other clauses can be presented in a similar manner.

Figure 19A:
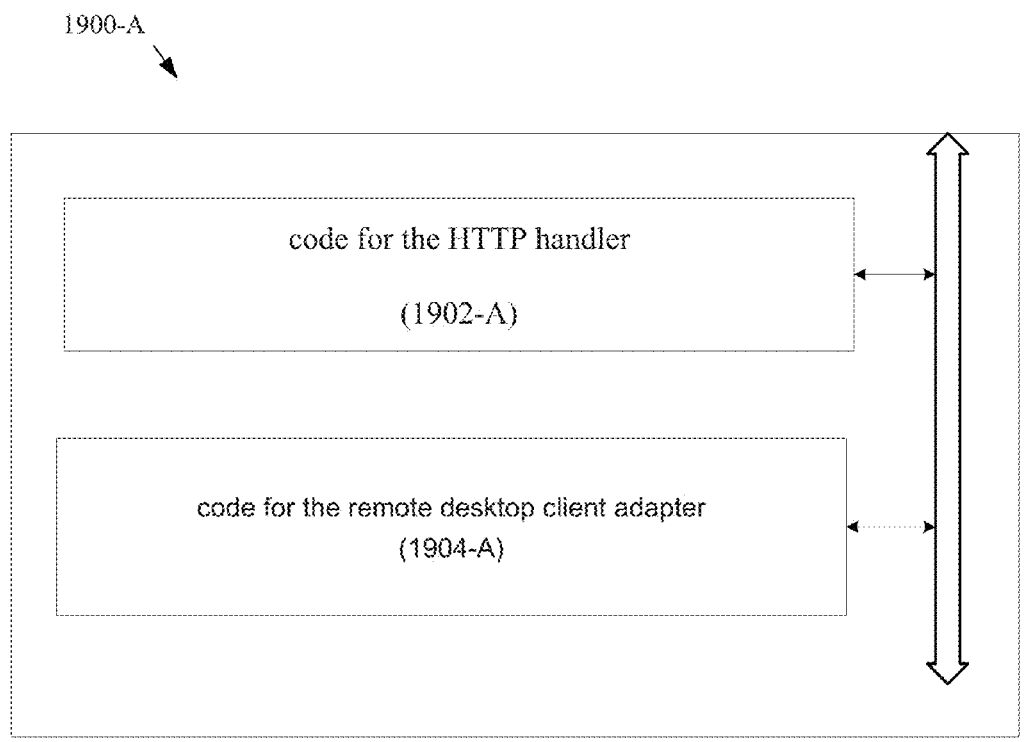
FIG. 19A is a block diagram representing code of an example of a machine-readable storage medium encoded with instructions executable by a processing system to perform a method of facilitating accessing and controlling a remote desktop of a remote machine in real time from a web browser of a client device via a hypertext transfer protocol (HTTP) handler and a remote desktop client adapter for a transcoding server.

1. A machine-readable storage medium (see, e.g., item 1900-A in FIG. 19A) comprising code for facilitating accessing and controlling a remote desktop of a remote machine (see, e.g., 320 in FIG. 3A) in real time from a web browser (see, e.g., 500 of FIG. 5) at a client device (see, e.g., 310 of FIG. 3A) via a hypertext transfer protocol (HTTP) handler (see, e.g., 422 of FIG. 4A) and a remote desktop client adapter (see, e.g., 430 of FIG. 4B) for a transcoding server (see, e.g., 330 of FIG. 3A), the machine-readable storage medium comprising:

the HTTP handler (see, e.g., item 1902-A of FIG. 19A); and the remote desktop client adapter (see, e.g., item 1904-A of FIG. 19A);

wherein the HTTP handler is configured to facilitate receiving a connection request and a user input request from the web browser utilizing HTTP, to facilitate providing the connection request and the user input request to the remote desktop client adapter, and to facilitate providing a web browser drawing update to the web browser in response to a drawing request from the web browser, wherein the web browser drawing update is compatible with the web browser, wherein the remote desktop client adapter is configured to facilitate receiving the connection request and the user input request, to translate the connection request into a session control command compatible with a remote desktop display protocol, and to translate the user input request into a remote desktop input command compatible with the remote desktop display protocol, wherein the remote desktop client adapter is configured to facilitate providing the session control command to a remote desktop client for providing the session control command to a remote desktop server of the remote machine and for establishing, controlling or terminating a remote desktop session with the remote desktop server, wherein the remote desktop client adapter is configured to facilitate providing the remote desktop input command to the remote desktop client for providing the remote desktop input command to the remote desktop server, wherein the remote desktop client adapter is configured to facilitate receiving a remote desktop drawing command from the remote desktop server via the remote desktop client in response to the remote desktop input command, wherein the remote desktop drawing command is compatible with the remote desktop display protocol, wherein the remote desktop client adapter is configured to translate the remote desktop drawing command into a graphics drawing command compatible with the transcoding server, and to update a portion of an image representing the entire remote desktop and coordinates based on the graphics drawing command, and wherein the HTTP handler is configured to generate an image file based on the updated portion of the image and to obtain drawing coordinates based on the coordinates in response to the drawing request, wherein the web browser drawing update comprises the image file and the drawing coordinates, wherein the remote desktop drawing command represents a portion of the entire remote desktop, wherein the remote desktop display protocol is a push protocol, and HTTP is a pull protocol.

2. The machine-readable storage medium of clause 1, wherein the user input request comprises at least one of a mouse event, a keyboard event, and a touch event.

3. The machine-readable storage medium of clause 1, wherein the session control command relates to establishing or controlling a connection between the remote desktop client and the remote desktop server and comprises at least one of: a command for starting the remote desktop session, a command for stopping the remote desktop session, a credential, a setting, a preference, and a command for passing at least one of a credential, a setting, and a preference.

4. The machine-readable storage medium of clause 1, wherein the graphics drawing command is a Java graphics drawing command, wherein the transcoding server is a Java transcoding server, and wherein the web browser is HTML5 compatible.

5. The machine-readable storage medium of clause 1, wherein the remote desktop client adapter is configured to place the image and the coordinates into a drawing commands queue, wherein the machine-readable storage medium comprises a long polling handler, wherein the long polling handler is configured to facilitate receiving the drawing request from the web browser utilizing HTTP, to forward the drawing request to the HTTP handler if coordinates for an image are pending in the drawing commands queue, to place the drawing request into a drawing requests queue if coordinates for an image are not pending in the drawing commands, and wherein the drawing commands queue is configured to send a notification to the drawing requests queue if the drawing commands queue receives a new drawing command comprising an image and coordinates for an image.

6. The machine-readable storage medium of clause 1, comprising a drawing requests queue configured to forward the drawing request to the HTTP handler in response to a notification from a drawing commands queue that a drawing command is pending for the web browser.

7. The machine-readable storage medium of clause 1, wherein the HTTP handler is configured to place the drawing coordinates into a section of an HTTP header, wherein the HTTP handler is configured to facilitate providing the image file and the drawing coordinates together to the web browser in a single HTTP transmission response for drawing a display image at the web browser, wherein the display image represents the updated portion of the image representing the entire remote desktop.

8. The machine-readable storage medium of clause 1, wherein the HTTP handler is configured to facilitate providing script client code compatible with the web browser to the web browser if the connection request from the web browser comprises a request to connect to the remote machine.

9. A computing machine comprising the machine-readable storage medium of clause 1, wherein the computing machine is the transcoding server.

Figure 19B:
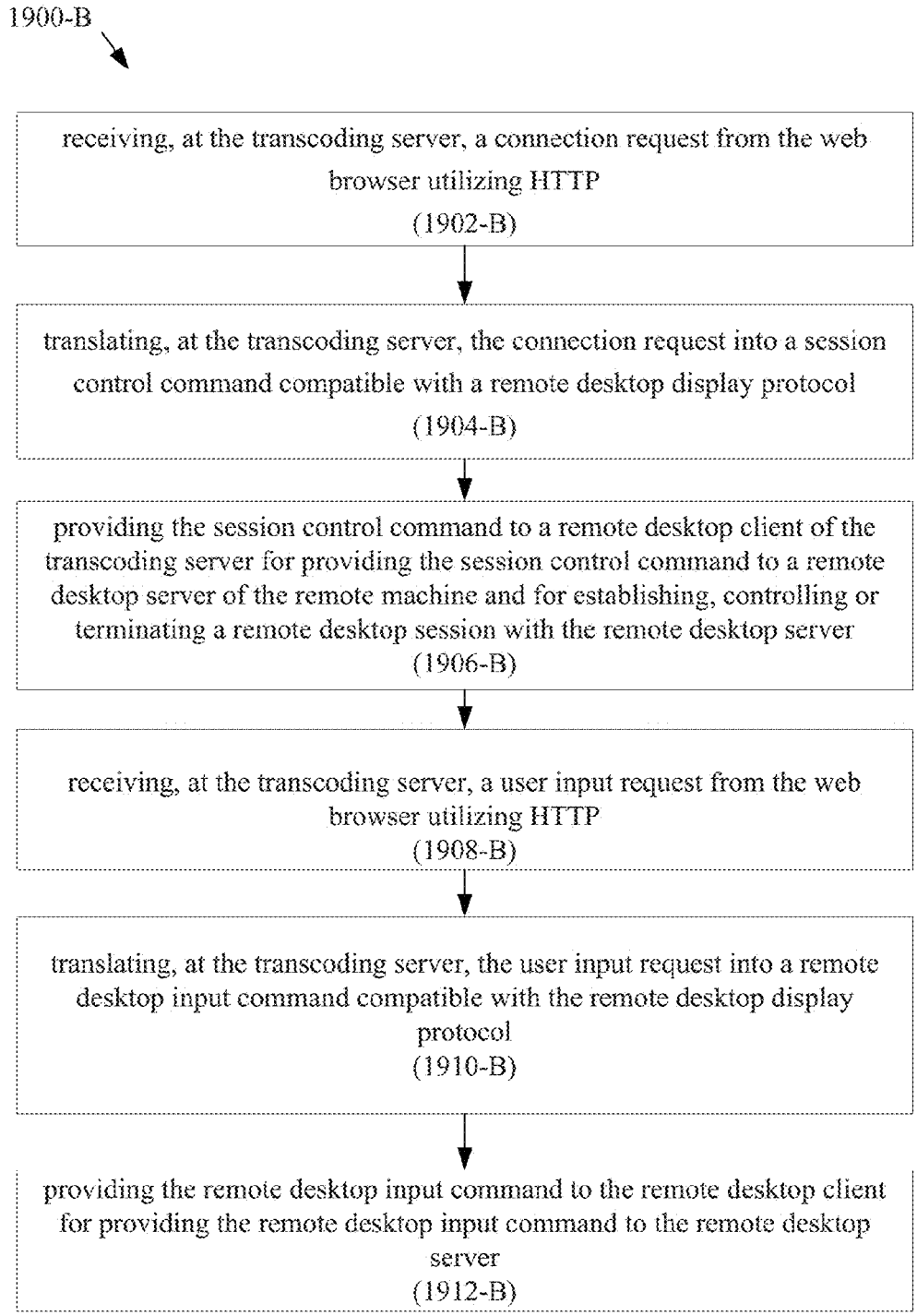
FIGS. 19B-19C are block diagrams representing an example of a method of facilitating accessing and controlling a remote desktop of a remote machine in real time from a web browser of a client device via a hypertext transfer protocol (HTTP) handler and a remote desktop client adapter for a transcoding server.
Figure 19C:
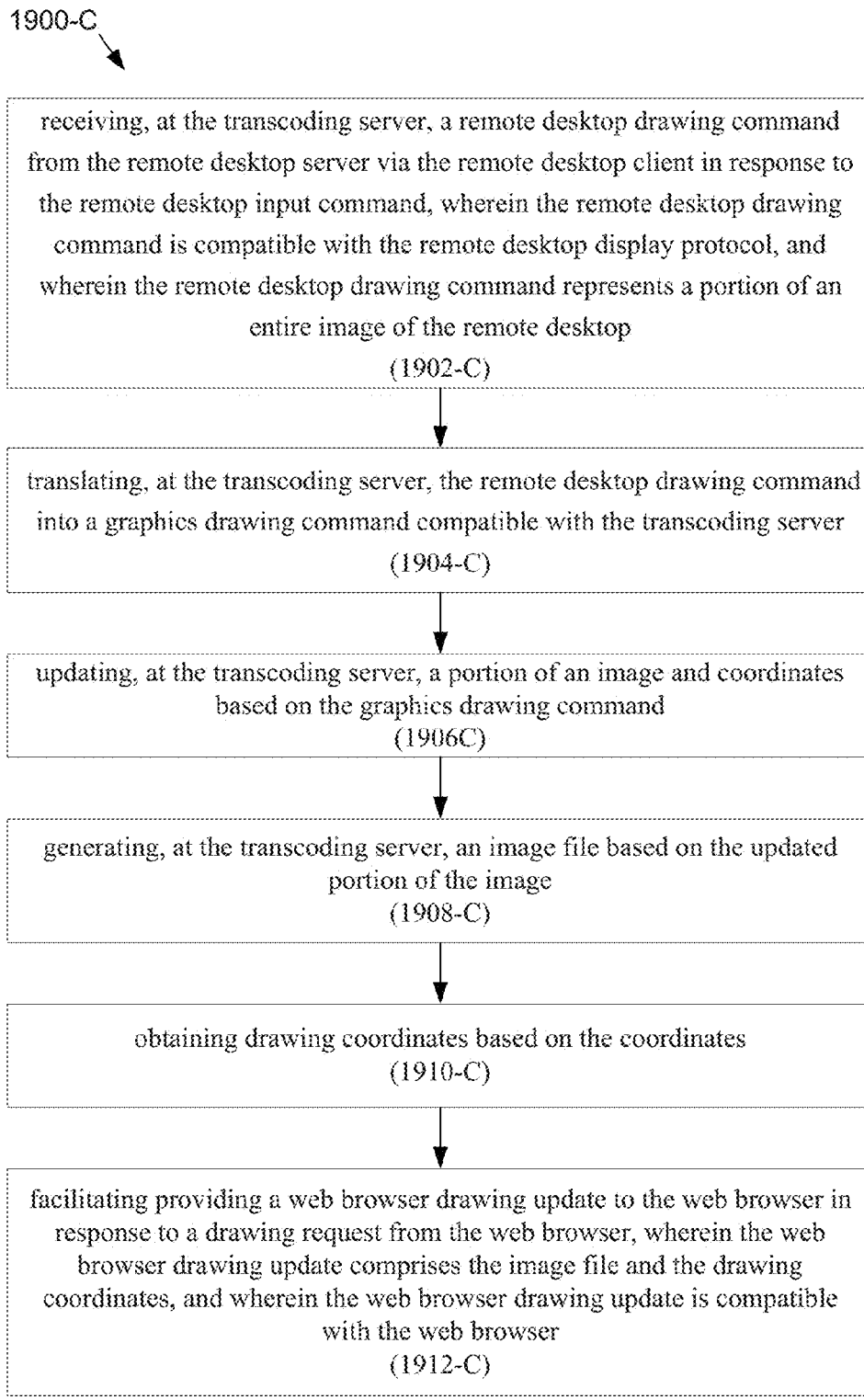

10. A method (see, e.g., item 1900-B of FIG. 19B and item 1900-C of FIG. 19C) for facilitating accessing and controlling a remote desktop of a remote machine (see, e.g., 320 of FIG. 3A) in real time from a web browser (see, e.g., 500 of FIG. 5) at a client device (see, e.g., 310 of FIG. 3A) utilizing a transcoding server (see, e.g., 330 of FIG. 3A), the method comprising:

receiving, at the transcoding server, a connection request from the web browser utilizing HTTP (see, e.g., item 1902-B of FIG. 19B);

translating, at the transcoding server, the connection request into a session control command compatible with a remote desktop display protocol (see, e.g., item 1904-B of FIG. 19B);

providing the session control command to a remote desktop client of the transcoding server for providing the session control command to a remote desktop server of the remote machine and for establishing, controlling or terminating a remote desktop session with the remote desktop server (see, e.g., item 1906-B of FIG. 19B);

receiving, at the transcoding server, a user input request from the web browser utilizing HTTP (see, e.g., item 1908-B of FIG. 19B), translating, at the transcoding server, the user input request into a remote desktop input command compatible with the remote desktop display protocol (see, e.g., item 1910-B of FIG. 19B);

providing the remote desktop input command to the remote desktop client for providing the remote desktop input command to the remote desktop server (see, e.g., item 1912-B of FIG. 19B), receiving, at the transcoding server, a remote desktop drawing command from the remote desktop server via the remote desktop client in response to the remote desktop input command, wherein the remote desktop drawing command is compatible with the remote desktop display protocol, and wherein the remote desktop drawing command represents a portion of an entire image of the remote desktop (see, e.g., item 1902-C of FIG. 19C);

translating, at the transcoding server, the remote desktop drawing command into a graphics drawing command compatible with the transcoding server (see, e.g., item 1904-C of FIG. 19C);

updating, at the transcoding server, a portion of an image and coordinates based on the graphics drawing command (see, e.g., item 1906-C of FIG. 19C);

generating, at the transcoding server, an image file based on the updated portion of the image (see, e.g., item 1908-C of FIG. 19C);

obtaining drawing coordinates based on the coordinates (see, e.g., item 1910-C of FIG. 19C); and facilitating providing a web browser drawing update to the web browser in response to a drawing request from the web browser, wherein the web browser drawing update comprises the image file and the drawing coordinates, and wherein the web browser drawing update is compatible with the web browser (see, e.g., item 1912-C of FIG. 19C), wherein the remote desktop drawing command represents a portion of the entire remote desktop, and the image represents the entire remote desktop, wherein the remote desktop display protocol is a push protocol, and HTTP is a pull protocol.

11. The method of clause 10, wherein the user input request comprises at least one of a mouse event, a keyboard event, and a touch event.

12. The method of clause 10, wherein the session control command comprises at least one of: a command for starting the remote desktop session, a command for stopping the remote desktop session, a credential, a setting, a preference, and a command for passing at least one of a credential, a setting, and a preference.

13. The method of clause 10, wherein the graphics drawing command is a Java graphics drawing command, wherein the transcoding server is a Java transcoding server, and wherein the web browser is HTML5 compatible.

14. The method of clause 10, wherein the updating a portion of an image and coordinates comprises storing the portion of the image and the coordinates into a drawing commands queue, wherein the method comprises: receiving the drawing request from the web browser utilizing HTTP; forwarding the drawing request to an HTTP handler if coordinates for an image are pending in the drawing commands queue; placing the drawing request into a drawing requests queue if coordinates for an image are not pending in the drawing commands, and wherein the method comprises: sending a notification to the drawing requests queue if the drawing commands queue receives a new drawing command comprising an image and coordinates for an image.

15. The method of clause 10, comprising forwarding the drawing request to an HTTP handler in response to a notification from a drawing commands queue that a drawing command is pending for the web browser.

16. The method of clause 10, comprising placing the drawing coordinates into a section of an HTTP header, wherein the facilitating providing the web browser drawing update comprises facilitating providing the image file and the drawing coordinates together to the web browser in a single HTTP transmission response for drawing a display image at the web browser, wherein the display image represents the updated portion of the image representing the entire remote desktop.

17. The method of clause 10, comprising facilitate providing script client code compatible with the web browser, to the web browser, if the connection request from the web browser comprises a request to connect to the remote machine.

Figure 19D:
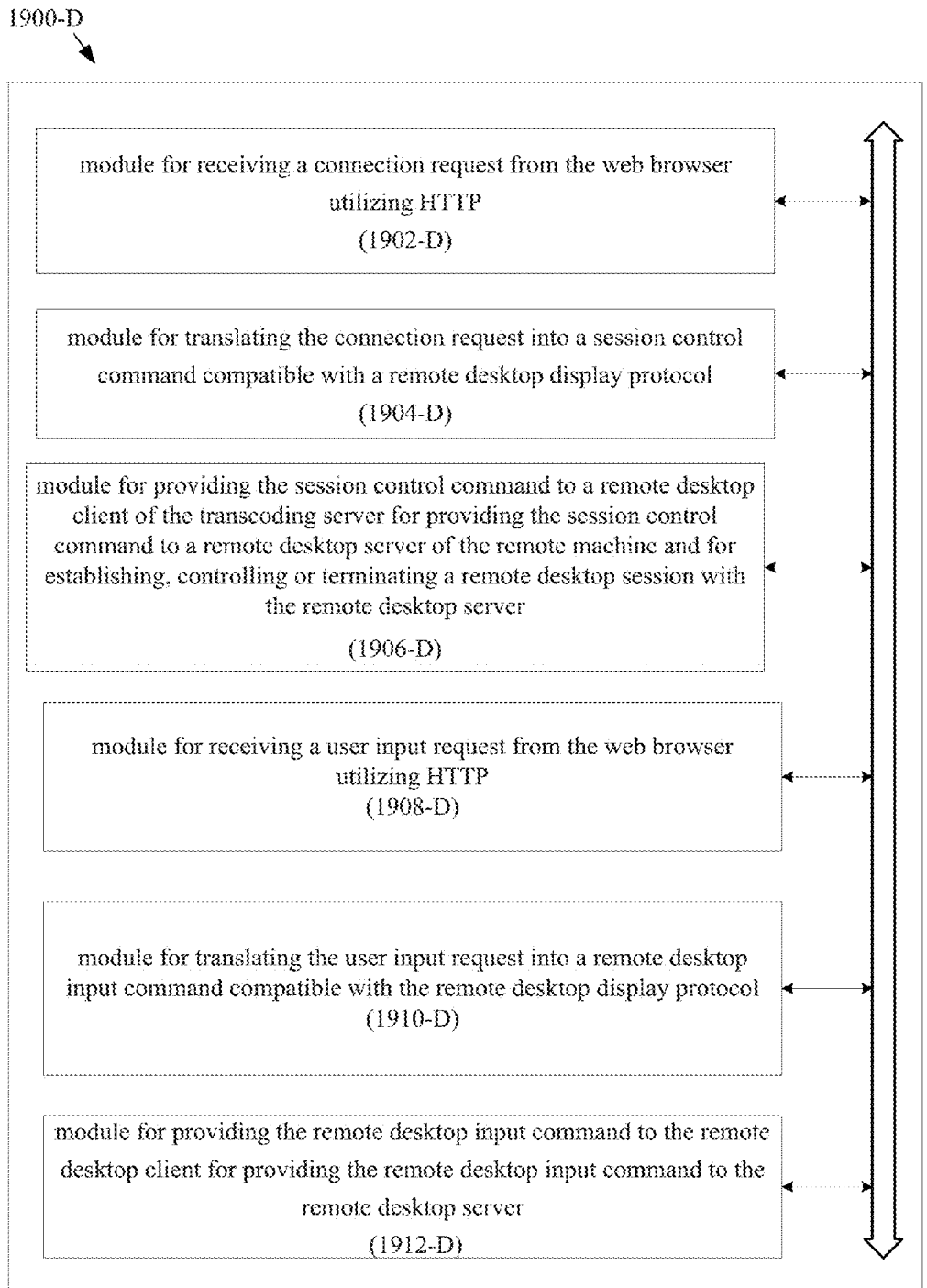
FIGS. 19D-19E are block diagrams of modules of an example of an apparatus for facilitating accessing and controlling a remote desktop of a remote machine in real time from a web browser of a client device via a hypertext transfer protocol (HTTP) handler and a remote desktop client adapter for a transcoding server.
Figure 19E:
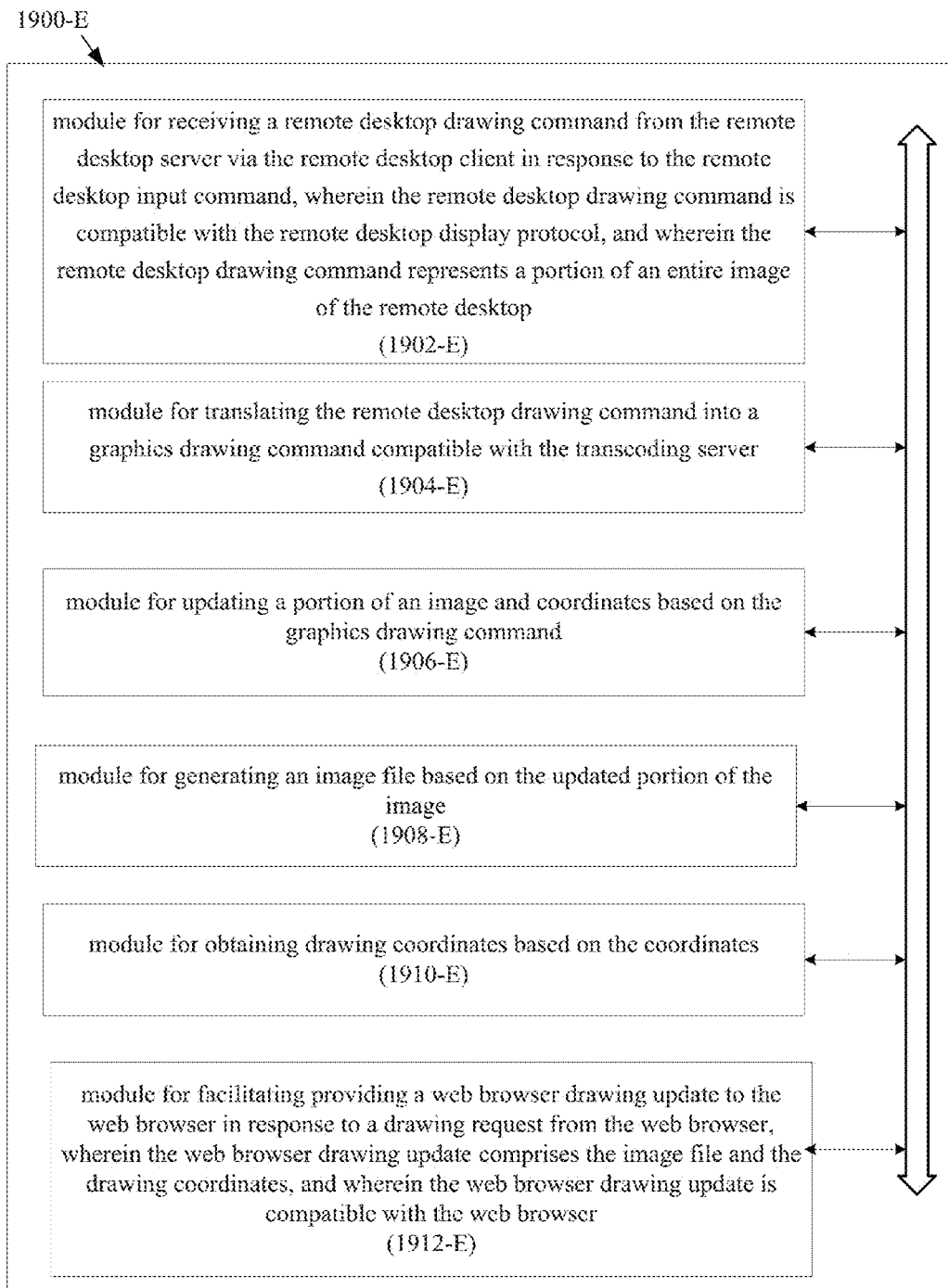

18. A transcoding server (see, e.g., item 1900-D of FIG. 19D and item 1900-E of FIG. 19E) for facilitating accessing and controlling a remote desktop of a remote machine (see, e.g., 320 of FIG. 3A) in real time from a web browser (see, e.g., 500 of FIG. 5) at a client device (see, e.g., 310 of FIG. 3A), the transcoding server comprising:

means for receiving a connection request from the web browser utilizing HTTP (see, e.g., item 1902-D in FIG. 19D);

means for translating the connection request into a session control command compatible with a remote desktop display protocol (see, e.g., item 1904-D in FIG. 19D);

means for providing the session control command to a remote desktop client of the transcoding server for providing the session control command to a remote desktop server of the remote machine and for establishing, controlling or terminating a remote desktop session with the remote desktop server (see, e.g., item 1906-D in FIG. 19D);

means for receiving a user input request from the web browser utilizing HTTP (see, e.g., item 1908-D in FIG. 19D), means for translating the user input request into a remote desktop input command compatible with the remote desktop display protocol (see, e.g., item 1910-D in FIG. 19D);

means for providing the remote desktop input command to the remote desktop client for providing the remote desktop input command to the remote desktop server (see, e.g., item 1912-D in FIG. 19D), means for receiving a remote desktop drawing command from the remote desktop server via the remote desktop client in response to the remote desktop input command, wherein the remote desktop drawing command is compatible with the remote desktop display protocol, and wherein the remote desktop drawing command represents a portion of an entire image of the remote desktop (see, e.g., item 1902-E in FIG. 19E);

means for translating the remote desktop drawing command into a graphics drawing command compatible with the transcoding server (see, e.g., item 1904-E in FIG. 19E);

means for updating a portion of an image and coordinates based on the graphics drawing command (see, e.g., item 1906-E in FIG. 19E);

means for generating an image file based on the updated portion of the image (see, e.g., item 1908-E in FIG. 19E);

means for obtaining drawing coordinates based on the coordinates (see, e.g., item 1910-E in FIG. 19E); and means for facilitating providing a web browser drawing update to the web browser in response to a drawing request from the web browser, wherein the web browser drawing update comprises the image file and the drawing coordinates, and wherein the web browser drawing update is compatible with the web browser (see, e.g., item 1912-E in FIG. 19E), wherein the remote desktop drawing command represents a portion of the entire remote desktop, and the image represents the entire remote desktop, wherein the remote desktop display protocol is a push protocol, and HTTP is a pull protocol.

19. The transcoding server of clause 18, wherein the user input request comprises at least one of a mouse event, a keyboard event, and a touch event.

20. The transcoding server of clause 18, wherein the session control command comprises at least one of: a command for starting the remote desktop session, a command for stopping the remote desktop session, a credential, a setting, a preference, and a command for passing at least one of a credential, a setting, and a preference.

21. The transcoding server of clause 18, wherein the graphics drawing command is a Java graphics drawing command, wherein the transcoding server is a Java transcoding server, and wherein the web browser is HTML5 compatible.

22. The transcoding server of clause 18, wherein the means for updating a portion of an image and coordinates comprises means for storing the portion of the image and the coordinates into a drawing commands queue, wherein the transcoding server comprises: means for receiving the drawing request from the web browser utilizing HTTP; means for forwarding the drawing request to an HTTP handler if coordinates for an image are pending in the drawing commands queue; means for placing the drawing request into a drawing requests queue if coordinates for an image are not pending in the drawing commands, and wherein the transcoding server comprises: means for sending a notification to the drawing requests queue if the drawing commands queue receives a new drawing command comprising an image and coordinates for an image.

23. The transcoding server of clause 18, comprising means for forwarding the drawing request to an HTTP handler in response to a notification from a drawing commands queue that a drawing command is pending for the web browser.

24. The transcoding server of clause 18, comprising means for placing the drawing coordinates into a section of an HTTP header, wherein the means for facilitating providing the web browser drawing update comprises means for facilitating providing the image file and the drawing coordinates together to the web browser in a single HTTP transmission response for drawing a display image at the web browser, wherein the display image represents the updated portion of the image representing the entire remote desktop.

25. The transcoding server of clause 18, comprising means for facilitate providing script client code compatible with the web browser, to the web browser, if the connection request from the web browser comprises a request to connect to the remote machine.

26. A processor comprising modules configured to perform the method of any one of the foregoing clauses.

27. A machine-readable storage medium comprising code for causing the transcoding server to perform the method of any one of the foregoing clauses.

28. The machine-readable storage medium of clause 27, wherein the transcoding server comprises the machine-readable storage medium.

29. An apparatus comprising means for performing the method of any one of the foregoing clauses.

30. The apparatus of clause 29, wherein the apparatus comprises a transcoding server.

31. The apparatus of clause 29, wherein the apparatus comprises a processing system and a memory.

33. An apparatus comprising components operable to perform the method of any one of the foregoing clauses.

34. The apparatus of clause 33, wherein the apparatus comprises a transcoding server.

35. The apparatus of clause 33, wherein the apparatus comprises a processing system and a memory.

Illustration of Method/Apparatus/Machine Readable Storage Medium for facilitating a remote desktop session between a web browser at and a remote desktop server (described as Clauses).

The subject technology is illustrated, for example, according to various aspects described below. Various examples of aspects of the subject technology are described as numbered clauses (1, 2, 3, etc.) for convenience. These are provided as examples, and do not limit the subject technology. It is noted that any of the dependent clauses may be combined in any combination, and placed into a respective independent clause. Clause 1 below is presented, for example, with reference to FIG. 20A. The other clauses can be presented in a similar manner.

1. A method (see, e.g., method 2000-A of FIG. 20A) of facilitating accessing and controlling a remote desktop of a remote machine (see, e.g., 830 of FIG. 8A) in real time by a web browser of a client device (see, e.g., 802 of FIG. 8A) via a hypertext transfer protocol (HTTP) utilizing a web server (see, e.g., 820 of FIG. 8A), the method comprising:

receiving, at the web server, a remote desktop drawing command based on an image of the remote desktop of the remote machine, wherein the remote desktop drawing command is compatible with a remote desktop display protocol utilized by the remote machine (see, e.g., 2002-A of FIG. 20A);

translating, at the web server, the remote desktop drawing command into a web browser drawing update that is compatible with the web browser (see, e.g., 2004-A of FIG. 20A); and facilitating providing the web browser drawing update from the web server to the web browser of the client device utilizing HTTP during a remote desktop session between the client device and the remote machine (see, e.g., 2006-A of FIG. 20A), wherein (i) the remote desktop display protocol is a push protocol, (ii) HTTP is a pull protocol, and (iii) the web browser comprises a windows web browser.

2. The method of clause 1, wherein the web browser drawing update comprises an image file and drawing coordinates for the image file that are recognizable and processable by the windows web browser.

3. The method of clause 1, wherein the translating comprises:

translating the remote desktop drawing command into a windows graphics drawing command;

updating a portion of a memory bitmap using the windows graphics drawing command, wherein the updated portion of the memory bitmap represents a portion of an entire image of the remote desktop;

creating an image file from the memory bitmap; and
generating drawing coordinates for the image file,
wherein the web browser drawing update comprises the image file and the drawing coordinates for the image file, wherein the facilitating providing comprises placing the drawing coordinates into an HTTP header, wherein utilizing HTTP comprises using an HTTP controller, wherein the web server is configured to facilitate providing an application framework for hosting one or more web applications comprising an ASP.NET model-view-controller (MVC), wherein the one or more web applications comprise one or more HTTP handlers, and wherein the one or more HTTP handlers comprise the HTTP controller of the ASP.NET MVC.

4. The method of clause 1, wherein the translating comprises:

translating the remote desktop drawing command into a graphics drawing command that is compatible with the windows web server, wherein the graphics drawing command includes coordinates;

extracting the coordinates from the graphics drawing command;

updating at least a portion of an off-screen bitmap based on the graphics drawing command, wherein the at least a portion of the off-screen bitmap is associated with the coordinates, wherein the off-screen bitmap is based on the image of the remote desktop;

creating an image file including a windows image file based on the at least a portion of the off-screen bitmap; and wherein the web browser drawing update comprises the image file and the coordinates.

5. The method of clause 1, wherein the web browser is an HTML5 compatible web browser.

6. The method of clause 1, comprising:

receiving a user input request from the web browser, using HTTP;

translating the user input request into an input command compatible with the remote desktop display protocol; and providing the input command to the remote desktop client for accessing and controlling the remote desktop of the remote machine during the remote desktop session, wherein the web browser drawing update comprises an image file including a windows image file and drawing coordinates for the image file that are recognizable and processable by the windows web browser, wherein the image file and the drawing coordinates represent a portion of an image of the remote desktop that has been changed in response to the input command.

7. The method of clause 6, wherein the user input request comprises at least one of a mouse event, a keyboard event, and a touch event.

8. The method of clause 1, wherein the remote desktop drawing command comprises remote desktop drawing command parameters and bitmap data received from a remote desktop server of the remote machine, wherein the translating comprises one or more of: calculating new drawing command parameters based on the remote desktop drawing command parameters; adjusting the remote desktop drawing command parameters; and making adjustments to the bitmap data.

9. The method of clause 1, wherein the remote desktop drawing command comprises remote desktop drawing command parameters and bitmap data received from a remote desktop server of the remote machine, wherein the translating comprises making adjustments to the bitmap data, wherein the making adjustments comprises converting a 16-bit red-green-blue (RGB) 5-6-5 color format into a 32-bit alpha-red-green-blue (ARGB) 8-8-8-8 format.

10. The method of clause 1, wherein the web server is an intermediary between the remote machine and the client device, and wherein the web server is physically separate from the remote machine.

Figure 20B:
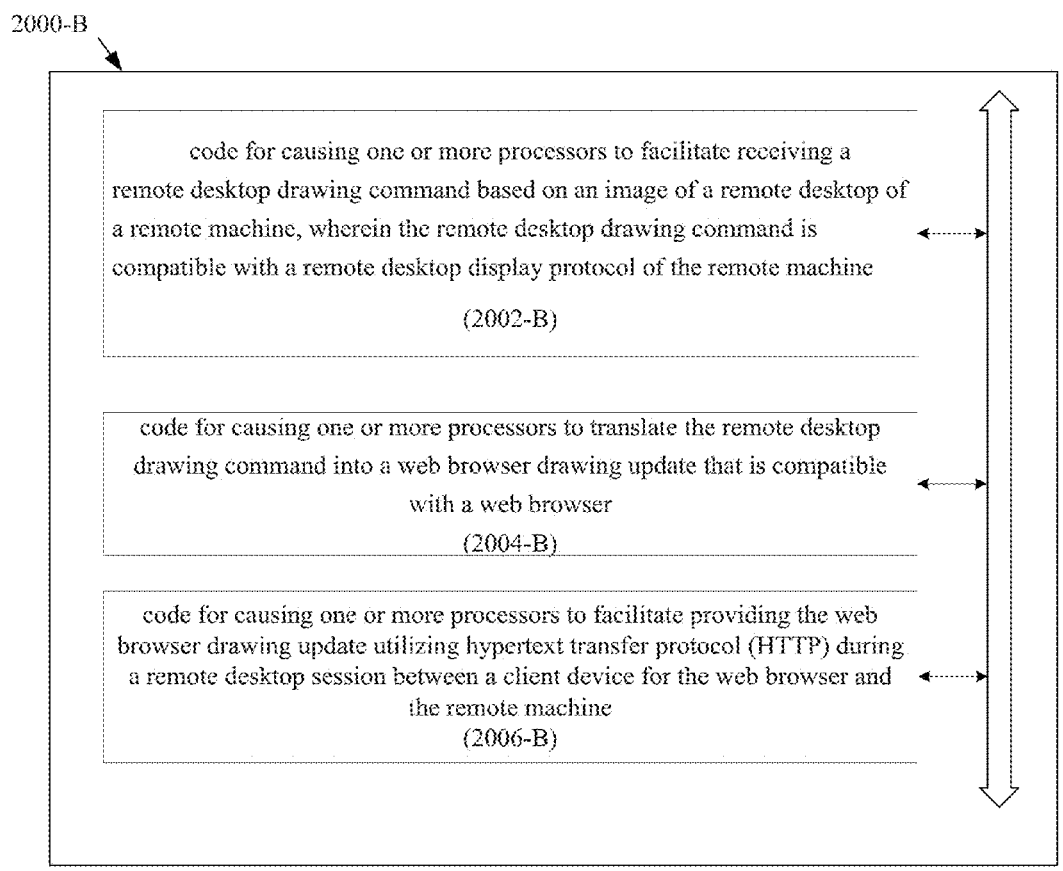
FIG. 20B is a block diagram of an example of a machine-readable storage medium comprising stored instructions executable by one or more processors to perform one or more operations.

11. A machine-readable storage medium (see, e.g., 1210, 1219 in FIGS. 12 and 2000-B of FIG. 20B) comprising instructions stored therein, the instructions executable by one or more processors (see, e.g., 1202) to perform one or more operations, the instructions comprising:

code for causing one or more processors to facilitate receiving a remote desktop drawing command based on an image of a remote desktop of a remote machine, wherein the remote desktop drawing command is compatible with a remote desktop display protocol of the remote machine (see, e.g., 2002-B of FIG. 20B);

code for causing one or more processors to translate the remote desktop drawing command into a web browser drawing update that is compatible with a web browser (see, e.g., 2004-B of FIG. 20B); and code for causing one or more processors to facilitate providing the web browser drawing update utilizing hypertext transfer protocol (HTTP) during a remote desktop session between a client device for the web browser and the remote machine (see, e.g., 2006-B of FIG. 20B), wherein (i) the remote desktop display protocol is a push protocol, (ii) HTTP is a pull protocol, and (iii) the web browser comprises a windows web browser.

12. The machine-readable storage medium of clause 11, wherein the web browser drawing update comprises an image file and drawing coordinates for the image file that are recognizable and processable by the windows web browser.

13. The machine-readable storage medium of clause 11, wherein the code for causing one or more processors to translate comprises:

code for causing one or more processors to translate, at a web server, the remote desktop drawing command into a windows graphics drawing command;

code for causing one or more processors to update a portion of a memory bitmap using the windows graphics drawing command, wherein the updated portion of the memory bitmap represents a portion of an image of the remote desktop;

code for causing one or more processors to create an image file including a windows image file from the memory bitmap; and code for causing one or more processors to generate drawing coordinates for the image file, wherein the web browser drawing update comprises the image file and the drawing coordinates for the image file, wherein the code for causing one or more processors to facilitate providing comprises code for causing one or more processors to place the drawing coordinates into an HTTP header, wherein code for causing one or more processors to utilize HTTP comprises code for causing one or more processors to use an HTTP controller, wherein the web server is configured to facilitate providing an application framework for hosting one or more web applications, wherein the one or more web applications comprise one or more HTTP handlers, and wherein the one or more HTTP handlers comprise the HTTP controller.

14. The machine-readable storage medium of clause 11, wherein the code for causing one or more processors to translate comprises:

code for causing one or more processors to translate, at a web server, the remote desktop drawing command into a graphics drawing command that is compatible with the web server, wherein the graphics drawing command includes coordinates;

code for causing one or more processors to extract the coordinates from the graphics drawing command;

code for causing one or more processors to update at least a portion of an off-screen bitmap based on the graphics drawing command, wherein the at least a portion of the off-screen bitmap is associated with the coordinates, wherein the off-screen bitmap is based on the image of the remote desktop;

code for causing one or more processors to create an image file including a windows image file based on the at least a portion of the off-screen bitmap; and wherein the web browser drawing update comprises the windows image file and the coordinates.

15. The machine-readable storage medium of clause 11, wherein the web browser is an HTML5 compatible web browser.

16. The machine-readable storage medium of clause 11, wherein the instructions comprise:

code for causing one or more processors to facilitate receiving a user input request from the web browser, using HTTP;

code for causing one or more processors to translate the user input request into an input command compatible with the remote desktop display protocol; and code for causing one or more processors to facilitate providing the input command to the remote desktop client for accessing and controlling the remote desktop of the remote machine during the remote desktop session;

wherein the web browser drawing update comprises an image file including a windows image file and drawing coordinates for the image file that are recognizable and processable by the windows web browser; and wherein the image file and the drawing coordinates represent a portion of an image of the remote desktop that has been changed in response to the input command.

17. The machine-readable storage medium of clause 16, wherein the user input request comprises at least one of a mouse event, a keyboard event, and a touch event.

18. The machine-readable storage medium of clause 11, wherein the remote desktop drawing command comprises remote desktop drawing command parameters and bitmap data received from a remote desktop server of the remote machine, wherein the code for causing one or more processors to translate comprises one or more of: code for causing one or more processors to calculate new drawing command parameters based on the remote desktop drawing command parameters; code for causing one or more processors to adjust the remote desktop drawing command parameters; and code for causing one or more processors to make adjustments to the bitmap data.

19. The machine-readable storage medium of clause 11, wherein the remote desktop drawing command comprises remote desktop drawing command parameters and bitmap data received from a remote desktop server of the remote machine, wherein the code for causing one or more processors to translate comprises code for causing one or more processors to make adjustments to the bitmap data, wherein the code for causing one or more processors to make adjustments comprises code for causing one or more processors to convert a 16-bit red-green-blue (RGB) 5-6-5 color format into a 32-bit alpha-red-green-blue (ARGB) 8-8-8-8 format.

20. The machine-readable storage medium of clause 11, wherein the code for causing one or more processors to translate is to be executed at a web server, and wherein the web server is an intermediary between the remote machine and the client device, and wherein the web server is physically separate from the remote machine.

21. A computing machine comprising the machine-readable storage medium of clause 11, wherein the computing machine is a web server.

Figure 20C:
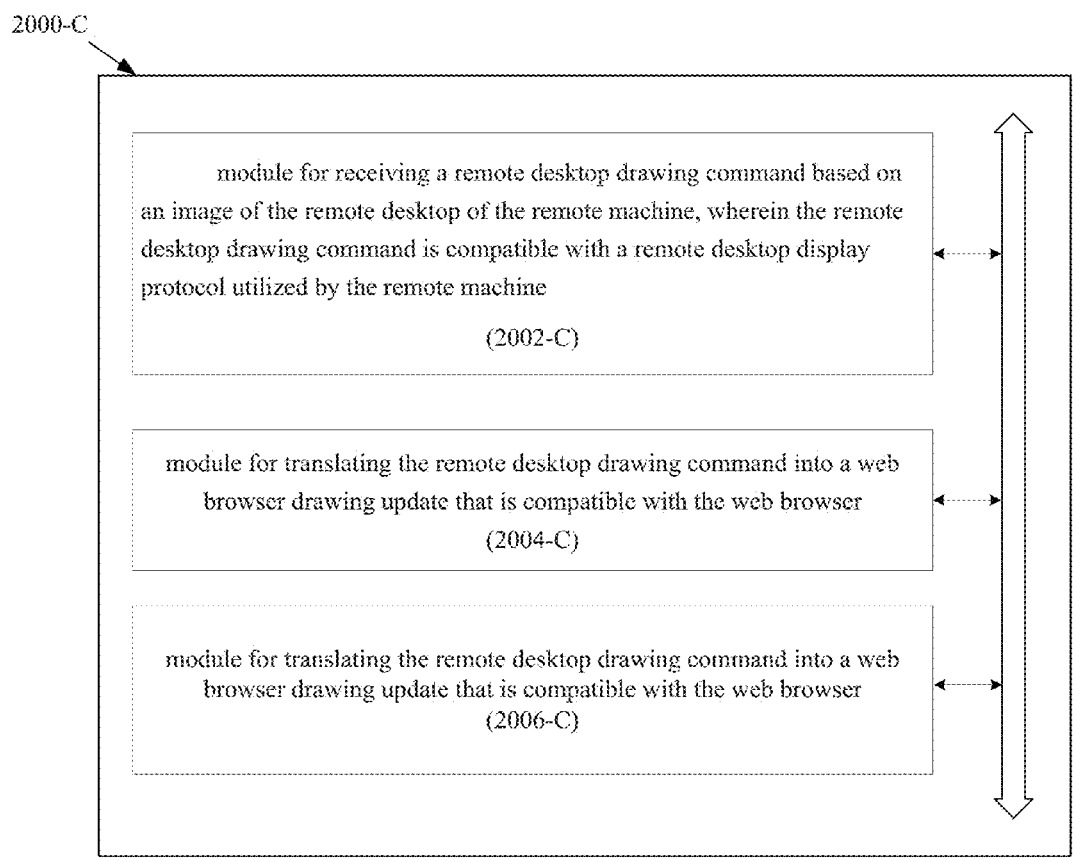
FIG. 20C is a block diagram of an example of an apparatus for facilitating accessing and controlling a remote desktop of a remote machine in real time by a web browser of a client device via a hypertext transfer protocol (HTTP).

22. An apparatus (see, e.g., 2000-C of FIG. 20C) for facilitating accessing and controlling a remote desktop of a remote machine (see, e.g., 830 of FIG. 8A) in real time by a web browser (see, e.g., 810 of FIG. 8A) at a client device (see, e.g., 802 of FIG. 8A) via a hypertext transfer protocol (HTTP) utilizing a web server (see, e.g., 820 of FIG. 8A), the apparatus comprising:

means for receiving a remote desktop drawing command based on an image of the remote desktop of the remote machine, wherein the remote desktop drawing command is compatible with a remote desktop display protocol utilized by the remote machine (see, e.g., 2002-C of FIG. 20C);

means for translating the remote desktop drawing command into a web browser drawing update that is compatible with the web browser (see, e.g., 2004-C of FIG. 20C); and means for translating the remote desktop drawing command into a web browser drawing update that is compatible with the web browser (see, e.g., 2006-C of FIG. 20C);

wherein (i) the remote desktop display protocol is a push protocol, (ii) HTTP is a pull protocol, and (iii) the web browser comprises a windows web browser.

23. The apparatus of clause 22, wherein the web browser drawing update comprises an image file including a windows image file and drawing coordinates for the image file that are recognizable and processable by the windows web browser.

24. The apparatus of clause 22, wherein the means for translating comprises:

means for translating the remote desktop drawing command into a windows graphics drawing command;

means for updating a portion of a memory bitmap using the windows graphics drawing command, wherein the updated portion of the memory bitmap represents a portion of an entire image of the remote desktop session;

means for creating an image file including a windows image file from the memory bitmap; and means for generating drawing coordinates for the image file, wherein the web browser drawing update comprises the image file and the drawing coordinates for the image file, wherein the means for facilitating providing comprises means for placing the drawing coordinates into an HTTP header, wherein utilizing HTTP comprises utilizing an HTTP controller, and wherein the web server is a windows web server that is configured to facilitate providing an application framework for hosting one or more web applications comprising an ASP-.NET model-view-controller (MVC), wherein the one or more web applications comprise one or more HTTP handlers, and wherein the one or more HTTP handlers comprise the HTTP controller of the ASP.NET MVC.

25. The apparatus of clause 22, wherein the means for translating comprises:

means for translating the remote desktop drawing command into a graphics drawing command that is compatible with the windows web server, wherein the graphics drawing command includes coordinates;

means for extracting the coordinates from the graphics drawing command;

means for updating at least a portion of an off-screen bitmap based on the graphics drawing command, wherein the at least a portion of the off-screen bitmap is associated with the coordinates, wherein the off-screen bitmap is based on the image of the entire remote desktop; and means for creating an image file including a windows image file based on the at least a portion of the off-screen bitmap;

wherein the web browser drawing update comprises the image file and the coordinates.

26. The apparatus of clause 22, wherein the web browser is an HTML5 compatible web browser.

27. The apparatus of clause 22, comprising:

means for receiving a user input request from the web browser, using HTTP;

means for translating the user input request into an input command compatible with the remote desktop display protocol; and means for providing the input command to the remote desktop client for accessing and controlling the remote desktop of the remote machine during the remote desktop session;

wherein the web browser drawing update comprises an image file including a windows image file and drawing coordinates for the image file that are recognizable and processable by the windows web browser; and wherein the image file and the drawing coordinates represent a portion of an image of the of the remote desktop that has been changed in response to the input command.

28. The apparatus of clause 27, wherein the user input request comprises at least one of a mouse event, a keyboard event, and a touch event.

29. The apparatus of clause 22, wherein the remote desktop drawing command comprises remote desktop drawing command parameters and bitmap data received from a remote desktop server of the remote machine, wherein the means for translating comprises one or more of: means for calculating new drawing command parameters based on the remote desktop drawing command parameters; means for adjusting the remote desktop drawing command parameters; and means for making adjustments to the bitmap data.

30. The apparatus of clause 22, wherein the remote desktop drawing command comprises remote desktop drawing command parameters and bitmap data received from a remote desktop server, wherein the means for translating comprises means for making adjustments to the bitmap data of the remote machine, wherein the means for making adjustments comprises means for converting a 16-bit red-green-blue (RGB) 5-6-5 color format into a 32-bit alpha-red-green-blue (ARGB) 8-8-8-8 format.

31. The apparatus of clause 22, wherein the web server is an intermediary between the remote machine and the client device, and wherein the web server is physically separate from the remote machine.

32. The apparatus of clause 22, wherein the apparatus comprises the web server.

33. The apparatus of clause 22, wherein the apparatus comprises a processing system and a memory.

Illustration of Method/Apparatus/Machine Readable Storage Medium for facilitating a remote desktop redrawing session utilizing HTML (described as Clauses).

The subject technology is illustrated, for example, according to various aspects described below. Various examples of aspects of the subject technology are described as numbered clauses (1, 2, 3, etc.) for convenience. These are provided as examples, and do not limit the subject technology. It is noted that any of the dependent clauses may be combined in any combination, and placed into a respective independent clause. Clause 1 below is presented, for example, with reference to FIG. 21A. The other clauses can be presented in a similar manner.

Figure 21A:
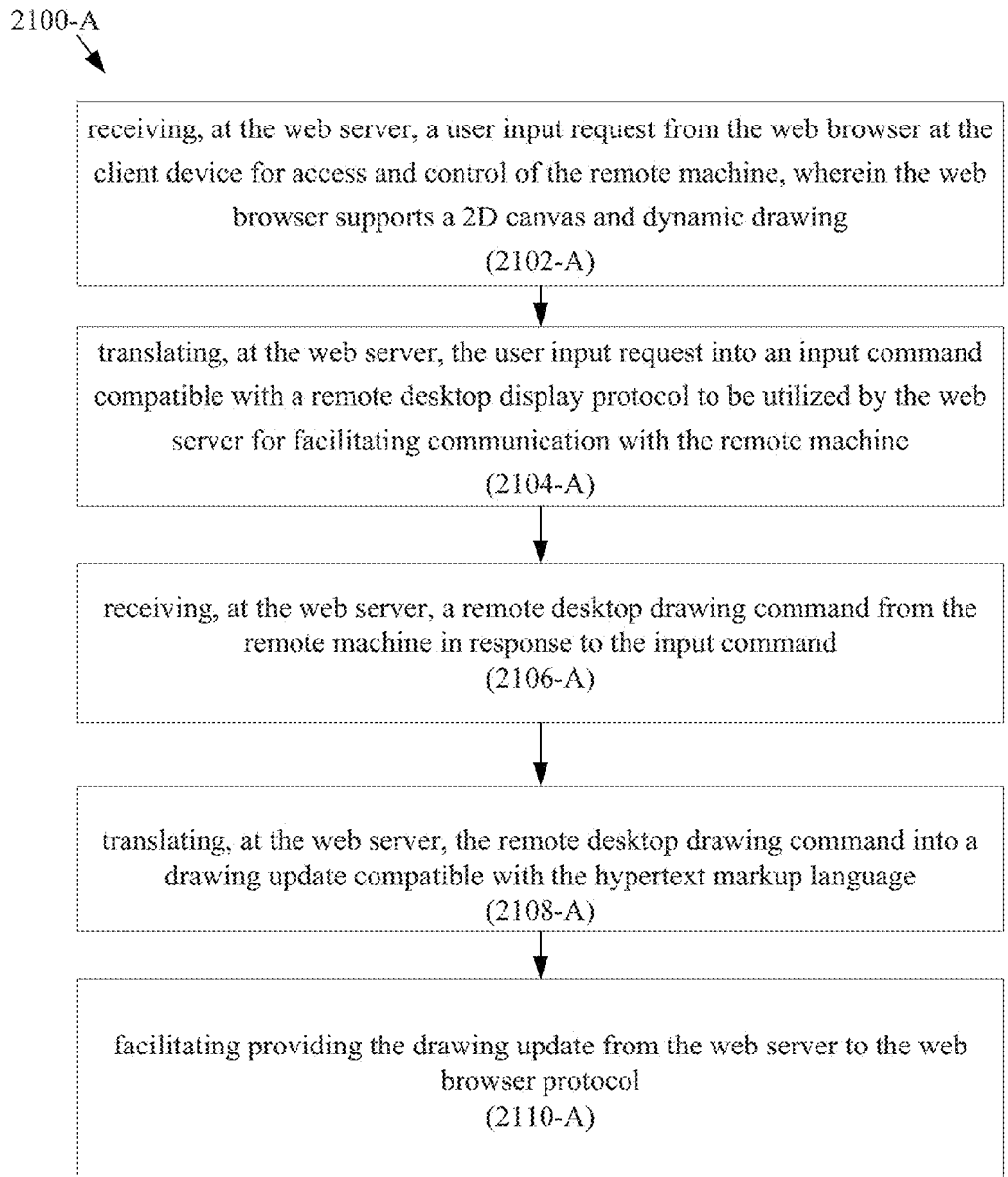
FIG. 21A is a block diagram of an example of a method of facilitating conducting a remote desktop session between a web browser of a client device and a remote machine via a web server in real time.

1. A method (see, e.g., 2100-A of FIG. 21A), of facilitating conducting a remote desktop session between a web browser (see, e.g., 820 of FIG. 8A) of a client device and a remote machine (see, e.g., 830 of FIG. 8A) via a web server (see, e.g., 820 of FIG. 8A) in real time and utilizing hypertext markup language (HTML) that supports a two-dimensional (2D) canvas and dynamic drawing, the method comprising:

receiving, at the web server, a user input request from the web browser of the client device for access and control of the remote machine, wherein the web browser supports a 2D canvas and dynamic drawing (see, e.g., 2102-A of FIG. 21A);

translating, at the web server, the user input request into an input command compatible with a remote desktop display protocol to be utilized by the web server for facilitating communication with the remote machine (see, e.g., 2104-A of FIG. 21A);

receiving, at the web server, a remote desktop drawing command from the remote machine in response to the input command (see, e.g., 2106-A of FIG. 21A);

translating, at the web server, the remote desktop drawing command into a drawing update compatible with the hypertext markup language (see, e.g., 2108-A of FIG. 21A); and facilitating providing the drawing update from the web server to the web browser (see, e.g., 2110-A of FIG. 21A);

wherein the web server is an intermediary between the remote machine and the client device, and wherein the web server comprises a windows web server and is physically separate from the remote machine.

2. The method of clause 1, wherein the web browser comprises a windows web browser and wherein the translating the remote desktop drawing command comprises:

translating the remote desktop drawing command into a windows graphics drawing command;

executing the windows graphics drawing command to update a portion of a memory bitmap, wherein the memory bitmap represents an image of a remote desktop of the remote machine;

generating coordinates for the memory bitmap based on the windows graphics drawing command;

forming an image file including a windows image file based on the memory bitmap, wherein the image file is compatible with HTML5; and obtaining drawing coordinates for the image file based on the coordinates for the memory bitmap, wherein the drawing coordinates are compatible with HTML5, wherein the drawing update comprises the image file and the drawing coordinates for the image file, wherein the drawing update represents a portion of the image of the remote desktop, wherein the web browser comprises client script code;

wherein the method comprises receiving, at the web server, drawing requests from the client script code of the web browser, wherein the facilitating providing the drawing update comprises facilitating providing the drawing update from the web server to the client script code of the web browser in response to one of the drawing requests from the client script code of the web browser.

3. The method of clause 1, wherein the translating the remote desktop drawing command comprises:

translating the remote desktop drawing command into a graphics drawing command compatible with the windows web server;

updating a portion of a bitmap based on the graphics drawing command, wherein the updated portion of the bitmap represents a portion of an image of a remote desktop of the remote machine that has changed relative to a previous graphics drawing command;

generating coordinates for the bitmap;

forming an image file including a windows image file based on the bitmap, wherein the image file is HTML5 compatible; and obtaining drawing coordinates for the image file, wherein the drawing coordinates are compatible with HTML5, wherein the drawing update comprises the image file and the drawing coordinates for the image file, wherein the method comprises receiving, at the web server, drawing requests from the web browser, wherein the facilitating providing the drawing update comprises facilitating providing the drawing update from the web server to the web browser in response to one of the drawing requests from the web browser.

4. The method of clause 1, wherein the web server comprises a remote desktop client wrapper configured to translate the user input request into the input command compatible with the remote desktop display protocol and to translate the remote desktop drawing command into the graphics drawing command compatible with a windows web browser.

5. The method of clause 1, comprising receiving long asynchronous HTTP requests from the web browser, wherein the asynchronous HTTP requests comprise drawing requests and the web browser comprises a windows web browser.

6. The method of clause 1, comprising receiving from the web browser an initial HTTP request comprising a uniform resource locator (URL) of the remote machine.

7. The method of clause 6, comprising facilitating providing a script client code to the web browser in response to the initial HTTP request for the URL of the remote machine, wherein the script client code is compatible with HTML5.

8. The method of clause 1, wherein the remote desktop drawing command is compatible with the remote desktop display protocol, wherein the remote desktop display protocol is a push protocol, and wherein the facilitating providing the drawing update comprises facilitating providing the drawing update using HTTP that is a pull protocol.

9. The method of clause 1, wherein dynamic drawing comprises drawing in real time a portion of the 2D canvas, rather than drawing the entire 2D canvas, in response to one or more drawing requests of a script client of the web browser.

10. The method of clause 1, wherein the 2D canvas is updatable by a portion at a time according to a set of coordinates.

Figure 21B:
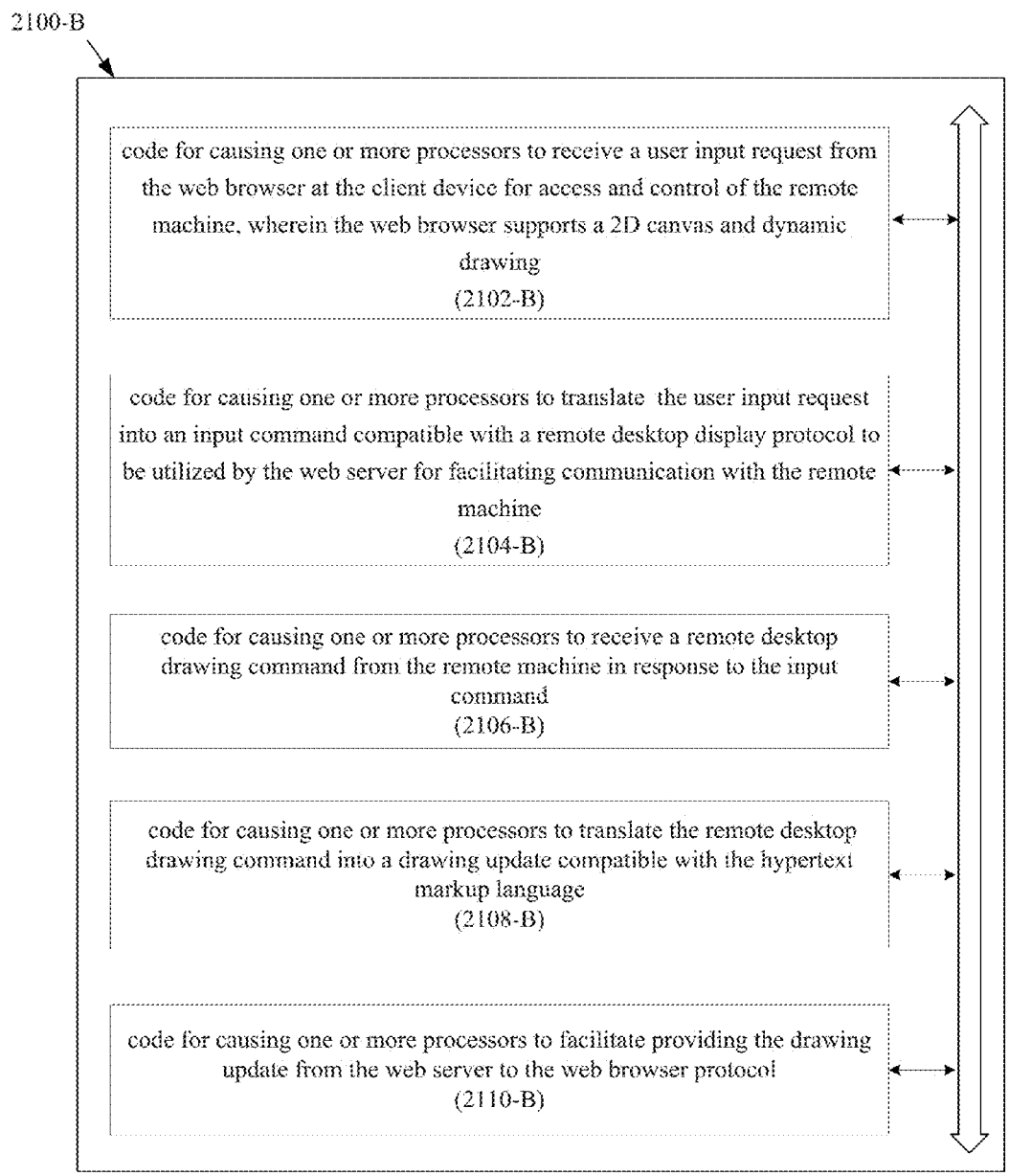
FIG. 21B is a block diagram of an example of a machine-readable storage medium comprising stored instructions executable by one or more processors to perform one or more operations.

11. A machine-readable storage medium (see, e.g., 1210, 1219 in FIGS. 12 and 2100-B of FIG. 21B) comprising instructions stored therein, the instructions executable by one or more processors (see, e.g., 1202), the instructions comprising:

code for causing one or more processors to facilitate receiving a user input request from a web browser of a client device for access and control of a remote machine, wherein the web browser supports a 2D canvas and dynamic drawing (see, e.g., 2102-B of FIG. 21B);

code for causing one or more processors to translate the user input request into an input command compatible with a remote desktop display protocol to be utilized for facilitating communication with the remote machine (see, e.g., 2104-B of FIG. 21B);

code for causing one or more processors to facilitate receiving a remote desktop drawing command from the remote machine in response to the input command (see, e.g., 2106-B of FIG. 21B);

code for causing one or more processors to translate the remote desktop drawing command into a drawing update compatible with hypertext markup language (see, e.g., 2108-B of FIG. 21B); and code for causing one or more processors to facilitate providing the drawing update to the web browser (see, e.g., 2110-B of FIG. 21B).

12. The machine-readable storage medium of clause 11, wherein the web browser comprises a windows web browser and wherein the code for causing one or more processors to translate the remote desktop drawing command comprises:

code for causing one or more processors to translate the remote desktop drawing command into a windows graphics drawing command;

code for causing one or more processors to execute the windows graphics drawing command to update a portion of a windows graphics application programming interface (API) memory bitmap, wherein the windows graphics API memory bitmap represents an image of a remote desktop of the remote machine;

code for causing one or more processors to generate coordinates for the updated portion of the windows graphics API memory bitmap based on the windows graphics drawing command;

code for causing one or more processors to form an image file including a windows image file based on the updated portion of the windows graphics API memory bitmap, wherein the image file is compatible with HTML5; and code for causing one or more processors to obtain drawing coordinates for the image file based on the coordinates for the updated portion of the windows graphics API memory bitmap, wherein the drawing coordinates are compatible with HTML5, wherein the drawing update comprises the image file and the drawing coordinates for the image file, wherein the drawing update represents a portion of the image of the remote desktop, wherein the web browser comprises client script code;

wherein the instructions comprise code for causing one or more processors to facilitate receiving, at a web server, drawing requests from the client script code of the web browser, wherein the code for causing one or more processors to facilitate providing the drawing update comprises code for causing one or more processors to facilitate providing the drawing update from the web server to the client script code of the web browser in response to one of the drawing requests from the client script code of the web browser.

13. The machine-readable storage medium of clause 11, wherein the code for causing one or more processors to translate the remote desktop drawing command comprises:

code for causing one or more processors to translate the remote desktop drawing command into a graphics drawing command compatible with the web server;

code for causing one or more processors to update a portion of a bitmap based on the graphics drawing command, wherein the updated portion of the bitmap represents a portion of an image of a remote desktop of the remote machine that has changed relative to a previous graphics drawing command;

code for causing one or more processors to generate coordinates for the updated portion of the bitmap;

code for causing one or more processors to form an image file including a windows image file based on the updated portion of the bitmap, wherein the image file is HTML5 compatible; and code for causing one or more processors to obtain drawing coordinates for the image file, wherein the drawing coordinates are compatible with HTML5, wherein the drawing update comprises the image file and the drawing coordinates for the image file, wherein the instructions comprise code for causing one or more processors to facilitate receiving, at the web server, drawing requests from the web browser, and wherein the code for causing one or more processors to facilitate providing the drawing update comprises code for causing one or more processors to facilitate providing the drawing update to the web browser in response to one of the drawing requests from the web browser.

14. The machine-readable storage medium of clause 11, wherein the remote desktop display protocol is to be utilized by a web server, wherein the web server is an intermediary between the remote machine and the client device, and wherein the web server comprises a windows web server and is physically separate from the remote machine, wherein the web server comprises a remote desktop client wrapper configured to translate the user input request into the input command compatible with the remote desktop display protocol and to translate the remote desktop drawing command into the graphics drawing command compatible with a windows web browser.

15. The machine-readable storage medium of clause 11, wherein the instructions comprise code for causing one or more processors to facilitate receiving asynchronous HTTP requests from the web browser, wherein the asynchronous HTTP requests comprise drawing requests and the web browser comprises a windows web browser.

16. The machine-readable storage medium of clause 11, wherein the instructions comprise code for causing one or more processors to facilitate receiving from the web browser an initial HTTP request comprising a uniform resource locator (URL) of the remote machine.

17. The machine-readable storage medium of clause 16, wherein the instructions comprise code for causing one or more processors to facilitate providing a script client code to the web browser in response to the initial HTTP request for the URL of the remote machine, wherein the script client code is compatible with HTML5.

18. The machine-readable storage medium of clause 11, wherein the remote desktop drawing command is compatible with the remote desktop display protocol, wherein the remote desktop display protocol is a push protocol, wherein the code for causing one or more processors to facilitate providing the drawing update comprises code for causing one or more processors to facilitate providing the drawing update using HTTP that is a pull protocol, and wherein the drawing updates are compatible with a windows graphic protocol.

19. The machine-readable storage medium of clause 11, wherein dynamic drawing comprises drawing in real time a portion of the 2D canvas, rather than drawing the entire 2D canvas, in response to one or more drawing requests of a script client of the web browser.

20. The machine-readable storage medium of clause 11, wherein the 2D canvas is updatable by a portion at a time according to a set of coordinates.

21. A computing machine comprising the machine-readable storage medium of clause 11, wherein the computing machine is a web server.

Figure 21C:
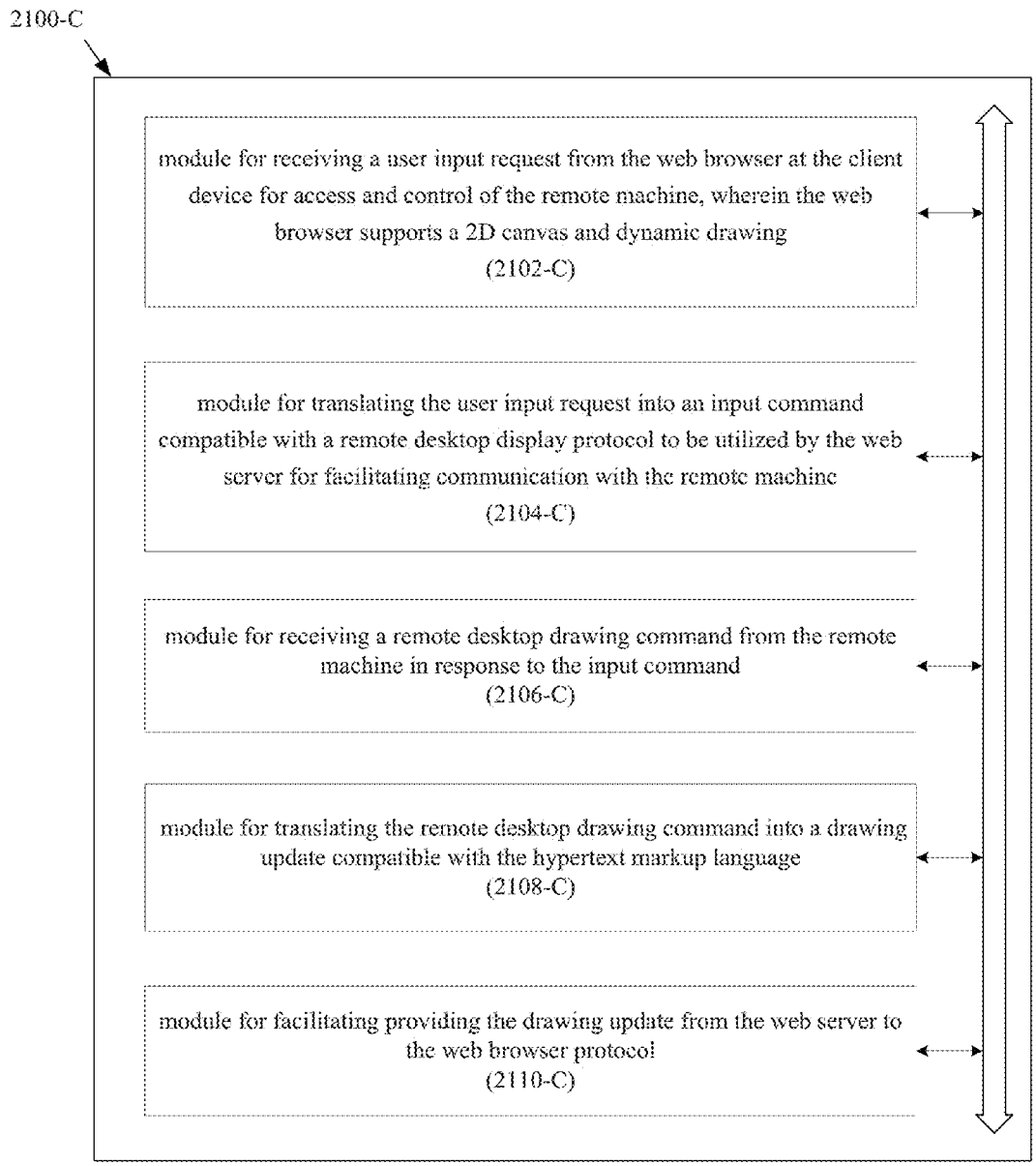
FIG. 21C is a block diagram of an example of an apparatus for facilitating conducting a remote desktop session between a web browser of a client device and a remote machine via a web server in real time.

22. An apparatus (see, e.g., 2100-C of FIG. 21C) for facilitating conducting a remote desktop session between a web browser of a client device and a remote machine via a web server in real time and utilizing hypertext markup language that supports a two-dimensional (2D) canvas and dynamic drawing, the apparatus comprising:

means for receiving a user input request from the web browser of the client device for access and control of the remote machine, wherein the web browser supports a 2D canvas and dynamic drawing (see, e.g., 2102-C of FIG. 21C);

means for translating the user input request into an input command compatible with a remote desktop display protocol to be utilized by the web server for facilitating communication with the remote machine (see, e.g., 2104-C of FIG. 21C);

means for receiving a remote desktop drawing command from the remote machine in response to the input command (see, e.g., 2106-C of FIG. 21C);

means for translating the remote desktop drawing command into a drawing update compatible with the hypertext markup language (see, e.g., 2108-C of FIG. 21C); and means for facilitating providing the drawing update from the web server to the web browser (see, e.g., 2110-C of FIG. 21C);

wherein the web server is an intermediary between the remote machine and the client device, and wherein the web server comprises a windows web server and is physically separate from the remote machine.

23. The apparatus of clause 22, wherein the web browser comprises a windows web browser and means for translating the remote desktop drawing command comprises:

means for translating the remote desktop drawing command into a windows graphics drawing command;

means for executing the windows graphics drawing command to update a portion of a memory bitmap, wherein the memory bitmap represents an image of a remote desktop of the remote machine;

means for generating coordinates for the updated portion of the memory bitmap based on the windows graphics drawing command;

means for forming an image file including a windows image file based on the updated portion of the memory bitmap, wherein the image file is compatible with HTML5; and means for obtaining drawing coordinates for the image file based on the coordinates for the memory bitmap, wherein the drawing coordinates are compatible with HTML5;

wherein the drawing update comprises the image file and the drawing coordinates for the image file, wherein the drawing update represents a portion of the image of the remote desktop, wherein the web browser temporarily comprises client script code during the remote desktop session while the remote desktop session persists;

wherein the apparatus comprises means for receiving drawing requests from the client script code of the web browser, wherein the means for facilitating providing the drawing update comprises means for facilitating providing the drawing update from the web server to the client script code of the web browser in response to one of the drawing requests from the client script code of the web browser.

24. The apparatus of clause 22, wherein the means for translating the remote desktop drawing command comprises:

means for translating the remote desktop drawing command into a graphics drawing command compatible with the web server;

means for updating a portion of a bitmap based on the graphics drawing command, wherein the updated portion of the bitmap represents a portion of an image of a remote desktop of the remote machine that has changed relative to a previous graphics drawing command;

means for generating coordinates for the bitmap;

means for forming an image file including a windows image file based on the bitmap, wherein the image file is HTML5 compatible; and means for obtaining drawing coordinates for the image file, wherein the drawing coordinates are compatible with HTML5, wherein the drawing update comprises the image file and the drawing coordinates for the image file, wherein the apparatus comprises means for receiving drawing requests from the web browser, wherein the means for facilitating providing the drawing update comprises means for facilitating providing the drawing update from the web server to the web browser in response to one of the drawing requests from the web browser.

25. The apparatus of clause 22, wherein the web server comprises a remote desktop client wrapper configured to translate the user input request into the input command compatible with the remote desktop display protocol and to translate the remote desktop drawing command into the graphics drawing command compatible with a windows web browser.

26. The apparatus of clause 22, comprising means for receiving asynchronous HTTP requests from the web browser, wherein the asynchronous HTTP requests comprise drawing requests and the web browser comprises a windows web browser.

27. The apparatus of clause 22, comprising means for receiving from the web browser an initial HTTP request comprising a uniform resource locator (URL) of the remote machine.

28. The apparatus of clause 27, comprising means for facilitating providing a script client code to the web browser in response to the initial HTTP request for the URL of the remote machine, wherein the script client code is compatible with HTML5.

29. The apparatus of clause 22, wherein the remote desktop drawing command is compatible with the remote desktop display protocol, wherein the remote desktop display protocol is a push protocol, wherein the means for facilitating providing the drawing update comprises means for facilitating providing the drawing update using HTTP that is a pull protocol, and wherein the drawing update is compatible with a windows web browser.

30. The apparatus of clause 22, wherein dynamic drawing comprises drawing in real time a portion of the 2D canvas, rather than drawing the entire 2D canvas, in response to one or more drawing requests of a script client of the web browser.

31. The apparatus of clause 22, wherein the 2D canvas is updatable by a portion at a time according to a set of coordinates.

32. The apparatus of clause 22, wherein the apparatus is the web server.

33. The apparatus of clause 22, wherein the apparatus comprises a processing system and memory.

Illustration of Method/Apparatus/Machine Readable Storage Medium for a remote desktop session, utilizing HTTP header (described as Clauses).

The subject technology is illustrated, for example, according to various aspects described below. Various examples of aspects of the subject technology are described as numbered clauses (1, 2, 3, etc.) for convenience. These are provided as examples, and do not limit the subject technology. It is noted that any of the dependent clauses may be combined in any combination, and placed into a respective independent clause.

Figure 22B:
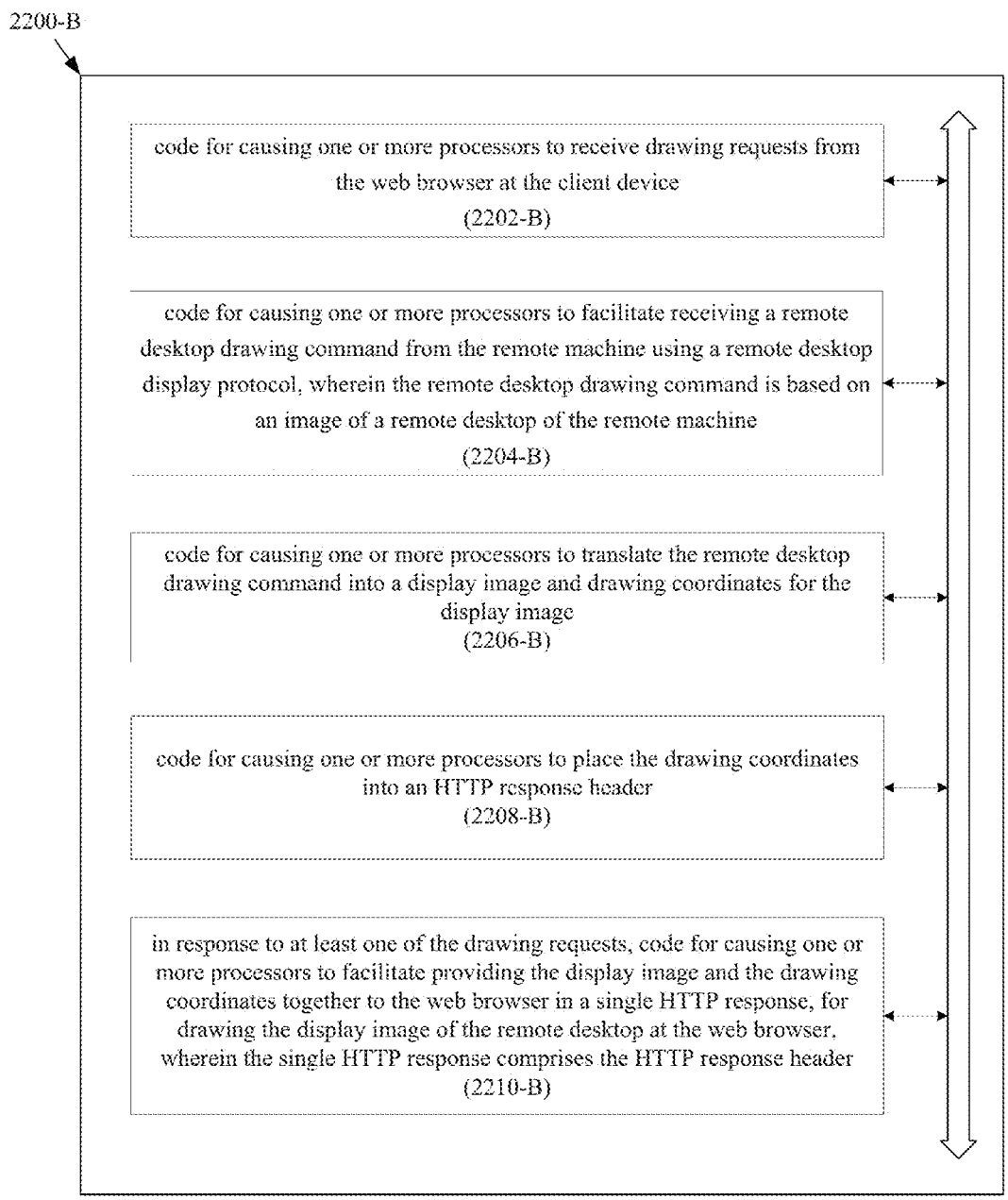
FIG. 22B is a block diagram of an example of a machine-readable storage medium comprising stored instructions executable by one or more processors to perform one or more operations.

Clause 1 below is presented, for example, with reference to FIG. 22A. The other clauses can be presented in a similar manner.

1. A method (see, e.g., 2200-A of FIG. 22A) of facilitating a remote desktop session between a web browser (see, e.g., 810 of FIG. 8A) of a client device (see, e.g., 802 of FIG. 8A) and a remote machine (see, e.g., 830 of FIG. 8A) through a web server, utilizing hypertext transfer protocol (HTTP) headers for remote desktop session drawing, the method comprising:

receiving, at the web server, drawing requests from the web browser of the client device (see, e.g., 2202-A of FIG. 22A);

receiving, at the web server, a remote desktop drawing command from the remote machine using a remote desktop display protocol, wherein the remote desktop drawing command is based on an image of a remote desktop of the remote machine (see, e.g., 2204-A of FIG. 22A);

translating, at the web server, the remote desktop drawing command into a display image and drawing coordinates for the display image (see, e.g., 2206-A of FIG. 22A);

placing, at the web server, the drawing coordinates into an HTTP response header (see, e.g., 2208-A of FIG. 22A); and in response to at least one of the drawing requests, facilitating providing the display image and the drawing coordinates together to the web browser in a single HTTP response, for drawing the display image of the remote desktop at the web browser, wherein the single HTTP response comprises the HTTP response header (see, e.g., 2210-A of FIG. 22A), wherein (i) the remote desktop display protocol is a push protocol, and (ii) HTTP is a pull protocol, and (iii) the web browser comprises a windows web browser.

2. The method of clause 1, wherein the web server comprises a windows web server, and wherein the translating comprises:

translating the remote desktop drawing command into a windows graphics drawing command, wherein the web server comprises one or more web applications including one or more HTTP handlers;

updating a portion of a memory bitmap corresponding to the remote desktop in response to the windows graphics drawing command;

generating coordinates for the updated portion of the memory bitmap from the windows graphics drawing command;

generating the display image compatible with the web browser based on the memory bitmap; and obtaining the drawing coordinates for the display image based on the coordinates for the memory bitmap, wherein the display image and the drawing coordinates are compatible with hypertext markup language (HTML), wherein the updated portion of the memory bitmap represents a portion of an image of the remote desktop of the remote machine, wherein the display image and the drawing coordinates represent the portion of the image of the remote desktop of the remote machine.

3. The method of clause 1, wherein the web server is an intermediary between the remote machine and the client device, and wherein the web server is physically separate from the remote machine.

4. The method of clause 1, wherein the remote desktop drawing command comprises coordinates of a region of the remote desktop that has changed relative to a previous remote desktop drawing command, wherein the coordinates specify a redrawing region, and wherein the display image and the drawing coordinates are compatible with windows graphic protocol and HTML5.

5. The method of clause 1, wherein the display image comprises at least one of a scaled image of the remote desktop or a display image comprising an offset image of the remote desktop.

6. A method of facilitating a remote desktop session between a web browser of a client device and a remote machine through a web server, utilizing asynchronous handling of requests to reduce traffic to the client device, the method comprising:

facilitating receiving, at the web server, a plurality of drawing requests from the web browser of the client device, using HTTP, wherein HTTP is a pull protocol;

handling, at the web server, the plurality of drawing requests as asynchronous requests;

facilitating receiving, at the web server, a remote desktop drawing command from the remote machine;

translating, at the web server, the remote desktop drawing command into a web browser drawing update, wherein the remote desktop drawing command is compatible with a push protocol, wherein the web browser drawing update is compatible with HTTP; and facilitating providing the web browser drawing update from the web server to the web browser of the client device, utilizing HTTP, as a response to at least one of the plurality of drawing requests from the web browser, wherein the web server comprises a windows web server and the web browser is a windows web browser.

7. The method of clause 6, wherein the handling comprises:

determining whether a drawing command is pending at the web server for the web browser;

if there is no pending drawing command, then storing the plurality of drawing requests in a drawing requests queue as asynchronous requests; and if there is a pending drawing command, then providing at least one of the plurality of drawing requests to an HTTP handler module in the web server to allow the HTTP handler module to serve the pending drawing command in response to the at least one of the plurality of drawing requests.

8. The method of clause 6, wherein the remote desktop drawing command represents a portion of an image of a remote desktop of the remote machine, wherein the translating comprises:

translating the remote desktop drawing command into a windows graphics drawing command;

updating a portion of a memory bitmap of the image of the remote desktop in response to the windows graphics drawing command;

generating coordinates of the updated portion of the memory bitmap based on the windows graphics drawing command;

generating an image file based on the updated portion of the memory bitmap, wherein the image file is compatible with the web browser, wherein the image file comprises a windows image file compatible with the windows web browser; and obtaining drawing coordinates for the image file based on the coordinates of the updated portion of the memory bitmap, wherein the web browser drawing update comprises the image file and the drawing coordinates.

9. The method of clause 7, wherein the facilitating providing comprises:

placing, at the HTTP handler module the drawing coordinates into an HTTP header of a single HTTP transmission response to the web browser;

including, at the HTTP handler module, the image file into the single HTTP transmission response to the web browser to facilitate providing the image file and the drawing coordinates together to the web browser in the single HTTP transmission response; and when a drawing commands queue has new coordinates, sending a notification to the drawing requests queue to allow at least one of the plurality of drawing requests in the drawing requests queue to be forwarded to the HTTP handler module.

10. The method of clause 6, comprising:
receiving a request from the web browser to connect to the remote machine;
facilitating providing a client script code to the web browser in response to the request to connect to the remote machine,
wherein the receiving the plurality of drawing requests comprises receiving the plurality of drawing requests from the client script code,
wherein the facilitating providing the web browser drawing update comprises facilitating providing the web browser drawing update to the client script code; and
facilitating deleting the client script code from the web browser when the remote desktop session is terminated.

11. The method of clause 6, comprising:
receiving, at the web server, a user input request from the web browser for accessing or controlling a remote desktop of the remote machine,
translating, at the web server, the user input request into an input command compatible with the push protocol;
facilitating providing the input command to the remote machine utilizing the push protocol,
wherein the receiving the remote desktop drawing command comprises receiving the remote desktop drawing command in response to the input command.

12. A machine-readable storage medium (see, e.g., 1210, 1219 in FIGS. 12 and 2200-B of FIG. 22B) comprising instructions stored therein, the instructions executable by one or more processors to perform one or more operations, the instructions comprising:
code for causing one or more processors to facilitate receiving drawing requests from a web browser of a client device (see, e.g., 2202-B of FIG. 22B);
code for causing one or more processors to facilitate receiving a remote desktop drawing command from a module of a remote machine using a remote desktop display protocol, wherein the remote desktop drawing command is based on an image of a remote desktop of the remote machine (see, e.g., 2204-B of FIG. 22B);
code for causing one or more processors to translate the remote desktop drawing command into a display image and drawing coordinates for the display image (see, e.g., 2206-B of FIG. 22B);
code for causing one or more processors to place the drawing coordinates into a hypertext transfer protocol (HTTP) response header (see, e.g., 2208-B of FIG. 22B); and
code for causing one or more processors to facilitate providing the display image and the drawing coordinates together to the web browser in a single HTTP response to at least one of the drawing requests, for drawing the display image of the remote desktop at the web browser, wherein the single HTTP response comprises the HTTP response header (see, e.g., 2210-B of FIG. 22B),
wherein the remote desktop display protocol is a push protocol, and HTTP is a pull protocol.

13. The machine-readable storage medium of clause 12, wherein the code for causing one or more processors to translate is to be executed at a web server, wherein the web server comprises a windows web server, and wherein the code for causing one or more processors to translate comprises:

code for causing one or more processors to translate the remote desktop drawing command into a windows graphics drawing command;
code for causing one or more processors to update a portion of a memory bitmap of the remote desktop in response to the windows graphics drawing command;
code for causing one or more processors to generate coordinates for the updated portion of the memory bitmap from the windows graphics drawing command;
code for causing one or more processors to generate the display image compatible with the web browser based on the updated portion of the memory bitmap; and
code for causing one or more processors to obtain the drawing coordinates for the display image based on the coordinates for the updated portion of the memory bitmap,
wherein the display image and the drawing coordinates are compatible with hypertext markup language (HTML),
wherein the updated portion of the memory bitmap represents a portion of an image of the remote desktop of the remote machine,
wherein the display image and the drawing coordinates represent the portion of the image of the remote desktop of the remote machine.

14. The machine-readable storage medium of clause 12, wherein the remote desktop drawing command comprises coordinates of a region of the remote desktop that has changed relative to a previous remote desktop drawing command, wherein the coordinates specify a redrawing region, and wherein the display image and the drawing coordinates are compatible with windows graphic protocol and HTML5.

15. The machine-readable storage medium of clause 12, wherein the display image comprises at least one of a scaled image of the remote desktop or a display image comprising an offset image of the remote desktop.

16. A machine-readable storage medium comprising instructions stored therein, the instructions executable by one or more processors to perform one or more operations, the instructions comprising:
code for causing one or more processors to facilitate receiving a plurality of drawing requests from a web browser of a client device, using a hypertext transfer protocol (HTTP), wherein HTTP is a pull protocol;
code for causing one or more processors to handle the plurality of drawing requests as asynchronous requests;
code for causing one or more processors to facilitate receiving a remote desktop drawing command from a module of a remote machine;
code for causing one or more processors to translate the remote desktop drawing command into a web browser drawing update, wherein the remote desktop drawing command is compatible with a push protocol, wherein the web browser drawing update is compatible with HTTP; and
code for causing one or more processors to facilitate providing the web browser drawing update to the web browser of the client device, utilizing HTTP, as a response to at least one of the plurality of drawing requests from the web browser.

17. The machine-readable storage medium of clause 16, wherein the code for causing one or more processors to handle comprises:
code for causing one or more processors to determine whether a drawing command is pending at a web server for the web browser;
if there is no pending drawing command, then code for causing one or more processors to store the plurality of drawing requests in a drawing requests queue as asynchronous requests; and if there is a pending drawing command, then code for causing one or more processors to facilitate providing at least one of the plurality of drawing requests to an HTTP handler module in the web server to allow the HTTP handler module to serve the pending drawing command in response to the at least one of the plurality of drawing requests.

18. The machine-readable storage medium of clause 16, wherein the remote desktop drawing command represents a portion of an image of a remote desktop of the remote machine,
wherein the code for causing one or more processors to translate comprises:
code for causing one or more processors to translate the remote desktop drawing command into a windows graphics drawing command;
code for causing one or more processors to update a portion of a memory bitmap of the image of the remote desktop in response to the windows graphics drawing command;
code for causing one or more processors to generate coordinates of the updated portion of the memory bitmap based on the windows graphics drawing command;
code for causing one or more processors to generate an image file based on the updated portion of the memory bitmap, wherein the image file is compatible with the web browser; and
code for causing one or more processors to obtain drawing coordinates for the image file based on the coordinates of the updated portion of the memory bitmap,
wherein the web browser drawing update comprises the image file and the drawing coordinates.

19. The machine-readable storage medium of clause 17, wherein the code for causing one or more processors to facilitate providing comprises:
code for causing one or more processors to place, at the HTTP handler module, the drawing coordinates into an HTTP header of a single HTTP transmission response to the web browser;
code for causing one or more processors to include, at the HTTP handler module, the image file into the single HTTP transmission response to the web browser to facilitate providing the image file and the drawing coordinates together to the web browser in the single HTTP transmission response; and
code for causing one or more processors to, when a drawing commands queue has new coordinates, send a notification to the drawing requests queue to allow at least one of the plurality of drawing requests in the drawing requests queue to be forwarded to the HTTP handler module.

20. The machine-readable storage medium of clause 16, wherein the instructions comprise:
code for causing one or more processors to facilitate receiving a request from the web browser to connect to the remote machine;
code for causing one or more processors to facilitate providing a client script code to the web browser in response to the request to connect to the remote machine,
wherein the code for causing one or more processors to facilitate receiving the plurality of drawing requests comprises code for causing one or more processors to facilitate receiving the plurality of drawing requests from the client script code,
wherein the code for causing one or more processors to facilitate providing the web browser drawing update comprises code for causing one or more processors to facilitate providing the web browser drawing update to the client script code; and
code for causing one or more processors to facilitate deleting the client script code from the web browser when the remote desktop session is terminated.

21. The machine-readable storage medium of clause 16, wherein the instructions comprise:
code for causing one or more processors to facilitate receiving, at a web server, a user input request from the web browser for accessing or controlling a remote desktop of the remote machine,
code for causing one or more processors to translate, at the web server, the user input request into an input command compatible with the push protocol;
code for causing one or more processors to facilitate providing the input command to the remote machine utilizing the push protocol,
wherein the code for causing one or more processors to facilitate receiving the remote desktop drawing command comprises code for causing one or more processors to facilitate receiving the remote desktop drawing command in response to the input command.

22. A computing machine comprising the machine-readable storage medium of clause 12, wherein the computing machine is a web server.

Figure 22C:
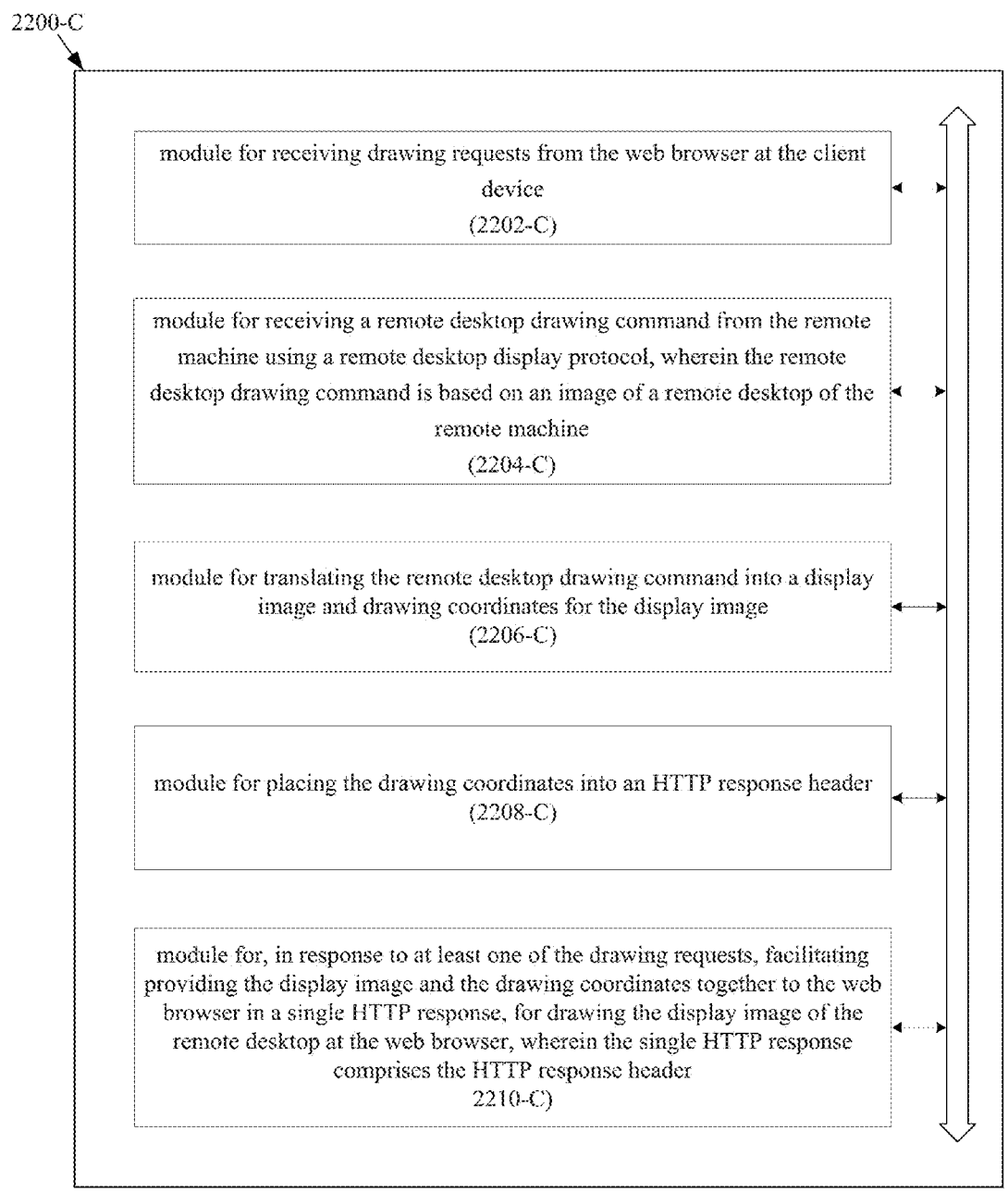
FIG. 22C is a block diagram of an example of an apparatus for facilitating a remote desktop session, utilizing hypertext transfer protocol (HTTP) headers.

23. An apparatus (see, e.g., 2200-C of FIG. 22C) for facilitating a remote desktop session between a web browser of a client device and a remote machine through a web server, utilizing hypertext transfer protocol (HTTP) headers of HTTP for remote desktop session drawing, the apparatus comprising:
means for receiving drawing requests from the web browser of the client device (see, e.g., 2202-C of FIG. 22C);
means for receiving a remote desktop drawing command from the remote machine using a remote desktop display protocol, wherein the remote desktop drawing command is based on an image of a remote desktop of the remote machine (see, e.g., 2204-C of FIG. 22C);
means for translating the remote desktop drawing command into a display image and drawing coordinates for the display image (see, e.g., 2206-C of FIG. 22C);
means for placing the drawing coordinates into an HTTP response header (see, e.g., 2208-C of FIG. 22C); and
means for, in response to at least one of the drawing requests, facilitating providing the display image and the drawing coordinates together to the web browser in a single HTTP response, for drawing the display image of the remote desktop at the web browser, wherein the single HTTP response comprises the HTTP response header (see, e.g., 2210-C of FIG. 22C),
wherein (i) the remote desktop display protocol is a push protocol, and (ii) HTTP is a pull protocol, and (iii) the web browser comprises a windows web browser.

24. The apparatus of clause 23, wherein the means for translating comprises:
means for translating the remote desktop drawing command into a windows graphics drawing command, wherein the web server comprises one or more web applications including one or more HTTP handlers;
means for updating a portion of a memory bitmap of the remote desktop in response to the windows graphics drawing command;
means for generating coordinates for the updated portion of the memory bitmap from the windows graphics drawing command;
means for generating the display image compatible with the web browser based on the updated portion of the memory bitmap; and means for obtaining the drawing coordinates for the display image based on the coordinates for the updated portion of the memory bitmap, wherein the display image and the drawing coordinates are compatible with HTML, wherein the updated portion of the memory bitmap represents a portion of an image of the remote desktop of the remote machine, wherein the display image and the drawing coordinates represent the portion of the image of the remote desktop of the remote machine.

25. The apparatus of clause 23, wherein the remote desktop drawing command comprises coordinates of a region of the remote desktop that has changed relative to a previous remote desktop drawing command, wherein the coordinates specify a redrawing region, and wherein the display image and the drawing coordinates are compatible with windows graphic protocol and HTML5.

26. The apparatus of clause 23, wherein the display image comprises at least one of a scaled image of the remote desktop or a display image comprising an offset image of the remote desktop.

27. The apparatus of clause 23, wherein the web server is an intermediary between the remote machine and the client device, and wherein the web server is physically separate from the remote machine.

28. An apparatus for facilitating a remote desktop session between a web browser of a client device and a remote machine through a web server, utilizing asynchronous handling of requests to reduce traffic to the client device, the apparatus comprising:

means for receiving a plurality of drawing requests from the web browser of the client device, using HTTP, wherein HTTP is a pull protocol;

means for handling the plurality of drawing requests as asynchronous requests;

means for receiving a remote desktop drawing command from the remote machine;

means for translating the remote desktop drawing command into a web browser drawing update, wherein the remote desktop drawing command is compatible with a push protocol, wherein the web browser drawing update is compatible with HTTP; and means for facilitating providing the web browser drawing update from the web server to the web browser of the client device, utilizing HTTP, as a response to at least one of the plurality of drawing requests from the web browser, wherein the web server comprises a windows web server and the web browser is a windows web browser.

29. The apparatus of clause 28, wherein the means for handling comprises:

means for determining whether a drawing command is pending at the web server for the web browser;

means for storing the plurality of drawing requests in a drawing requests queue as asynchronous requests, if there is no pending drawing command; and means for providing at least one of the plurality of drawing requests to an HTTP handler module in the web server to allow the HTTP handler module to serve the pending drawing command in response to the at least one of the plurality of drawing requests, if there is a pending drawing command.

30. The apparatus of clause 28, wherein the remote desktop drawing command represents a portion of an image of a remote desktop of the remote machine, wherein the means for translating comprises:

means for translating the remote desktop drawing command into a windows graphics drawing command;

means for updating a portion of a memory bitmap of the image of the remote desktop in response to the windows graphics drawing command;

means for generating coordinates of the updated portion of the memory bitmap based on the windows graphics drawing command;

means for generating an image file based on the updated portion of the memory bitmap, wherein the image file is compatible with the web browser, wherein the image file includes a windows image file compatible with windows web browser; and means for obtaining drawing coordinates for the image file based on the coordinates of the updated portion of the memory bitmap, wherein the web browser drawing update comprises the image file and the drawing coordinates.

31. The apparatus of clause 28, wherein the means for facilitating providing comprises:

means for placing the drawing coordinates into an HTTP header of a single HTTP transmission response to the web browser;

means for including the image file into the single HTTP transmission response to the web browser to facilitate providing the image file and the drawing coordinates together to the web browser in the single HTTP transmission response; and means for sending a notification to the drawing requests queue to allow at least one of the plurality of drawing requests in the drawing requests queue to be forwarded to the HTTP handler module, when a drawing commands queue has new coordinates.

32. The apparatus of clause 28, comprising:

means for receiving a request from the web browser to connect to the remote machine;

means for facilitating providing a client script code to the web browser in response to the request to connect to the remote machine, wherein the means for receiving the plurality of drawing requests comprises means for receiving the plurality of drawing requests from the client script code, wherein the means for facilitating providing the web browser drawing update comprises means for facilitating providing the web browser drawing update to the client script code; and means for facilitating deleting the client script code from the web browser when the remote desktop session is terminated.

33. The apparatus of clause 28, comprising:

means for receiving a user input request from the web browser for accessing or controlling a remote desktop of the remote machine, means for translating the user input request into an input command compatible with the push protocol;

means for facilitating providing the input command to the remote machine utilizing the push protocol, wherein the means for receiving the remote desktop drawing command comprises means for receiving the remote desktop drawing command in response to the input command.

34. The apparatus of clause 28, wherein the apparatus is the web server.

35. The apparatus of clause 28, wherein the apparatus comprises a processing system and a memory.

Illustration of Method/Apparatus/Machine Readable Storage Medium for facilitating a remote desktop session for a web browser and a remote desktop server (described as Clauses).

The subject technology is illustrated, for example, according to various aspects described below. Various examples of aspects of the subject technology are described as numbered clauses (1, 2, 3, etc.) for convenience. These are provided as examples, and do not limit the subject technology. It is noted that any of the dependent clauses may be combined in any combination, and placed into a respective independent clause. Clause 1 below is presented, for example, with reference to FIG. 23A. The other clauses can be presented in a similar manner.

1. A method (see, e.g., method 2300-A of FIG. 23A) for facilitating a remote desktop session between a web browser (see, e.g., 810 of FIG. 8A) of a client device (see, e.g., 802 of FIG. 8A) and a remote desktop server at a remote machine (see, e.g., 830 of FIG. 8A) through a web server (see, e.g., 820 of FIG. 8A), utilizing a wrapper (see, e.g., 826 of FIG. 8A) of the web server (see, e.g., 820 of FIG. 8A), the method comprising:

receiving, at the wrapper, an input request from the web browser utilizing a request-response protocol, wherein the request-response protocol is a pull protocol (see, e.g., 2302-A of FIG. 23A);

translating, at the wrapper, the input request into an input command compatible with a remote desktop display protocol to be utilized by a remote desktop client at the web server for facilitating communication with the remote desktop server at the remote machine, wherein the remote desktop display protocol is a push protocol (see, e.g., 2304-A of FIG. 23A);

providing the input command to the remote desktop client at the web server, to facilitate providing the input command to the remote desktop server utilizing the remote desktop display protocol (see, e.g., 2306-A of FIG. 23A);

receiving, at the wrapper, a remote desktop drawing command from the remote desktop server in response to the input command, wherein the remote desktop drawing command is based on an image of a remote desktop of the remote machine (see, e.g., 2308-A of FIG. 23A); and translating, at the wrapper, the remote desktop drawing command into a graphics drawing command compatible with the web server to allow the web server to facilitate providing a web browser drawing update to the web browser, wherein the web browser comprises a windows web browser and the web browser drawing update is compatible with the windows web browser (see, e.g., 2310-A of FIG. 23A).

2. The method of clause 1, wherein the request-response protocol comprises hypertext transfer protocol (HTTP), wherein the graphics drawing command is a windows graphics drawing command, wherein the web server is a windows web server, wherein the web browser is hypertext markup language 5 (HTML5) compatible.

3. The method of clause 1, wherein the receiving the input request comprises receiving the input request from the web browser via an HTTP handler of a web application including an ASP.NET model-view-controller (MVC) at the web server, wherein the receiving the remote desktop drawing command comprises receiving the remote desktop drawing command via the remote desktop client using the remote desktop display protocol, wherein the remote desktop drawing command comprises remote desktop drawing command parameters and bitmap data received from the remote desktop server, and wherein the translating the remote desktop drawing command comprises one or more of: calculating new drawing command parameters based on the remote desktop drawing command parameters; adjusting the remote desktop drawing command parameters; and making adjustments to the bitmap data.

4. The method of clause 1, comprising:

executing the graphics drawing command to generate and draw an image into a drawing commands module at the web server that is accessible by an HTTP handler at the web server for communicating with the web browser;

generating coordinates for the image based on the graphics drawing command;

storing the coordinates in the drawing commands queue;

after generating the coordinates, transmitting a notification to the HTTP handler that a drawing command is ready to be served to the web browser, wherein each of the image and the graphics drawing command represents a portion of an image of the remote desktop;

updating at least a portion of an off-screen bitmap based on the graphics drawing command, wherein the at least a portion of the off-screen bitmap is associated with the coordinates, wherein the off-screen bitmap represents an image of the remote desktop.

5. The method of clause 1, comprising:

receiving, via an HTTP handler of the web server, a connection request from the web browser; and facilitating establishing, controlling or terminating the remote desktop session between the remote desktop client and the remote desktop server in response to the connection request, wherein the facilitating of the establishing, controlling or terminating comprises:

generating a session control command based on the connection request, wherein the session control command is compatible with the remote desktop display protocol; and facilitating transmitting the session control command to the remote desktop server via the remote desktop client using the remote desktop display protocol, wherein the session control command comprises at least one of: a command for starting the remote desktop session, a command for stopping the remote desktop session, a credential, a setting, a preference, and a command for passing at least one of a credential, a setting, and a preference.

6. A method for facilitating accessing and controlling a remote desktop of a remote machine in real time from a web browser of a client device utilizing a web server, the method comprising:

receiving, at the web server, a connection request from the web browser utilizing HTTP;

translating, at the web server, the connection request into a session control command compatible with a remote desktop display protocol;

providing the session control command to a remote desktop client of the web server for providing the session control command to a remote desktop server of the remote machine and for establishing, controlling or terminating a remote desktop session with the remote desktop server;

receiving, at the web server, a user input request from the web browser utilizing HTTP, translating, at the web server, the user input request into a remote desktop input command compatible with the remote desktop display protocol;

providing the remote desktop input command to the remote desktop client for providing the remote desktop input command to the remote desktop server;

receiving, at the web server, a remote desktop drawing command from the remote desktop server via the remote desktop client in response to the remote desktop input command, wherein the remote desktop drawing command is compatible with the remote desktop display protocol, and wherein the remote desktop drawing command represents a portion of an image of the remote desktop;

translating, at the web server, the remote desktop drawing command into a graphics drawing command compatible with the web server;

updating, at the web server, a portion of an image and coordinates based on the graphics drawing command;

generating, at the web server, an image file based on the updated portion of the image;

obtaining drawing coordinates based on the coordinates; and facilitating providing a web browser drawing update to the web browser in response to a drawing request from the web browser, wherein the web browser drawing update comprises the image file and the drawing coordinates, and wherein the web browser drawing update is compatible with the web browser, wherein the remote desktop drawing command represents a portion of the remote desktop, and the image represents the remote desktop, wherein (i) the web server comprises a windows web server, (ii) the web browser is s windows web browser, (iii) the remote desktop display protocol is a push protocol, and (iv) HTTP is a pull protocol.

7. The method of clause 6, wherein the user input request comprises at least one of a mouse event, a keyboard event, and a touch event, wherein the updating a portion of an image and coordinates comprises storing the portion of the image and the coordinates into a drawing commands queue, wherein the graphics drawing command is a windows graphics drawing command, and wherein the web browser is HTML5 compatible.

8. The method of clause 6, wherein the updating a portion of an image and coordinates comprises storing the portion of the image and the coordinates into a drawing commands buffer, wherein the method comprises an asynchronous request handling comprising: receiving the drawing request from the web browser utilizing HTTP; forwarding the drawing request to an HTTP handler module if coordinates for an image are pending in the drawing commands buffer; placing the drawing request into a drawing requests queue if coordinates for an image are not pending in the drawing commands buffer, and wherein the method comprises: sending a notification to the drawing requests queue if the drawing commands buffer receives a new drawing command comprising an image and coordinates for an image.

9. The method of clause 6, comprising:

forwarding the drawing request to an HTTP handler in response to a notification from a drawing commands buffer that a drawing command is pending for the web browser;

placing the drawing coordinates into a section of an HTTP header, wherein the image file comprises a windows image file and the facilitating providing the web browser drawing update comprises facilitating providing the windows image file and the drawing coordinates together to the web browser in a single HTTP transmission response for drawing a display image at the web browser, wherein the display image represents the updated portion of the image representing the remote desktop;

facilitating providing script client code compatible with the web browser, to the web browser, if the connection request from the web browser comprises a request to connect to the remote machine.

Figure 23B:
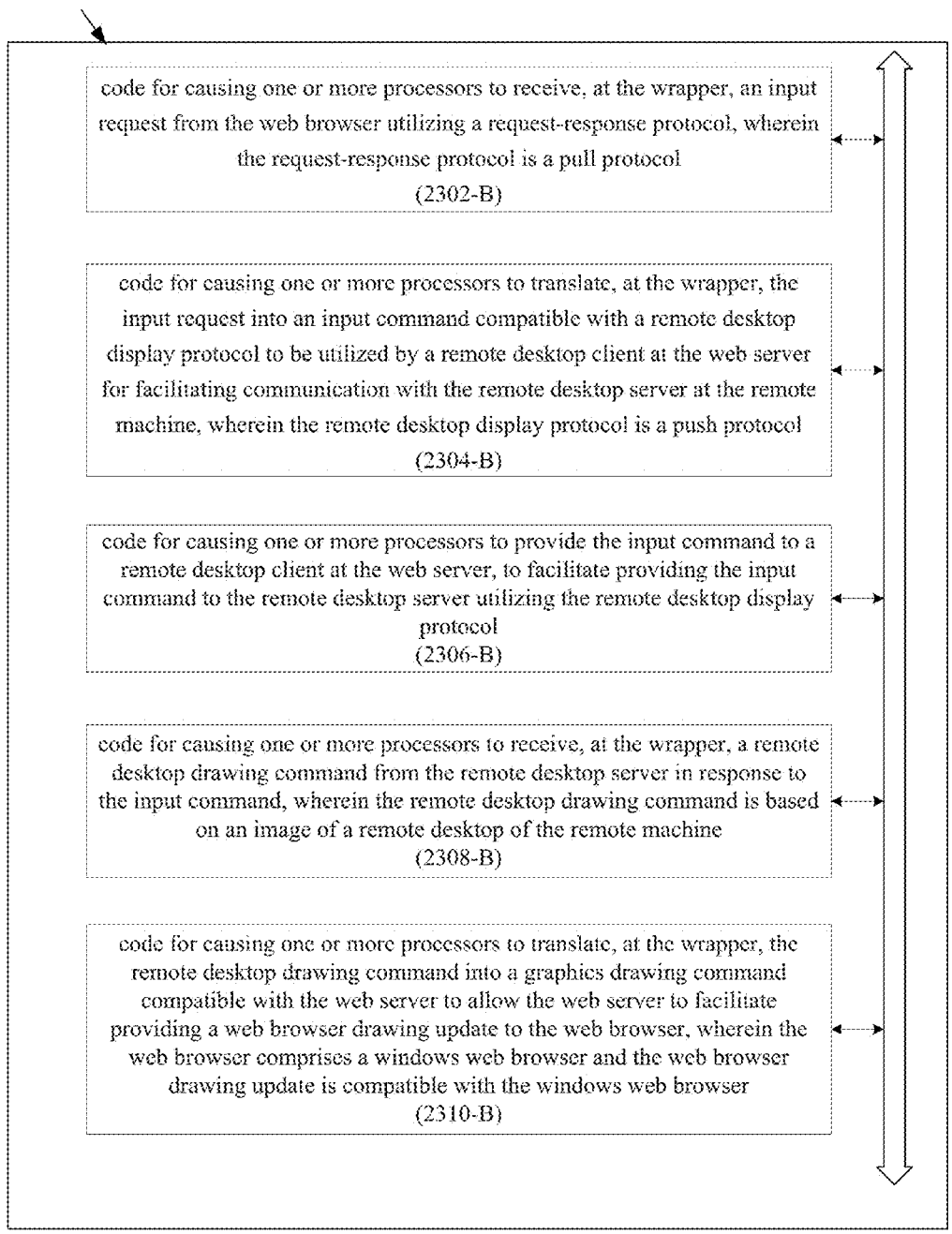
FIG. 23B is a block diagram of an example of a machine-readable storage medium comprising stored instructions executable by one or more processors to perform one or more operations.

10. A machine-readable storage medium (see, e.g., 1210, 1219 in FIGS. 12 and 2300-B of FIG. 23B) comprising instructions stored therein, the instructions executable by one or more processors (see, e.g., 1202) to perform a one or more operations, the instructions comprising:

code for causing one or more processors to facilitate receiving an input request from a web browser utilizing a request-response protocol, wherein the request-response protocol is a pull protocol (see, e.g., 2302-B of FIG. 23B);

code for causing one or more processors to translate the input request into an input command compatible with a remote desktop display protocol to be utilized by a remote desktop client for facilitating communication with a remote desktop server, wherein the remote desktop display protocol is a push protocol (see, e.g., 2304-B of FIG. 23B);

code for causing one or more processors to facilitate providing the input command to the remote desktop client at the web server, to facilitate providing the input command to the remote desktop server utilizing the remote desktop display protocol (see, e.g., 2306-B of FIG. 23B);

code for causing one or more processors to facilitate receiving a remote desktop drawing command from the remote desktop server in response to the input command, wherein the remote desktop drawing command is based on an image of a remote desktop of the remote machine (see, e.g., 2308-B of FIG. 23B); and code for causing one or more processors to translate the remote desktop drawing command into a graphics drawing command to facilitate providing a web browser drawing update to the web browser, wherein the web browser comprises a windows web browser and the web browser drawing update is compatible with the web browser (see, e.g., 2310-B of FIG. 23B).

11. The machine-readable storage medium of clause 10, wherein the request-response protocol comprises hypertext transfer protocol (HTTP), wherein the graphics drawing command is a windows graphics drawing command, wherein a web server is for the remote desktop client a windows web server, wherein the web browser is HTML5 compatible.

12. The machine-readable storage medium of clause 10, wherein the code for causing one or more processors to facilitate receiving the input request comprises code for causing one or more processors to facilitate receiving the input request from the web browser via an HTTP handler of a web application at a web server, wherein the code for causing one or more processors to facilitate receiving the remote desktop drawing command comprises code for causing one or more processors to facilitate receiving the remote desktop drawing command via the remote desktop client using the remote desktop display protocol, wherein the remote desktop drawing command comprises remote desktop drawing command parameters and bitmap data received from the remote desktop server, and wherein the code for causing one or more processors to translate the remote desktop drawing command comprises one or more of: code for causing one or more processors to calculate new drawing command parameters based on the remote desktop drawing command parameters; code for causing one or more processors to adjust the remote desktop drawing command parameters; and code for causing one or more processors to make adjustments to the bitmap data.

13. The machine-readable storage medium of clause 10, wherein the instructions comprise:

code for causing one or more processors to execute the graphics drawing command to generate and draw an image into a drawing commands module at the web server that is accessible by HTTP handler at the web server for communicating with the web browser;

code for causing one or more processors to generate coordinates for the image based on the graphics drawing command;

code for causing one or more processors to store the coordinates in the drawing commands queue;

after generating the coordinates, code for causing one or more processors to transmit a notification to the HTTP handler that a drawing command is ready to be served to the web browser, wherein each of the image and the graphics drawing command represents a portion of an image of the remote desktop;

code for causing one or more processors to update at least a portion of an off-screen bitmap based on the graphics drawing command, wherein the at least a portion of the off-screen bitmap is associated with the coordinates, wherein the off-screen bitmap represents an image of the remote desktop.

14. The machine-readable storage medium of clause 10, wherein the instructions comprise:

code for causing one or more processors to facilitate receiving, via an HTTP handler of a web server, a connection request from the web browser; and code for causing one or more processors to facilitate establishing, controlling or terminating the remote desktop session between the remote desktop client and the remote desktop server in response to the connection request, wherein the code for causing one or more processors to facilitate of the establishing, controlling or terminating comprises:

code for causing one or more processors to generate a session control command based on the connection request, wherein the session control command is compatible with the remote desktop display protocol; and code for causing one or more processors to facilitate transmitting the session control command to the remote desktop server via the remote desktop client using the remote desktop display protocol, wherein the session control command comprises at least one of: a command for starting the remote desktop session, a command for stopping the remote desktop session, a credential, a setting, a preference, and a command for passing at least one of a credential, a setting, and a preference.

15. A computing machine comprising the machine-readable storage medium of clause 10, wherein the computing machine is a web server.

16. A machine-readable storage medium comprising instructions stored therein, the instructions executable by one or more processors to facilitate accessing and controlling a remote desktop of a remote machine in real time from a web browser of a client device via a hypertext transfer protocol (HTTP) handler and a remote desktop client wrapper for a web server, the machine-readable storage medium comprising:

the HTTP handler; and
the remote desktop client wrapper, wherein the HTTP handler is configured to facilitate receiving a connection request and a user input request from the web browser utilizing HTTP, to facilitate providing the connection request and the user input request to the remote desktop client wrapper, and to facilitate providing a web browser drawing update to the web browser in response to a drawing request from the web browser, wherein the web browser drawing update is compatible with the web browser, wherein the remote desktop client wrapper is configured to facilitate receiving the connection request and the user input request, to translate the connection request into a session control command compatible with a remote desktop display protocol, and to translate the user input request into a remote desktop input command compatible with the remote desktop display protocol, wherein the remote desktop client wrapper is configured to facilitate providing the session control command to a remote desktop client for providing the session control command to a remote desktop server of the remote machine and for establishing, controlling or terminating a remote desktop session with the remote desktop server, wherein the remote desktop client wrapper is configured to facilitate providing the remote desktop input command to the remote desktop client for providing the remote desktop input command to the remote desktop server, wherein the remote desktop client wrapper is configured to facilitate receiving a remote desktop drawing command from the remote desktop server via the remote desktop client in response to the remote desktop input command, wherein the remote desktop drawing command is compatible with the remote desktop display protocol, wherein the remote desktop client wrapper is configured to translate the remote desktop drawing command into a graphics drawing command compatible with the web server, and to update a portion of an image representing the remote desktop and coordinates based on the graphics drawing command, and wherein the HTTP handler is configured to generate an image file based on the updated portion of the image and to obtain drawing coordinates based on the coordinates in response to the drawing request, wherein the web browser drawing update comprises the image file and the drawing coordinates, wherein the remote desktop drawing command represents a portion of the remote desktop, and the image represents the remote desktop wherein (i) the web server comprises a windows web server, (ii) the web browser is s windows web browser, (iii) the remote desktop display protocol is a push protocol, and (iv) HTTP is a pull protocol.

17. The machine-readable storage medium of clause 16, wherein the user input request comprises at least one of a mouse event, a keyboard event, and a touch event, wherein the remote desktop client wrapper is configured to update a portion of an image and coordinates by storing the portion of the image and the coordinates into a drawing commands buffer, wherein the graphics drawing command is a windows graphics drawing command, and wherein the web browser is HTML5 compatible.

18. The machine-readable storage medium of clause 16, comprising an asynchronous handler configured to handle requests asynchronously by: facilitate receiving the drawing request from the web browser utilizing HTTP; forwarding the drawing request to an HTTP handler module if coordinates for an image are pending in the drawing commands buffer; placing the drawing request into a drawing requests queue if coordinates for an image are not pending in the drawing commands buffer, and wherein the HTTP handler is configured to send a notification to the drawing requests queue if the drawing commands buffer receives a new drawing command comprising an image and coordinates for an image.

19. The machine-readable storage medium of clause 16, wherein the web server is configured to forward the drawing request to the HTTP handler in response to a notification from a drawing commands buffer that a drawing command is pending for the web browser, wherein the HTTP handler is configured to place the drawing coordinates into a section of an HTTP header, wherein the image file comprises a windows image file and to facilitate providing the windows image file and the drawing coordinates together to the web browser in a single HTTP transmission response for drawing a display image at the web browser, wherein the display image represents the updated portion of the image representing the remote desktop, and wherein the HTTP handler is configured to facilitate providing script client code compatible with the web browser, to the web browser, if the connection request from the web browser comprises a request to connect to the remote machine.

Figure 23C:
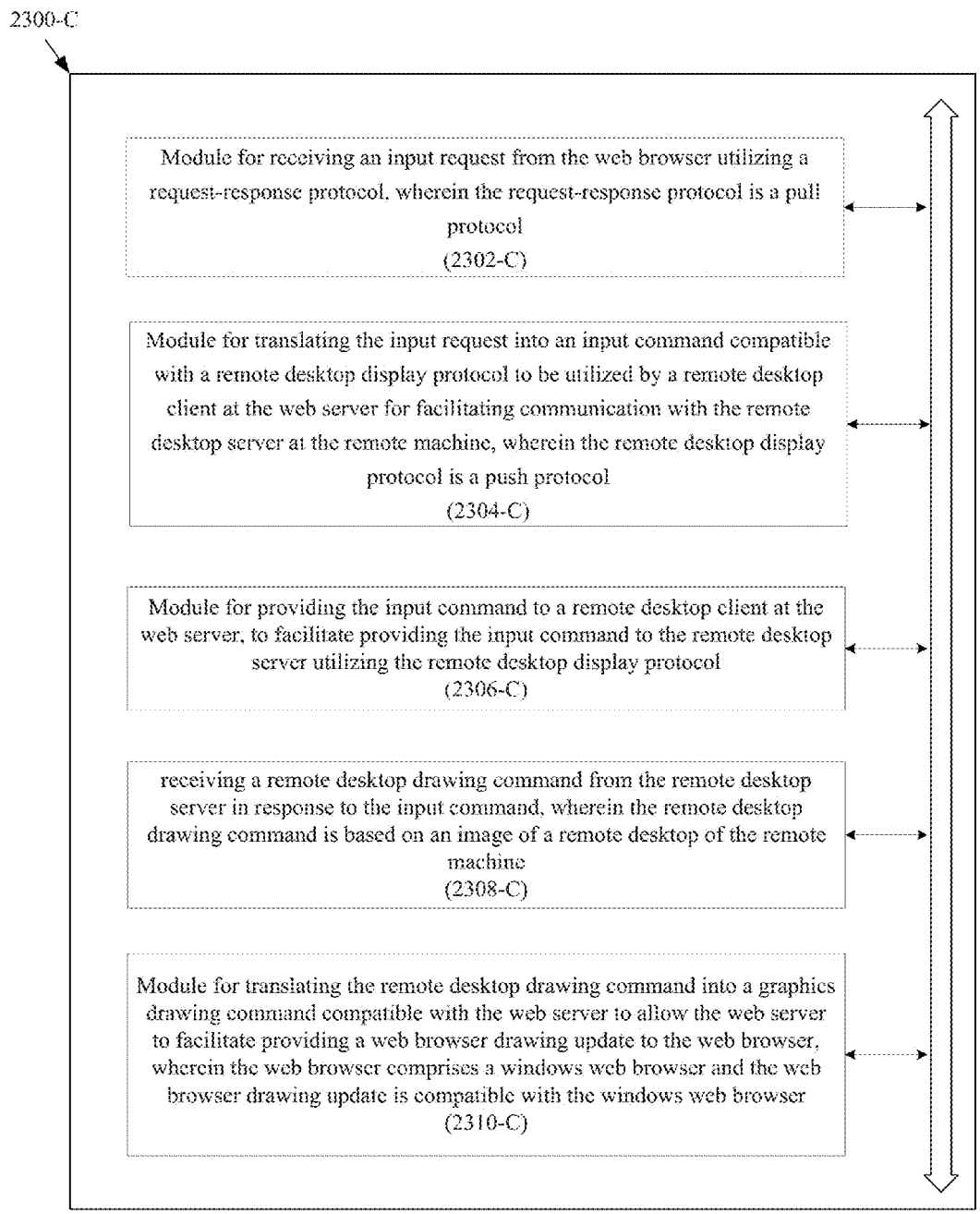
FIG. 23C is a block diagram of an example of an apparatus for facilitating a remote desktop session for a web browser and a remote desktop server.

20. An apparatus (see, e.g., 2300-C of FIG. 23C) for facilitating a remote desktop session between a web browser of a client device and a remote desktop server of a remote machine through a web server, utilizing a wrapper at the web server, the apparatus comprising:

means for receiving an input request from the web browser utilizing a request-response protocol, wherein the request-response protocol is a pull protocol (see, e.g., 2302-C of FIG. 23C);

means for translating the input request into an input command compatible with a remote desktop display protocol to be utilized by a remote desktop client at the web server for facilitating communication with the remote desktop server at the remote machine, wherein the remote desktop display protocol is a push protocol (see, e.g., 2304-C of FIG. 23C);

means for providing the input command to a remote desktop client at the web server, to facilitate providing the input command to the remote desktop server utilizing the remote desktop display protocol (see, e.g., 2306-C of FIG. 23C);

means for receiving a remote desktop drawing command from the remote desktop server in response to the input command, wherein the remote desktop drawing command is based on an image of a remote desktop of the remote machine (see, e.g., 2308-C of FIG. 23C); and means for translating the remote desktop drawing command into a graphics drawing command compatible with the web server to allow the web server to facilitate providing a web browser drawing update to the web browser, wherein the web browser comprises a windows web browser and the web browser drawing update is compatible with the windows web browser (see, e.g., 2310-C of FIG. 23C).

21. The apparatus of clause 20, wherein the request-response protocol comprises hypertext transfer protocol (HTTP), wherein the graphics drawing command is a windows graphics drawing command, wherein the web server is a windows web server, wherein the web browser is HTML5 compatible.

22. The apparatus of clause 20, wherein the means for receiving the input request comprises means for receiving the input request from the web browser via an HTTP handler of a web application at the web server, wherein the means for receiving the remote desktop drawing command comprises means for receiving the remote desktop drawing command via the remote desktop client using the remote desktop display protocol, wherein the remote desktop drawing command comprises remote desktop drawing command parameters and bitmap data received from the remote desktop server, and wherein the translating the remote desktop drawing command comprises one or more of: calculating new drawing command parameters based on the remote desktop drawing command parameters; adjusting the remote desktop drawing command parameters; and making adjustments to the bitmap data.

23. The apparatus of clause 20, comprising:

means for executing the graphics drawing command to generate and draw an image into a drawing commands module at the web server that is accessible by an HTTP handler at the web server for communicating with the web browser;

means for generating coordinates for the image based on the graphics drawing command;

means for storing the coordinates in the drawing commands queue;

means for transmitting a notification to the HTTP handler that a drawing command is ready to be served to the web browser, after generating the coordinates, wherein each of the image and the graphics drawing command represents a portion of an image of the remote desktop;

means for updating at least a portion of an off-screen bitmap based on the graphics drawing command, wherein the at least a portion of the off-screen bitmap is associated with the coordinates, wherein the off-screen bitmap represents an image of the remote desktop.

24. The apparatus of clause 20, comprising:

means for receiving, via an HTTP handler of the web server, a connection request from the web browser; and means for facilitating establishing, controlling or terminating the remote desktop session between the remote desktop client and the remote desktop server in response to the connection request, wherein the means for facilitating of the establishing, controlling or terminating comprises:

means for generating a session control command based on the connection request, wherein the session control command is compatible with the remote desktop display protocol; and means for facilitating transmitting the session control command to the remote desktop server via the remote desktop client using the remote desktop display protocol, wherein the session control command comprises at least one of: a command for starting the remote desktop session, a command for stopping the remote desktop session, a credential, a setting, a preference, and a command for passing at least one of a credential, a setting, and a preference.

25. An apparatus for facilitating accessing and controlling a remote desktop of a remote machine in real time from a web browser of a client device utilizing a web server, the apparatus comprising:

means for receiving a connection request from the web browser utilizing HTTP;

means for translating the connection request into a session control command compatible with a remote desktop display protocol;

means for providing the session control command to a remote desktop client of the web server for providing the session control command to a remote desktop server of the remote machine and for establishing, controlling or terminating a remote desktop session with the remote desktop server;

means for receiving a user input request from the web browser utilizing HTTP, means for translating the user input request into a remote desktop input command compatible with the remote desktop display protocol;

means for providing the remote desktop input command to the remote desktop client for providing the remote desktop input command to the remote desktop server;

means for receiving a remote desktop drawing command from the remote desktop server via the remote desktop client in response to the remote desktop input command, wherein the remote desktop drawing command is compatible with the remote desktop display protocol, and wherein the remote desktop drawing command represents a portion of an image of the remote desktop;

means for translating the remote desktop drawing command into a graphics drawing command compatible with the web server;

means for updating a portion of an image and coordinates based on the graphics drawing command;

means for generating an image file based on the updated portion of the image;

means for obtaining drawing coordinates based on the coordinates; and means for facilitating providing a web browser drawing update to the web browser in response to a drawing request from the web browser, wherein the web browser drawing update comprises the image file and the drawing coordinates, and wherein the web browser drawing update is compatible with the web browser, wherein the remote desktop drawing command represents a portion of the remote desktop, and the image represents the remote desktop, wherein (i) the web server comprises a windows web server, (ii) the web browser is s windows web browser, (iii) the remote desktop display protocol is a push protocol, and (iv) HTTP is a pull protocol.

26. The apparatus of clause 25, wherein the user input request comprises at least one of a mouse event, a keyboard event, and a touch event, wherein the means for updating a portion of an image and coordinates comprises means for storing the portion of the image and the coordinates into a drawing commands queue, wherein the graphics drawing command is a windows graphics drawing command, and wherein the web browser is HTML5 compatible.

27. The apparatus of clause 25, wherein the means for updating a portion of an image and coordinates comprises means for storing the portion of the image and the coordinates into a drawing commands buffer, wherein the apparatus comprises means for asynchronous request handling comprising: means for receiving the drawing request from the web browser utilizing HTTP; means for forwarding the drawing request to an HTTP handler module if coordinates for an image are pending in the drawing commands buffer; means for placing the drawing request into a drawing requests queue if coordinates for an image are not pending in the drawing commands buffer, and wherein the apparatus comprises: means for sending a notification to the drawing requests queue if the drawing commands buffer receives a new drawing command comprising an image and coordinates for an image.

28. The apparatus of clause 25, comprising:

means for forwarding the drawing request to an HTTP handler in response to a notification from a drawing commands buffer that a drawing command is pending for the web browser;

means for placing the drawing coordinates into a section of an HTTP header, wherein the image file comprises a windows image file and the means for facilitating providing the web browser drawing update comprises means for facilitating providing the windows image file and the drawing coordinates together to the web browser in a single HTTP transmission response for drawing a display image at the web browser, wherein the display image represents the updated portion of the image representing the remote desktop;

means for facilitating providing script client code compatible with the web browser, to the web browser, if the connection request from the web browser comprises a request to connect to the remote machine.

29. The apparatus of clause 25, wherein the apparatus is the web server.

30. The apparatus of clause 25, wherein the apparatus comprises a processing system and memory.

31. An Apparatus comprising modules configured to perform the method of any one of the forgoing clauses.

32. The apparatus of clause 31, comprising the web server.

33. The apparatus of clause 31, comprising a processing system and memory.

34. A machine-readable storage medium comprising code for causing the web server to perform the method of any one of the forgoing clauses.

35. The machine-readable storage medium of clause 34, wherein the web server comprises the machine-readable storage medium.

36. An apparatus comprising means for performing the method of any one of the forgoing clauses.

37. The apparatus of clause 36, comprising a web server.

38. The apparatus of clause 36, comprising a processing system and memory.

39. An apparatus comprising components operable to perform the method of any one of the forgoing clauses.

40. The apparatus of clause 39, comprising a web server.

41. The apparatus of clause 39, comprising a processing system and memory.

Without limitation and without limiting the scope of the foregoing clauses or this disclosure, in one aspect, illustrations of the foregoing clauses may include FIGS. 8-11 with the corresponding description in the disclosure.

Without limitation and without limiting the scope of the foregoing clauses or this disclosure, in one aspect, the foregoing clauses are re-stated herein and FIGS. 14A through 19E are re-drawn herein, with the phrase "transcoding server" replaced with the phrase "web server" (e.g., 820 in FIG. 8), with the phrase "long polling request" replaced with the phrase "asynchronous request", and with the phrase "adapter" replaced with the phrase "Wrapper."

Without limitation and without limiting the scope of the foregoing clauses or this disclosure, referring to FIG. 8, the foregoing clauses and the previous paragraph, in one aspect, an example of a client device may be client device 802 of FIG. 8, an example of a remote machine may be 830, an example of a web browser may be 810, an example of a web application container may be 822. an example of a HTTP handler may be 344, an example of a transcoder server may be 820, an example of a HTTP handler may be 824, and an example of a remote desktop client adaptor may be 826. an example of a HTTP handler may be 344. Referring to FIG. 9, the foregoing clauses and the previous paragraph, in one aspect, an example of a transcoding server may be web server 901 of FIG. 9, an example of a HTTP handler may be 912, 916, and an example of a long polling handler may be 914.

In one aspect, any of the clauses herein may depend from any one of the independent clauses or any one of the dependent clauses. In one aspect, any of the clauses (e.g., dependent or independent clauses) may be combined with any other clauses (e.g., dependent or independent clauses). In one aspect, a claim may include some or all of the words (e.g., steps, operations, means or components) recited in a clause, a sentence, a phrase or a paragraph. In one aspect, a claim may include some or all of the words recited in one or more clauses, sentences, phrases or paragraphs. In one aspect, some of the words in each of the clauses, sentences, phrases or paragraphs may be removed. In one aspect, additional words or elements may be added to a clause, a sentence, a phrase or a paragraph. In one aspect, the subject technology may be implemented without utilizing some of the components, elements, functions or operations described herein. In one aspect, the subject technology may be implemented utilizing additional components, elements, functions or operations.

Those of skill in the art would appreciate that the various illustrative blocks, modules, elements, components, methods, and algorithms described herein may be implemented as electronic hardware, computer software, or combinations of both.

For example, a module (e.g., a web application container, a long polling handler module, a long polling handler, a drawing requests queue, an HTTP handler, an image conversion module, a drawing commands queue, a remote desktop client adapter, a remote desktop client, a remote desktop server, an input listener, an image.onload handler, an image.onerror/image.on abort handler, a drawing command handler, a remote desktop client manager, a user input handler, an HTML canvas, a script client, an HTTP handler, a remote desktop client wrapper, an HTTP handler response ready, an HTTP request switch, a drawing coordinates queue, a memory bitmap, a drawing commands module, a remote desktop session module, a user input module, or other modules or functions) may be implemented as electronic hardware, computer software, or combinations of both. Modules may be considered in some aspects as "means for" accomplishing one or more functions or steps. In one aspect, a module(s) may be an apparatus since a module(s) may include instructions encoded or stored on a machine-readable medium, on another device, or on a portion thereof, where an instruction(s) may be software, an application(s), a subroutine(s), or a portion thereof, where the instructions(s) may be for performing the function(s) or operation(s). In one aspect, a module(s) may be software (e.g., an application, a subroutine) stored in a machine-readable medium and executable by a processing system or a processor. In another aspect, a module(s) may be hardware (e.g., machine-readable medium encoded with instructions, a pre-programmed general-purpose computer with for example ASIC or FPGA, or a special purpose electronic or optical device). In an aspect, a module may be implemented as one or more circuits configured to perform the function(s) or operation(s). A circuit may include one or more circuits and/or logic. A circuit may be analog and/or digital. A circuit may be electrical and/or optical. A circuit may include transistors. In an example, one or more modules may be implemented as a processing system (e.g., a digital signal processor (DSP), an application specific integrated circuit (ASIC), a field programmable gate array (FPGA), etc.), as a portion(s) of any of the foregoing, or as a combination(s) of any of the foregoing. Those skilled in the art will recognize how to implement the instructions, circuits, and processing systems.

To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application.

In one aspect of the disclosure, when actions or functions (e.g., receiving, determining, providing, generating, converting, displaying, notifying, accepting, selecting, controlling, transmitting, reporting, sending, establishing, building, or any other action or function) are described as being performed by an item (e.g., one or more of blocks, modules, elements, components or processors), it is understood that such actions or functions may be performed, for example, by the item directly or indirectly. In an example, when an item is described as performing an action, the item may be understood to perform the action indirectly, for example, by facilitating such an action (e.g., assisting, allowing, enabling, causing, or providing for, such action to occur; or performing a portion of such an action). For example, determining can refer to facilitating determination, attaching can refer to facilitating attaching, and receiving can refer to facilitating receiving. For instance, facilitating receiving an item may, for example, include providing a code to allow an entity to receive the item. For instance, when a session is described as being established by a module, it is understood that the module may establish the session indirectly by facilitating an establishment of the session. As yet another example, when an image is described as being displayed or rendered by a module, it is understood that the image may be displayed or rendered by the module either directly or indirectly. In one aspect, performing an action may refer to performing a portion of the action (e.g., performing a beginning part of the action, performing an end part of the action, or performing a middle portion of the action).

Various components and blocks may be arranged differently (e.g., arranged in a different order, or partitioned in a different way) all without departing from the scope of the subject technology. In one aspect of the disclosure, the modules (or elements) recited in the accompanying claims may be performed by one module or by a smaller number of modules, and this arrangement is within the scope of the claims. In another aspect, the modules (or elements) recited in the accompanying claims may be performed by a larger number of modules, and this arrangement is within the scope of the claims. In yet another aspect, a module (or an element) recited in the accompanying claims may be performed by multiple modules, and this arrangement is within the scope of the claims.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element (e.g., a command, a call, a handler, a device, a machine, etc.) in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

In one aspect, the term "compatible" may be used in a sense that a first element (e.g., a drawing command, an input call, an input command, a connection request, a drawing request, etc.) is compatible with a second element (e.g., a remote desktop display protocol, a remote desktop client, a remote desktop server, a transcoding server, a web browser, a client device, a remote machine, HTML5, HTTP, etc.) so that the first element can be recognized or understood by the second element, can be processed by the second element, or can be utilized by or with the second element.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A method of facilitating conducting a remote desktop session between a web browser of a client device and a remote machine via a web server in real time and utilizing hypertext markup language (HTML) that supports a two-dimensional (2D) canvas and dynamic drawing, the method comprising:

receiving, at the web server, a user input request from the web browser of the client device for access and control of the remote machine, wherein the web browser supports a 2D canvas and dynamic drawing;

translating, at the web server, the user input request into an input command compatible with a remote desktop display protocol to be utilized by the web server for facilitating communication with the remote machine;

receiving, at the web server, a remote desktop drawing command from the remote machine in response to the input command;

translating, at the web server, the remote desktop drawing command into a windows graphics drawing command by executing the windows graphics drawing command to update a portion of a windows graphics application programming interface (API) memory bitmap, wherein the windows graphics API memory bitmap represents a portion of an image of a remote desktop of the remote machine that has changed relative to a previous graphics drawing command; and providing the windows graphics drawing command from the web server to the web browser;

wherein the web server is an intermediary between the remote machine and the client device, and wherein the web server comprises a windows web server and is physically separate from the remote machine.

2. The method of claim 1, wherein the web browser comprises a windows web browser and wherein the translating the remote desktop drawing command comprises:

generating coordinates for the windows graphics API memory bitmap based on the windows graphics drawing command;

forming an image file including a windows image file based on the windows graphics API memory bitmap, wherein the image file is compatible with HTML5; and obtaining drawing coordinates for the image file based on the coordinates for the windows graphics API memory bitmap, wherein the drawing coordinates are compatible with HTML5, wherein the windows graphics drawing command comprises the image file and the drawing coordinates for the image file, wherein the windows graphics drawing command represents a portion of the image of the remote desktop, wherein the web browser comprises client script code;

wherein the method comprises receiving, at the web server, drawing requests from the client script code of the web browser, wherein providing the windows graphics drawing command comprises providing the windows graphics drawing command from the web server to the client script code of the web browser in response to one of the drawing requests from the client script code of the web browser.

3. The method of claim 1, wherein the translating the remote desktop drawing command comprises:

generating coordinates for the windows graphics API memory bitmap;

forming an image file including a windows image file based on the windows graphics API memory bitmap, wherein the image file is HTML5 compatible; and obtaining drawing coordinates for the image file, wherein the drawing coordinates are compatible with HTML5, wherein the windows graphics drawing command comprises the image file and the drawing coordinates for the image file, wherein the method comprises receiving, at the web server, drawing requests from the web browser, wherein providing the windows graphics drawing command comprises providing the windows graphics drawing command from the web server to the web browser in response to one of the drawing requests from the web browser.

4. The method of claim 1, wherein the web server comprises a remote desktop client wrapper configured to translate the user input request into the input command compatible with the remote desktop display protocol and to translate the remote desktop drawing command into the windows graphics drawing command compatible with a windows web browser.

5. The method of claim 1, comprising receiving long asynchronous HTTP requests from the web browser, wherein the asynchronous HTTP requests comprise drawing requests and the web browser comprises a windows web browser.

6. The method of claim 1, comprising receiving from the web browser an initial HTTP request comprising a uniform resource locator (URL) of the remote machine.

7. The method of claim 6, comprising providing a script client code to the web browser in response to the initial HTTP request for the URL of the remote machine, wherein the script client code is compatible with HTML5.

8. The method of claim 1, wherein the remote desktop drawing command is compatible with the remote desktop display protocol, wherein the remote desktop display protocol is a push protocol, and wherein providing the windows graphics drawing command comprises providing the windows graphics drawing command using HTTP that is a pull protocol.

9. The method of claim 1, wherein dynamic drawing comprises drawing in real time a portion of the 2D canvas, rather than drawing the entire 2D canvas, in response to one or more drawing requests of a script client of the web browser.

10. The method of claim 1, wherein the 2D canvas is updatable by a portion at a time according to a set of coordinates.

11. A machine-readable non-transitory storage medium comprising instructions stored therein, the instructions executable by one or more processors, the instructions comprising code for causing a processor to:
  receive a user input request from a web browser of a client device for access and control of a remote machine, wherein the web browser supports a 2D canvas and dynamic drawing;
  translate the user input request into an input command compatible with a remote desktop display protocol to be utilized for facilitating communication with the remote machine;
  receive a remote desktop drawing command from the remote machine in response to the input command;
  translate the remote desktop drawing command into a windows graphics drawing command by executing the windows graphics drawing command to update a portion of a windows graphics application programming interface (API) memory bitmap, wherein the windows graphics API memory bitmap represents a portion of an image of a remote desktop of the remote machine that has changed relative to a previous graphics drawing command; and
  provide the windows graphics drawing command to the web browser.

12. The machine-readable non-transitory storage medium of claim 11, wherein the web browser comprises a windows web browser and wherein translating the remote desktop drawing command comprises code for causing the processor to:
  generate coordinates for the updated portion of the windows graphics API memory bitmap based on the windows graphics drawing command;
  form an image file including a windows image file based on the updated portion of the windows graphics API memory bitmap, wherein the image file is compatible with HTML5; and
  obtain drawing coordinates for the image file based on the coordinates for the updated portion of the windows graphics API memory bitmap, wherein the drawing coordinates are compatible with HTML5,
  wherein the windows graphics drawing command comprises the image file and the drawing coordinates for the image file,
  wherein the windows graphics drawing command represents a portion of the image of the remote desktop, wherein the web browser comprises client script code;
  wherein the instructions further comprise code for causing the processor to receive, at a web server, drawing requests from the client script code of the web browser,
  wherein providing the windows graphics drawing command comprises code for causing the processor to provide the windows graphics drawing command from the web server to the client script code of the web browser in response to one of the drawing requests from the client script code of the web browser.

13. The machine-readable non-transitory storage medium of claim 11, wherein translating the remote desktop drawing command comprises code for causing the processor to:
  generate coordinates for the updated portion of the windows graphics API memory bitmap;
  form an image file including a windows image file based on the updated portion of the windows graphics API memory bitmap, wherein the image file is HTML5 compatible; and
  obtain drawing coordinates for the image file, wherein the drawing coordinates are compatible with HTML5,
  wherein the windows graphics drawing command comprises the image file and the drawing coordinates for the image file,
  wherein the instructions further comprise code for causing the processor to receive, at the web server, drawing requests from the web browser, and
  wherein providing the windows graphics drawing command comprises providing the windows graphics drawing command to the web browser in response to one of the drawing requests from the web browser.

14. The machine-readable non-transitory storage medium of claim 11, wherein the remote desktop display protocol is to be utilized by a web server, wherein the web server is an intermediary between the remote machine and the client device, wherein the web server comprises a windows web server and is physically separate from the remote machine, wherein the web server comprises a remote desktop client wrapper configured to translate the user input request into the input command compatible with the remote desktop display protocol and to translate the remote desktop drawing command into the windows graphics drawing command compatible with a windows web browser.

15. The machine-readable non-transitory storage medium of claim 11, wherein the instructions comprise code for causing the processor receive asynchronous HTTP requests from the web browser, wherein the asynchronous HTTP requests comprise drawing requests and the web browser comprises a windows web browser.

16. The machine-readable non-transitory storage medium of claim 11, wherein the instructions comprise code for causing the processor to receive from the web browser an initial HTTP request comprising a uniform resource locator (URL) of the remote machine.

17. The machine-readable non-transitory storage medium of claim 16, wherein the instructions comprise code for causing the processor to provide a script client code to the web browser in response to the initial HTTP request for the URL of the remote machine, wherein the script client code is compatible with HTML5.

18. The machine-readable non-transitory storage medium of claim 11, wherein the remote desktop drawing command is compatible with the remote desktop display protocol, wherein the remote desktop display protocol is a push protocol, and wherein providing the windows graphics drawing command comprises code for causing the processor to provide the windows graphics drawing command using HTTP that is a pull protocol.

19. The machine-readable non-transitory storage medium of claim 11, wherein dynamic drawing comprises drawing in real time a portion of the 2D canvas, rather than drawing the entire 2D canvas, in response to one or more drawing requests of a script client of the web browser.

20. The machine-readable non-transitory storage medium of claim 11, wherein the 2D canvas is updatable by a portion at a time according to a set of coordinates.

21. A computing machine comprising the machine-readable non-transitory storage medium of claim 11, wherein the computing machine is a web server.

22. A system for facilitating conducting a remote desktop session between a web browser of a client device and a remote machine via a web server in real time and utilizing hypertext markup language that supports a two-dimensional (2D) canvas and dynamic drawing, the system comprising:

a processor configured to:

receive a user input request from the web browser of the client device for access and control of the remote machine, wherein the web browser supports a 2D canvas and dynamic drawing;

translate the user input request into an input command compatible with a remote desktop display protocol to be utilized by the web server for facilitating communication with the remote machine;

receive a remote desktop drawing command from the remote machine in response to the input command;

translate the remote desktop drawing command into a windows graphics drawing command by executing the windows graphics drawing command to update a portion of a windows graphics application programming interface (API) memory bitmap, wherein the windows graphics API memory bitmap represents a portion of an image of a remote desktop of the remote machine that has changed relative to a previous graphics drawing command; and provide the windows graphics drawing command from the web server to the web browser;

wherein the web server is an intermediary between the remote machine and the client device, and wherein the web server comprises a windows web server and is physically separate from the remote machine.

23. The system of claim 22, wherein the web browser comprises a windows web browser and translating the remote desktop drawing command comprises:

generating coordinates for the updated portion of the windows graphics API memory bitmap based on the windows graphics drawing command;

forming an image file including a windows image file based on the updated portion of the windows graphics API memory bitmap, wherein the image file is compatible with HTML5; and obtaining drawing coordinates for the image file based on the coordinates for the windows graphics API memory bitmap, wherein the drawing coordinates are compatible with HTML5;

wherein the windows graphics drawing command comprises the image file and the drawing coordinates for the image file, wherein the windows graphics drawing command represents a portion of the image of the remote desktop, wherein the web browser temporarily comprises client script code during the remote desktop session while the remote desktop session persists;

wherein the processor is further configured to receive drawing requests from the client script code of the web browser, wherein providing the windows graphics drawing command comprises providing the windows graphics drawing command from the web server to the client script code of the web browser in response to one of the drawing requests from the client script code of the web browser.

24. The system of claim 22, wherein translating the remote desktop drawing command comprises:

generating coordinates for the windows graphics API memory bitmap;

forming an image file including a windows image file based on the windows graphics API memory bitmap, wherein the image file is HTML5 compatible; and obtaining drawing coordinates for the image file, wherein the drawing coordinates are compatible with HTML5, wherein the windows graphics drawing command comprises the image file and the drawing coordinates for the image file, wherein the processor is further configured to receive drawing requests from the web browser, wherein providing the windows graphics drawing command providing the windows graphics drawing command from the web server to the web browser in response to one of the drawing requests from the web browser.

25. The system of claim 22, wherein the web server comprises a remote desktop client wrapper configured to translate the user input request into the input command compatible with the remote desktop display protocol and to translate the remote desktop drawing command into the windows graphics drawing command compatible with a windows web browser.

26. The system of claim 22, wherein the processor is further configured to receive asynchronous HTTP requests from the web browser, wherein the asynchronous HTTP requests comprise drawing requests and the web browser comprises a windows web browser.

27. The system of claim 22, wherein the processor is further configured to receive from the web browser an initial HTTP request comprising a uniform resource locator (URL) of the remote machine.

28. The system of claim 27, wherein the processor is further configured to provide a script client code to the web browser in response to the initial HTTP request for the URL of the remote machine, wherein the script client code is compatible with HTML5.

29. The system of claim 22, wherein the remote desktop drawing command is compatible with the remote desktop display protocol, wherein the remote desktop display protocol is a push protocol, wherein providing the windows graphics drawing command comprises providing the windows graphics drawing command using HTTP that is a pull protocol, and wherein the windows graphics drawing command is compatible with a windows web browser.

30. The system of claim 22, wherein dynamic drawing comprises drawing in real time a portion of the 2D canvas, rather than drawing the entire 2D canvas, in response to one or more drawing requests of a script client of the web browser.

31. The system of claim 22, wherein the 2D canvas is updatable by a portion at a time according to a set of coordinates.

32. The system of claim 22, wherein the system is the windows web server.

33. The system of claim 22, wherein the system comprises a processing system and a memory.

* * * * *